United States Patent
Girtman et al.

(10) Patent No.: US 9,315,345 B2
(45) Date of Patent: Apr. 19, 2016

(54) ROBOTIC CARTON UNLOADER

(71) Applicant: INTELLIGRATED HEADQUARTERS LLC, Mason, OH (US)

(72) Inventors: Michael L. Girtman, O'Fallon, MO (US); Tim Beilsmith, St. Louis, MO (US); Matthew Wicks, St. Charles, MO (US)

( * ) Notice: Subject to any disclaimer, the term of this patent is extended or adjusted under 35 U.S.C. 154(b) by 113 days.

(21) Appl. No.: 14/471,688

(22) Filed: Aug. 28, 2014

(65) Prior Publication Data

US 2015/0063972 A1   Mar. 5, 2015

Related U.S. Application Data

(60) Provisional application No. 61/871,292, filed on Aug. 28, 2013, provisional application No. 61/894,871, filed on Oct. 23, 2013, provisional application No. 61/894,878, filed on Oct. 23, 2013, provisional (Continued)

(51) Int. Cl.
*B25H 3/00* (2006.01)
*B65G 61/00* (2006.01)
(Continued)

(52) U.S. Cl.
CPC .............. *B65G 61/00* (2013.01); *B25J 9/0093* (2013.01); *B25J 15/0052* (2013.01);
(Continued)

(58) Field of Classification Search
CPC ........ B65G 67/08; B65G 61/00; B65G 59/04; B65G 67/02; B65G 67/24; B65G 59/02; B65G 2201/025; B65G 2814/031; B25J 19/0016; B25J 15/0616; B25J 9/0093; B25J 15/0052; B25J 15/08; Y10T 74/20305; B66C 23/005; F15B 15/1457; F15B 15/149; Y10S 901/40; Y10S 901/01; Y10S 901/02; Y10S 901/15; Y10S 901/27

USPC ................... 198/308.1, 471.1, 517, 581, 812; 414/111, 345, 392, 393, 398, 666, 680, 414/719, 796.9, 797, 797.2, 799; 901/48
See application file for complete search history.

(56) References Cited

U.S. PATENT DOCUMENTS

| 2,605,912 A | 8/1952 | Small et al. |
| 3,608,743 A | 9/1971 | Mosher |

(Continued)

FOREIGN PATENT DOCUMENTS

| CA | 908092 A | 8/1972 |
| CA | 2143816 | 9/1996 |

(Continued)

OTHER PUBLICATIONS

International Search Report and Written Opinion received in connection with international application No. PCT/US2014/053252; mailed Dec. 10, 2014.

(Continued)

*Primary Examiner* — Stephen Vu

(57) ABSTRACT

A robotic carton unloader for automatic unloading of cartons from a carton pile. In various embodiments, a robotic carton unloader may comprise a mobile body, a movable robotic arm attached to the mobile body and comprising an end effector configured to unload a row of cartons in a side-by-side orientation from the carton pile, and a conveyor system mounted on the mobile body and configured to receive the row of cartons from the end effector in the side-by-side orientation. In various embodiments the conveyor system may comprise a front-end descrambler and a central descrambler coupled to the front-end descrambler. In various embodiments, the robotic arm may be configured to straddle at least a portion of the mobile body and at least a portion of the conveyor system such that the conveyor system conveys cartons from the carton pile through the robotic arm.

20 Claims, 72 Drawing Sheets

Related U.S. Application Data application No. 61/894,889, filed on Oct. 23, 2013, provisional application No. 61/916,720, filed on Dec. 16, 2013, provisional application No. 61/971,463, filed on Mar. 27, 2014, provisional application No. 61/973,188, filed on Mar. 31, 2014, provisional application No. 62/023,068, filed on Jul. 10, 2014.

(51) Int. Cl.

| | | |
|---|---|---|
| B25J 9/00 | (2006.01) | |
| B25J 15/00 | (2006.01) | |
| B25J 15/06 | (2006.01) | |
| B25J 15/08 | (2006.01) | |
| B65G 67/08 | (2006.01) | |

(52) U.S. Cl.
CPC ............. *B25J 15/0616* (2013.01); *B25J 15/08* (2013.01); *B65G 67/08* (2013.01); *Y10S 901/01* (2013.01); *Y10S 901/02* (2013.01); *Y10S 901/15* (2013.01); *Y10S 901/27* (2013.01)

(56) References Cited

U.S. PATENT DOCUMENTS

| | | |
|---|---|---|
| 3,651,963 A | 3/1972 | McWilliams |
| 3,715,043 A | 2/1973 | Weir |
| 3,837,510 A | 9/1974 | McWilliams |
| 3,850,313 A | 11/1974 | Rackman et al. |
| 3,866,739 A | 2/1975 | Sikorski |
| 4,039,074 A | 8/1977 | Maxted |
| 4,044,897 A | 8/1977 | Maxted |
| 4,111,412 A | 9/1978 | Cathers |
| 4,181,947 A | 1/1980 | Krauss et al. |
| 4,229,136 A | 10/1980 | Panissidi |
| 4,242,025 A | 12/1980 | Thibault |
| 4,281,955 A | 8/1981 | McWilliams |
| 4,284,186 A | 8/1981 | Brouwer |
| 4,536,980 A | 8/1985 | Fleming |
| 4,597,707 A | 7/1986 | Cornacchia |
| 4,635,908 A | 1/1987 | Ludwig |
| 4,692,876 A | 9/1987 | Tenma et al. |
| 4,705,447 A | 11/1987 | Smith |
| 4,721,005 A | 1/1988 | Yoshiji et al. |
| 4,747,193 A | 5/1988 | Hashidate et al. |
| 4,792,995 A | 12/1988 | Harding |
| 4,802,377 A | 2/1989 | Keppler |
| 4,836,111 A | 6/1989 | Kaufmann |
| 4,904,150 A | 2/1990 | Svensson et al. |
| RE33,416 E | 10/1990 | Konishi et al. |
| 4,968,214 A | 11/1990 | Shiotani |
| 4,976,584 A | 12/1990 | Focke |
| 5,009,560 A | 4/1991 | Ruder et al. |
| 5,015,145 A | 5/1991 | Angell et al. |
| 5,067,867 A | 11/1991 | Ruder et al. |
| 5,108,255 A | 4/1992 | Cornacchia |
| 5,195,627 A | 3/1993 | Wyman |
| 5,201,626 A | 4/1993 | Hansen |
| 5,240,101 A | 8/1993 | LeMay et al. |
| 5,256,021 A | 10/1993 | Wolf et al. |
| 5,325,953 A | 7/1994 | Doster et al. |
| 5,400,896 A | 3/1995 | Loomer |
| 5,415,057 A | 5/1995 | Nihei et al. |
| 5,415,281 A | 5/1995 | Taylor et al. |
| 5,476,358 A | 12/1995 | Costa |
| 5,509,630 A | 4/1996 | Bringuier |
| 5,524,747 A | 6/1996 | Wohlfahrt et al. |
| 5,549,191 A | 8/1996 | Itoh et al. |
| 5,560,733 A | 10/1996 | Dickinson |
| 5,605,432 A | 2/1997 | Fink et al. |
| 5,642,803 A | 7/1997 | Tanaka |
| 5,701,989 A | 12/1997 | Boone et al. |
| 5,716,184 A | 2/1998 | Lowe et al. |
| 5,718,325 A | 2/1998 | Doster et al. |
| 5,738,487 A | 4/1998 | Schaede et al. |
| 5,743,705 A | 4/1998 | Eissfeller |
| 5,769,204 A | 6/1998 | Okada et al. |
| 5,796,620 A | 8/1998 | Laskowski et al. |
| 5,799,806 A | 9/1998 | Cullity |
| 5,918,723 A | 7/1999 | Schuitema et al. |
| 5,921,740 A | 7/1999 | Stewart |
| 5,984,621 A | 11/1999 | Letson |
| 5,997,240 A | 12/1999 | Focke et al. |
| 6,006,893 A | 12/1999 | Gilmore et al. |
| 6,116,841 A | 9/2000 | Iwasaki |
| 6,234,737 B1 | 5/2001 | Young et al. |
| 6,234,745 B1 * | 5/2001 | Pugh ..................... B65G 59/02 414/794.5 |
| 6,238,175 B1 | 5/2001 | Gotz et al. |
| 6,269,933 B1 | 8/2001 | Schuitema et al. |
| 6,298,587 B1 | 10/2001 | Vollom |
| 6,408,225 B1 | 6/2002 | Ortmeier et al. |
| 6,412,621 B1 | 7/2002 | De Vree et al. |
| 6,484,862 B1 | 11/2002 | Gilmore et al. |
| 6,502,877 B2 | 1/2003 | Schick et al. |
| 6,545,440 B2 | 4/2003 | Slater et al. |
| 6,629,018 B2 | 9/2003 | Mondie et al. |
| 6,629,594 B2 | 10/2003 | Nagel et al. |
| 6,634,686 B2 | 10/2003 | Hosokawa |
| 6,659,264 B2 | 12/2003 | Pelka |
| 6,823,985 B2 | 11/2004 | Gilmore et al. |
| 6,923,085 B2 | 8/2005 | Nakano |
| 7,090,067 B2 | 8/2006 | Shiesser et al. |
| 7,108,125 B2 | 9/2006 | Gilmore et al. |
| 7,168,910 B2 | 1/2007 | Keller |
| 7,387,485 B2 | 6/2008 | Dickey et al. |
| 7,641,247 B2 | 1/2010 | Blonigan et al. |
| 7,648,329 B2 | 1/2010 | Chilson et al. |
| 7,967,543 B2 | 6/2011 | Criswell et al. |
| 7,980,808 B2 | 7/2011 | Chilson et al. |
| 7,994,793 B2 | 8/2011 | Matsumoto et al. |
| 8,075,243 B2 | 12/2011 | Chilson et al. |
| 8,162,362 B2 | 4/2012 | Braunschweiger et al. |
| 8,192,137 B2 | 6/2012 | Ross et al. |
| 8,210,791 B2 | 7/2012 | Chilson et al. |
| 8,295,980 B2 | 10/2012 | Williamson |
| 8,473,094 B2 * | 6/2013 | Becker .................. B65G 47/914 294/65 |
| 8,522,540 B2 | 9/2013 | Runesson et al. |
| 8,562,277 B2 | 10/2013 | Criswell |
| 2001/0014268 A1 | 8/2001 | Bryson, III et al. |
| 2003/0177688 A1 | 9/2003 | Renzi |
| 2003/0209407 A1 | 11/2003 | Brouwer et al. |
| 2004/0013506 A1 | 1/2004 | Guhr et al. |
| 2004/0020087 A1 | 2/2004 | Fleming |
| 2006/0133913 A1 | 6/2006 | Helmner |
| 2006/0185963 A1 | 8/2006 | Wijngaarden et al. |
| 2006/0260911 A1 | 11/2006 | Eckert et al. |
| 2006/0272324 A1 | 12/2006 | Hedman |
| 2006/0280587 A1 | 12/2006 | Guerra et al. |
| 2007/0020069 A1 | 1/2007 | Hutton |
| 2007/0246328 A1 | 10/2007 | Reznik |
| 2008/0267756 A1 | 10/2008 | Echelmeyer et al. |
| 2009/0110522 A1 | 4/2009 | Criswell |
| 2010/0074720 A1 | 3/2010 | Taylor |
| 2010/0104403 A1 | 4/2010 | Cho et al. |
| 2010/0178137 A1 | 7/2010 | Chintalapati et al. |
| 2010/0178139 A1 | 7/2010 | Sundar et al. |
| 2010/0266381 A1 | 10/2010 | Chilson et al. |
| 2011/0072930 A1 | 3/2011 | Bayer et al. |
| 2011/0114444 A1 | 5/2011 | Butler et al. |
| 2012/0076629 A1 | 3/2012 | Goff et al. |
| 2012/0207572 A1 | 8/2012 | Enenkel |
| 2012/0207577 A1 | 8/2012 | Stollery et al. |
| 2012/0253507 A1 | 10/2012 | Eldershaw et al. |
| 2014/0050557 A1 | 2/2014 | Criswell |
| 2014/0205403 A1 | 7/2014 | Criswell |

FOREIGN PATENT DOCUMENTS

| | | |
|---|---|---|
| CH | 648806 A5 | 4/1985 |
| DE | 10324755 A1 | 9/2004 |
| DE | 102010033115 A1 | 2/2012 |
| EP | 1332683 A2 | 8/2003 |

(56) References Cited

FOREIGN PATENT DOCUMENTS

| | | |
|---|---|---|
| EP | 2626181 A2 | 8/2013 |
| GB | 2109337 A | 6/1983 |
| GB | 2327929 A | 2/1999 |
| JP | 5756689 U | 4/1982 |
| JP | 05105235 | 4/1993 |
| JP | 06262561 | 9/1994 |
| JP | 09301538 | 11/1997 |
| NL | 1011978 C2 | 11/2000 |
| WO | 9316582 A1 | 9/1993 |
| WO | 2008091733 A2 | 7/2008 |
| WO | 2008094164 A1 | 8/2008 |
| WO | 2009051723 A1 | 4/2009 |
| WO | 2010114754 A1 | 10/2010 |

OTHER PUBLICATIONS

International Search Report and Written Opinion received in connection with international application No. PCT/US2014/053247; mailed Dec. 11, 2014.

International Search Report and Written Opinion received in connection with international application No. PCT/US2014/048679; mailed Nov. 20, 2014.

Prieele, "The best way to unload a container . . . ", http://www.youtube.com/watch?feature=player_detailpage&v=Mc-IClyclgU, (Nov. 17, 2009).

RTL Robotic Mixed Case Simulation, "http://robotics.wynright.com/videos.php" (Dec. 12, 2012).

RTL Robotic Truck Loading, "http://robotics.wynright.com/videos.php" (Dec. 12, 2012).

RTL Robotic Tire Loading, "http://robotics.wynright.com/videos.php" (Dec. 12, 2012).

RTU Robotic Truck Unloading, "http://robotics.wynright.com/videos.php" (Dec. 12, 2012).

RTU Robotic Truck Unloading 2, "http://robotics.wynright.com/videos.php" (Mar. 22, 2013).

RTU Mixed Case, "http://robotics.wynright.com/videos.php" (Feb. 11, 2013).

RTU Window View, "http://robotics.wynright.com/videos.php" (Feb. 11, 2013).

RTU Window View 2, "http://robotics.wynright.com/videos.php" (Feb. 11, 2013).

U.S. Appl. No. 61/754,630, filed Jan. 20, 2013 titled "Automated Truck Unloader for Unloading/Unpacking Product from Trailers and Containers".

International Preliminary Report on Patentability received in connection with International Application No. PCT/US2014/048679; dated Aug. 5, 2015.

* cited by examiner

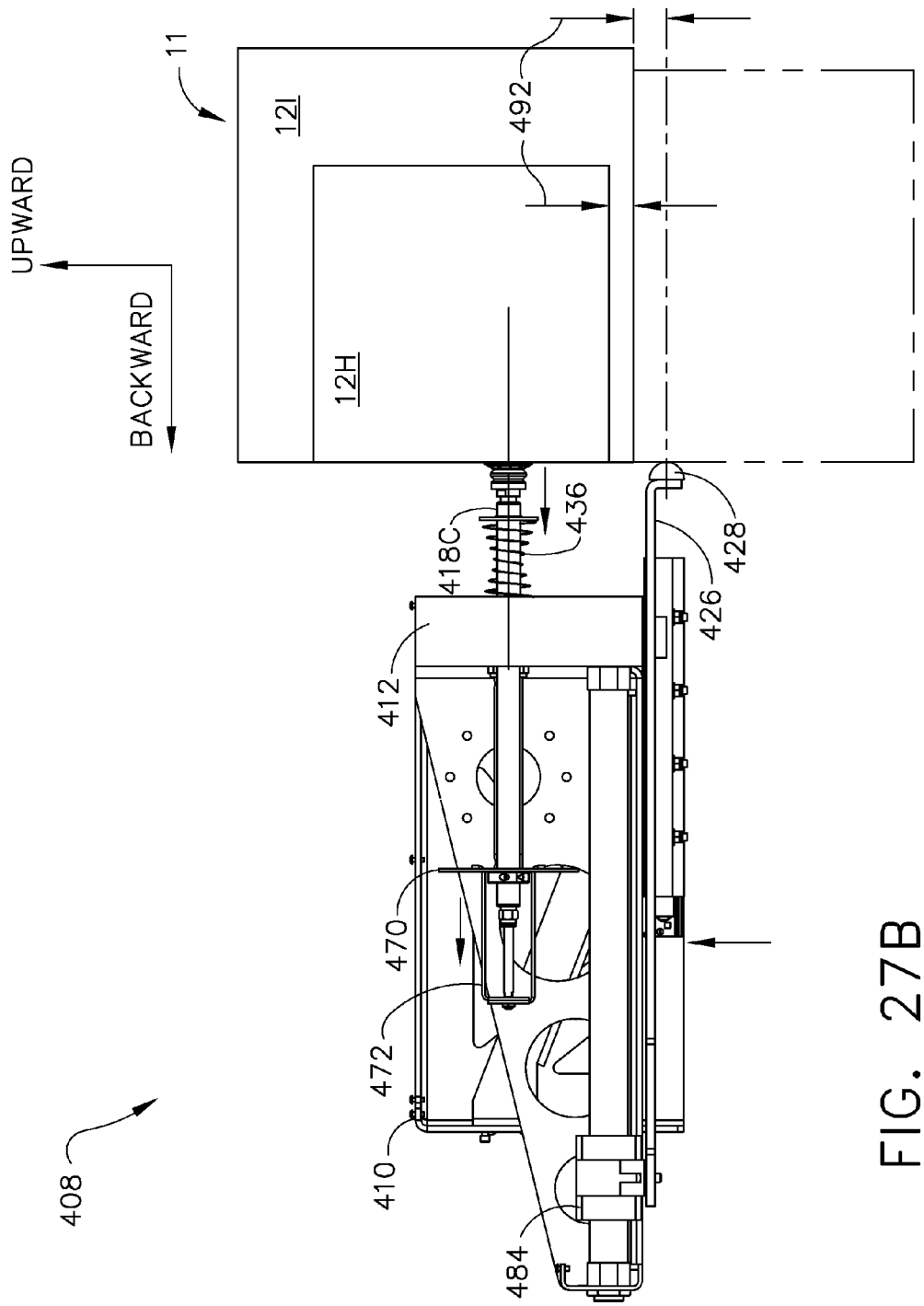

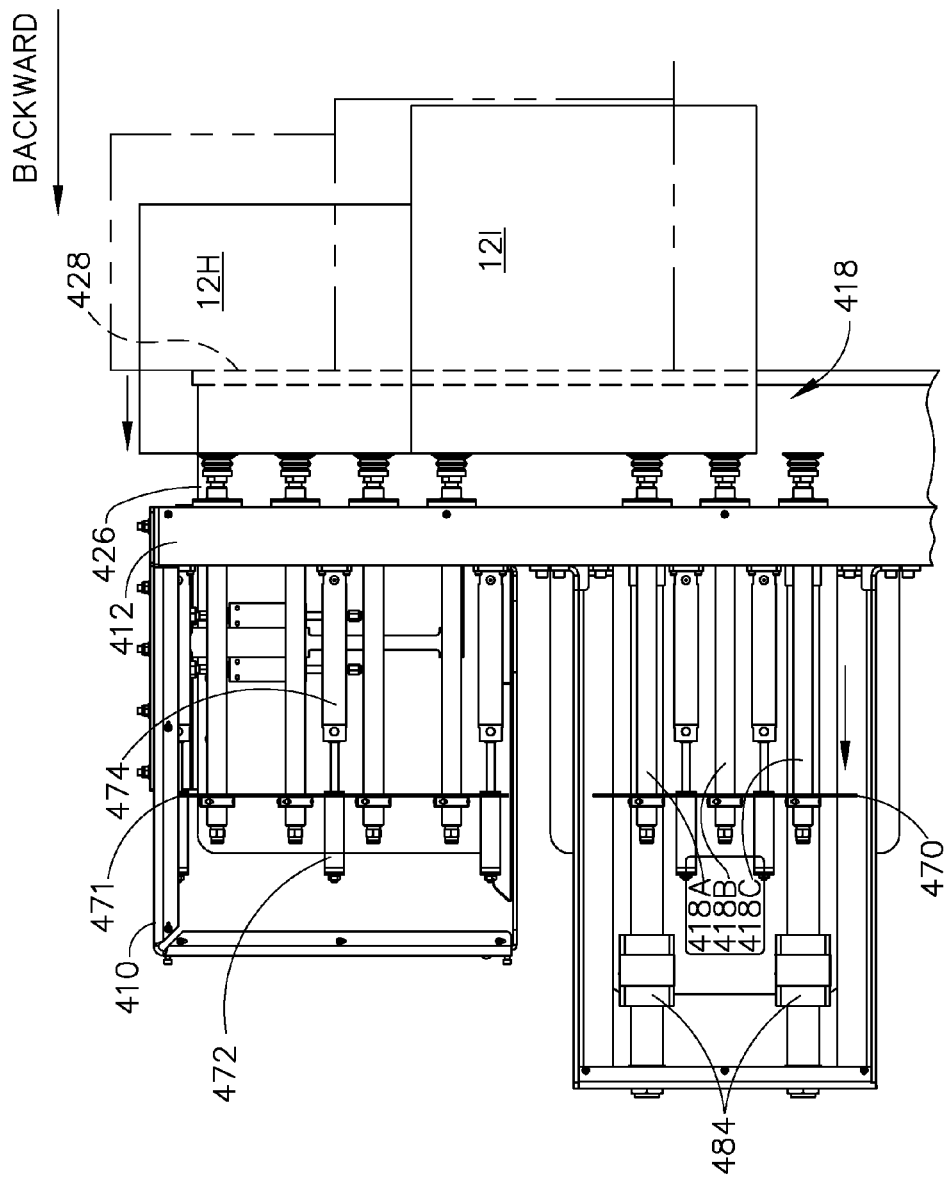

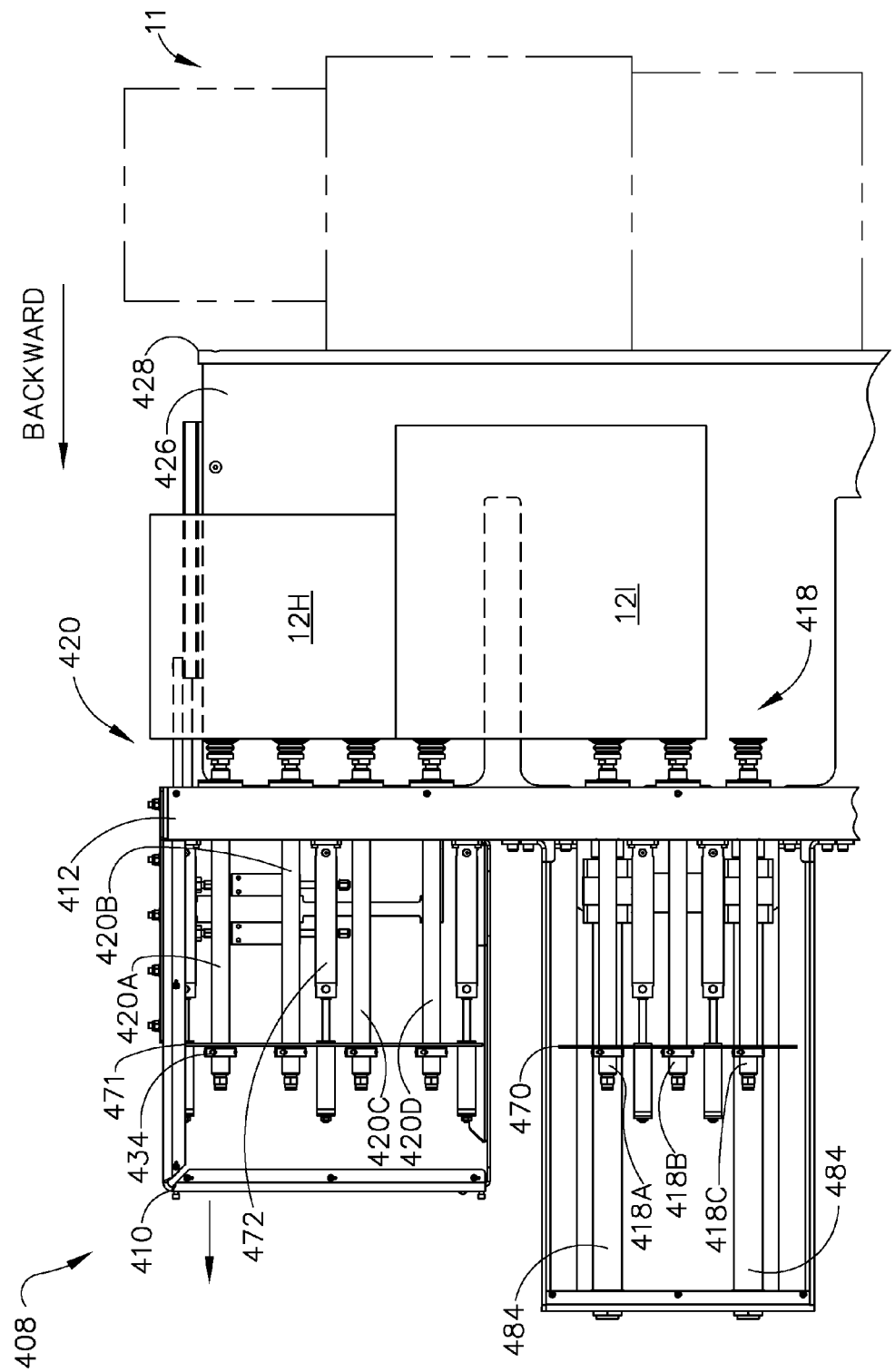

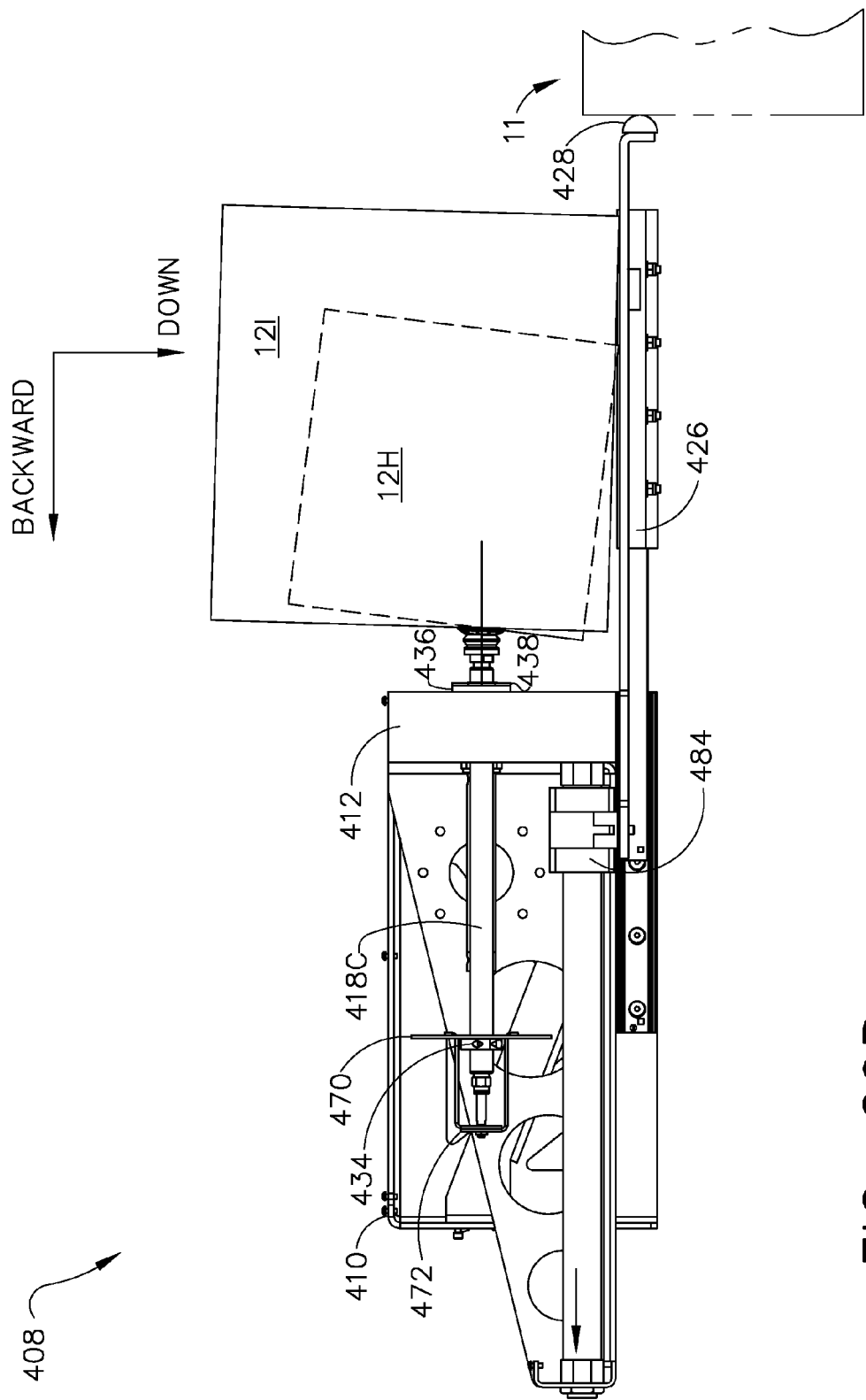

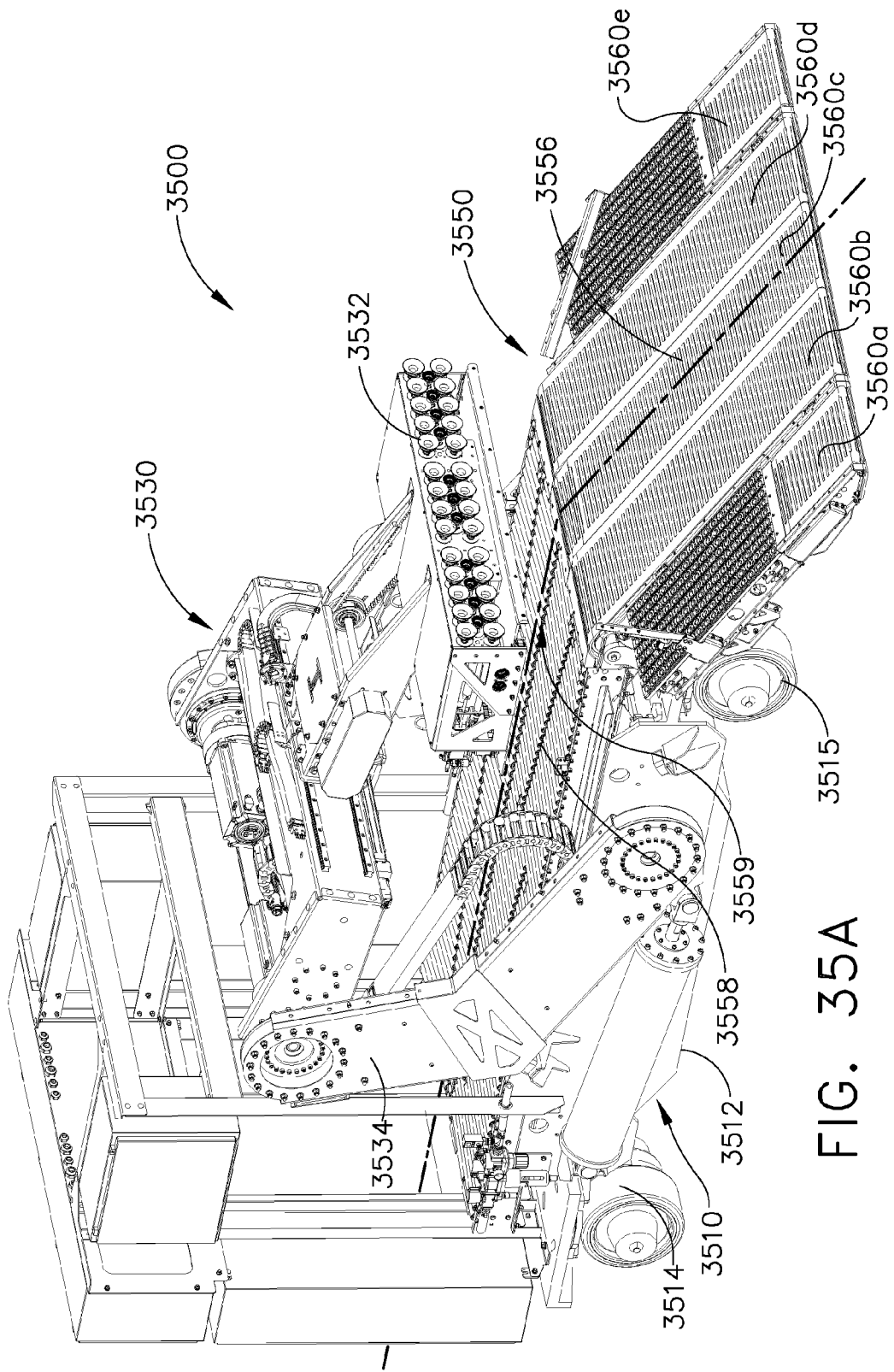

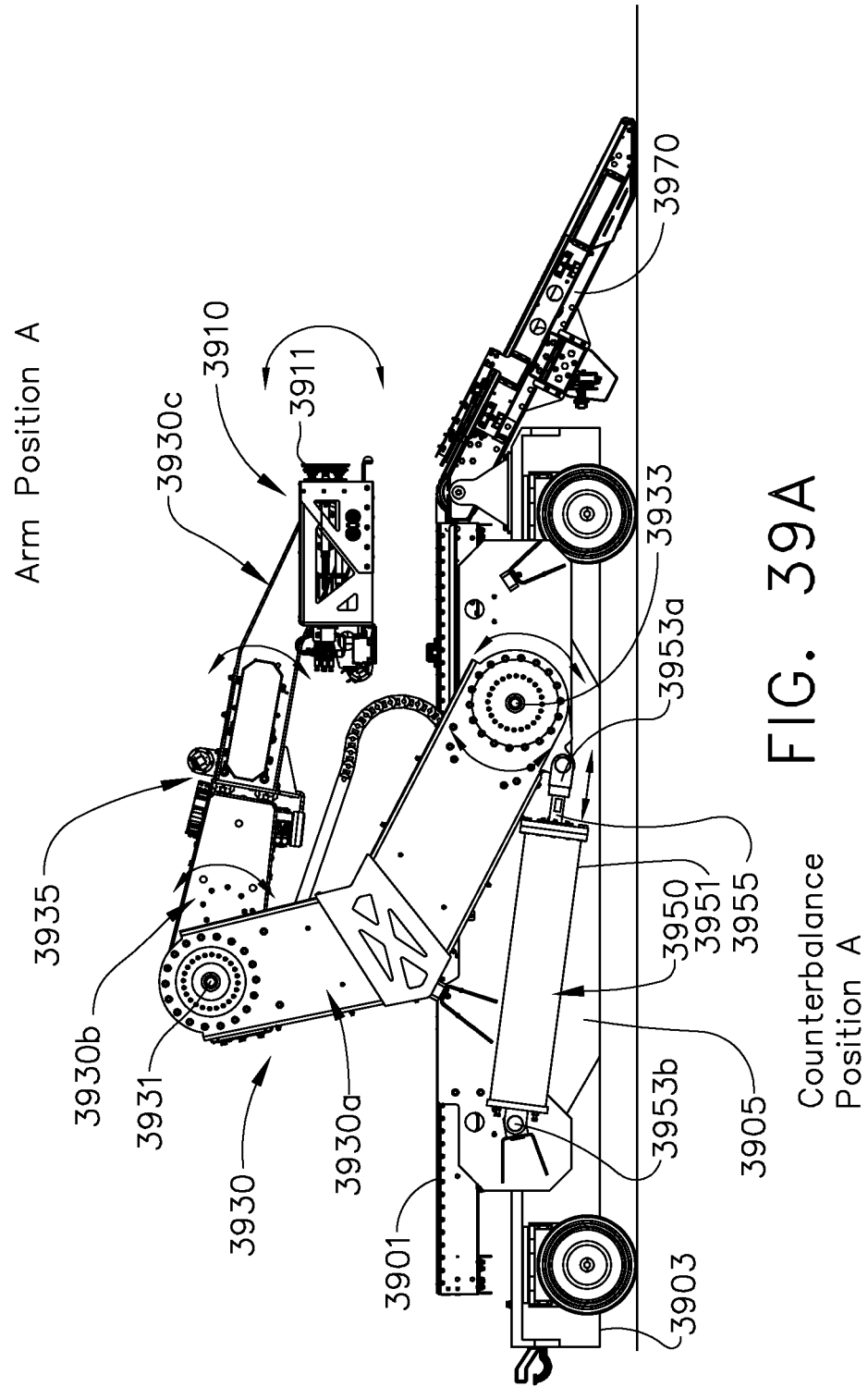

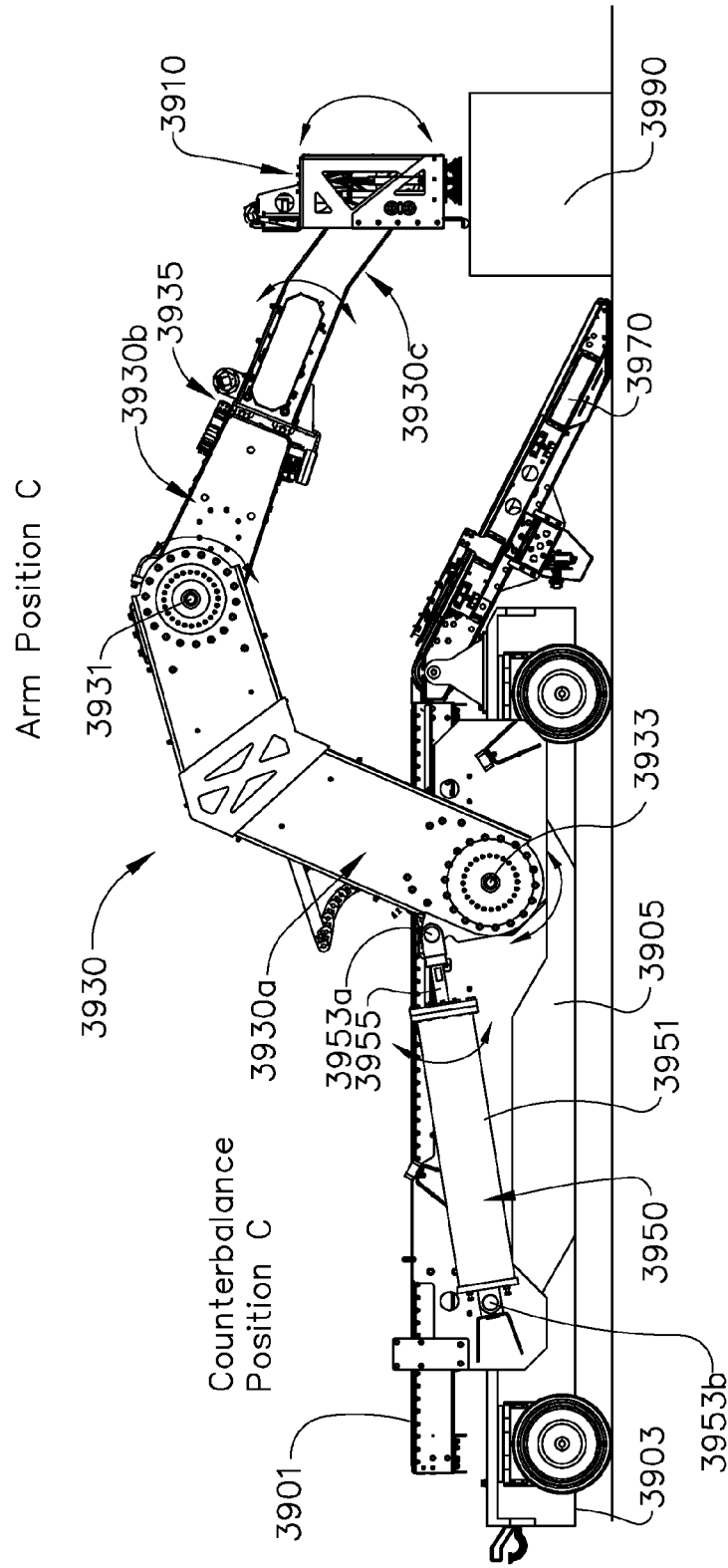

ROBOTIC CARTON UNLOADER

CROSS REFERENCE TO RELATED APPLICATIONS

This application claims priority to U.S. Provisional Patent Application Ser. No. 61/871,292, filed Aug. 28, 2013, entitled "Robotic Carton Unloader", U.S. Provisional Patent Application Ser. No. 61/894,871, filed Oct. 23, 2013, entitled "Robotic Carton Unloader", U.S. Provisional Patent Application Ser. No. 61/894,878, filed Oct. 23, 2013, entitled "Robotic Carton Unloader", U.S. Provisional Patent Application Ser. No. 61/894,889, filed Oct. 23, 2013, entitled "Robotic Carton Unloader", U.S. Provisional Patent Application Ser. No. 61/916,720, filed Dec. 16, 2013, entitled "Robotic Carton Unloader", U.S. Provisional Patent Application Ser. No. 61/971,463, filed Mar. 27, 2014, entitled "Robotic Carton Unloader", U.S. Provisional Patent Application Ser. No. 61/973,188, filed Mar. 31, 2014, entitled "Robotic Carton Unloader", and U.S. Provisional Patent Application Ser. No. 62/023,068, filed Jul. 10, 2014, entitled "Robotic Carton Unloader." The entire contents of all eight applications are incorporated by reference herein.

TECHNICAL FIELD

The present disclosure relates generally to an apparatus for handling products, and is more particularly directed to an automatic case unloader designed to unload product, such as cardboard cases of various sizes, from within a trailer.

BACKGROUND

Trucks and trailers loaded with cargo and products move across the country to deliver products to commercial loading and unloading docks at stores, warehouses, and distribution centers. Trucks can have a trailer mounted on the truck, or can be of a tractor-semi trailer configuration. To lower overhead costs at retail stores, in-store product counts have been reduced, and products-in-transit now count as part of available store stock. Unloading trucks quickly at the unloading docks of warehouses and regional distribution centers has attained new prominence as a way to refill depleted stock.

Trucks are typically unloaded with forklifts if the loads are palletized and with manual labor if the products are stacked within the trucks. Unloading large truck shipments manually with human laborers can be physically difficult, and can be costly due to the time and labor involved. Consequently, a need exists for an improved unloading system that can unload bulk quantities of stacked cases and cargo from truck trailers more quickly than human laborers and at a reduced cost.

SUMMARY

Various embodiments provide a robotic carton unloader capable of unloading cartons in a carton pile, such as a carton pile within a truck trailer. In some embodiments, the robotic carton unloader may be movable across a floor and may include a mobile body, a movable robotic arm attached to the mobile body and comprising an end effector (or manipulator) at an end thereof, the end effector configured to unload a row of cartons in a side-by-side orientation from the carton pile, a descrambling conveyor (or conveyor system) mounted on the mobile body configured to receive the row of cartons from the end effector in the side-by-side orientation, the descrambling conveyor further configured to simultaneously move the row of cartons towards a rear of the robotic carton unloader and to singulate the cartons while they move. In some embodiments, the descrambling conveyor may include a plurality of rows of conveyors oriented side by side. In some embodiments, at least one of the conveyors in the plurality of rows of conveyors may be configured to move a carton carried thereon at a different speed than other conveyors in the plurality of rows of conveyors. In some embodiments, at least one of the conveyors in the plurality of rows of conveyors may be configured to move the carton traveling thereon rearwards and towards a center line of the descrambling conveyor. In some embodiments, at least one of the conveyors in the plurality of rows of conveyors may include skewed rollers. In some embodiments, the skewed rollers of the at least one of the conveyors in the plurality of rows of conveyors may be skewed in herringbone patterns. In some embodiments, the conveyors in the plurality of rows of conveyors may include belt conveyors.

In some embodiments, the descrambling conveyor may include a front-end descrambler and a central descrambler, the front-end descrambler feeding the cartons to the central descrambler. In some embodiments, the front-end descrambler may be pivotally mounted to the mobile body at an intersection of the front-end descrambler with the central descrambler, the front-end descrambler having a front end pivotally movable towards and away from the floor. In some embodiments, the central descrambler may include a plurality of rows configured to move the cartons toward a rear of the robotic carton unloader, the plurality of rows may be on both sides of a center line running a length of the central descrambler. In some embodiments, each of the plurality of rows may be comprised of a plurality of rollers angled toward the center line.

In some embodiments, the plurality of rows may be associated with a plurality of zones, each zone being configured to move the cartons at a different speed. In some embodiments, a first set of zones of the plurality of zones located on a first side of the center line of the central descrambler may be configured to move the cartons at a faster speed than a second set of zones of the plurality of zones located on a second side of the center line of the central descrambler. In some embodiments, the plurality of zones may include three zones located on a first side of the center line of the central descrambler and three zones located on a second side of the center line of the central descrambler.

In some embodiments, the front-end descrambler may include a plurality of parallel rows configured to move the cartons toward the central descrambler. In some embodiments, each in the plurality of parallel rows may be configured to move the cartons toward the central descrambler at a different speed. In some embodiments, the plurality of parallel rows may include inner rows and outer-most rows, and wherein the inner rows of the plurality of parallel rows may be configured to move the cartons toward the central descrambler at faster speeds than the outer-most rows of the plurality of parallel rows. In some embodiments, a center row of the inner rows of the plurality of parallel rows may be configured to move the cartons toward the central descrambler at a fast speed, two middle rows of the inner rows of the plurality of parallel rows may be configured to move the cartons toward the central descrambler at a medium speed, and two outer rows of the outer-most rows of the plurality of parallel rows may be configured to move the cartons toward the central descrambler at a slow speed. In some embodiments, the front-end descrambler may be configured to move laterally relative to the central descrambler. In some embodiments, each of the outer-most rows of the plurality of parallel rows may include a section of rollers configured to move the cartons diagonally inward toward the inner rows of the plurality of parallel rows.

In some embodiments, a robotic carton unloader may include a mobile body movable across the floor, a conveyor mounted on the mobile body to convey unloaded cartons thereon, and a robotic arm movably attached to the mobile body with the conveyor passing between movable portions of the robotic arm. In some embodiments, the conveyor may include a front-end descrambler and a central descrambler coupled to the front-end descrambler.

In some embodiments, the robotic arm further may include a distal end movable with the robotic arm, the distal end configured to unload cartons from the carton pile and onto the conveyor. In some embodiments, the movable portions of the robot arm may straddle each side of the conveyor. In some embodiments, the conveyor may extend side-to-side between the robotic arm to maximize a width thereof. In some embodiments, a first portion of the robotic arm may pivotally attach to the mobile body below the conveyor.

In some embodiments, a portion of the robotic arm may be configured to move side to side relative to the mobile body to access the carton pile. In some embodiments, the robotic arm further may include a linear actuator to move the portion of the robotic arm side to side. In some embodiments, the robotic arm may be configured to pivot about at least one axis parallel to a front of the mobile body while moving towards and away from the carton pile.

In some embodiments, when the robotic carton unloader is positioned in front of the carton pile, the robotic arm may be configured to unload any carton from the carton pile with the distal end without moving the mobile body. In some embodiments, the robotic carton unloader may include a base secured to the mobile body a movable arm extending from the base and movable relative thereto, wherein a counterbalance connects between the base and the movable arm.

In some embodiments, the counterbalance may be an over-the center design counterbalancing the robotic arm when the robotic arm is extending towards the carton pile and away from the carton pile. In some embodiments, the counterbalance may be a spring. In some embodiments, the counterbalance may be a gas spring. In some embodiments, the robotic arm may be configured to move between a first position, a second position aligned, and a third position such that the counterbalance is in a first resistance condition when the robotic arm is in the first position, the counterbalance is in a neutral resistance condition when the robotic arm is in the second position, and the counterbalance is in a second resistance condition when the robotic arm is in the third position.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the present invention.

FIG. 27B is a side sectional view of the vacuum manipulator of FIG. 27A.

FIG. 28A is a partial top view of the left side of the vacuum manipulator of FIG. 27A in contact with the carton pile at a third time during carton removal operations.

FIG. 29A is a partial top view of the left side of the vacuum manipulator of FIG. 28A in contact with the carton pile at a fourth time during carton removal operations.

FIG. 29B is a side sectional view of the vacuum manipulator of FIG. 29A.

FIGS. 35A-35B are diagrams illustrating perspective views of embodiment robotic carton unloaders with robotic arms, mobile bodies, and conveyor systems.

FIG. 39A is a diagram illustrating a side view of a robotic arm, head unit, and counterbalancing unit mounted on a base unit including a descrambling conveyor unit showing a retracted position of the robotic arm and the counterbalancing unit in the various embodiments.

FIG. 39D is a diagram further illustrating a side view of a robotic arm, head unit, counterbalancing unit of FIG. 39A, FIG. 39B and FIG. 39C, showing a downward extended position of the robotic arm and the counterbalancing unit during engaging a carton in the various embodiments.

DETAILED DESCRIPTION

Figure 1:
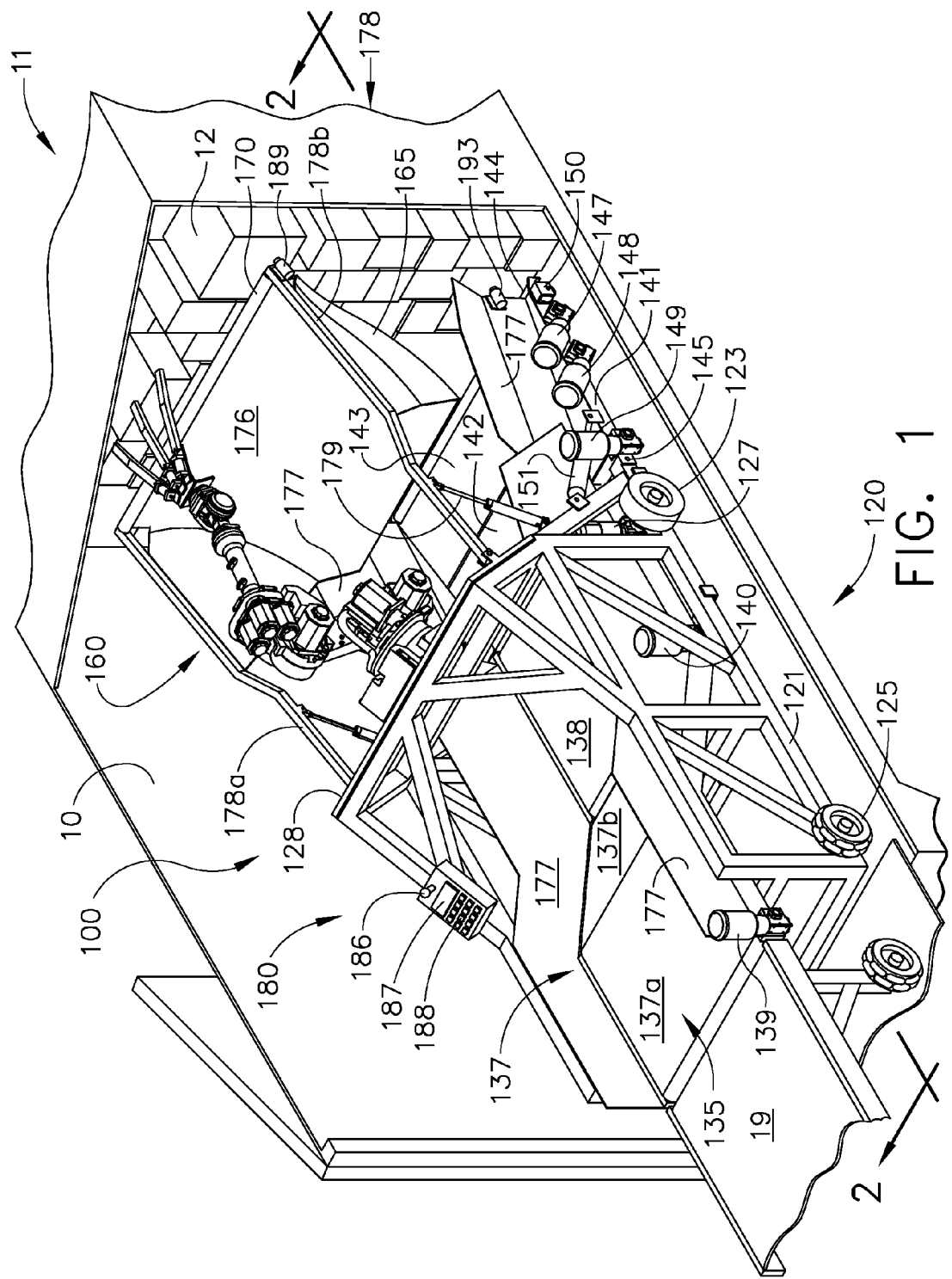
FIG. 1 is an isometric view of an embodiment of a robotic carton unloader maneuvering within a truck to unload product, such as cartons depicted as a pile of cartons, stacked within the truck.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. References made to particular examples and implementations are for illustrative purposes and are not intended to limit the scope of the invention or the claims. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference.

The word "exemplary" is used herein to mean "serving as an example, instance, or illustration." Any implementation described herein as "exemplary" is not necessarily to be construed as preferred or advantageous over other implementations.

The present application is related to International Patent Application Serial No. PCT/US2014/038513 filed May 16, 2014, entitled "Robotic Carton Unloader" and U.S. patent application Ser. No. 14/445,929 filed Jul. 29, 2014, entitled "Robotic Carton Unloader," the entire contents of both of which are incorporated by reference herein.

FIGS. 1-6 generally show an embodiment of a robotic carton unloader 100 for unloading cartons 12 from within a truck or semi-trailer 10. For instance, robotic carton unloader 100 may be configured to be driven into semi-trailer 10, dislodge or remove cartons 12 from carton wall or carton pile 11 stacked on floor 18 of semi-trailer 10, and transfer or unload the dislodged cartons 12 from semi-trailer 10. Cartons 12 may then be transferred into a store, warehouse or distribution center unloading bay. Cartons 12 may be any kind of product container for conveying products such as, but not limited to, cardboard cartons. Robotic carton unloader 100 may include a mobile body 120 sized and configured to be driven in and out of semi-trailer 10. Robotically controlled carton remover system 160 may be positioned on mobile body 120 and may extend from mobile body 120 toward carton pile 11 to dislodge and unload cartons 12 from carton pile 11. For instance, robotically controlled carton remover system 160 may dislodge and unload cartons 12 from a front and a top of carton pile 11. Carton guide system 175 may be located adjacent to (e.g., below) carton remover system 160 to catch cartons 12 as they are dislodged from pile 11. Carton guide system 175 may also guide cartons 12 onto and along conveyor system 135 that may extend from one end of robotic carton unloader 100 to the other end of robotic carton unloader 100. Conveyor system 135 may discharge unloaded cartons 12 at the end portion of robotic carton unloader 100 for collection (e.g., by laborers) or to a distribution center conveyor 19. Control and visualization system 180 may be provided to control and automate the unloading process, and to operate robotic carton unloader 100. Each of these components will be discussed in further detail below.

Mobile Body

Figure 2:
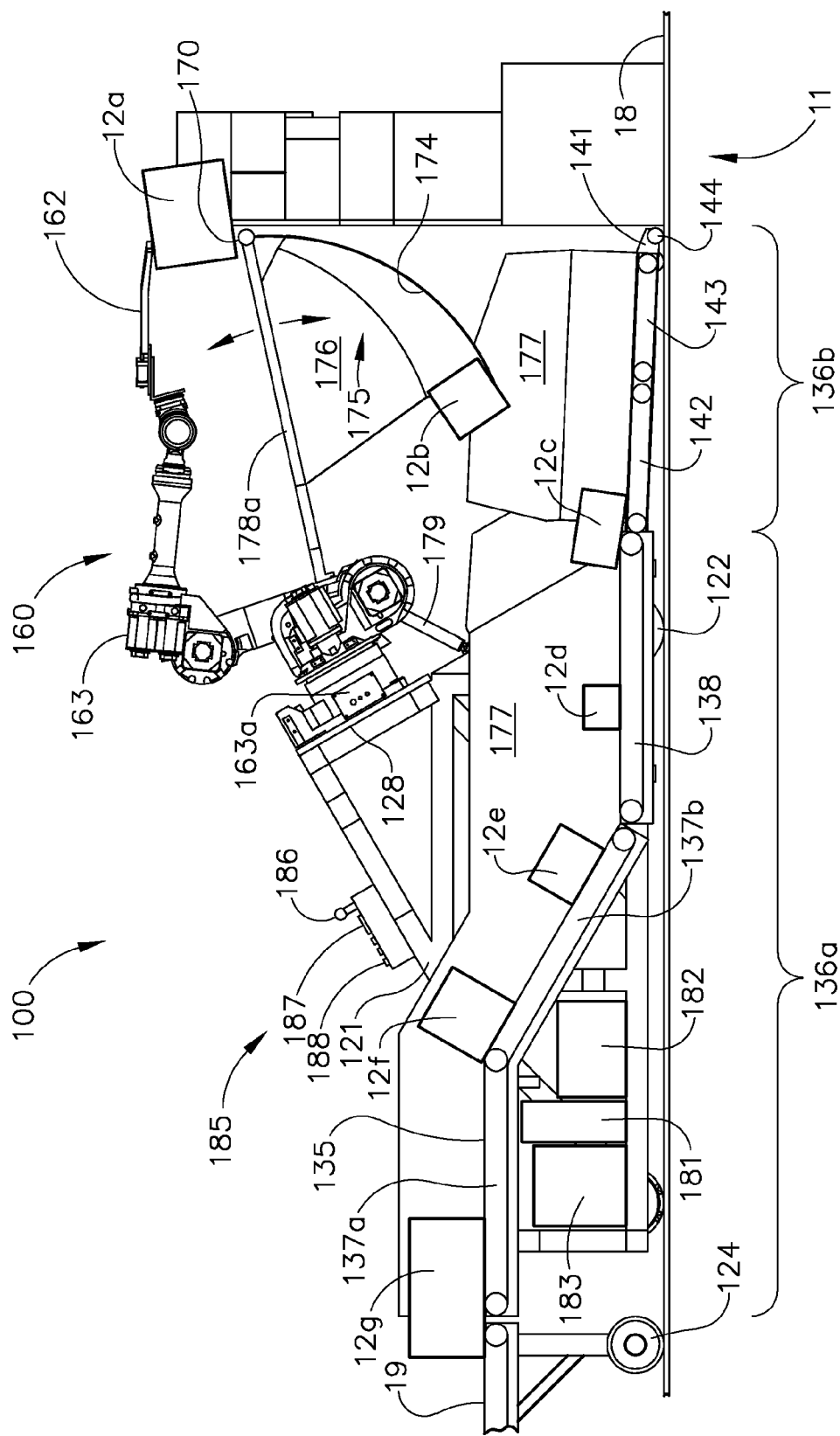
FIG. 2 is a side sectional view of the robotic carton unloader of FIG. 1 taken along line 2-2 of FIG. 1, showing a carton being unloaded from the pile of cartons and discharged onto an unloading dock conveyor.

As shown in FIGS. 1 and 2, mobile body 120 of robotic carton unloader 100 comprises chassis 121 movably supported on a four wheel configuration with each wheel 122, 123, 124, 125 adjacent to a corner of chassis 121. As an example, the chassis 121 may be a generally rectangular chassis with each wheel 122, 123, 124, and 125 adjacent to a corner or the rectangle. Angled plate 128 may be elevated above a central portion of conveyor system 135 and may extend across chassis 121 (e.g., transversely across chassis 121) for the attachment of robotically controlled carton remover system 160 thereto. A first drive motor and a second drive motor 127 (e.g., a drive system) may be generally located inboard from sides (e.g., the left side and the right side) of robotic carton unloader 100. The first drive motor may be configured to drive wheel 122, while second drive motor 127 may be configured to drive wheel 123. Other wheels, such as wheels 124, 125, may be configured to freewheel. Accordingly, drive motors, such as the first drive motor and the second drive motor 127, may drive and steer robotic carton unloader 100 within semi-trailer 10. As examples, rotating the first drive motor and the second drive motor 127 in the same direction may drive robotic carton unloader 100 forward or backward, rotating the first drive motor and the second drive motor 127 in opposite directions may pivot robotic carton unloader 100 about a point centered between drive wheels 122, 123, and rotating one of the first drive motor or the second drive motor 127 may pivot robotic carton unloader 100 about the opposite undriven drive wheel 122 or 123.

Conveyor System

As best seen in FIG. 2, conveyor system 135 includes a plurality of independently controlled conveyors to transport cartons 12. For example, the independently controlled conveyors may define an elongated "Z" shape conveyor system. In an embodiment, conveyor system 135 may be wider at the front (e.g., at the end of the conveyor closest to the carton pile 11) to receive cartons 12, and may narrow moving toward the rear (e.g., at the end of the conveyor farthest from the carton pile 11) along conveyor system 135. The narrowing of conveyor system 135 may position the unloaded cartons 12 in a line for discharge. Conveyor system 135 may comprise a rear portion 136a fixed relative to chassis 121, and a front portion 136b pivotally mounted to, and extending from, chassis 121. Rear portion 136a of conveyor system 135 may comprise a rear conveyor 137 and central conveyor 138. Rear conveyor 137 may comprise a portion 137a (e.g., a horizontal portion) that may be aligned with distribution center conveyor 19 for unloading cartons 12. Rear conveyor 137 may further comprise a portion 137b that is inclined to couple portion 137a with central conveyor 138. Central conveyor 138 may be positioned proximal (e.g., horizontal) to trailer floor 18 and may extend through chassis 121 from rear conveyor 137 to front portion 136*b* of conveyor system 135. Motor 139 may be coupled with rear conveyor 137 to drive rear conveyor 137, and motor 140 may be coupled to central conveyor 138 to drive central conveyor 138. As will be apparent to one with ordinary skill in the art in view of the teachings herein, any suitable number of motors 139, 140 may be used to drive conveyors 137, 138.

Conveyor arms 141 may pivotally extend (e.g., in a front direction toward the carton pile 11) from chassis 121 to support front portion 136*b* of conveyor system 135. Conveyor arms 141 may be rotatable about pivot 145. Front portion 136*b* of conveyor system 135 may comprise trailing conveyor 142 and leading conveyor 143. Conveyors 142, 143 may be positioned end-to-end between conveyor arms 141 to transport cartons 12 along conveyors 142, 143. Roller 144 may be positioned adjacent the distal end of leading conveyor 143 and may be configured to load cartons 12 onto leading conveyor 143. Roller 144 may be generally cylindrical and may extend transversely across an end of conveyor arms 141. Roller 144 may be powered by roller drive motor 147 coupled with conveyor arms 141. Leading motor 148 and trailing motor 149 are coupled with conveyor arms 141 to drive leading conveyor 143 and trailing conveyor 142 respectively.

Figure 3:
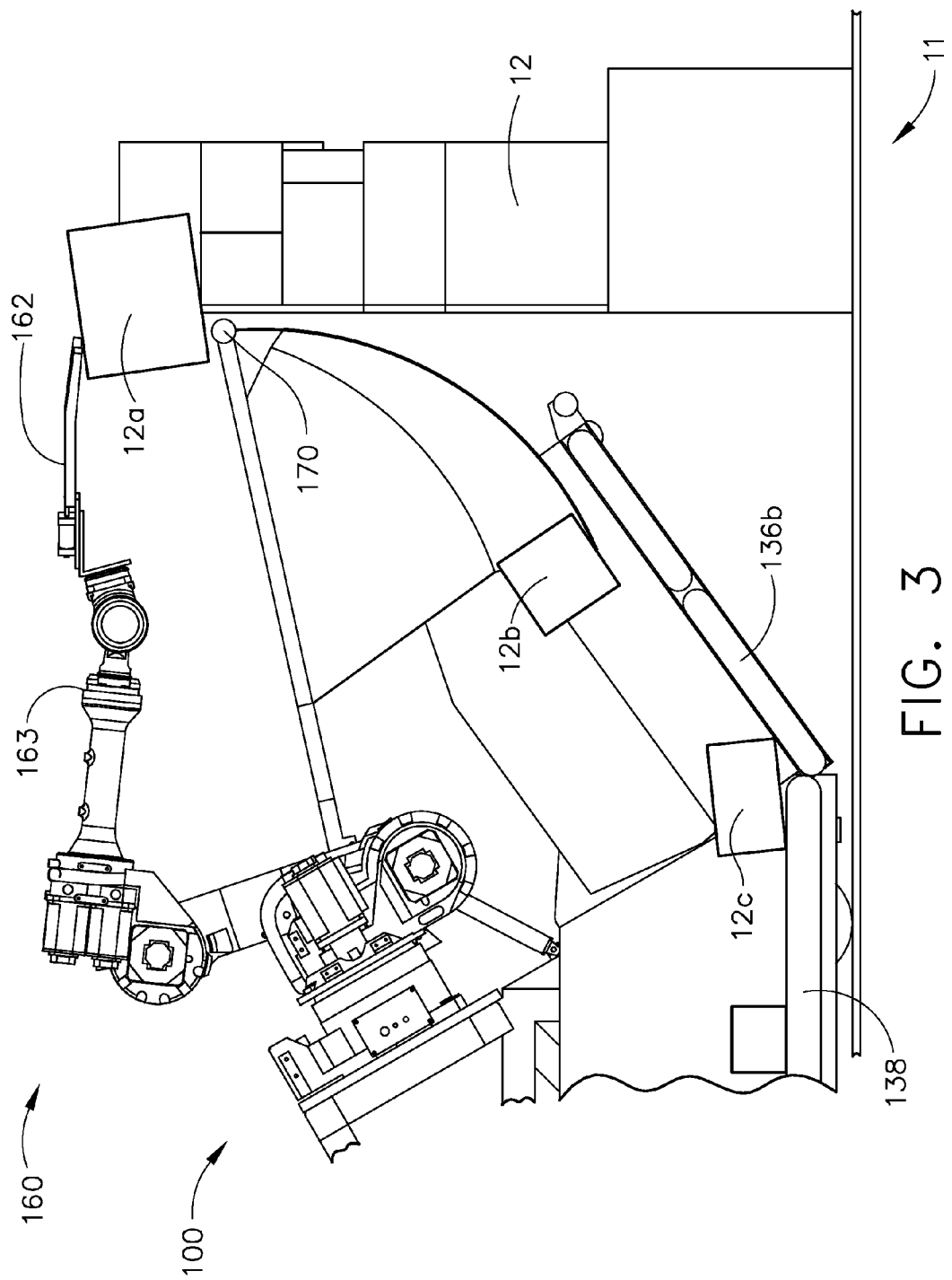
FIG. 3 is a partial side sectional view of the robotic carton unloader of FIG. 2, showing a portion of a conveyor system pivoted upwards.

Conveyor wheel 150 may be coupled with conveyor arms 141 to support front portion 136*b* on trailer floor 18. Lift 151 may operably connect between chassis 121 and conveyor arms 141 to lift the front portion 136*b* of conveyor system 135 off of the trailer floor 18 to any angular position relative thereto, such as but not limited to the angular position shown in FIG. 3. During operation, front portion 136*b* may be angled upwardly or downwardly relative to central conveyor 138. For instance, the angular position of front portion 136*b* may be adjusted to meet the changing height of carton pile 11. The front portion 136*b* may be angled to remain below the carton guide system 175. When carton pile 11 is at a maximum, the angular position is at a maximum, and when carton pile 11 is at a minimum, the angular position is at a minimum. As shown in FIG. 3, pivoting upstream portion 136*b* to an angular position may shorten the fall distance of carton 12 as it exits carton guide system 175 to fall or drop onto conveyor system 135. Lift 151 may be an electrical actuator such as a motor, but is not limited thereto.

Robotically Controlled Carton Remover System

Turning to FIGS. 1-4, robotically controlled carton remover system 160 may be configured to reach out (e.g., extend) from robotic carton unloader 100 to dislodge one or more cartons 12 (e.g., a plurality of cartons 12) from carton pile 11 with manipulator 162. As best seen in FIG. 3, manipulator 162 may be movably attached to a free end of robotic positioner 163. Base 163*a* of robotic positioner 163 is disposed adjacent angled plate 128 overlying central conveyor 138 of conveyor system 135. Robotic positioner 163 and manipulator 162 may be controlled by control and visualization system 180, and may be configured to dislodge or unload cartons 12 from anywhere on carton pile 11. The operating areas of robotic positioned 163 and manipulator 162 may extend from side-to-side and from floor-to-top of semi-trailer 10. Robotic positioner 163 may be any available robotic arm with at least four degrees of motion, such as the exemplary FANUC® Robot R-1000ia sold by FANUC® Robotics America Corporation, 3900 West Hamlin Road, Rochester Hills Mich. 48309-3253.

Figure 4:
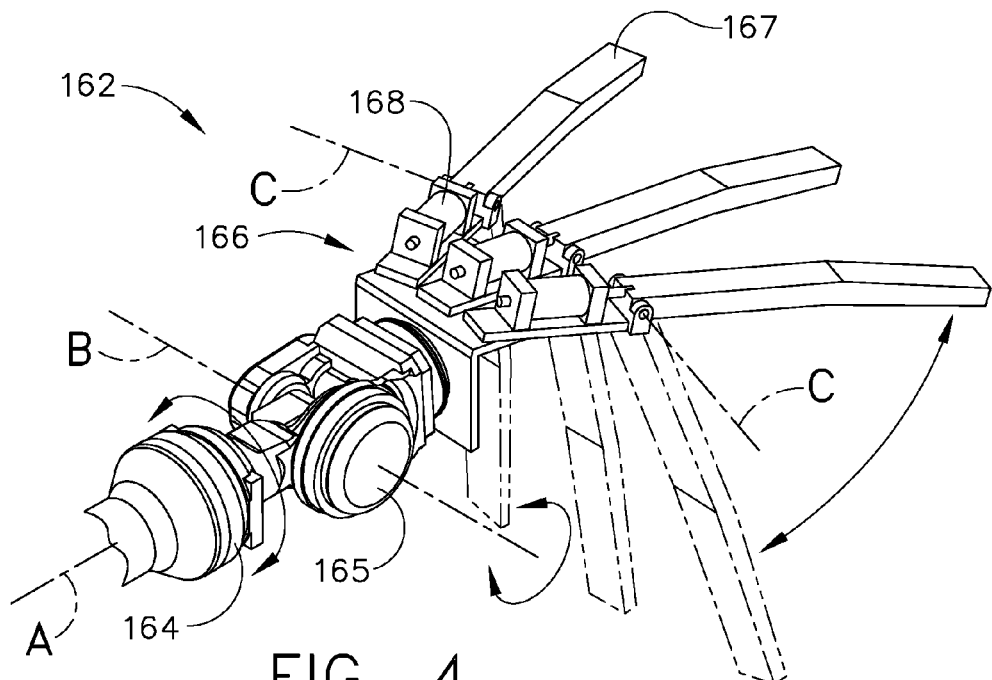
FIG. 4 is an isometric view of a manipulator of the robotic carton unloader of FIG. 1, showing movements of portions of the manipulator.
Figure 5:
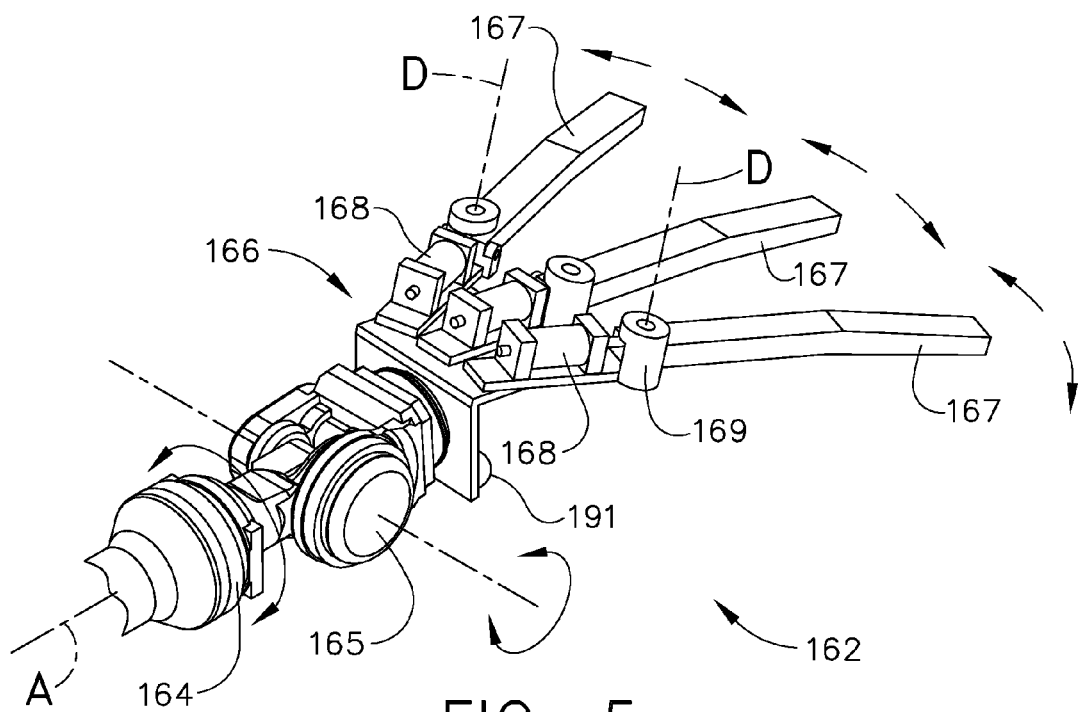
FIG. 5 is an isometric view of the manipulator of FIG. 4, showing a spreading movement of the manipulator.
Figure 6:
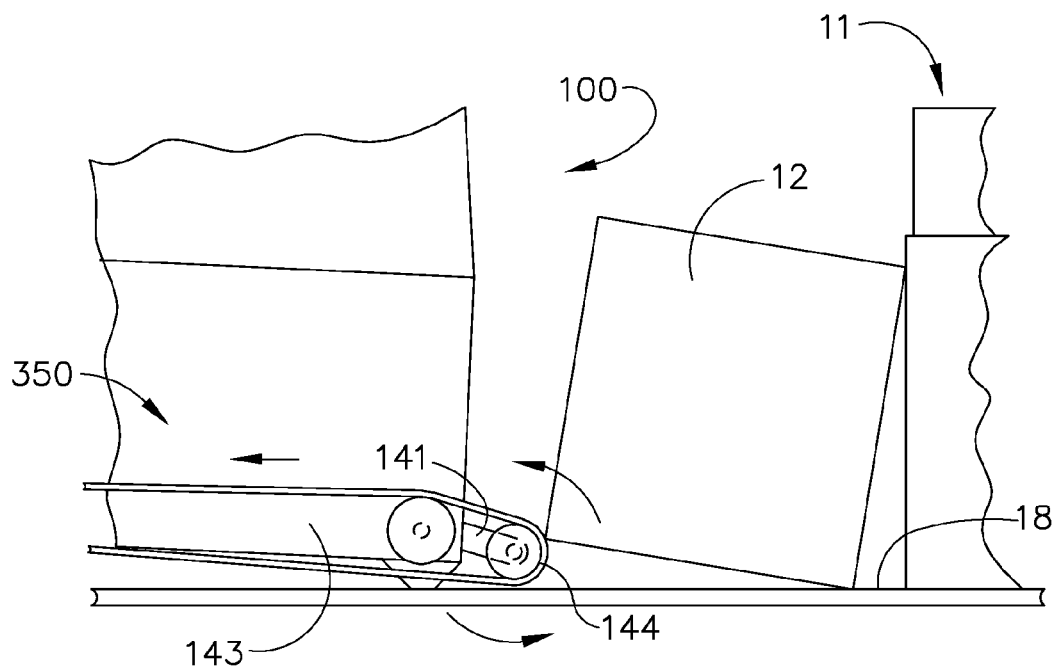
FIG. 6 is a partial side sectional view of the robotic carton unloader of FIG. 2, showing a rotating front roller lifting a carton from a floor of the truck.

As shown in FIG. 4, manipulator 162 may be rotatable about a wrist rotation joint 164 to rotate manipulator 162 about longitudinal axis A. Manipulator 162 may be further pivotable about wrist pivot joint 165 to pivot manipulator 162 about axis B oriented transverse to axis A. Manipulator 162 includes base 166 with at least one actuatable element, such as a claw 167 or finger, extending therefrom. As shown in this embodiment, base 166 may have two or more actuatable elements, such as three fingers 167, pivotally mounted to base 166 at their respective proximal ends. First actuator 168 may be connected to each actuatable element, such as each of fingers 167, to pivot fingers 167 downwardly relative to hand 166 about respective axes C, which is spaced from axis B as shown in FIG. 4. Second actuator 169 may be attached to hand 166 and to each of fingers 167 for spreading fingers 167 apart about axis D which is oriented transverse to axis C as shown in FIG. 5. First and second actuators 168, 169 may be, but are not limited to, electric or fluidic actuators. Fluidic actuators of the embodiments may operate with compressible fluids or with incompressible fluids.

Carton Guide System

Carton guide system 175 may be configured to guide unloaded or dislodged cartons 12 through robotic carton unloader 100, as shown in FIGS. 1 and 2. Carton guide system 175 may comprise a shelf 176, for example a carton deceleration skirt, located between carton remover system 160 and conveyor system 135. Shelf 176 comprises may comprise a surface 174. For example, the surface 174 may be a non-vertical surface, such as a curved surface. The shelf 174 may be configured to catch falling cartons 12 and guide the sliding dislodged cartons 12 onto conveyor system 135. Shelf 176 may be constructed from materials having a coefficient of friction configured to decelerate cartons 12 sliding thereon without stopping the sliding motion of cartons 12. Shelf 176 may be formed from various materials. As examples, shelf 176 may be formed from bendable or deflectable materials such as a fabric, a flexible plastic sheet, a pleated collapsible structure, etc. Carton guide system 175 may further comprise a pair of conveyor guides 177 positioned on each side of conveyor system 135. Conveyor guides 177 extend from conveyor arms 141 of front portion 136*b* of conveyor system 135 and may narrow toward at the rear portion 136*a* to guide cartons 12 onto conveyor system 135.

A frame 178 of carton guide system 175 may be pivotally attached to angled plate 128 of mobile body 120 (e.g., at a front side of angled plate 128 oriented toward the carton pile 11) such that carton guide system 175 extends outwardly from mobile body 120. In an embodiment, frame 178 may be generally U-shaped and may comprise a pair of frame arms 178*a* and 178*b* extending outwardly and spreading wider therefrom. Frame arms 178*a* and 178*b* may terminate at a cross member such as bumper 170 extending rigidly between frame arms 178*a* and 178*b* (e.g., from side to side at a front end closest to the carton pile 11). Bumper 170 may include outer cover 170*a* over a rigid core and may rotate. In one embodiment, at least a portion of bumper 170 may be a deflectable material such as an elastomer or a foam. Curved arrows are provided in FIG. 2 to show the directions of the pivotal motion of frame arms 178*a*, 178*b* relative to mobile body 120.

The previously described shelf 176 may be suspended from frame 178. Frame lift 179 may connect between the frame 178 and the angled plate 128 (see FIG. 1) to raise and lower frame 178, bumper 170, and shelf 176 (see arrows FIG. 2). Frame lift 179 can be an electrical actuator such as a motor but is not limited thereto. As will be described in greater detail later, frame lift 179 may place bumper 170 against the wall of carton pile 11 below cartons 12 being removed to stabilize the wall of carton pile 11 below the cartons 12 being removed. The deflection properties of shelf 176 may provide robotically controlled carton remover system 160 access to cartons 12 resting on trailer floor 18 when shelf 176 is lowered into contact with at least part of conveyor system 135 and collapses or reduces in height from the contact.

Control and Visualization System

Control and visualization system 180 may coordinate and control all of the functions of the systems of the robotic carton unloader 100. Control and visualization system 180 may be configured to operate robotic carton unloader 100 to automate at least a portion of the unloading process. Control and visualization system 180 may include control module 181, power supply 182, and robotics controller 183, positioned within chassis 121. Control and visualization system 180 provides timing, sequencing, homing routines, and motion control for drive motors 126, 127, conveyor drive motors 139, 140, 148, 149, roller drive motor 147, front lift 151, frame lift 179, robotic positioner 163 and manipulator 162.

Operator interface 185 may be coupled with chassis 121 and extends inwardly above a portion of conveyor system 135. Operator interface 185 may include joystick 186, display 187, and keypad 188. Joystick 186 may be a multi-purpose control and can be configured to control movement of robotic positioner 163 and manipulator 162. Joystick 186 may be reconfigured (via selections on keypad 188) to steer, drive, and stop robotic carton unloader 100. Display 187 may display a wide variety of information that includes but is not limited to error messages, calibration information, status indicators, systems fault warnings, and can display lines of software code entered or edited on keypad 188. Keypad 188 may be used to enter software code for motion control of the robotic arm, conveyor system 135, drive motors 126, 127, lifts 151, 179, and conveyor drive motors 139, 140, 148, and 149.

Control and visualization system 180 may include visualization sensors such as a wall proximity sensor 193 for preventing robotic carton unloader 100 from colliding with the wall of carton pile 11. Wall proximity sensor 193 may be an electrical sensor attached to at least one of conveyor guides 177, such as at a front of the robotic carton unloader 100, for measuring proximity between the at least one proximity sensor 193 and carton pile 11. When wall proximity sensor 193 senses that robotic carton unloader 100 is at a desired distance from carton pile 11, control and visualization system 180 may stop robotic carton unloader 100.

Upper carton sensor 189 may be mounted on frame 178 to indicate contact of frame 178 with carton pile 11. Upper carton sensor 189 may be a contact switch adjacent to bumper 170 that trips when bumper 170 contacts the face of carton pile 11. Or, in another embodiment, upper carton sensor 189 may be a distance sensor that detects a distance to the face of carton pile 11. An angle position indicator may connect between angled plate 128 and frame 178 to indicate an angle between angled plate 128 and frame 178. When bumper 170 is contacting carton pile 11, the angle position indicator may provide control and visualization system 180 with angular positional data that can be used to compute the location of the wall of carton piles 11 relative to robotic carton unloader 100 and manipulator 162 of robotically controlled carton remover system 160. As an example, the angle position indicator may be a potentiometer.

Carton sensor 191 may be attached to base 166 of manipulator 162 (FIG. 5) so that the carton extraction or unloading area adjacent to manipulator 162 may be viewed or scanned. For instance, carton sensor 191 may measure the distance to a selected carton 12 so that manipulator 162 may be appropriately positioned to extract or unload the selected carton 12. In an alternate embodiment, carton sensor 191 may be a carton edge detector. A visualization sensor may be attached to angled plate 128 of chassis 121 for viewing the inside of semi-trailer 10, robotically controlled carton remover system 160 and cartons 12 within carton pile 11.

Operation

During operation, an operator may start robotic carton unloader 100 to initiate a startup and homing sequence to verify operation of the various systems and to move systems components to a home position. For example, control and visualization system 180 may undergo test routines to calibrate and home robotically controlled carton remover system 160, to pivot and position frame 178 behind a leading edge of robotic carton unloader 100, and to test activate conveyors of conveyor system 135. After the startup tests and homing routines are completed, the operator manually may select a drive selection on operator interface 185, and uses joystick 186 to steer and drive robotic carton unloader 100 into semi-trailer 10. Robotic carton unloader 100 may be advanced into semi-trailer 10 until the at least one proximity sensor 193 signals to the operator, via control and visualization system 180, that robotic carton unloader 100 is positioned adjacent to carton pile 11.

Upper carton sensor 189 may be used to identify a height and a front of carton pile 11, and control and visualization system 180 can use this information to position manipulator 162 adjacent to the identified position of carton pile 11. Carton sensor 191 on manipulator 162 may rescan carton pile 11 to refine the carton location data to ensure accurate selection and unloading of cartons 12.

FIG. 2 shows robotic carton unloader 100 unloading cartons 12 from semi-trailer 10 and the arrows are provided to show the paths of a plurality of cartons 12a-12h as they are unloaded from carton pile 11 and through robotic carton unloader 100. In FIG. 2, control and visualization system 180 selected carton 12a for unloading from carton pile 11 (e.g., the top of the carton pile 11), and robotically controlled carton remover system 160 is raking or dislodging carton 12a from carton pile 11.

Carton 12a may be tipped and drawn back by manipulator 162 towards shelf 176. Note that bumper 170 of carton guide system 175 may be pressed (e.g., deliberately) against carton pile 11 directly below carton 12a to stabilize carton pile 11 therebelow. Once the top row of cartons 12 is removed from carton pile 11, control and visualization system 180 can actuate frame lift 179 and possibly drive motors 126, 127 to reposition bumper 170 and carton guide system 175 against carton pile 11 below the new topmost row of cartons 12 slated for removal.

Turning back to FIG. 2, carton 12b is sliding down and off curved shelf 176 just prior to falling or dropping onto the moving conveyor system 135. Carton 12c is transiting from trailing conveyor 142 onto central conveyor 138 to join carton 12d traveling rearward thereon. Cartons 12e and 12f are moving upwards and rearwards along portion 137b of rear conveyor 137. Unloaded carton 12g is shown discharging from portion 137a of rear conveyor 137, and onto distribution center conveyor 19 for delivery into the distribution center. As the height of carton pile 11 is reduced, frame lift 179 may lower carton guide system 175 downward.

In an embodiment, when shelf 176 may be lowered into contact with conveyor system 135, shelf 176 may be operatively configured to deflect or collapse against conveyor system 135. This deflection or collapse may reduce the height of shelf 176, which may enable robotically controlled carton remover system 160 to reach over the collapsed shelf 176 to reach lower cartons 12. Once a dislodged lower carton 12 may be drawn onto the collapsed shelf 176, robotically controlled carton remover system 160 and shelf 176 may be raised to dump carton 12 onto conveyor system 135.

As described previously and best shown in FIG. 6, roller 144 may be located adjacent to conveyor system 135 and may be rotated by roller drive motor 147. As shown, roller 144 is cylindrical with a length and a circular cross section. Roller 144 is rotated in a direction that lifts any carton 12 upwardly when contacted by roller 144. Once lifted, the rotating roller 144 can draw carton 12 downstream onto roller 144 and onto moving conveyor system 135 for extraction. These processes may repeat as required until all of the cartons 12 are unloaded from semi-trailer 10.

Alternate Embodiments

Figure 7:
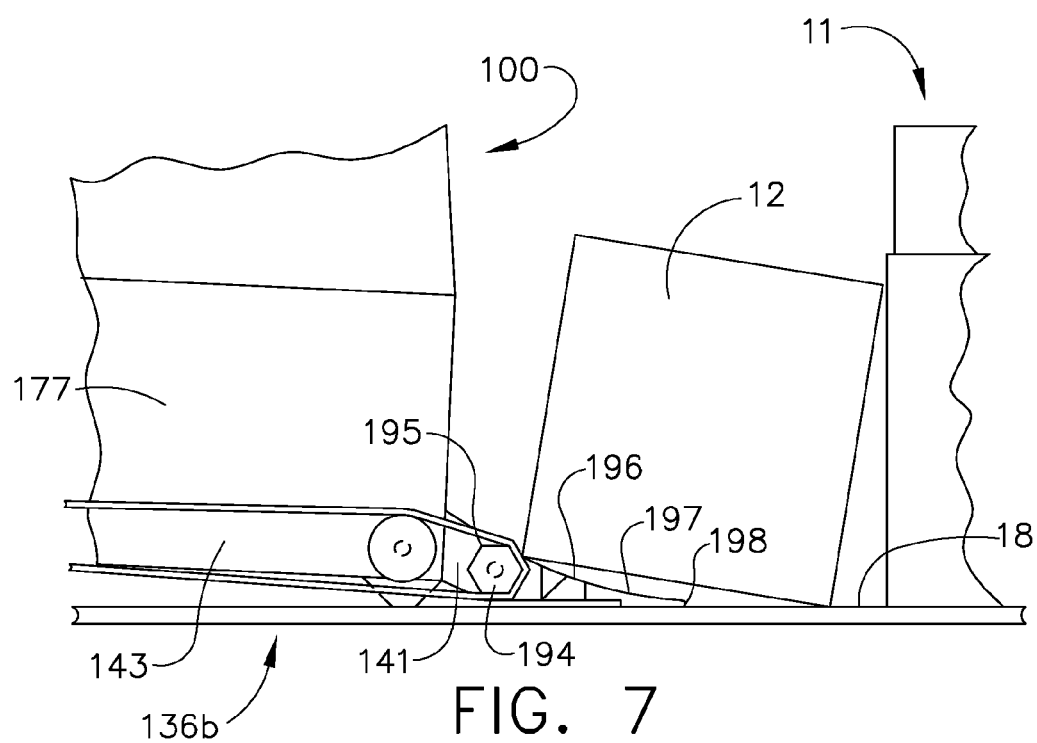
FIG. 7 is a partial side sectional view of an alternate embodiment of a robotic carton unloader having a roller with corners and a carton scoop.

FIG. 7 shows an alternate roller 194 having a length and a non-circular cross section such as a hexagonal cross section. Other suitable cross section configurations for roller 194 may be used, such as octagonal or ribbed cross section. The non-circular cross section extends lengthwise along roller 194 and is placed in front of conveyor system 135. Roller 194 may have a plurality of roller corners 195 extending lengthwise along the alternate roller 194 and when rotated, roller corners 195 create rotating ridges of high pressure that impact and dig into cartons 12. The combinations of upward rotating lines of pressure and impact have been proven to be effective in dislodging cartons 12.

FIG. 7 further includes carton scoop 196 extending from conveyor arms 141 frontwards of roller 194. Carton scoop 196 may be wedge shaped and at least a portion of carton scoop 196 can be a curve 197. Leading edge 198 of carton scoop 196 may be driven underneath carton 12 resting on floor 18. Carton scoop 196 may be configured to act as an inclined ramp that lifts and tilts carton 12 while moving underneath. As shown, the tilted carton 12 in FIG. 7 may have at least one edge thereof lifted off floor 18. Carton 12 then slides and rides up along carton scoop 196 until contacting rotating roller 194 to further lift and pull carton 12 downstream onto conveyor system 135. While carton scoop 196 is shown with roller 194, carton scoop 196 may, in another embodiment, also be used with roller 144. Additionally, in another embodiment, carton scoop 196 may be used without rollers 194 or 144 and can attach directly in front of moving conveyor system 135 (not shown).

While robotic carton unloader 100 is described above for unloading a semi-trailer 10, robotic carton unloader 100 of the present embodiment is not limited for use solely thereto, and is well suited for unloading cartons 12 in other settings such as within a store, a warehouse, a distribution center, an unloading bay, between product aisles, a rack, a pallet, and a freezer.

With respect to the actuators and lifts described as first and second actuators 168, 169 or frame lift 179, these actuators are not limited to electrical actuators, but can be a fluidic actuator operable with compressible or incompressible fluids, such as air and oil.

Vacuum Pick Head

FIGS. 8-13 illustrate an alternate robotically controlled carton remover system 260 that has a manipulator having a conformable face, such as a vacuum manipulator 162, to grasp, draw, and drop cartons 12 from the carton wall or carton pile 11 onto a body conveyor system 235. The body conveyor system 235 is shown in different embodiments in FIGS. 14 and 31, and was simulated in testing of the vacuum manipulator 162 with a table top as shown in FIGS. 8-13. Additionally, during the testing, an edge of the table top was used as a bumper 170 to stabilize the carton pile 11 during the removal of the cartons 12 therefrom. FIGS. 8-13 show snapshots of the vacuum manipulator 162 in operation as it grasps, draws, and drops cartons 12 onto the body conveyor system 235.

Figure 8:
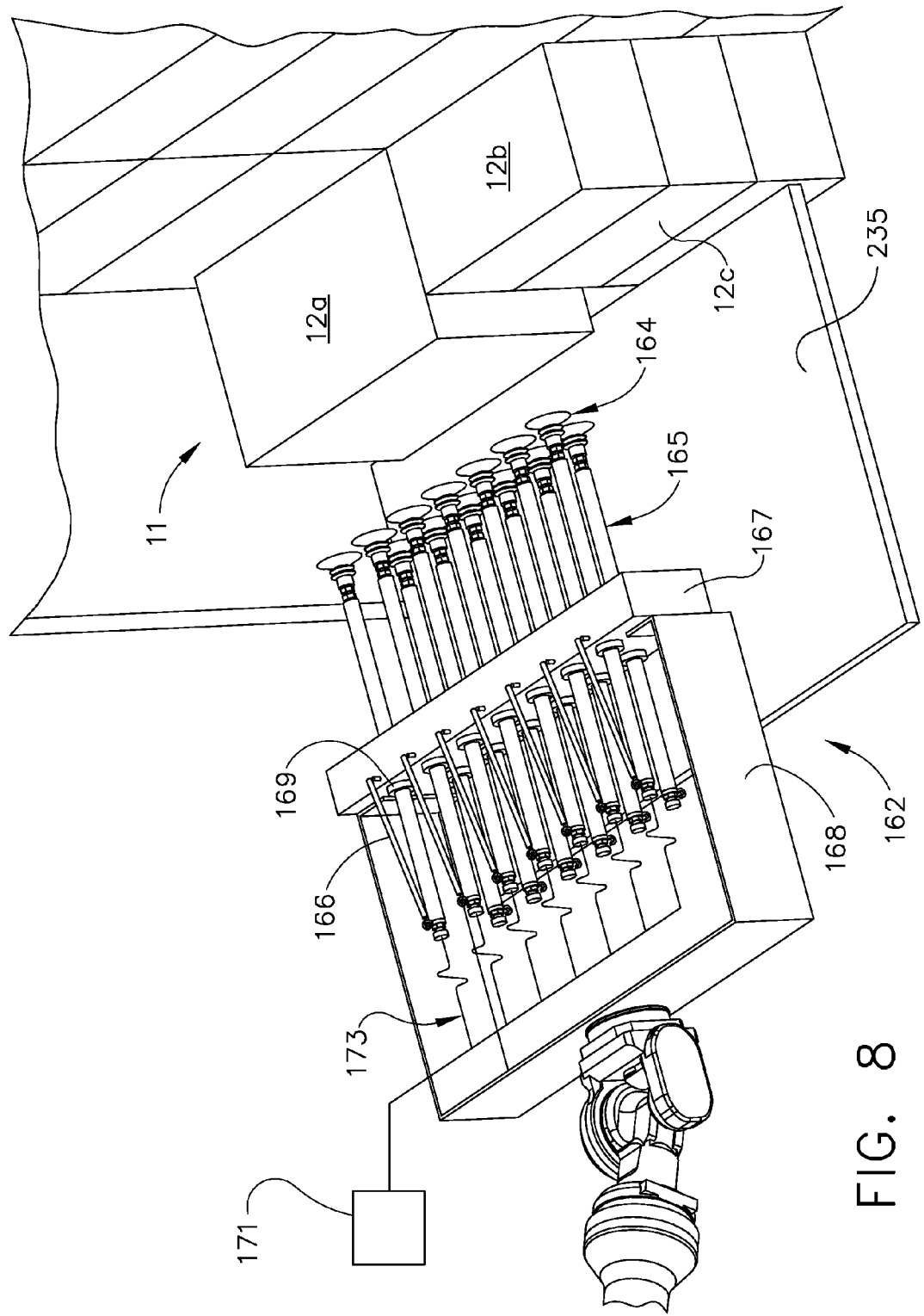
FIGS. 8-13 are a series of block diagrams showing a vacuum manipulator in operation as it grasps, draws, and drops cartons.

FIG. 8 shows the vacuum manipulator 162 approaching the carton wall or carton pile 11. The vacuum manipulator is aimed at cartons 12*a*, 12*b*, and 12*c*. Carton 12*a* juts out of the carton pile 11. The vacuum manipulator 162 has a plurality of vacuum cups 164 with each vacuum cup 164 mounted at an end of a respective guide rod 165. The guide rods 165 are hollow and slidably mounted in a guide frame 167. Springs 166 are connected between the guide rods 165 and the guide frame 168 to bias the guide rods 165 forward. A stop 169 is located on a middle portion of each of the guide rods 165 to stop forward movement of the guide rods 165 when stops 169 contact the guide frame 167. The guide frame 167 is held by a frame 168 that is movable towards and away from the carton pile 11, such as by a robotic positioner (e.g., a robotic arm). Vacuum lines 173 connect to each of the hollow guide rods 165 to supply vacuum to the vacuum cups 164 provide by a vacuum source 171 connected to each vacuum line 173.

Figure 9:
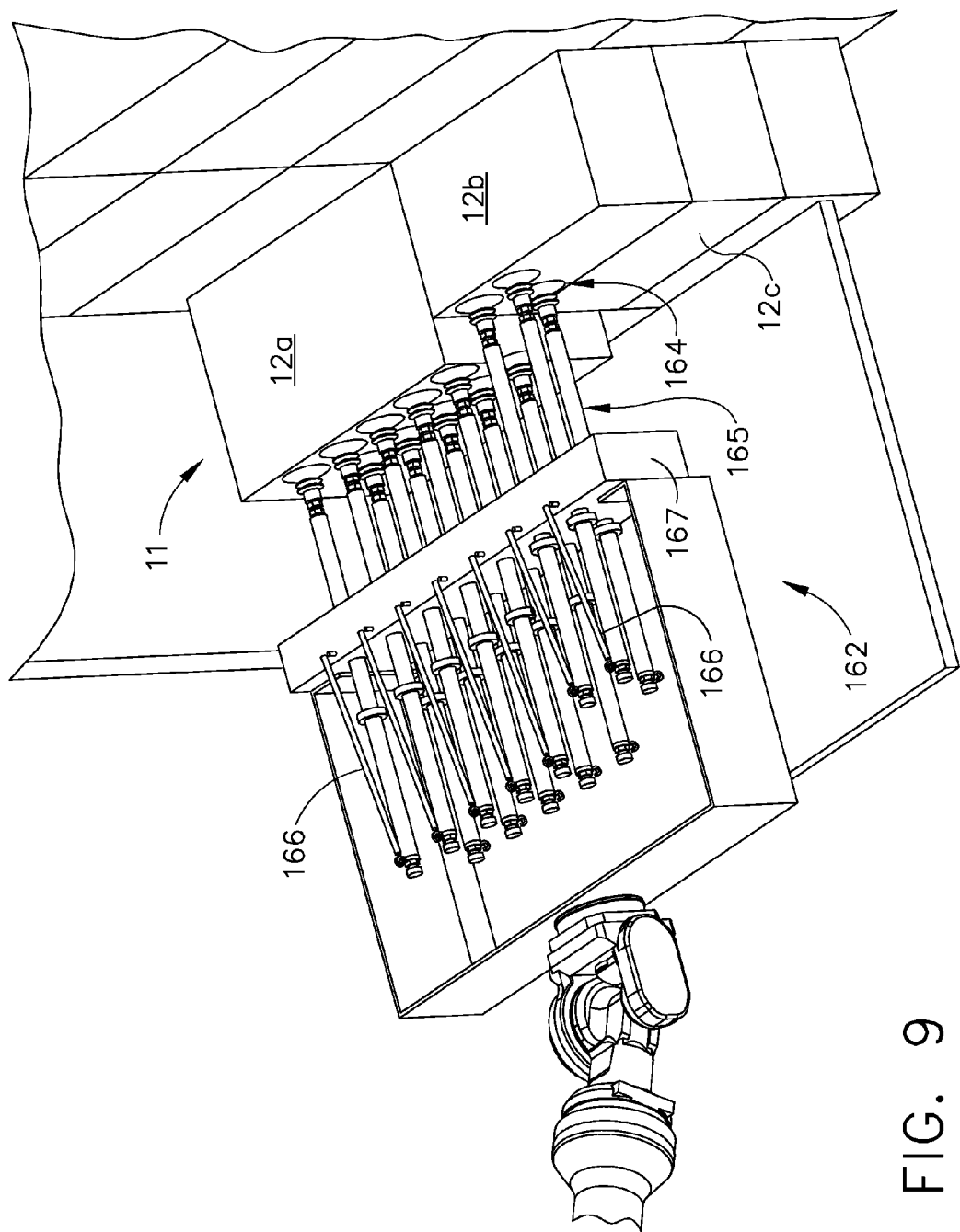

FIG. 9 shows the vacuum manipulator 162 brought into contact with the uneven face of the carton pile 11 and moved forward towards the carton pile 11 to ensure that vacuum cups 164 are brought into suction contact with carton 12*b*. Note that the guide rods 165 that are attached to the vacuum cups 164 in contact with carton 12*a* are moved farther rearward than the guide rods 165 associated with the vacuum cups 164 in contact with carton 12*b*.

Figure 10:
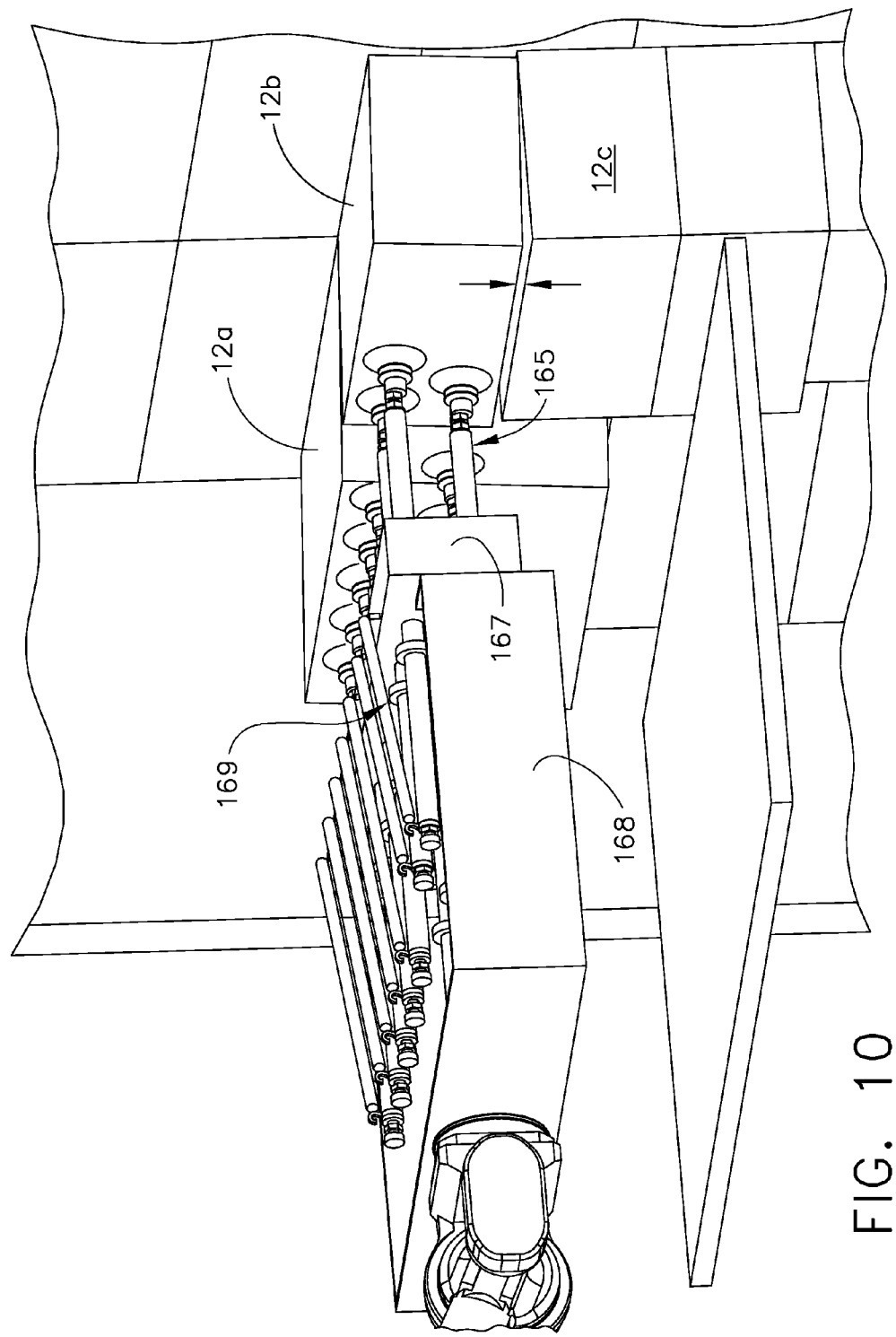
Figure 11:
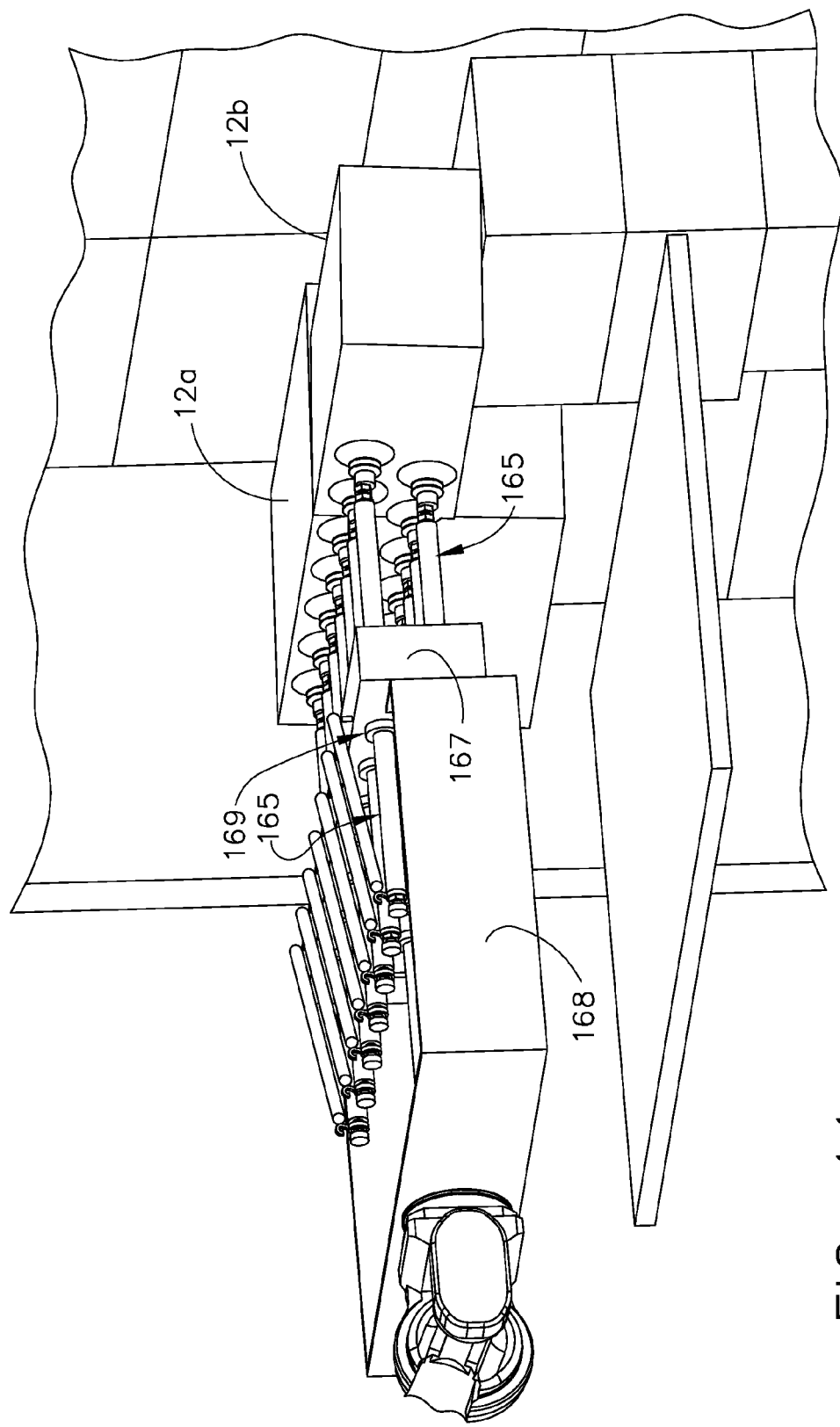
Figure 12:
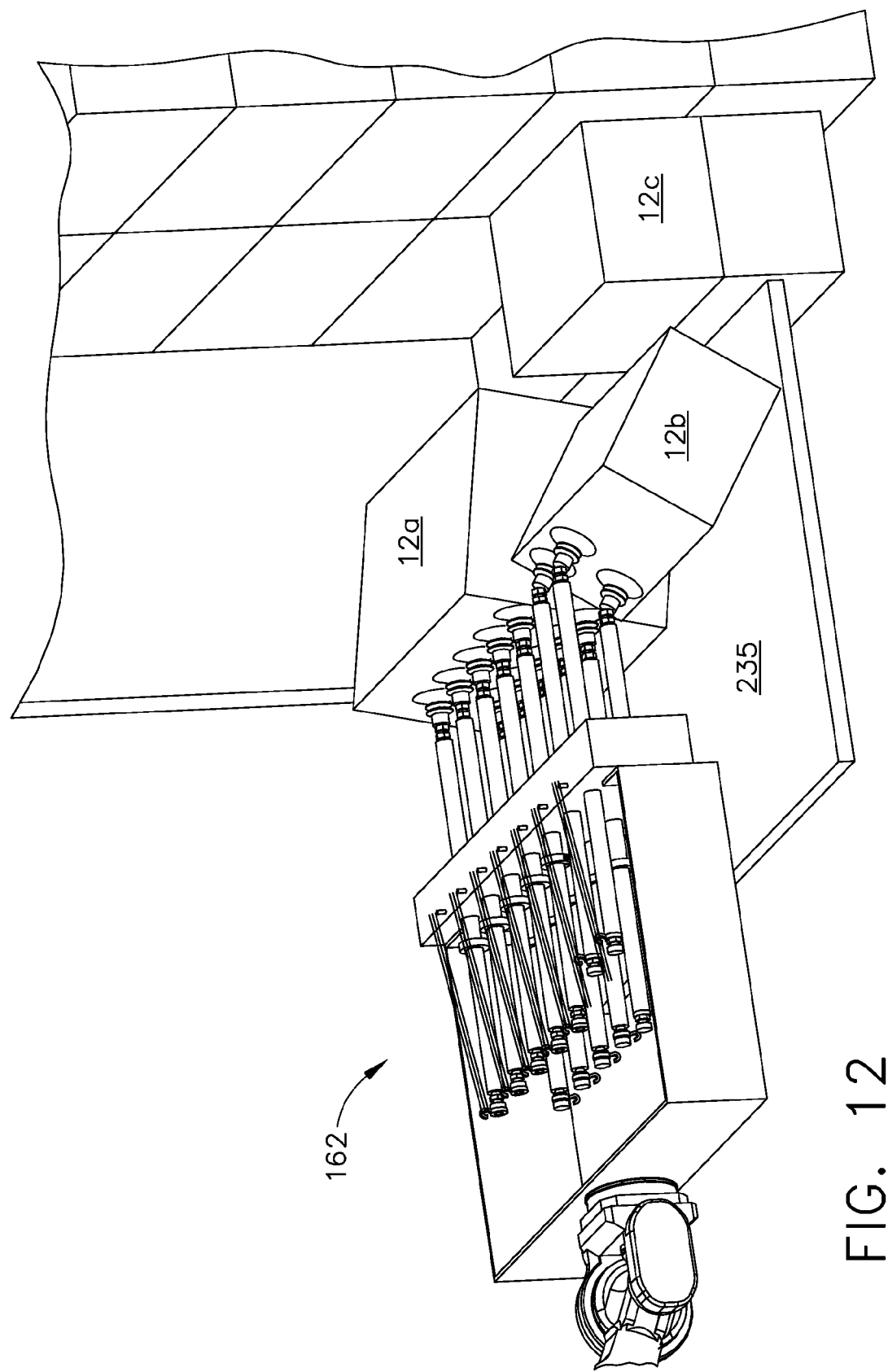
Figure 13:
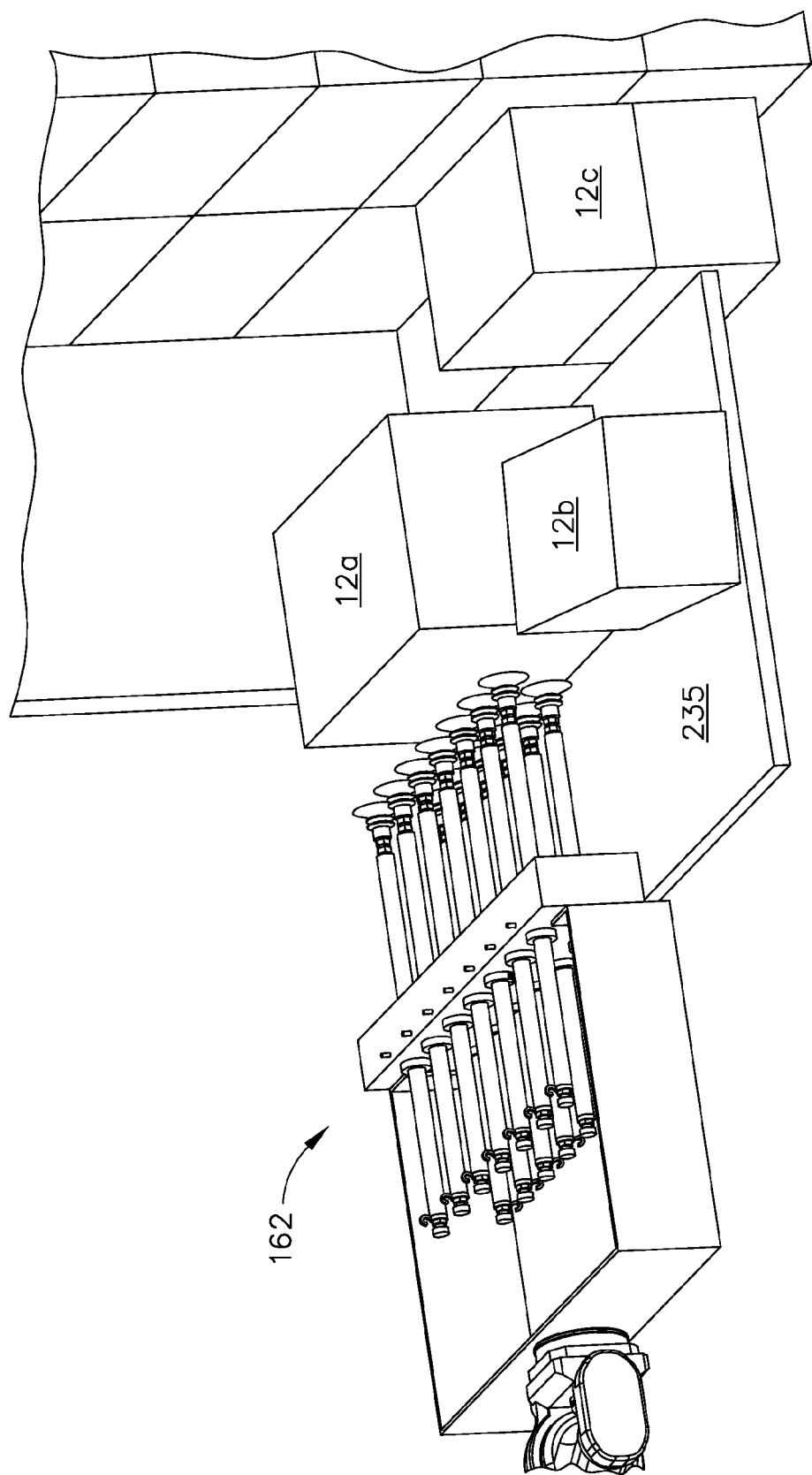

In FIG. 10, the arms 12 have been elevated to lift cartons 12*a* and 12*b* from the carton pile 11. In FIG. 11, the arms 12 have moved rearward pulling the guide frame 168 rearward until the stops 169 of the guide rods 165 contact the rearward moving guide frame 168. Once the stops 99 associated with a carton 12*a*, 12*b* are in contact with the rearward moving guide frame 168, the carton 12*a*, 12*b* begins moving rearward. Since the cartons 12*a* and 12*b* are staggered, the stops associated with carton 12*b* make contact before the stops of carton 12*a*, and carton 12*b* begins moving rearward before carton 12*a*. In this view, both carton 12*a* and 12*b* are being drawn rearward by the moving vacuum manipulator 162. In FIG. 12, the rearward moving vacuum manipulator 162 has pulled cartons 12*a*, 12*b* off of the carton pile and a front end of each carton 12*a*, 12*b* is resting on the body conveyor system 235. In FIG. 13, the vacuum is turned off, and the cartons 12*a* and 12*b* have fallen full onto the body conveyor system 235 for removal.

Figure 14:
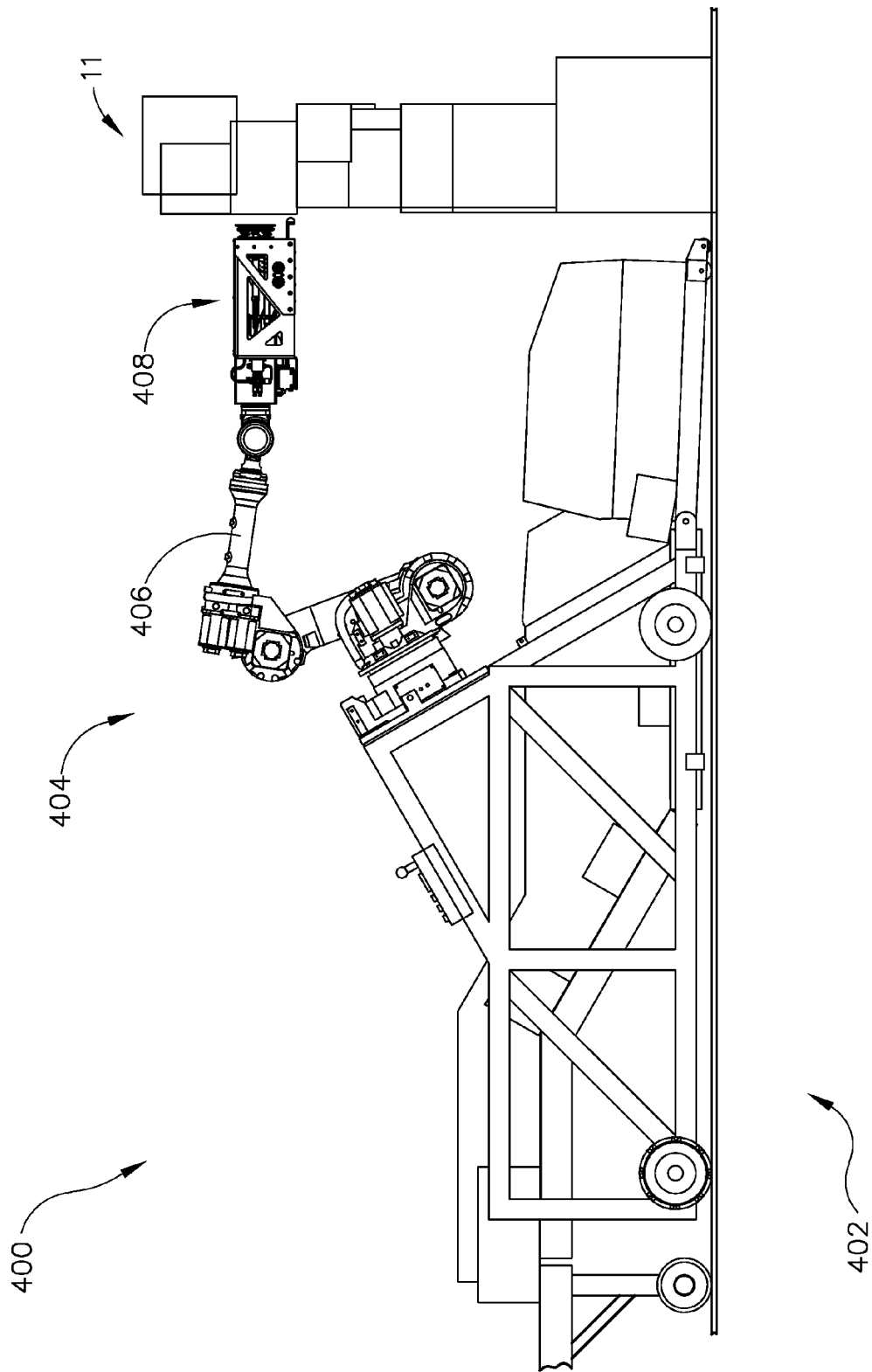
FIG. 14 is a right side sectional view of another robotic carton unloader including a vacuum manipulator according to an embodiment.

FIG. 14 is a right side sectional view of another embodiment robotic carton unloader 400 including a manipulator, such as vacuum manipulator 408, that includes a conformable face configured to conform to irregularities of a carton pile. The robotic carton unloader 400 may be similar to robotic carton unloader 100 described above with reference to FIGS. 1-6, and may include a mobile body 402 and robotically controlled carton remover system 404 similar to those described above. One difference between the robotic carton unloader 400 and robotic carton unloader 100, may be that robotic carton unloader 400 may include a vacuum manipulator 408 coupled to the robotic positioner 406. The robotic positioner 406 may be any type robotic arm, such as the FANUC® Robot R-1000ia sold by FANUC® Robotics America Corporation described above, and may extend the vacuum manipulator 408 forward toward the carton pile 11, backward (or rearward) from the carton pile 11, to the left, to the right, and/or rotate the vacuum manipulator 408. The robotic positioner 406 and vacuum manipulator 408 may be connected to a control and visualization system, such as control and visualization system 180 described above, and the control and visualization system may control the operations of the robotic positioner 406, vacuum manipulator 408, and mobile body 402 to unload cartons from the carton pile 11. For example, the control and visualization system may monitor sensor inputs received from sensors on the robotic positioner 406 and/or vacuum manipulator 408, and send control signals, such as electrical control signals or fluid control signals, to motors, valves, actuators, and/or other devices of the robotic positioner 406 and/or vacuum manipulator 408 to control the robotic positioner 406 and/or vacuum manipulator 408 based on the sensor inputs to unload cartons from the carton pile 11. As used herein, the term fluid may refer to any compressible or incompressible fluid. Examples of fluids may include air, oil, etc.

Figure 15:
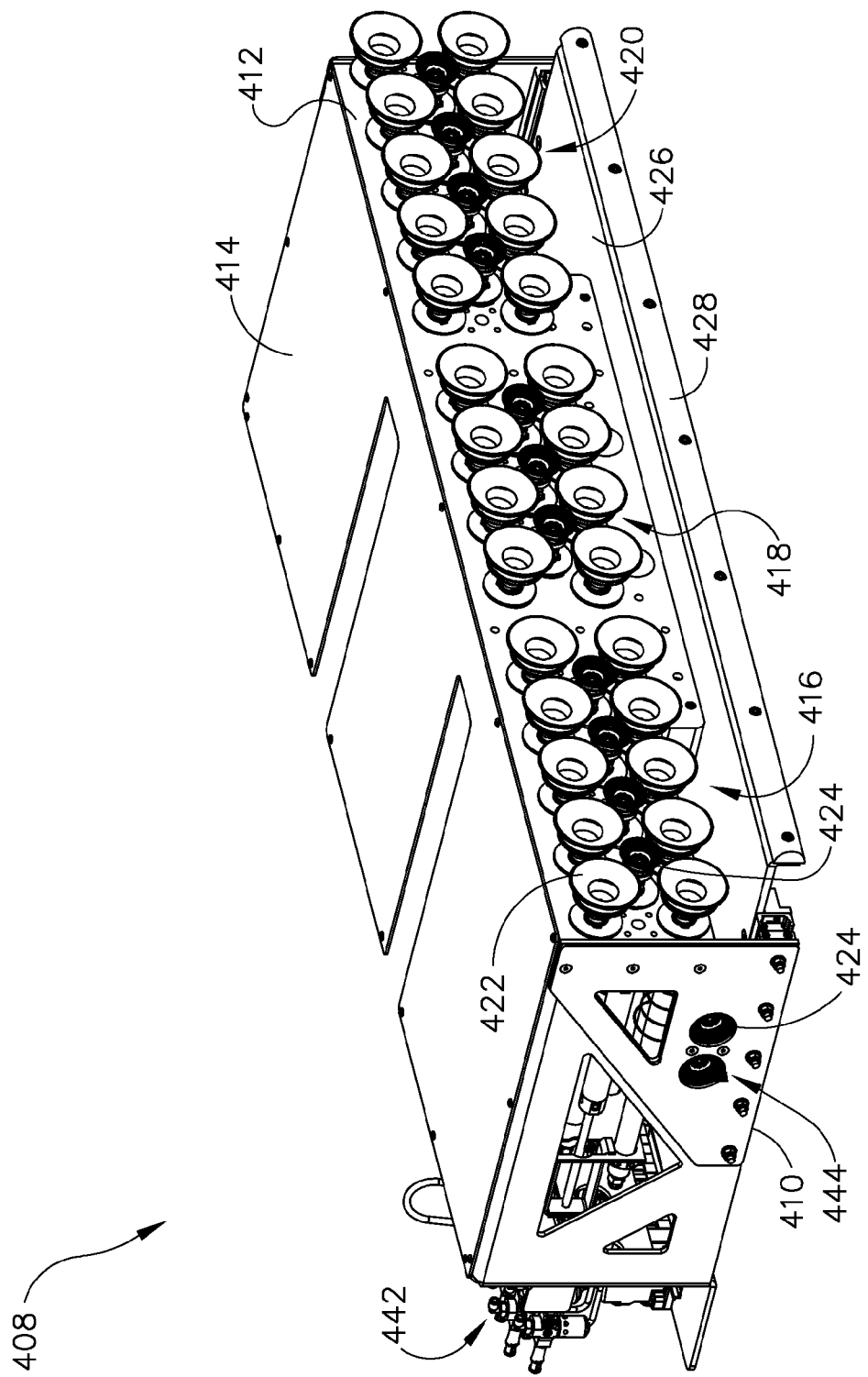
FIG. 15 is an isometric view of the right side of the vacuum manipulator of FIG. 14.

FIG. 15 is an isometric view of the right side of the vacuum manipulator 408 according to an embodiment. The vacuum manipulator 408 may comprise a manipulator frame 410 coupled to and configured to support a guide frame 412. The vacuum manipulator 408 may include one or more banks of carton connectors (e.g., vacuum rods), such as a first bank of vacuum rods 416, a second bank of vacuum rods, 418, and a third bank of vacuum rods 420. The each vacuum rod of the banks of vacuum rods 416, 418, and 420, may be supported by and extend through holes in the guide frame 412 from an internal portion of the vacuum manipulator 408 out to the front face of the guide frame 412. In an embodiment, the guide frame 412 may be a solid block, such as a resin (e.g., Delrin®) block, with a series of holes drilled through the block. The vacuum rods of each bank of vacuum rods 416, 418, and 420 may pass through the holes to extend out from and into the guide frame 412 and vacuum manipulator 408. In this manner, the banks of vacuum rods 416, 418, and 420 may form a conformable face of the vacuum manipulator 408. A top cover 414 may be affixed to the manipulator frame 410 to protect the vacuum rods and other devices housed within the vacuum manipulator 408.

In an embodiment, the banks of pluralities of carton connectors, such as banks of vacuum rods 416, 418, and 420, may be comprised of a series of vacuum rods having vacuum cups affixed to one end. In an embodiment, the vacuum cups in each bank 416, 418, and 420 may be of different diameters, such that the banks 416, 418, and 420 are comprised of at least one vacuum rod having a major vacuum cup 422 and at least one vacuum rod having a minor vacuum cup 424. For example, the banks 416, 418, and 420, may be comprised of parallel rows of major vacuum cups 422 and minor vacuum cups 424, such as two vertically aligned parallel rows of major vacuum cups 422 disposed above a vertically offset parallel row of minor vacuum cups 424. In an embodiment, the banks of vacuum rods 416, 418, and 420 may include the same number of vacuum rods and vacuum cups. In another embodiment, the banks of vacuum rods 416, 418, and 420 may include different numbers of vacuum rods and vacuum cups. For example, the first bank 416 and the third bank 420 may each include two rows of five major vacuum cups 422 and one row of four minor vacuum cups 424, while the second bank 418 (e.g., the middle bank) includes two rows of four major vacuum cups 422 and one row of three minor vacuum cups 424. In another embodiment, the rows of vacuum cups may include different types of vacuum cups, such as both major vacuum cups 422 and minor vacuum cups 424. In an embodiment, the diameter of the major vacuum cups 422 may be relatively larger than the diameter of the minor vacuum cups 424. In an embodiment, the major vacuum cups 422 and minor vacuum cups 424 may have the same or different surface textures, be made from the same or different materials, and/or may have the same or different deflection depths. While discussed in terms of two different types of vacuum cups, major vacuum cups 422 and minor vacuum cups 424, a single type of vacuum cup or more than two different types of vacuum cups may be used in the various embodiments.

Each of the vacuum rods of each bank of vacuum rods 416, 418, and 420 may be connected to a respective bank of vacuum generators. A first bank of vacuum generators 442 is illustrated in FIG. 15 coupled to the manipulator frame 410. An opposite end of the vacuum rod may include a vacuum coupling which may be connected by a vacuum line to one of the vacuum generators of the first bank of vacuum generators 442. In operation the vacuum generators may draw a vacuum which may pull fluid through the vacuum lines, through the respective vacuum rods and through the respective vacuum cups. In an embodiment, the vacuum drawn through the respective vacuum rods and through the respective vacuum cups may enable the conformable face of the vacuum manipulator 408 to attach to contacted cartons of the carton pile 11 to unload the contacted cartons from the carton pile 11.

In an embodiment, the vacuum manipulator 408 may include a moveable shelf, such as a sliding shelf 426, that may extend in the same direction as the banks of vacuum rods 416, 418, 420 (e.g., forward and reward when the vacuum manipulator 408 is parallel to the floor of the floor of the truck or trailer) by moving in and out of the manipulator frame 410. The sliding shelf 426 is illustrated retracted into the vacuum manipulator 408 in FIG. 15. In various embodiments, a moveable shelf, such as sliding shelf 426, may be moveable towards and away from the carton pile, such as by sliding towards and away from the carton pile. The sliding shelf 426 may be configured to catch one or more cartons dislodged from carton pile 11 and guide the cartons onto a conveyor system. A bumper 428 may be coupled to an edge of the sliding shelf 426. The bumper 428 may be configured to be pressed against the carton pile 11 below one or more cartons being dislodged (e.g., removed) from the carton pile 11 by the vacuum manipulator 408 to stabilize the carton pile below the one or more cartons being dislodged. In this manner, the moveable shelf may include a bumper to stabilize the carton pile 11 as cartons are unloaded. In an additional embodiment, the moveable shelf, such as sliding shelf 426, may pivot or rotate to swing down from a position parallel to the floor of the truck or trailer to a position perpendicular to the floor of the truck or trailer. In an embodiment, the entire sliding shelf 426 may pivot or rotate. In another embodiment, a portion of the sliding shelf may pivot or rotate. For example, a pivoting portion of the sliding shelf may be attached by a hinge or other type joint to a stationary portion of the sliding shelf and the pivoting portion may pivot or rotate relative to the stationary portion.

In an embodiment, the vacuum manipulator 408 may include at least one carton connector, such as a vacuum rod, configured to extend out from a side of the manipulator perpendicular to the conformable face of the vacuum manipulator 408. In an embodiment, the vacuum manipulator may include at least one carton connector configured to extend out from a side of the manipulator perpendicular to the conformable face as one or more banks of vacuum rods disposed on one or both of the left and/or right sides of the manipulator frame 410. A right side bank of vacuum rods 444 is illustrated in FIG. 15. The side banks of vacuum rods may be oriented in different directions than the banks of vacuum rods 416, 418, and 420 extending from the front of the vacuum manipulator 408. For example, the side banks of vacuum rods may extend perpendicular to the front of the vacuum manipulator and/or in other directions/orientations. In an embodiment, the bank of vacuum rods 444 may comprise one or more vacuum rods 444, such as two vacuum rods, having vacuum cups, such as minor vacuum cups 424, affixed to one end. The right side bank of vacuum rods 444 may be configured to extend and retract out of and into the right side of the manipulator frame 410. In operation the right side bank of vacuum rods 444 may extend out from the vacuum manipulator 408 to contact, attach to, and dislodge (e.g., remove) cartons arranged to the right side of vacuum manipulator 408. When unloading cartons from a truck or trailer, the unloading of cartons from the center portion of the carton pile 11 may result in columns of cartons arranged along the sides of the truck or trailer that may be difficult for a vacuum manipulator 408 to reach with the banks of vacuum rods 416, 418, and 420 extending from the front of the vacuum manipulator 408. The side banks of vacuum rods, such as right side bank of vacuum rods 444, may extend from the manipulator frame 410 to contact and manipulate cartons in these columns of cartons arranged along the sides of the truck or trailer. The side banks of vacuum rods through their own retraction or in combination with movement of the vacuum manipulator 408 caused by the robotic positioner 406 may pull these side cartons to a position in which the vacuum manipulator 408 may engage the cartons with the banks of vacuum rods 416, 418, and 420 extending from the front of the vacuum manipulator 408. Alternatively, the side banks of vacuum rods through their own retraction or in combination with movement of the vacuum manipulator 408 caused by the robotic positioner 406 may remove the cartons from their respective columns and cause them to fall onto a conveyor system.

Figure 16:
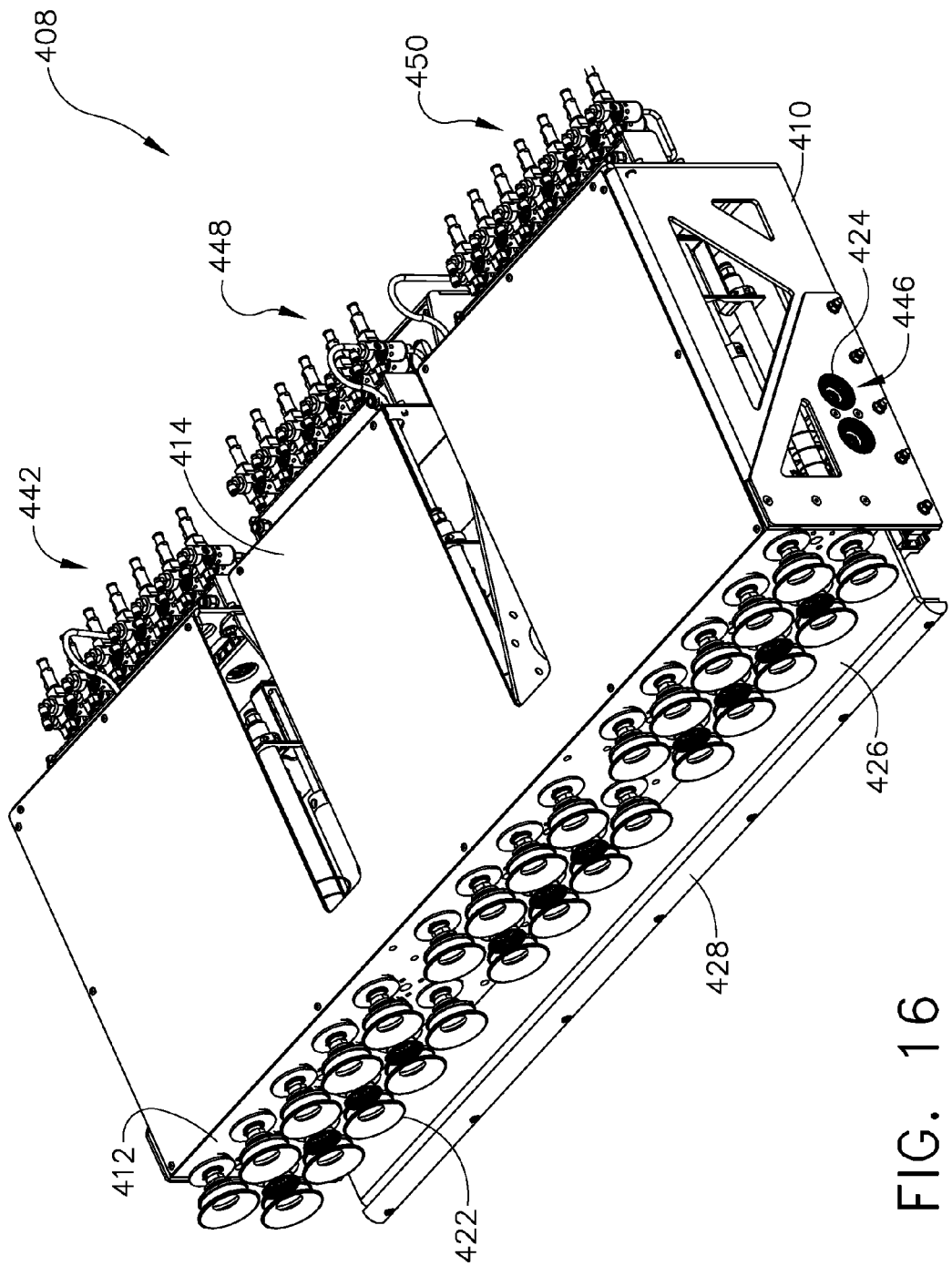
FIG. 16 is an isometric view of the left side of the vacuum manipulator of FIG. 14.

FIG. 16 is an isometric view of the left side of the vacuum manipulator 408. FIG. 16 illustrates the left side bank of vacuum rods 446 including minor vacuum cups 424 which may extend through the manipulator frame 410 out to the left. Additionally, in FIG. 16 the first bank of vacuum generators 442, second bank of vacuum generators 448, and third bank of vacuum generators 450 for each of the first bank of vacuum rods 416, second bank of vacuum rods 418, and third bank of vacuum rods 420 are illustrated coupled to the manipulator frame 410.

Figure 17A:
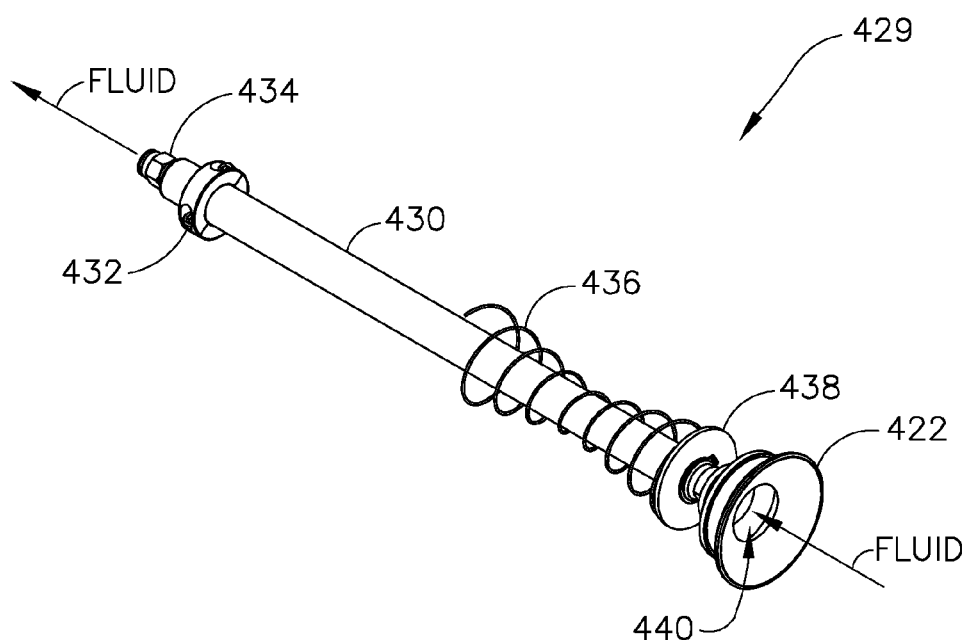
FIG. 17A is an isometric view of an embodiment vacuum rod.
Figure 17B:
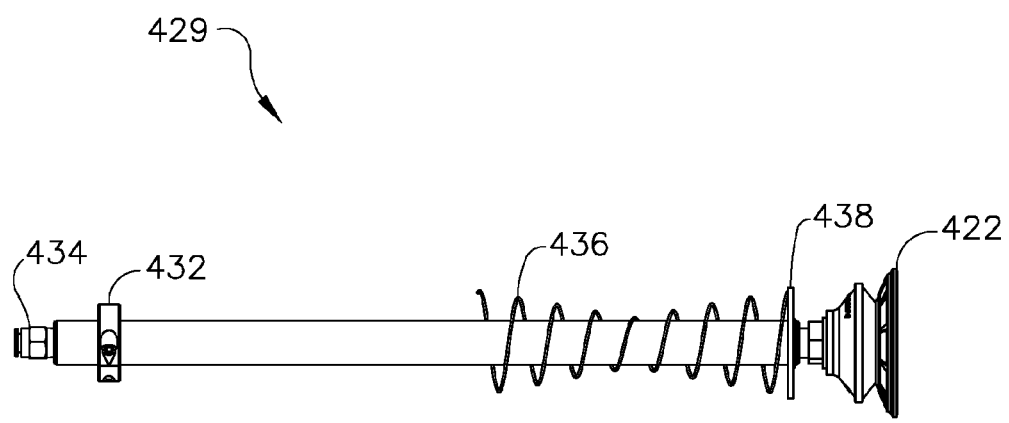
FIG. 17B is a side view of the vacuum rod of FIG. 17A.

FIG. 17A is an isometric view and FIG. 17B is a side view of an embodiment carton connector, such as vacuum rod 429, having a major vacuum cup 422 affixed to one end. The vacuum rod 429 may be comprised of a hollow guide rod 430 to which the major vacuum cup 422 may be affixed to one end and a vacuum coupling 434 may be affixed to an opposite end. Disposed along the guide rod 430, such as forward of the vacuum coupling 434, may be a stop 432. The stop 432 may be a protrusion, such as a collar, ring, ridge, etc., affixed to and/or formed on the guide rod 430. Opposite the stop 432 along the guide rod 430 may be a washer 438 set at or back from the point of attachment of the major vacuum cup 422. The washer 438 may be a collar, ring, ridge, etc., affixed to and/or formed on the guide rod 430. A compression spring 436 may surround the guide rod 430 and extend from the washer 438 on a side opposite the major vacuum cup 422. When compressed, the compression spring 436 may push against the washer 438 exerting a force against the washer 438. The hole through the center of the major vacuum cup 422, hole through the center of the guide rod 430, and the hole through the vacuum coupling 434 may form a central passage 440 through which fluid may travel from the major vacuum cup 422, through the center of the guide rod 430, and out the vacuum coupling 434, thereby traveling through the vacuum rod 429.

Figure 18A:
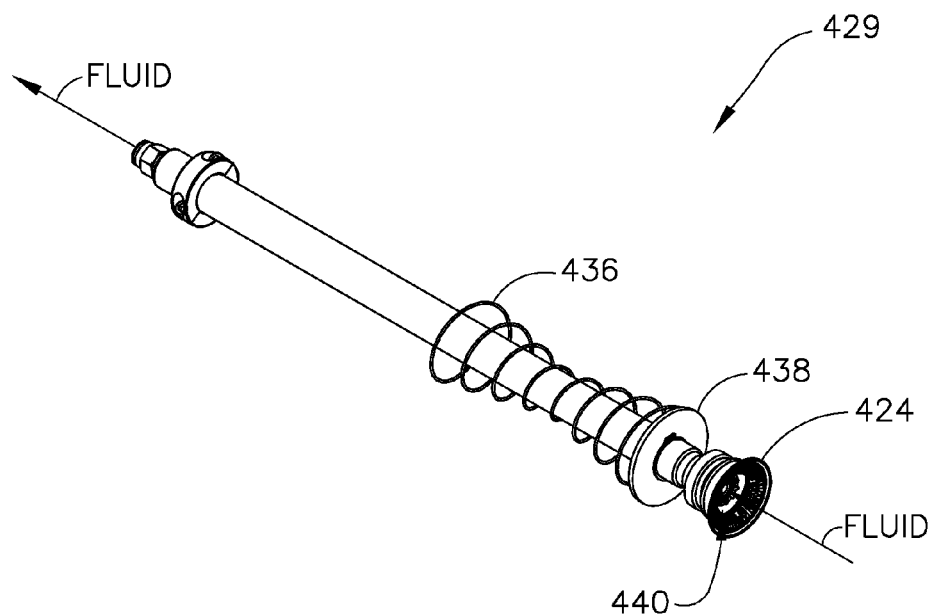
FIG. 18A is an isometric view of another embodiment vacuum rod.
Figure 18B:
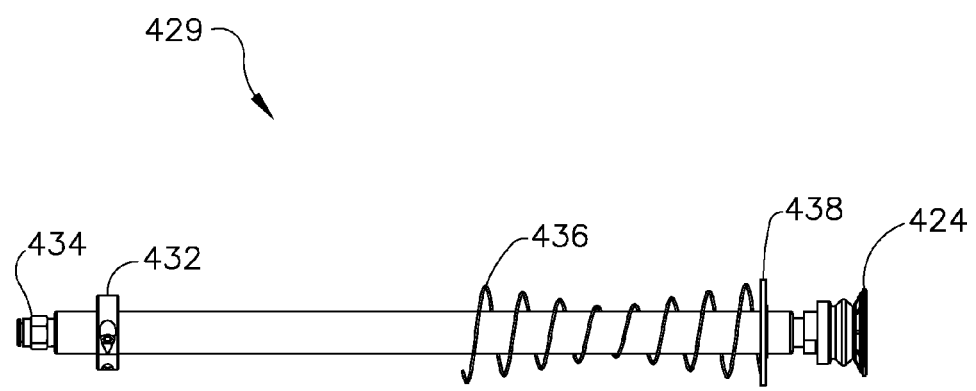
FIG. 18B is a side view of the vacuum rod of FIG. 18A.

FIG. 18A is an isometric view and FIG. 18B is a side view of the embodiment carton connector, such as vacuum rod 429, described above with reference to FIGS. 17A and 17B, except in FIGS. 18A and 18B the carton connector, such as vacuum rod 429, is illustrated including a minor vacuum cup 424 affixed to one end. Series of vacuum rods 429 with major vacuum cups 422 and/or minor vacuum cups 424 may comprise the first bank of vacuum rods 416, second bank of vacuum rods 418, and/or third bank of vacuum rods 420. When the vacuum rod 429 contacts a surface of a carton, the major vacuum cup 422 or minor vacuum cup 424 may deflect and/or compress due to the force of the carton and the guide rod 430 exerted against the major vacuum cup. The deflection and/or compression distance of the major vacuum cup 422 or minor vacuum cup 424 may depend on various factors, such as material properties of the vacuum cup, diameter of the vacuum cup, etc. In one embodiment, the maximum deflection of the major vacuum cup 422 or minor vacuum cup 424 may be 1.19 inches. Other embodiment maximum deflection or compression distances may be greater than 1.19 inches or less than 1.19 inches.

Figure 19:
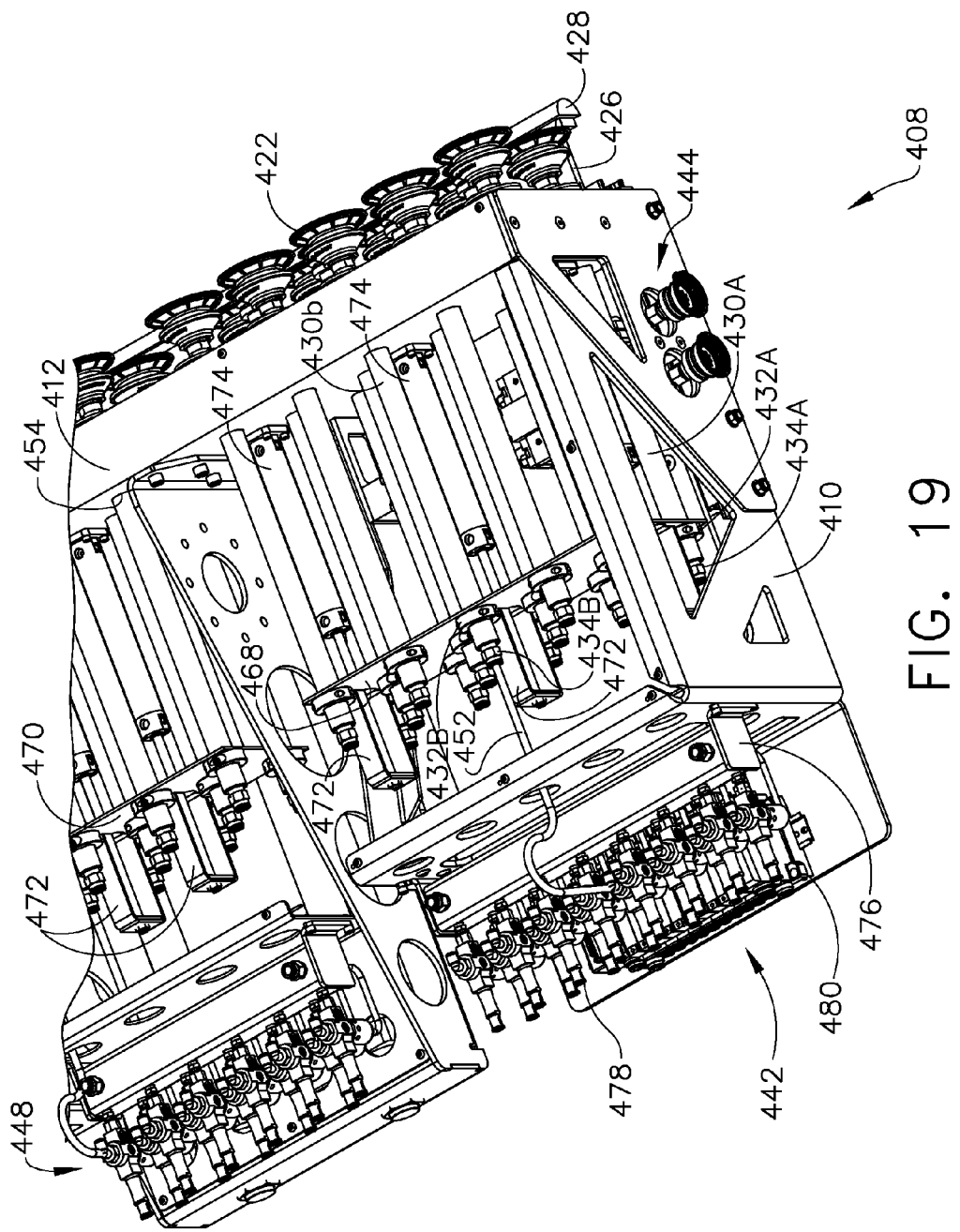
FIG. 19 is a partial isometric view of the right side of the vacuum manipulator of FIG. 14 illustrating internal features according to an embodiment shown through a clear top cover.

FIG. 19 is a partial isometric view of the right side of the vacuum manipulator 408 with the top cover 414 shown clear to provide a view of the internal configuration of the vacuum manipulator. FIG. 19 illustrates that the vacuum rods pass through the guide frame 412 and through plates, such as a first plate 468 associated with the first bank of vacuum rods 416 and a second plate 470 associated with the second bank of vacuum rods 418. All the vacuum rods for the first bank of vacuum rods 416 are illustrated, but a number of vacuum rods for the second bank of vacuum rods 418 are removed for illustration purposes. With the vacuum rods removed, the guide frame openings 454 (e.g., holes) in the guide frame 412 are visible as well as the plate openings 455 (e.g., holes) in the second plate 470. The vacuum rods may extend through the guide frame 412 and through their respective plates 468 and 470 and may slide through the guide frame 412 and their respective plates 468 and 470.

The first plate 468 and the second plate 470 may each be slidably mounted within the manipulator frame 410 and may move forward toward the guide frame 412 and backward (e.g., rearward) away from the guide frame 412. In an embodiment retraction cylinders 474 may be coupled to the plates and may be actuated to move the plates within the manipulator frame 410. For example, the retraction cylinders 474 may be mounted between the plates and the guide frame 412, such that the retraction cylinders 474 extend from the back surface of the guide frame 412 in an opposite direction of the vacuum cups of the banks of vacuum rods 416, 418, and 420. The extension rods of the retraction cylinders 474 may extend through the plates and contact u-shaped brackets 472 located on a back surface of the plates. In operation, as the retraction cylinders 474 extend their extension rods, the extension rods may exert force on the u-shaped brackets 472 pushing the plates away from the guide frame 412. In an embodiment, the retraction cylinders 474 may be compressed fluid (e.g., air) cylinders configured to extend the extension rods when compressed fluid (e.g., air) is supplied. For example, one or more valves of a compressed fluid (e.g., air) distributor may be controlled by the control and visualization system to be closed to provide compressed fluid (e.g., air) to the retraction cylinders 474 to extend the extension rods and the one or more valves may be controlled to be opened to vent the cylinders 474 to the atmosphere, thereby allowing the extension rods to be retracted and the plate to slide forward toward the guide frame 412.

As illustrated in FIG. 19, the stops 432a and 432b of guide rods 430a and 430b, respectively, contact the first plate 468. When the first plate 468 is slid all the way forward toward the guide frame 412 (e.g., when the extension rods of retraction cylinders 474 are not extended), stops 432a and 432b may contact the first plate 468 and prevent their respective guide rods 430a and 430b from moving farther forward. As the first plate 468 slides back away from the guide frame 412 due to extension of the extension rods applying force to the u-shaped brackets 472, the first plate 468 applies force against the stops 432a and 432b to pull guide rods 430a and 430b back through the guide frame 412, thereby compressing the compression springs of the respective vacuum rods between the front face of the guide frame 412 and the respective washers. In this manner, the vacuum rods may be retracted back into the vacuum manipulator 408 to prevent damage, such as bending, breaking, etc. of the vacuum rods. For example, the vacuum rods may be retracted during movement of the robotic carton unloader 400 and/or robotic positioner 406 to protect the vacuum rods from damage. When the extension rods of the retraction cylinders 474 are no longer exerting force against the u-shaped brackets 472, the force of the compression springs of the various vacuum rods pushing on the guide frame 412 and the various washers may drive the vacuum rods forward out of the guide frame 412. In this manner, each of the various vacuum rods may be biased towards the carton pile by its spring. The stops 432, such as stops 432a and 432b, may exert force on the plates, such as the first plate 468, to pull the plates forward toward the guide frame 412 as the compression springs extend the vacuum rods. As the extension and retraction of the vacuum rods is controlled by the compression springs and/or the retraction cylinders 474, respectively, the vacuum rods may be considered spring loaded passive suction devices. In an embodiment, the various plates associated with each respective bank of vacuum rods may have the same number of respective u-shaped brackets 472 and retraction cylinders 474. In another embodiment, the plates may have different numbers of respective u-shaped brackets 472 and retraction cylinders 474. For example, the middle plate 470 may be associated with two u-shaped brackets 472 and two retraction cylinders 474, while the outer plates (e.g., first plate 468 and third plate 471) may be associated with three u-shaped brackets 472 and three retraction cylinders 474.

FIG. 19 also illustrates aspects of the first bank of vacuum generators 442, including a vacuum line 452 connected between one of the vacuum generators and the vacuum coupling 434b of one of the vacuum rods of the first bank of vacuum rods 416. Other vacuum generators and vacuum couplings, such as vacuum coupling 434a, may be connected in a similar manner, but are illustrated without vacuum lines 452 for clarity of illustration. The vacuum lines 452 may be any type connection, such as flexible tubes, pipes, hoses, etc. The vacuum generators may receive compressed fluid (e.g., air) from a compressed fluid (e.g., air) manifold 476. The compressed fluid may flow to each of the vacuum generators from the compressed fluid manifold 476 and be forced across an opening connected to the respective vacuum line 452 and out an exhaust 478. In this manner, the vacuum generator may act as an educator drawing fluid through the vacuum line 452 and through the central passage 440 of the vacuum, and drawing a vacuum or partial vacuum when the vacuum cups contact a surface of a carton. In an embodiment, each bank of vacuum generators 442, 448, and 450 may have its own respective compressed fluid manifold 476.

The compressed fluid manifolds 476 and other fluid actuated devices, such as retraction cylinders 474, may receive compressed fluid (e.g., air) from compressed fluid (e.g., air) distributor 480. Compressed fluid lines may connect the compressed fluid manifolds 476 and other fluid actuated devices, such as retraction cylinders 474, to the compressed fluid distributor 480. The compressed fluid distributor 480 may receive compressed fluid (e.g., air) from a main compressed fluid connection and may comprise a series of valves remotely controllable by the control and visualization system, such as electrically operated valves, that may be cycled open and closed to provide compressed fluid from the main compressed fluid connection to the compressed fluid manifolds 476 and other fluid actuated devices, such as retraction cylinders 474 of the vacuum manipulator 408. In an embodiment, the vacuum manipulator 408 may have one compressed fluid distributor 480. In another embodiment, more than one compressed fluid distributor 480 may be present on the vacuum manipulator.

Figure 20:
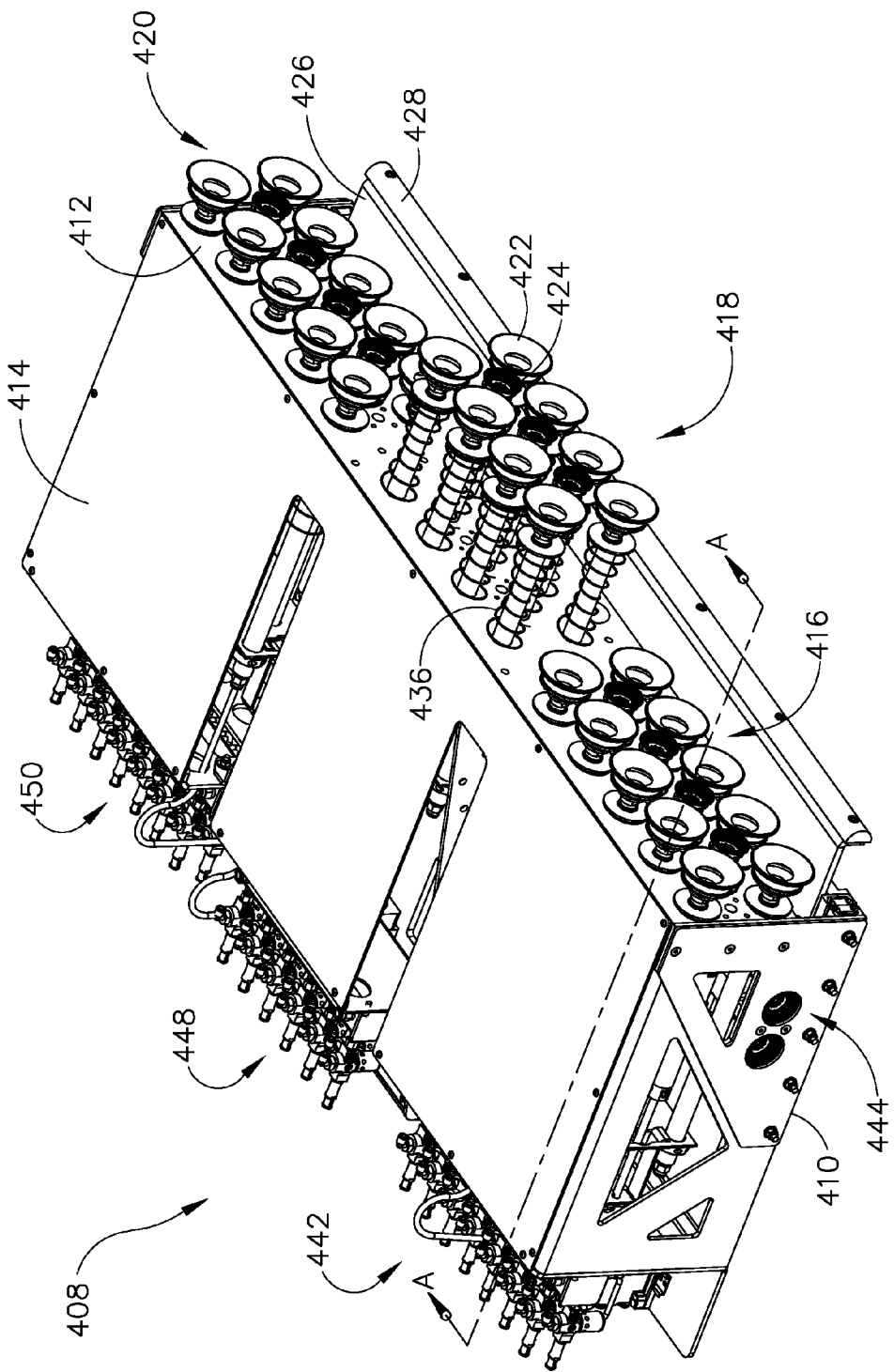
FIG. 20 is an isometric view of the right side of the vacuum manipulator of FIG. 14 with a second bank of vacuum rods extended.

FIG. 20 is an isometric view of the right side of the vacuum manipulator 408 with the second bank of vacuum rods 418 extended and the sliding shelf 426 retracted. The first bank of vacuum rods 416, the second bank of vacuum rods 418, and the third bank of vacuum rods 420 may be independently extendable and retractable. In this manner, each bank of a plurality of carton connectors, such as the first bank of vacuum rods 416, the second bank of vacuum rods 418, and the third bank of vacuum rods 420, may be configured to move independent of the other banks of pluralities of carton connectors towards the carton pile to conform to irregularities of the carton pile by contact therewith and to move independent of the other banks of pluralities of carton connectors away from the carton pile to unload the contacted cartons. As illustrated in FIG. 20, when the second bank of vacuum rods 418 is extended the compression springs 436 of the various vacuum rods expand out from the guide frame 412 pushing against the washers 438 to extend the vacuum cups forward. As illustrated in FIG. 20 by the extension of the vacuum rods 418, as the various vacuum rods may extend through the guide frame 412 to extend the vacuum cups away from the guide frame 412 and manipulator frame 410. The range of extension of the vacuum rods may be based on the length of the guide rods 430, uncompressed length of the springs 436, location of the stops 432, separation distance between the plates 468, 470, 471 and the guide frame 412, and/or the depth of guide frame 412. However, the extension of the vacuum rods may enable the vacuum cups to be extend out a range from the guide frame 412 that is longer than the depth of the vacuum cups and beyond the distance the vacuum cups extend in the retracted state. In this manner, the vacuum cups may be extended to reach deeper into the carton pile 11 to reach cartons that may not be aligned with the front face of the carton pile 11 because the vacuum cups may be extended beyond their own depth forward from the retracted position to any position over the range. Additionally, because the vacuum rods are in effect spring loaded passive suction devices that may move freely through the guide frame 412 and the plates 468, 470, 471 limited only by the stops 432, washers 438, and springs 436, the vacuum rods may also deflect the same range backward from their fully extended position back to their retracted position. In this manner, each carton connector, such as each vacuum rod, and therefore the banks of vacuum rods 416, 418, and 420, may deflect to conform to the face of the carton pile 11, and the conformable face of the manipulator may be configured to passively conform to irregularities of the carton pile 11 to unload the carton pile 11 by contact therewith. In an embodiment, the deflection may be the range of extension distance plus any deflection/compression distance of the vacuum cups themselves. In this manner, the effective deflection distance may be greater than the deflection distance of the vacuum cups themselves.

Figure 21:
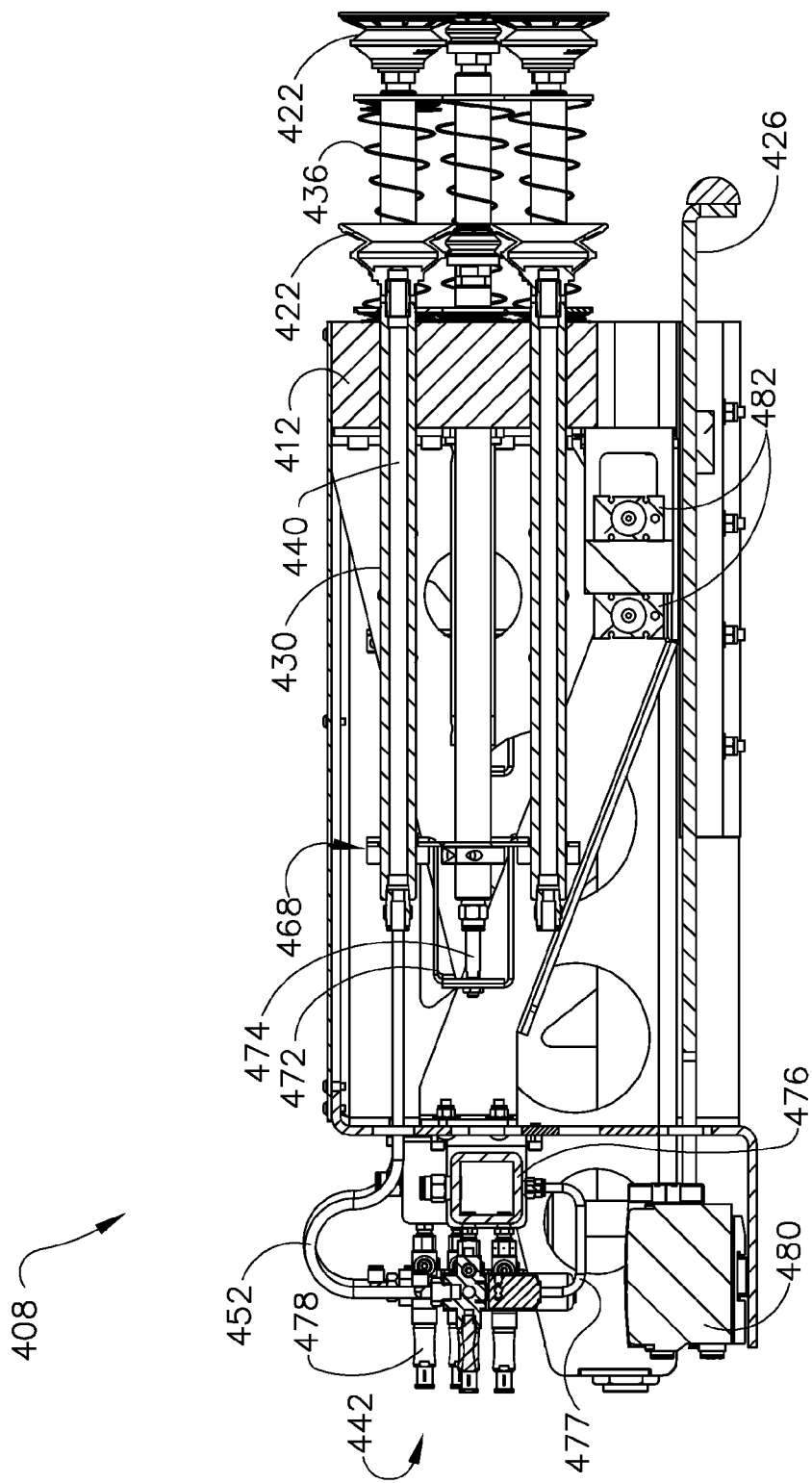
FIG. 21 is a side sectional view of the right side of the vacuum manipulator of FIG. 20.

FIG. 21 is a side sectional view of the right side of the vacuum manipulator 408 along the line A-A shown in FIG.

20. In FIG. 21, the central passage 440 and the pathway from the vacuum generator through the vacuum line 452 and vacuum coupling 432 is visible. Additionally, compressed fluid line 477 coupling the compressed fluid manifold 476 to the vacuum generator is illustrated. As illustrated in FIG. 21, the compression springs 436 for the second bank of vacuum rods are extended, while the compression springs 436 for the first bank of vacuum rods are compressed between the washer 438 and guide frame 412. Additionally, the side actuators 482 for the two vacuum cups of the right side bank of vacuum rods 444 are shown in FIG. 21.

Figure 22:
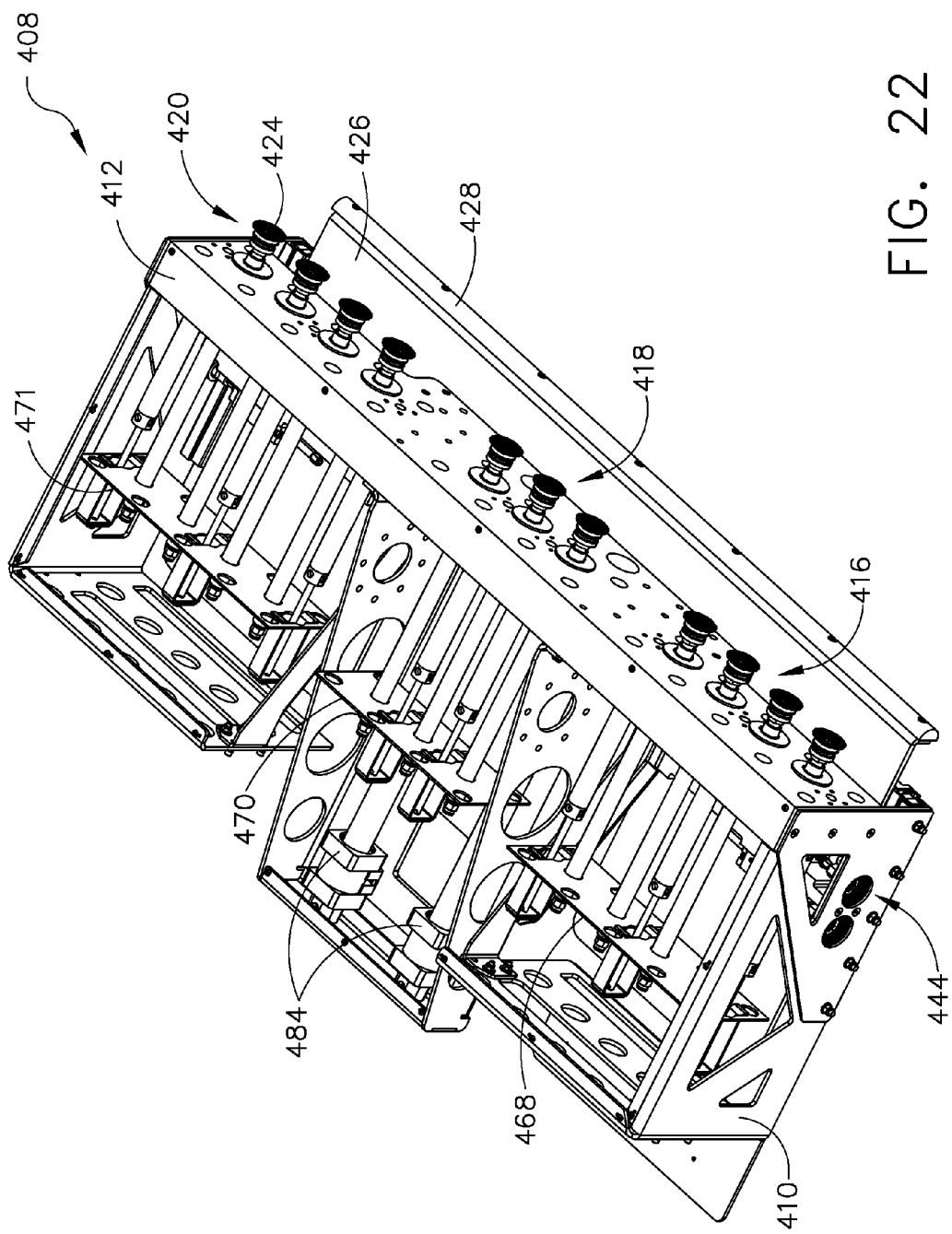
FIG. 22 is an isometric view of the right side of the vacuum manipulator of FIG. 14 with the top cover and various vacuum rods removed for clarity of illustration.

FIG. 22 is an isometric view of the right side of the vacuum manipulator 408 with the top cover and various vacuum rods removed for clarity of illustration. FIG. 22 illustrates the sliding shelf 426 retracted and all banks 416, 418, and 420 retracted. Additionally, the right side bank of vacuum rods 444 is retracted. The sliding shelf 426 may be coupled to one or more pneumatic cylinders 484, such as two pneumatic cylinders 484, that may drive the sliding shelf 426 in and out of the vacuum manipulator 408. In an embodiment, pneumatic cylinders 484 may be pneumatic rodless fluid (e.g., air) cylinders with magnetic coupling. Each pneumatic cylinder 484 may include an outside collar that slides on the outside of a fluid (e.g., air) cylinder and is magnetically coupled to an inside piston through the cylinder wall. The outside collars may be coupled to the sliding shelf 426 and as they piston drives forward or backward the magnetically coupled collars drive the sliding shelf 426 forward or backward, respectively. The magnetic coupling of the collars may provide a magnetic decoupling should the sliding shelf 426 impact the carton pile 11 with too high an impact force. In this manner, damage to the sliding shelf 426 and/or the carton pile 11 may be avoided. The collars may re-couple magnetically with the piston when the piston retracts. The pneumatic cylinders 484 may be coupled to the compressed fluid distributor 480 and received compressed fluid (e.g., air) to extend and retract the sliding shelf 426 based on the control and visualization system controlling the valves of the compressed fluid distributor 480.

Figure 23:
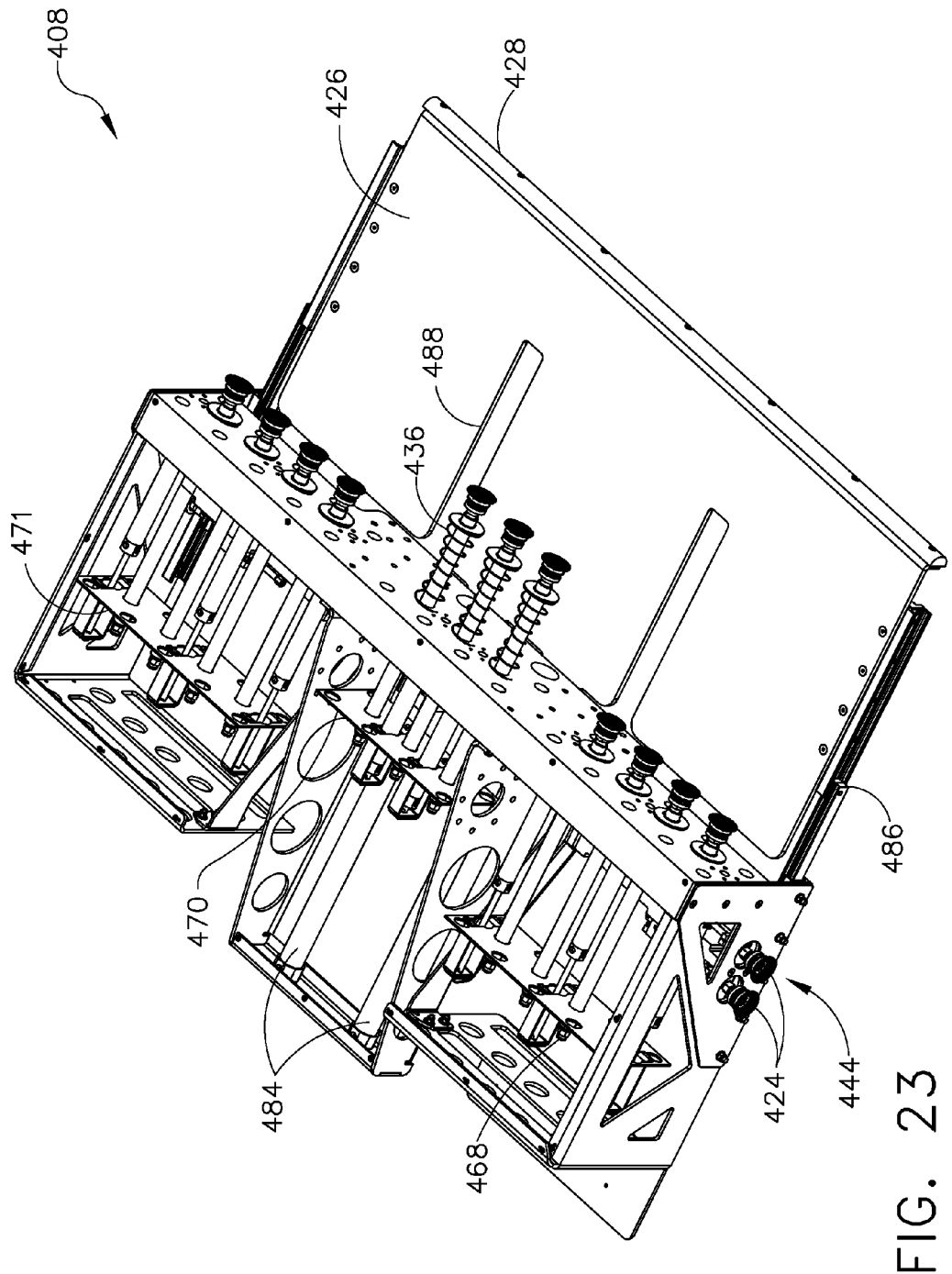
FIG. 23 is an isometric view of the right side of the vacuum manipulator of FIG. 22 with a second bank of vacuum rods, the right side bank of vacuum rods, and the sliding shelf extended.

FIG. 23 is an isometric view of the right side of the vacuum manipulator 408 with the second bank of vacuum rods 418, the right side bank of vacuum rods 444, and the sliding shelf 426 extended. Other vacuum rods have been removed for clarity of illustration. As illustrated in FIG. 23, when the sliding shelf 426 is extended the collars of the pneumatic cylinders 484 may be moved forward to extend the sliding shelf 426. In an embodiment, the sliding shelf 426 may slide forward on rails 486 mounted between the sliding shelf 426 and the manipulator frame 410. Rails 486 may be any type rails enabling the sliding shelf 426 to extend from and retract into the vacuum manipulator, such as roller slides. The sliding shelf 426 may be a continuous shelf or a modular shelf and may include various shelf cutouts 488.

FIG. 23 also shows that the plate 470 associated with the second bank of vacuum rods 418 may move forward when the vacuum rods are extended by the compression springs 436, while the first plate 468 and third plate 471 remain retracted all the way back, thereby compressing the compression springs 436.

Figure 24:
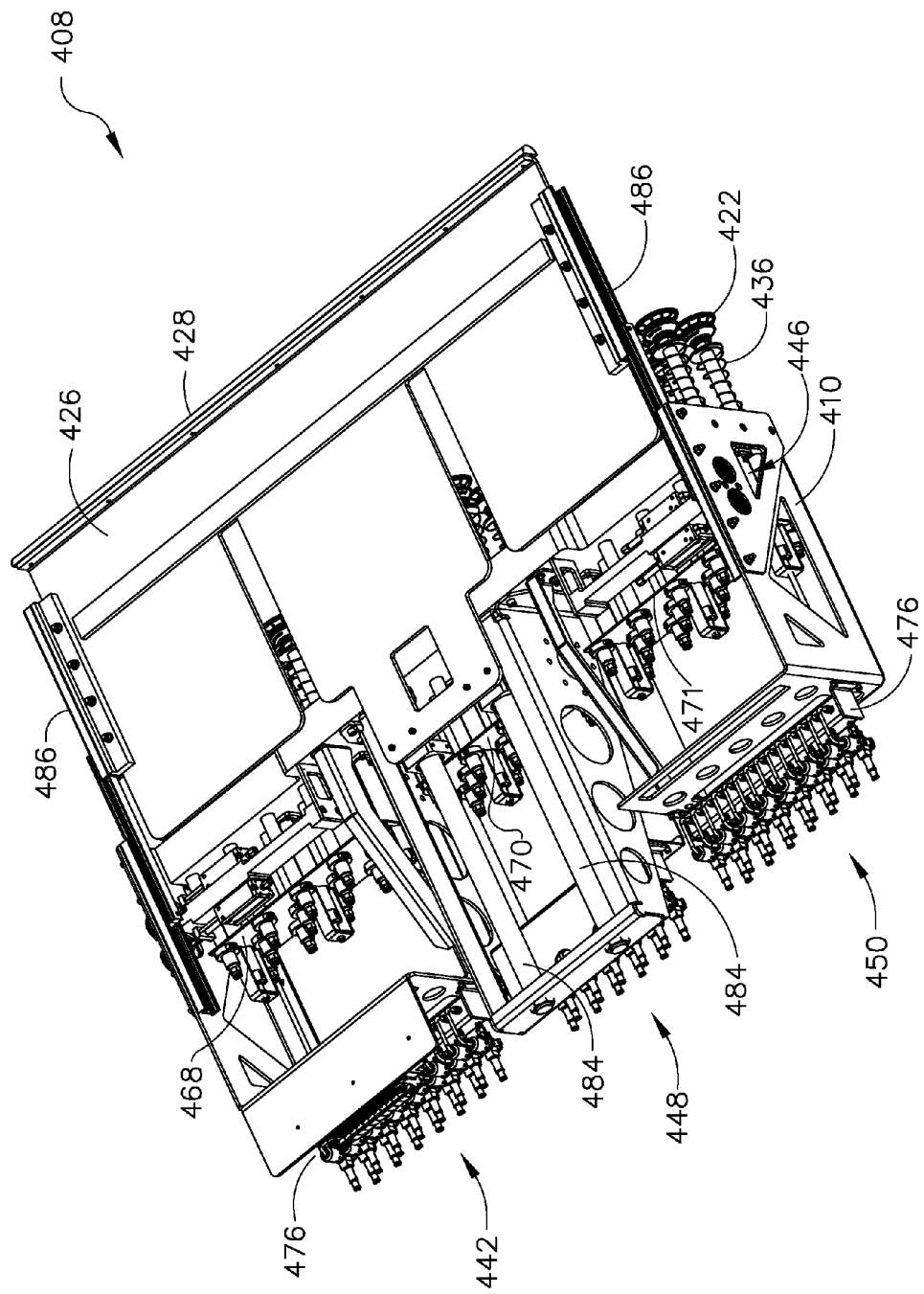
FIG. 24 is an isometric view of the left under-side of the vacuum manipulator of FIG. 14 with the sliding shelf and first, second, and third banks of vacuum rods extended.
Figure 25:
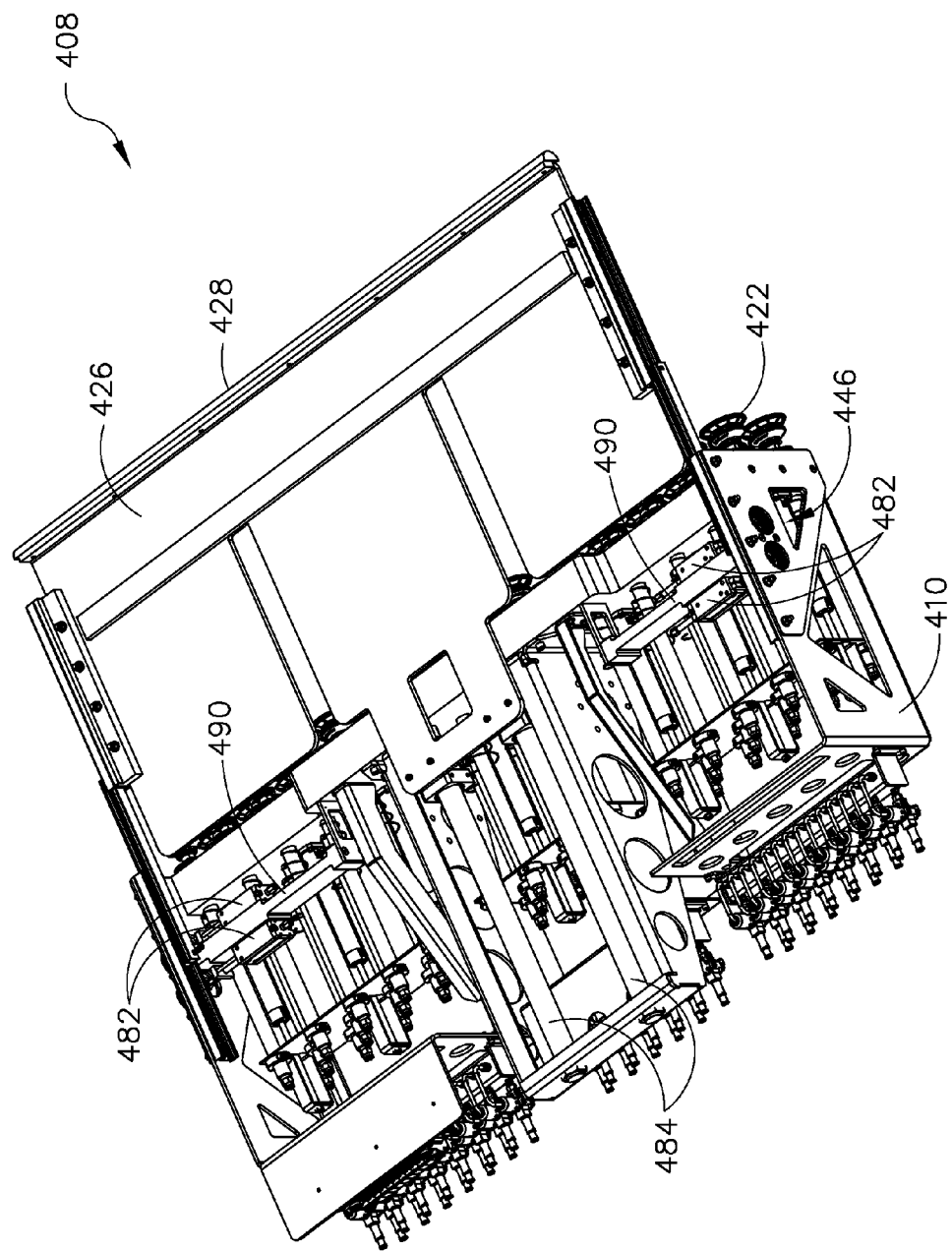
FIG. 25 is an isometric view of the left under-side of the vacuum manipulator of FIG. 24 with the sliding shelf extended and first, second, and third banks of vacuum rods retracted.

FIG. 24 is an isometric view of the left under-side of the vacuum manipulator 408 with the sliding shelf 426 and banks of vacuum rods 416, 418, and 420 extended. Because all banks of vacuum rods 416, 418, and 420 are extended, all plates 468, 470, and 471 are pulled forward to the same location. The collars of the pneumatic cylinders 484 may also be seen pushed forward with the sliding shelf 426. The left side bank of vacuum rods 446 is illustrated retracted. FIG. 25 is an isometric view of the left under-side of the vacuum manipulator 408 with the sliding shelf 426 extended and banks of vacuum rods 416, 418, and 420 retracted. The extension rods of the retraction cylinders 474 are all extended driving the plates 468, 470, and 471 reward and compressing the compression springs 436 as the washers 438 and vacuum cups are pulled back to the guide frame 412. FIG. 25 also illustrates the underside view of the side actuators 482 for the right side bank of vacuum rods 444 and the left side bank of vacuum rods 446. The side actuators 482 may be affixed to cross beams 490 running parallel to the guide frame 12.

FIGS. 26A, 26B, 27A, 27B, 28A, 28B, 29A, and 29B are partial top and side sectional views, respectively, of the left side of the vacuum manipulator 408 in contact with the carton pile 11 at various times during carton removal operations. Only the vacuum rods with minor vacuum cups 424 are illustrated for clarity.

Figure 26A:
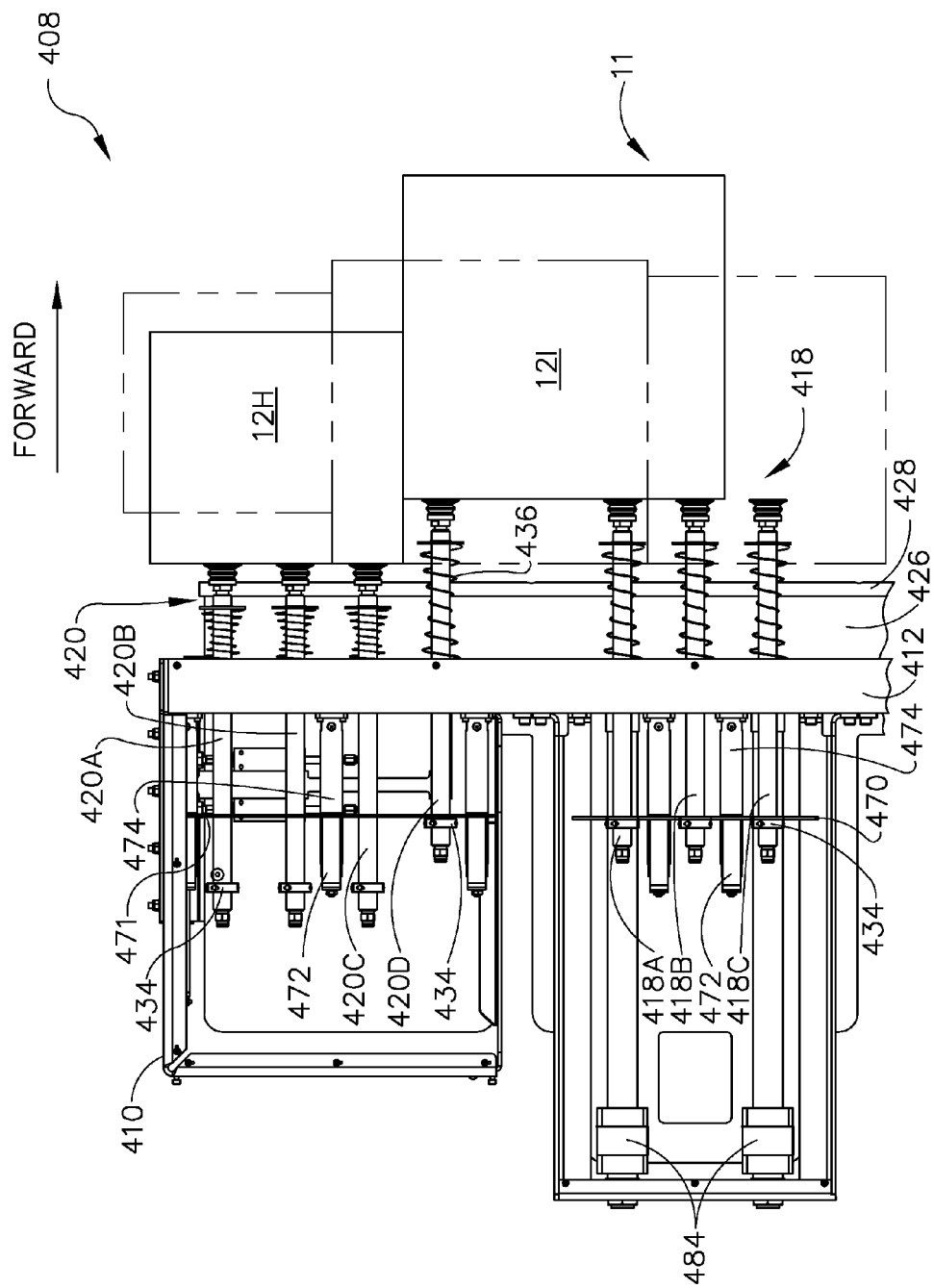
FIG. 26A is a partial top view of the left side of the vacuum manipulator of FIG. 14 in contact with a carton pile at a first time during carton removal operations.
Figure 26B:
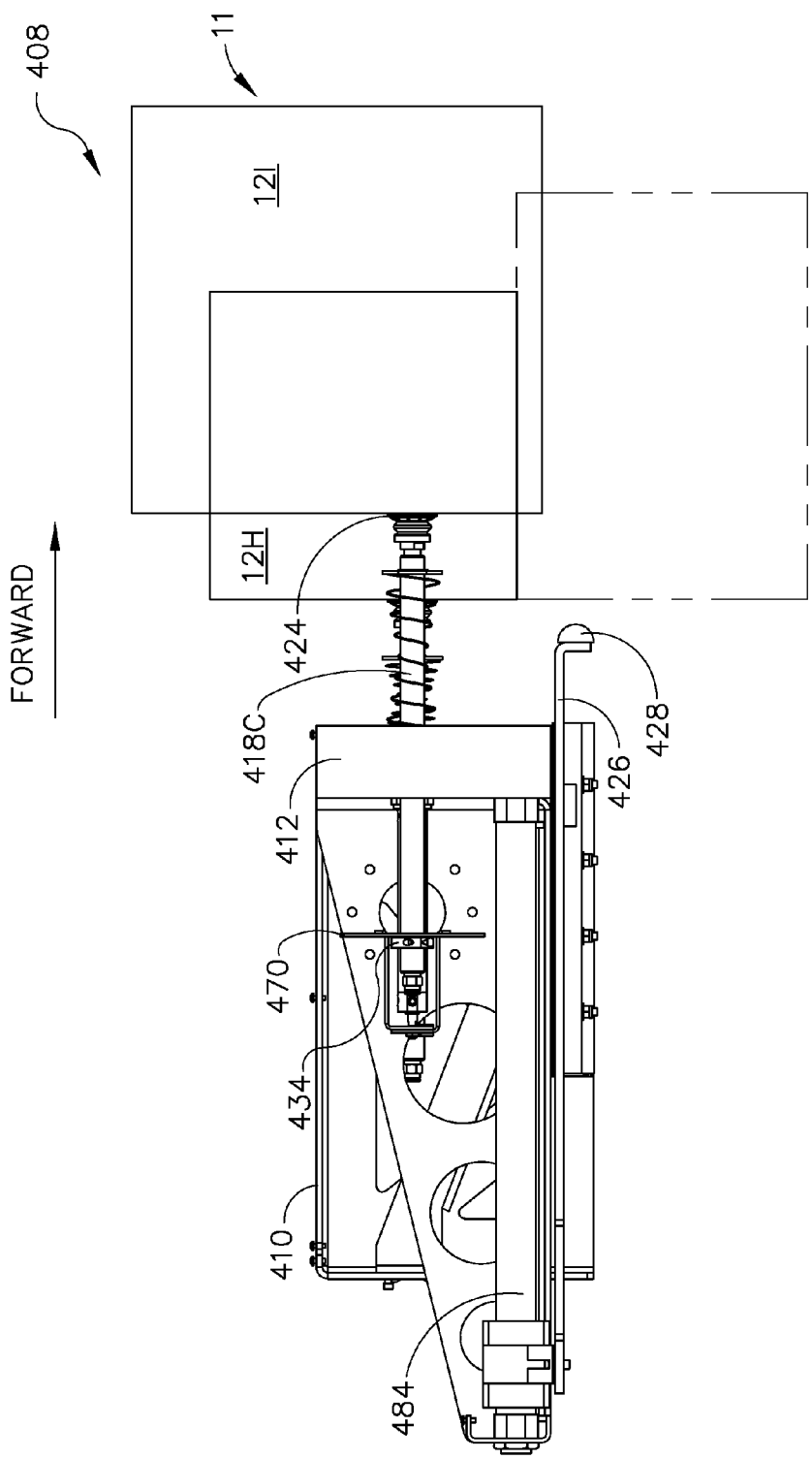
FIG. 26B is a side sectional view of the vacuum manipulator of FIG. 26A.

Initially during carton removal operations, the control and visualization system may measure the distance to the carton pile 11, such as using a sensor (e.g., a camera other type of carton sensor), and position the vacuum manipulator 408 an initial distance from the face of the carton pile 11. As illustrated in FIGS. 26A and 26B, at a first time after positioning the vacuum manipulator 408, the compressed fluid to the retraction cylinders 474 associated with the second bank of vacuum rods 418 and the third bank of vacuum rods 420 may be de-energized, thereby allowing the compression springs 436 to drive the second bank of vacuum rods 418 and third bank of vacuum rods 420 forward until the various vacuum cups contact (or engage) the cartons 12H and 12I to be removed. Carton 12H may be closer to the vacuum manipulator 408 than carton 12I, so the vacuum rods 420A, 420B, and 420C, may not extend as far as vacuum rods 420D, 418A, and 418B. Vacuum rod 418C may extend fully until its stop 434 contacts plate 470 because no carton is present in front of vacuum rod 418C to impede its extension. The sliding shelf 426 may remain retracted. As illustrated in FIG. 26A, the ability of each vacuum rod 420A, 420B, 420C, 420D, 418A, 418B, and 418C to extend and deflect independently over a range enables the conformable face of the vacuum manipulator 408 formed by the banks of vacuum rods 418 and 420 to conform to the shape of the face of the carton pile 11, thereby conforming to the irregularities of the carton pile 11. For example, when the rods 420A, 420B, 420C, 420D, 418A, 418B, and 418C are extended the full extension range initially and the vacuum manipulator 408 is driven forward into the carton pile 11, the rods 420A, 420B, and 420C contacting closer box 12H may deflect further backward than the rods 420D, 418A, and 418B contacting farther box 12I. In an embodiment, the extension range may be 9.5 inches, greater than 9.5 inches, or less than 9.5 inches. The vacuum cups may be enabled to deflect the full extension range plus their own deflection depth. A vacuum cup may be deflected the full extension range by the surface of a carton until the vacuum rod spring 436 and washer 438 contact the guide frame and still further back the deflection distance of the vacuum cup itself. For example, when the deflection depth of the vacuum cup is 1.19 inches from the edge of the vacuum cup to the forward end of the hollow guide tube 430 and the extended range is 9.5 inches, the vacuum cup may deflect a maximum distance of 10.69 inches from its max extension to max deflection. As another example, when the rods 420A, 420B, 420C, 420D, 418A, 418B, and 418C are retracted initially and the vacuum manipulator 408 is driven forward before the rods are extended, the rods 420A, 420B, and 420C contacting closer box 12H may extend a shorter distance forward than the rods 420D, 418A, and 418B contacting farther box 12I which may extend the full extension range. The ability of the vacuum rods to extend beyond the retracted state may enable cartons set back from the face of the carton pile 11 to be reached/grasped while cartons at or extending from the face of the carton pile 11 are also reached/grasped. In this manner, the vacuum manipulator 408 may conform to an uneven carton pile 11 and unload cartons at different depths in the carton pile 11 at the same time.

Figure 27A:
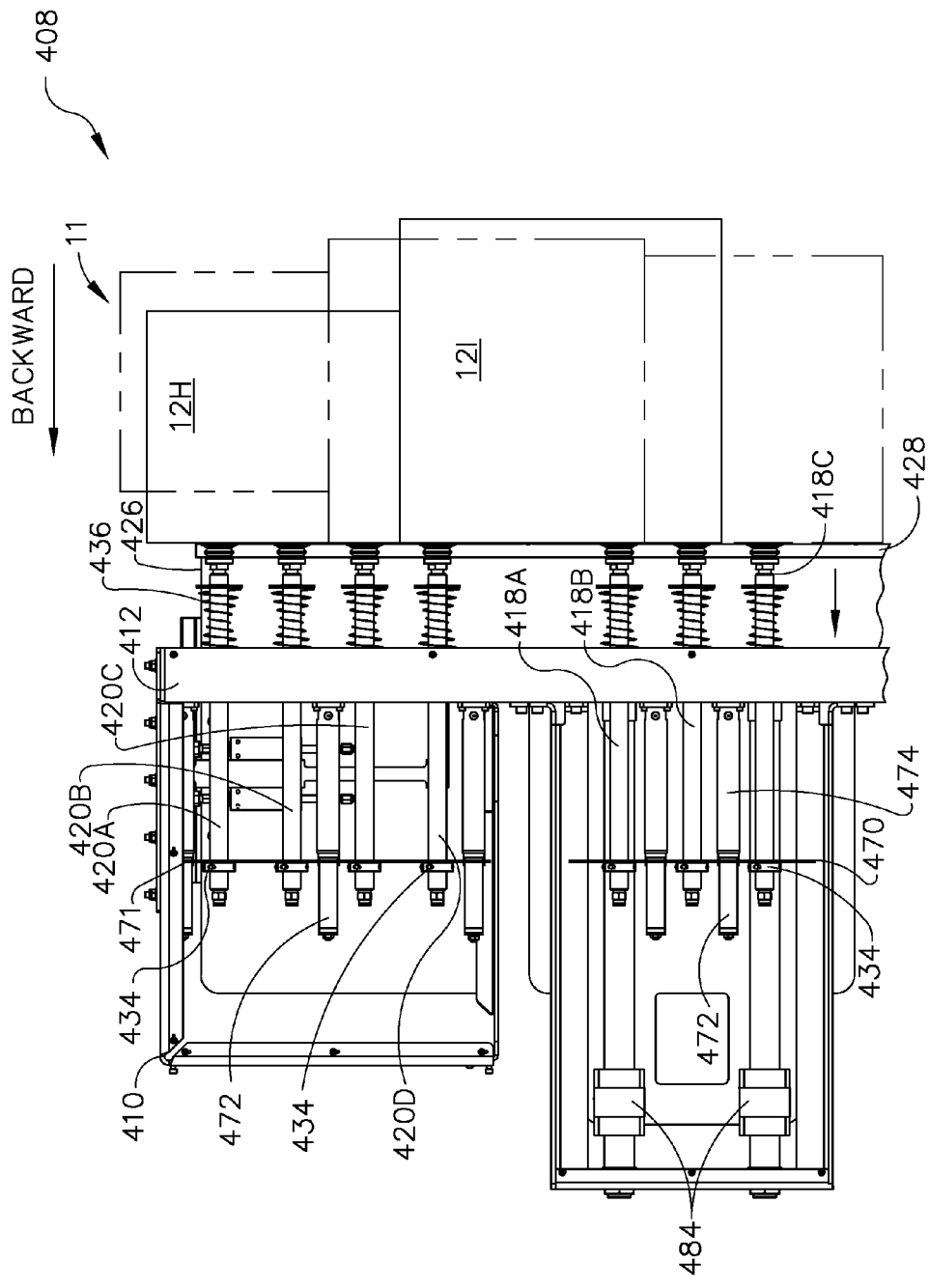
FIG. 27A is a partial top view of the left side of the vacuum manipulator of FIG. 26A in contact with the carton pile at a second time during carton removal operations.
Figure 28B:
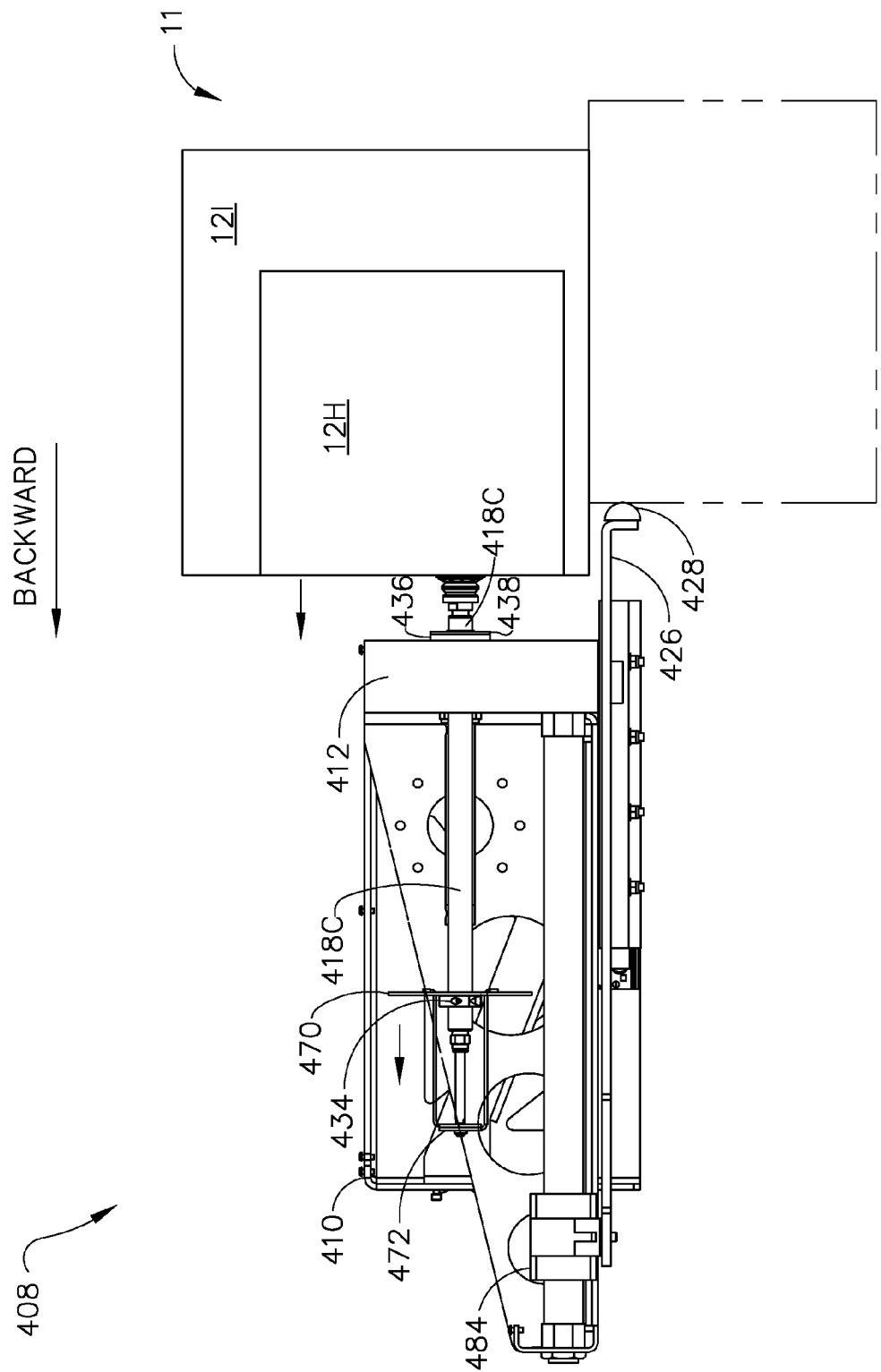
FIG. 28B is a side sectional view of the vacuum manipulator of FIG. 28A.

As illustrated in FIGS. 27A and 27B, at a second time the vacuum may be applied by the vacuum generators to the second bank of vacuum rods 418 and the third bank of vacuum rods 420 to grip the cartons 12H and 12I with the vacuum cups via suction thereby effectively attaching the vacuum rods 420A, 420B, 420C, 420D, 418A, and 418B to the cartons 12H and 12I. The compressed fluid may be energized to the retraction cylinders 474 which may drive the plates 470 and 471 backward. Vacuum rods at or near full extension, such as vacuum rods 420D, 418A, 418B, and 418C may begin retracting as the plates 470 and 471 start to move backwards because these vacuum rods' stops 432 may already be in contact with the plates 470 and 471, while vacuum rods not full extended, such as vacuum rods 420A, 420B, and 420D may remain stationary until their respective stops 432 are contacted by the plates 470 and 471 moving backward. In this manner, there may be a "dead zone" in which though a vacuum has been applied and the vacuum manipulator 408 has started to move some cartons, such as carton 12I, farther from the vacuum manipulator other closer cartons, such as carton 12H remain stationary. The sequential movement of cartons 12H and 12I based on their distance from the vacuum manipulator 408 and its resulting impact on the stops 432 being contacted by the plates 470 and 471 may align the carton line being removed. Additionally, the vacuum manipulator 408 may be raised a height 492 from its initial position by the robotic positioner 406 to lift the cartons 12H and 12I. The height 492 may be any height, for example the height 492 may be two inches. Further the sliding shelf 426 may be extended forward from the vacuum manipulator 408 to place the bumper 428 against the carton pile 11 to stabilize the carton pile 11 below the cartons 12H and 12I being dislodged (e.g., removed). As illustrated in FIGS. 28A and 28B, the plates 470 and 471 may be pushed backwards until the compression springs 436 are fully compressed. Once the compression springs 436 are fully compressed, as illustrated in FIGS. 29A and 29B, the robotic positioner 406 may be actuated to retract the vacuum manipulator 408 while the sliding shelf 426 is further extended away from the front face of the guide frame 412. In an embodiment, the sliding shelf 426 may be extended as the vacuum manipulator 408 is retracted, such that the sliding shelf 426 extends to over fifty percent of the distance to the center of gravity of the cartons 12H and 12I being removed. Once the cartons 12H and 12I are full supported by the sliding shelf 426, the sliding shelf 426 may retract and/or pivot or rotate down and the suction may be released for the vacuum cups, thereby dropping the cartons 12H and 12I onto a conveyor system.

Figure 30A:
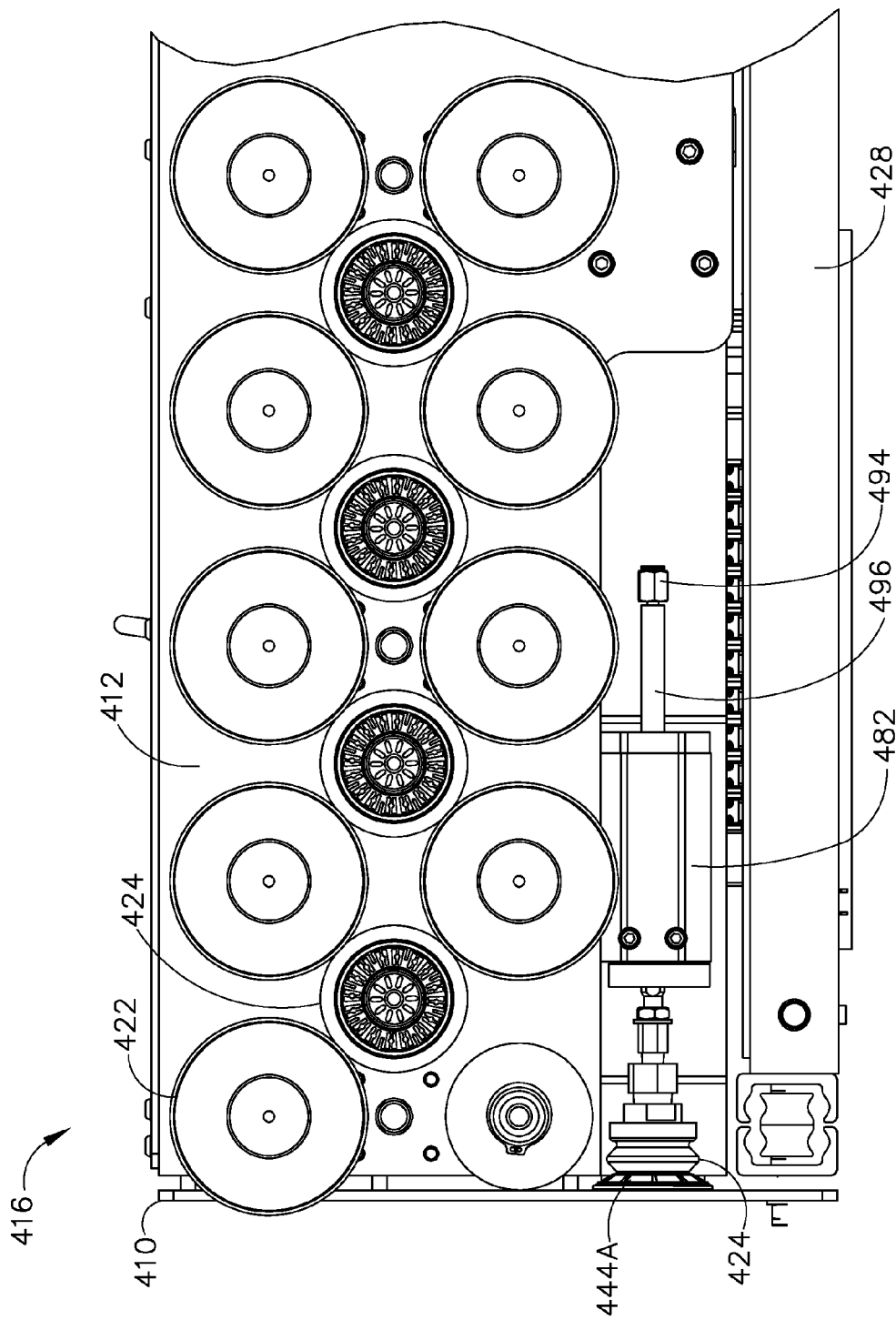
FIG. 30A is a partial front side view of the vacuum manipulator of FIG. 14 with the right side bank of vacuum rods retracted.
Figure 30B:
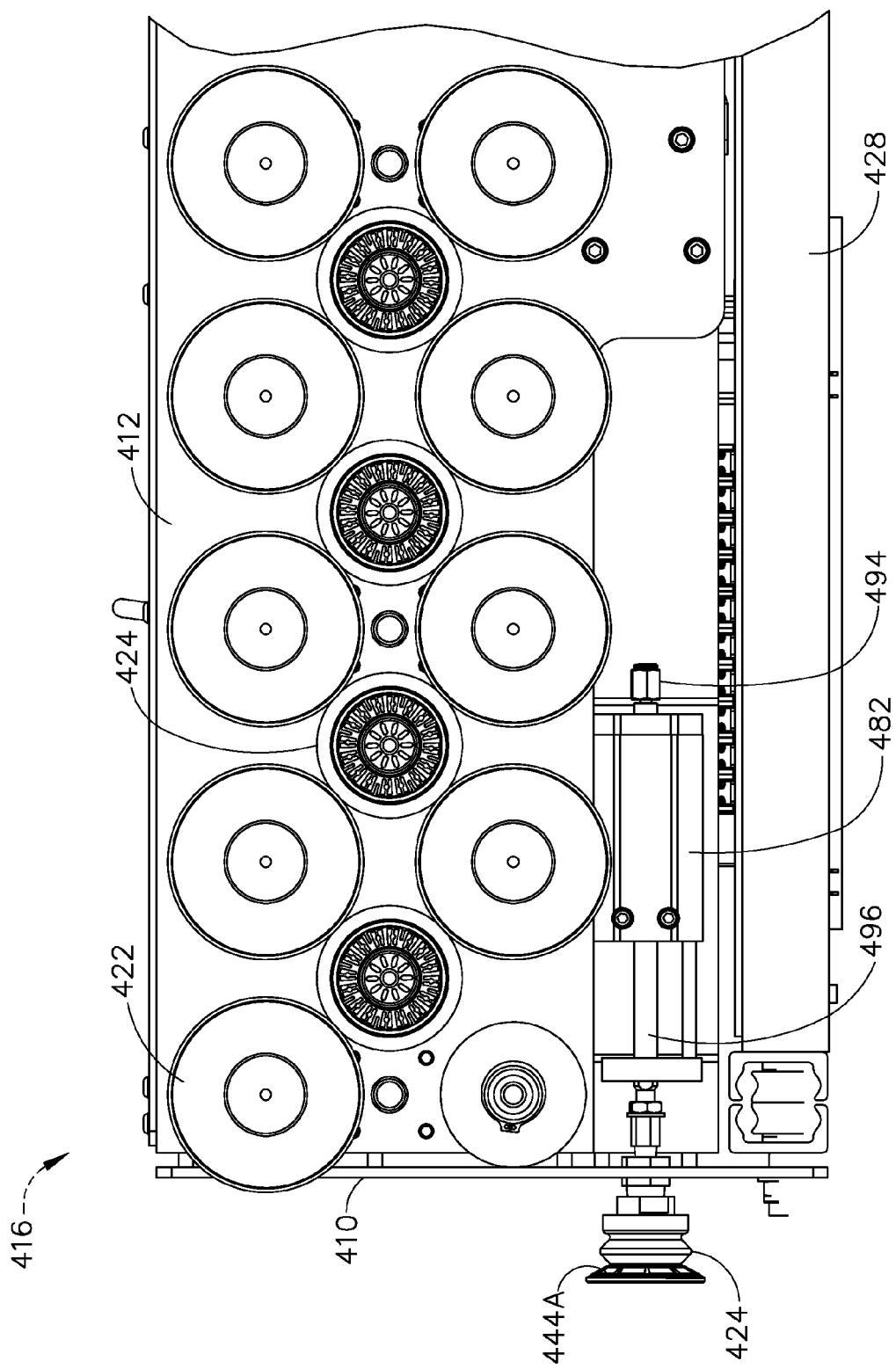
FIG. 30B is a partial front side view of the vacuum manipulator of FIG. 30A with the right side bank of vacuum rods extended.

FIG. 30A is a partial front side view of the vacuum manipulator 408 with the right side bank of vacuum rods 444 retracted. On major vacuum cup 422 of the first bank of vacuum rods 416 is removed for clarity of illustration. The right side bank of vacuum rods 444 may be extended and retracted by a side actuator 482 which may be an electric or pneumatic actuator that may drive hollow guide rode 496 to extend vacuum cups 424 into and out of the right side of the manipulator frame 410. A vacuum coupling 494 may connect the guide rod 496 to a vacuum generator via a vacuum line to draw fluid (e.g., air) through the vacuum cup 424, the guide rod 496, and the vacuum coupling 494. FIG. 30B is the same view as FIG. 30A, except that the guide rod 496 is extended pushing the vacuum cup 424 out from the manipulator frame 410. In this manner, the right side bank of vacuum rods 444 may be extended and retracted to dislodge (e.g., remove) boxes on the right side of the vacuum manipulator 408. The left side bank of vacuum rods 446 may be configured in a similar manner to extend out the left side of the manipulator frame 410.

Figure 31:
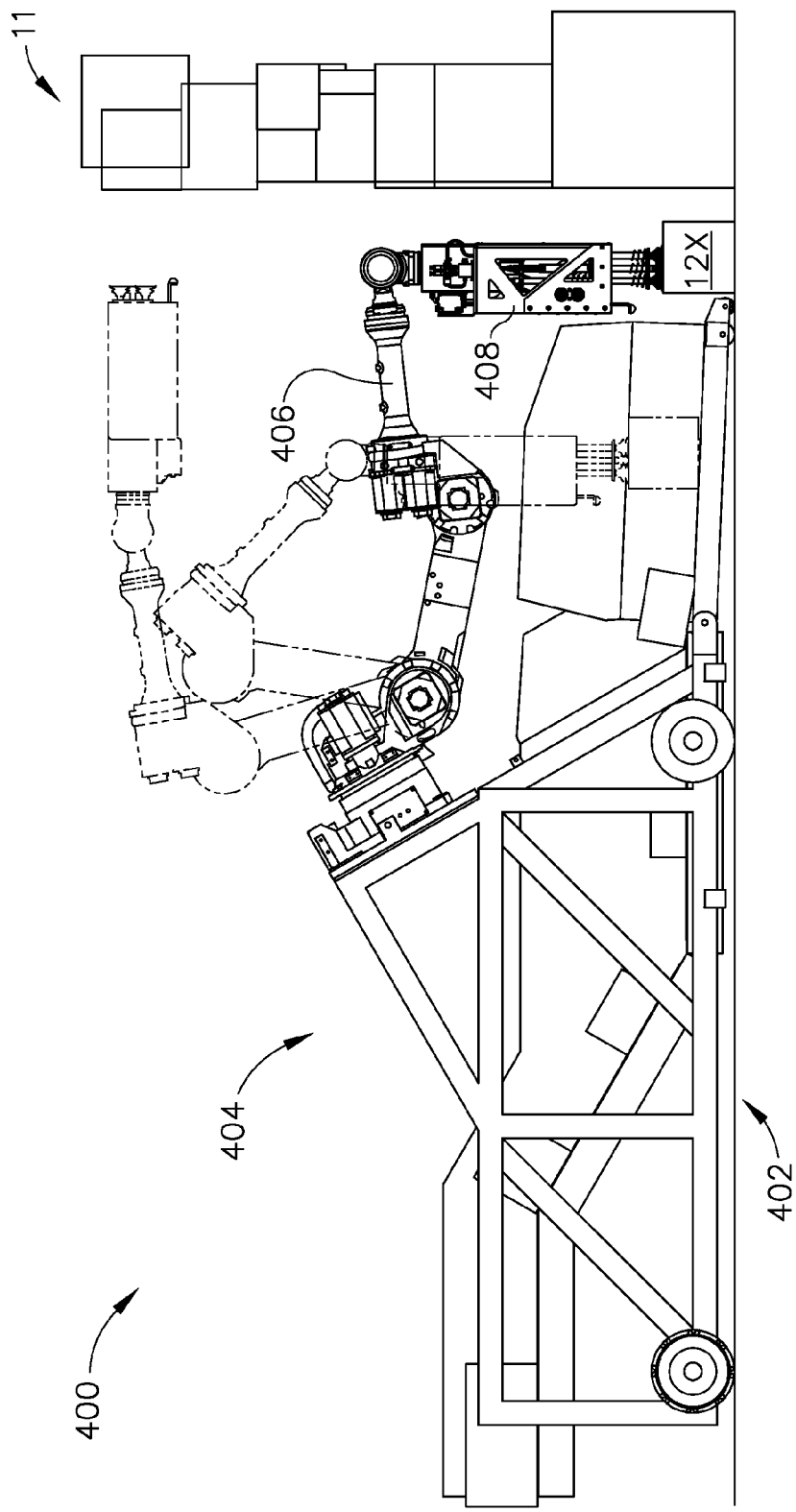
FIG. 31 is a right side sectional view of the robotic carton unloader of FIG. 14 extended to remove cartons from a floor of the truck.

FIG. 31 is a right side sectional view of the robotic carton unloader 400 extended to remove cartons from a floor of the truck or trailer. In an embodiment, the vacuum manipulator 408 may rotate down, such as 90 degrees, to face the vacuum cups toward the floor of the truck or trailer. In this manner, the vacuum cups may contact (or engage) a top of carton 12X on the floor of the truck or trailer. A vacuum may be applied by the vacuum generators to vacuum rods to grip the carton 12X with the vacuum cups via suction, and the robotic positioner 406 may be articulated to lift the vacuum manipulator 408 and carton 12X to move the carton to the conveyor system. FIG. 31 also illustrates in dotted line a first position of the vacuum manipulator 408 with the conformable face directed towards the carton pile 11, and a third position of the vacuum manipulator depositing the carton 12X on the conveyor system.

Figure 32A:
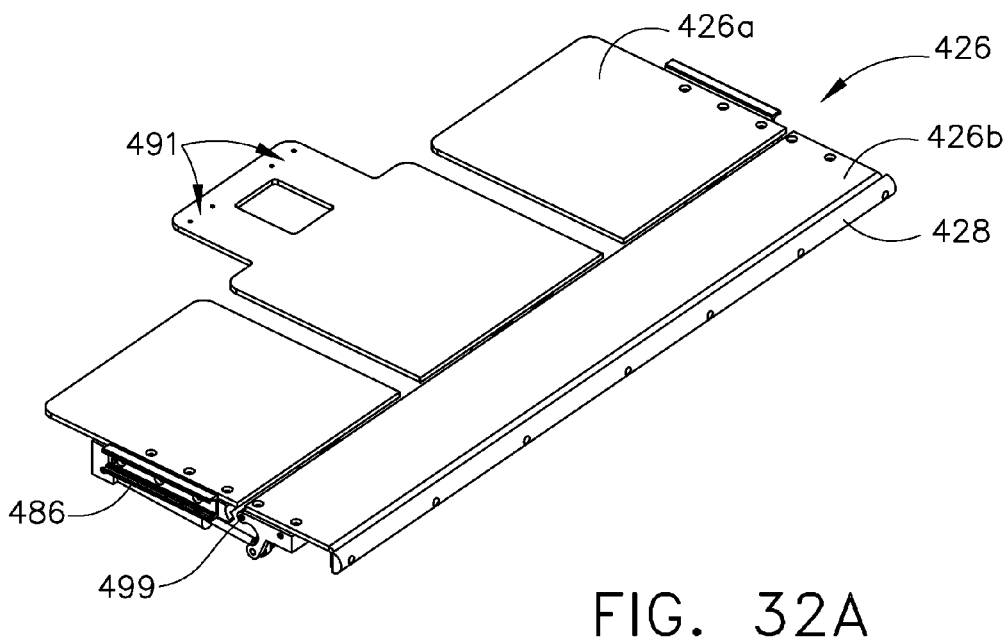
FIG. 32A is a right side isometric view of a pivoting shelf according to an embodiment.
Figure 32B:
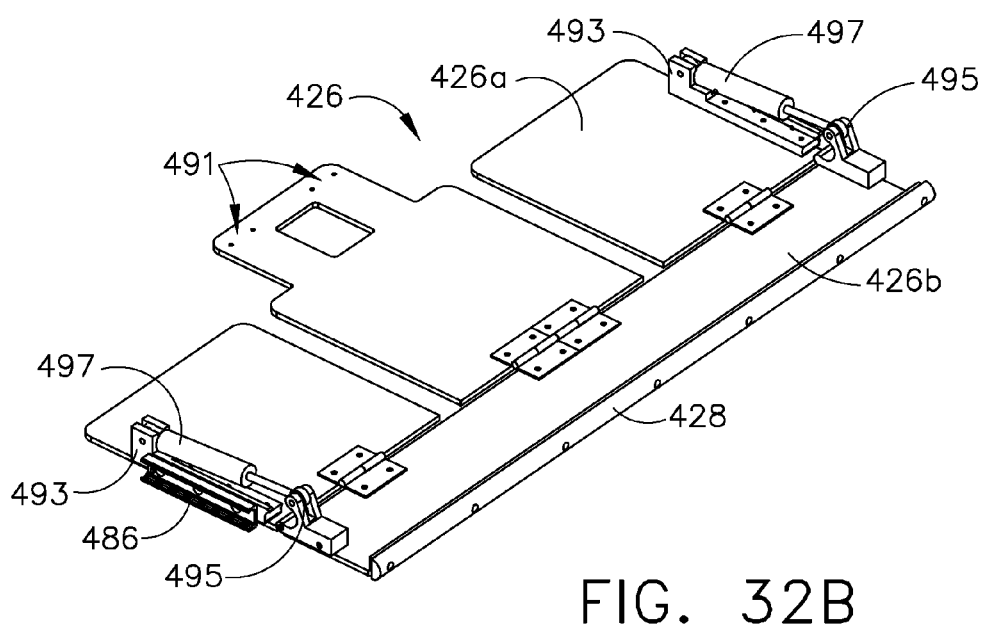
FIG. 32B is a left under-side isometric view of a pivoting shelf according to an embodiment.

In an embodiment, the sliding shelf 426 may pivot or rotate to swing down from a position parallel to the extension direction of the forward facing vacuum rods to a position perpendicular to forward facing vacuum rods. In an embodiment, the entire sliding shelf 426 may pivot or rotate. In another embodiment, a portion of the sliding shelf 426 may pivot or rotate. For example, a pivoting portion of the sliding shelf may be attached by a hinge or other type joint to a stationary portion of the sliding shelf and the pivoting portion may pivot or rotate relative to the stationary portion. FIG. 32A is a right side isometric view of a pivoting sliding shelf 426 according to an embodiment and FIG. 32B is a left under-side isometric view of the same pivoting sliding shelf 426. The pivoting sliding shelf 426 may comprise a stationary shelf 426a and pivoting shelf or tray 426b to which bumper 428 may be connected. The stationary shelf 426a may include attachment points 491 for pneumatic cylinders 484 to attach to the stationary shelf 426a to drive the pivoting sliding shelf 426 into and out of the manipulator frame 410. In an embodiment the pivoting shelf or tray 426b may be rotationally coupled to the stationary shelf 426a and/or to the rails 486, such as by one or more hinges 499. In an embodiment, pistons 497, such as a pneumatic pistons, may be coupled between brackets 493 mounted to the stationary shelf 426a and protruding arms 495 of the pivoting shelf or try 426b. The extension of the rods of the pistons 497 may raise and lower the pivoting shelf or tray 426b.

Figure 33A:
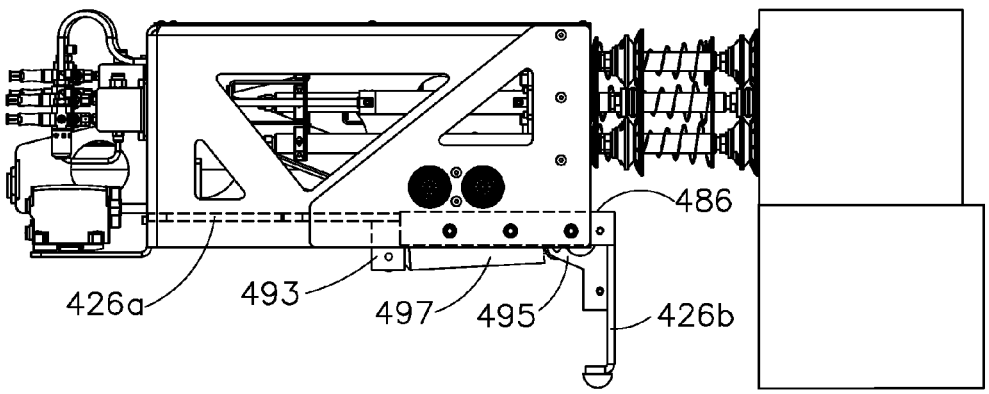
FIGS. 33A-C are right side views of a pivoting shelf transitioning from a rotated down state to a rotated up state.
Figure 33B:
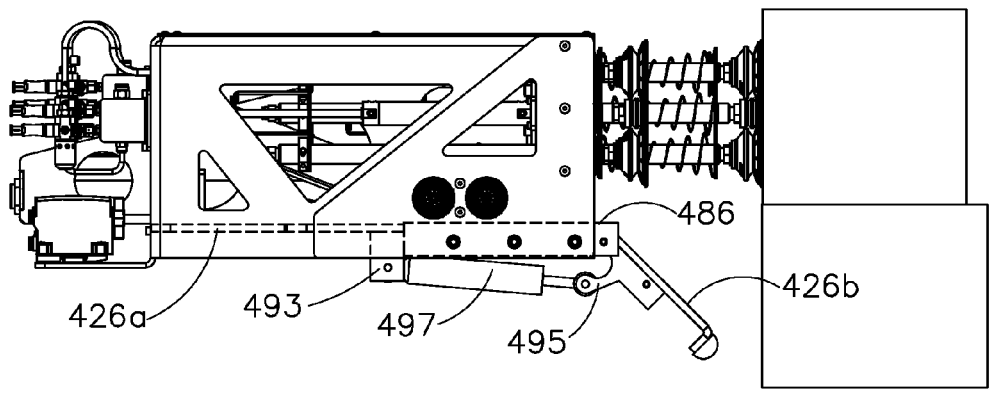
Figure 33C:
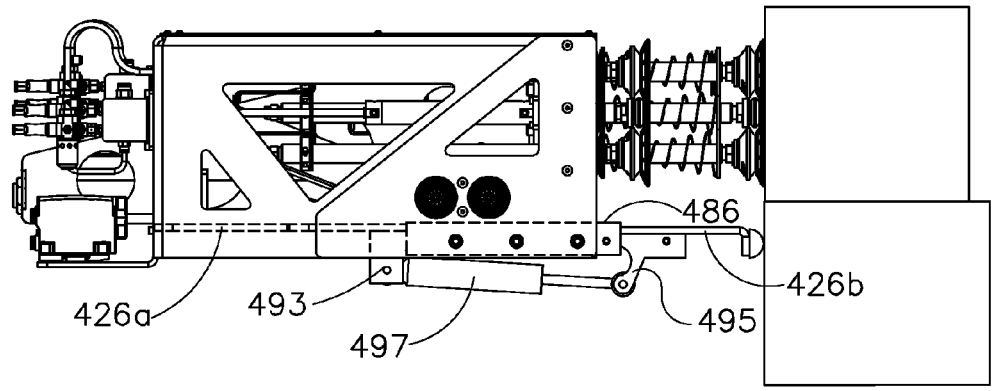

FIGS. 33A-B are right side views of a manipulator including pivoting shelf or tray 426b transitioning from a rotated down state to a rotated up state. FIG. 33A illustrates the pivoting shelf or tray 426b rotated down, perpendicular to the stationary shelf 426a. The rod of the piston 497 may be retracted pulling the pivoting shelf or tray 426b down. In an embodiment, the pivoting shelf or tray 426b may be rotated down to drop cartons onto a conveyor system and/or to enable the vacuum cups to be positioned closer to cartons of a carton pile 11. As illustrated in FIG. 33A the pivoting shelf or tray 426b may be rotated down when the manipulator is attached to the cartons of the carton pile 11. FIG. 33B illustrates the pivoting shelf or tray 426b rotated partially up through its range of motion between a rotated down state and a rotated up state. The rod of piston 497 may be partially extended/retracted driving the protruding arm 495 forward/backward, thereby raising the pivoting shelf or tray 426b up from a rotated down state or down from a rotated up state, respectively. FIG. 33C illustrates the pivoting shelf or tray 426b rotated up parallel to the stationary shelf 426a. The rod of the piston 497 may be fully extended. In an embodiment, the pivoting shelf or tray 426b may be rotated up to support cartons and/or to place the bumper against the carton pile 11 to stabilize the carton pile 11. In an embodiment, the pivoting shelf or tray 426b may be rotated up before the vacuum manipulator 408 is placed in position at the carton pile 11. In another embodiment, the pivoting shelf or tray 426b may be rotated up after the vacuum manipulator 408 is placed in position at the carton pile 11.

Figure 34:
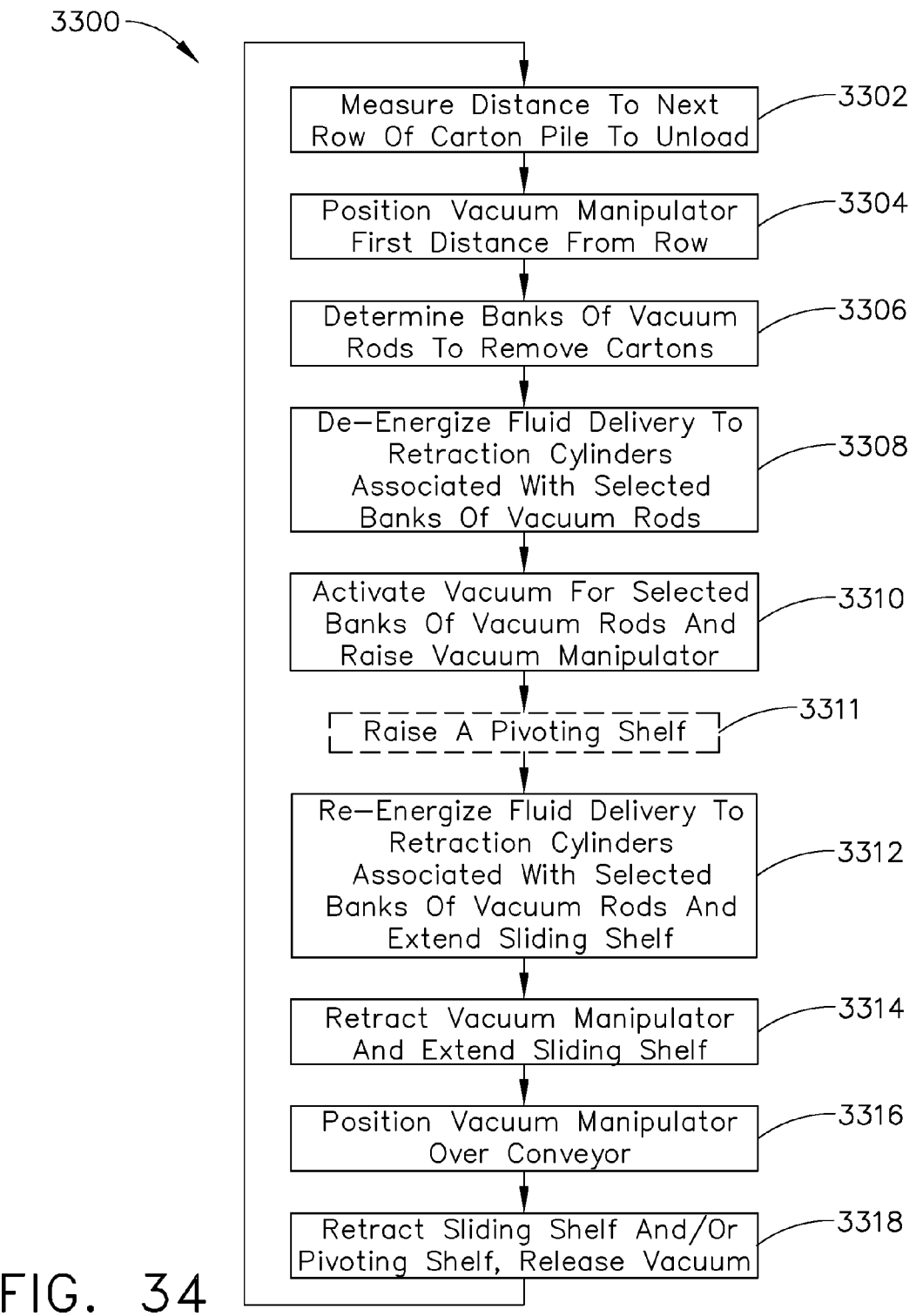
FIG. 34 is a process flow diagram illustrating an embodiment method for controlling a robotic carton unloader including a vacuum manipulator.

FIG. 34 is a process flow diagram illustrating an embodiment method 3300 for controlling a robotic carton unloader including a manipulator, such as vacuum manipulator 408 described above. In an embodiment, the operations of method 3300 may be performed by a processor of a control and visualization system connected to a conveyor system, robotic positioner, and manipulator to automatically control the conveyor system, robotic positioner, and manipulator to unload a carton pile.

In block 3302 the control and visualization system may measure a distance to the next row of a carton pile to be unloaded. For example, the control and visualization system may measure the distance using one or more sensor, such as one or more camera or other carton sensor. In block 3304 the control and visualization system may position the vacuum manipulator a first distance away from the row. For example, the distance may be a distance selected to enable the vacuum rods of the vacuum manipulator to extend to the cartons in the row. The control and visualization system may use the measured distance to the next row of the carton pile to be unloaded determine the robotic positioner and mobile body actuations necessary to position the vacuum manipulator at the first distance. In an embodiment where the vacuum manipulator includes a pivoting shelf or tray, the pivoting shelf or tray may be rotated up as the vacuum manipulator is positioned or after the vacuum manipulator is brought into position. In block 3306 the control and visualization system may determine the banks of vacuum rods needed to remove the cartons of the row. For example, the control and visualization system may determine that one bank, two banks, and/or three banks of vacuum rods may be activated. Removing cartons from each row may not require all banks to be selected for each carton removal operation.

In block 3308 the control and visualization system may de-energize the fluid delivery to the retraction cylinders associated with the selected banks of vacuum rods. De-energizing the fluid delivery to the retraction cylinders may enable the compression springs of each selected bank to drive the vacuum rods forward to contact the cartons of the row. In block 3310 the control and visualization system may activate the vacuum for the selected banks of vacuum rods to grip the cartons via suction and raise the vacuum manipulator a selected height, such as two inches. Raising the vacuum manipulator may raise the cartons reducing the surface area of cartons being moved in contact with cartons below remaining in the carton pile, thereby making dislodging the cartons easier.

In optional block 3311 the control and visualization system may raise a pivoting shelf portion. As discussed above, in an optional embodiment, a portion of the moveable shelf may pivot or rotate. For example, a pivoting portion of the sliding shelf may be attached by a hinge or other type joint to a stationary portion of the movable shelf that merely slides forward and backward, and the pivoting portion pivots or rotate relative to the sliding portion. In this manner, the moveable shelf slides and/or the moveable shelf pivots. The control and visualization system may optionally raise the pivoting shelf portion to stabilize the carton pile during unloading of the carton pile. In block 3312 the control and visualization system may re-energize the fluid delivery to the retraction cylinders associated with the selected banks of vacuum rods and extend the shelf. As discussed above, though the fluid delivery may be re-energized, all vacuum rods may not begin moving at the time of fluid delivery and/or at the same time, because an individual vacuum rod is passive and will not move until the respective plate contacts its respective stop. Thus, there may be a "dead zone" in which though a vacuum has been applied and the vacuum manipulator has started to move some cartons, other vacuum rods and/or cartons may remain still waiting for their stops to be contacted by plates. In an embodiment, the moveable shelf, or portions of the moveable shelf, slides and/or pivots, and the shelf may be extended at the same time fluid delivery is started, such as nearly the same time, or may be started at a different time. In block 3314 the control and visualization system may retract the vacuum manipulator and extend the sliding shelf. The vacuum manipulator may be retracted by the robotic positioner as the shelf is extended such that the shelf extends over fifty percent of the distance to the center of gravity of the cartons being removed.

In block 3316 the control and visualization system may position the vacuum manipulator over the conveyor system and in block 3318 the control and visualization system may retract the shelf (and optionally lower a pivoting shelf portion in embodiments in which the shelf pivots) and release the vacuum. In an embodiment where the vacuum manipulator includes a pivoting shelf or tray, the pivoting shelf or tray may be rotated down in addition to or in place of retracting the sliding shelf to drop the cartons. Whether through retracting the shelf, tipping the vacuum manipulator, and/or pivoting the shelf, the cartons may drop onto the conveyor. The method 3300 may then return to block 3300 to measure the distance to the next row of cartons to be unloaded.

The term "descrambling conveyor" may refer to any or all of the components of a conveyor system of an embodiment robotic carton unloader, such as a front-end loader. The terms "herringbone-type central descrambler" and "central descrambler" are used herein to refer to a central portion of a conveyor system (or descrambling conveyor) used by embodiment robotic carton unloaders. A herringbone-type central descrambler may be comprised of a plurality of rows of rollers angled (or skewed) toward a center line in a configuration that resembles a herringbone (or chevron-like) pattern. In various embodiments, herringbone-type central descramblers or central descramblers may be comprised of a plurality of sections (e.g., two, three, etc.) running lengthwise, such as a front section of rows of rollers and a rear section of rows of rollers, as well as a left side and a right side separated by a center line running lengthwise down the various sections. Further, the terms "manipulator head" and "end effector" and "distal end" may be interchangeably herein to refer to implements coupled to robotic arms of embodiment robotic carton unloaders and configured to pick-up, retrieve, and/or otherwise move items within an unloading area, such as a vacuum manipulator configured to pick-up cartons from a carton wall or carton pile and to place the cartons on a conveyor system of the carton unloader.

Figure 35B:
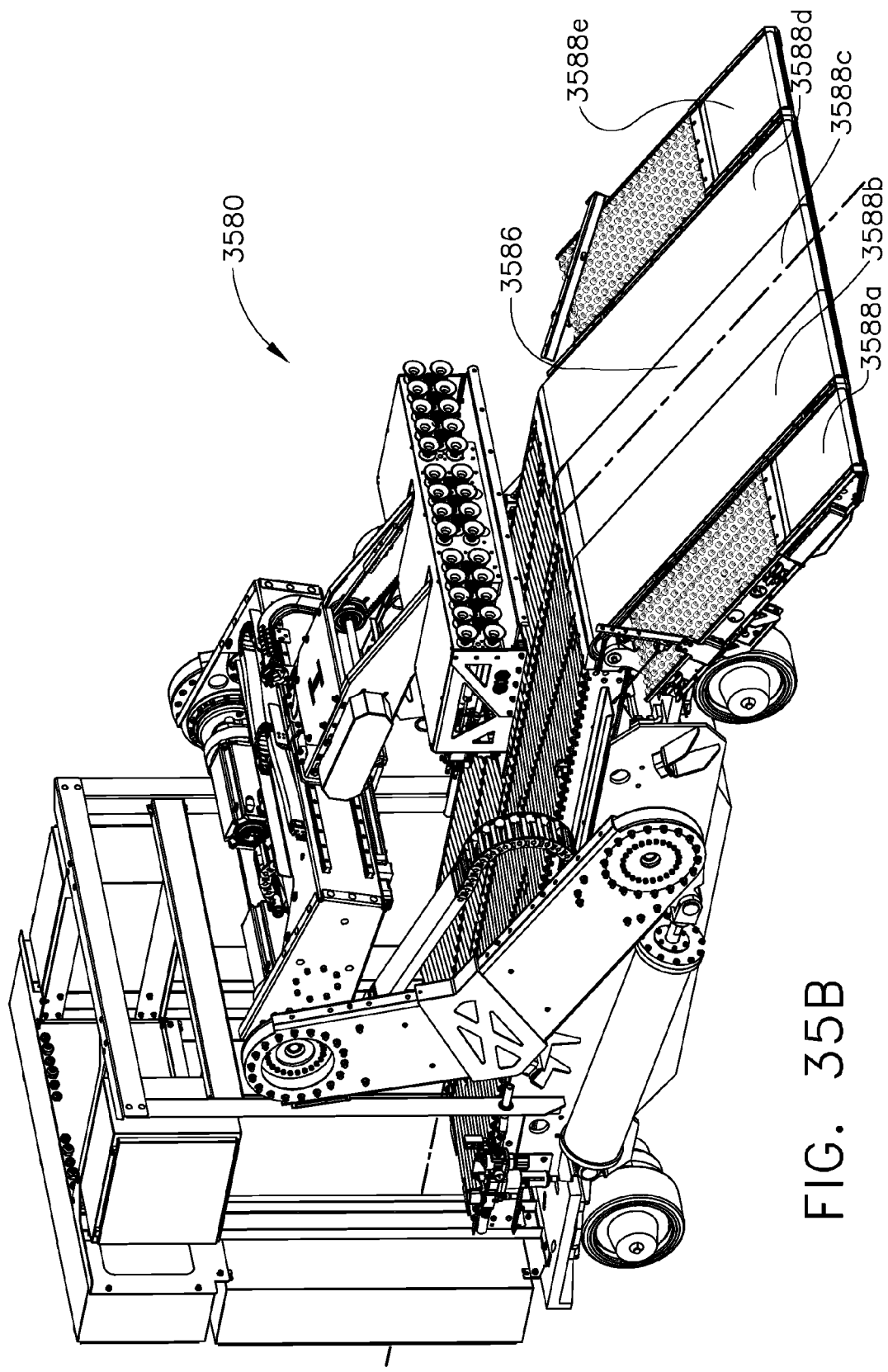

FIGS. 35A-35B illustrate embodiment robotic carton unloaders that may include robotic arms (or robotic carton retrieval arms) that may be of a straddle design and include end effectors (e.g., vacuum manipulators) for retrieving items (e.g., cartons from a carton pile), conveyor systems (e.g., a descrambling conveyor), and mobile (or vehicle) bodies. Such embodiment robotic carton unloaders may be suitable for efficient and fast unloading of items (e.g., cartons, cardboard boxes, any kind of product container for conveying products, etc.) from unloading areas, such as a truck (or semi) trailer, refrigerated areas, loading docks, etc. For example, a robotic carton unloader according to various embodiments may be configured to drive into a semi-trailer via its mobile body, to dislodge or remove cartons from a carton wall or carton pile stacked on a floor of the semi-trailer via its end effector (e.g., manipulator head) coupled to the robotic arm, and to transfer or unload the dislodged cartons from the semi-trailer and into a store, warehouse, or distribution center unloading bay via its conveyor system that travels with the mobile body and outputs the cartons to other conveyors. Such embodiment robotic carton unloaders may be capable of removing a substantial portion of a row of items (e.g., a carton row) that extends side-to-side across an unloading area (e.g., semi-trailer) with one removal action. For example, such robotic carton unloaders may be configured to remove between about 40% to about 100% of a carton row in one movement. Designed to move within space-constrained unloading areas, such embodiment robotic carton unloaders may minimize the time and effort required to efficiently unload and provide basic organization for items being moved for subsequent processing within facilities, such as distribution centers.

The embodiment robotic carton unloaders described below may include conveyor systems (e.g., descrambling conveyor) that pass through robotic arms that straddle the mobile body. By including robotic arms that are movably coupled to the outside of the chassis's of the mobile bodies, and that straddle the mobile bodies, the robotic carton unloaders may access unloading areas at full width or nearly full width of the unloading areas. These embodiment robotic carton unloaders are capable of having items (e.g., cartons, boxes, etc.) pulled from along a full width, or nearly a full width of item walls or piles within unloading areas (e.g., tractor trailers, etc.). The items may move through the straddling robotic arms, thus improving the utilization of floor space required for operating within the unloading areas. The full utilization of floor space within the unloading areas may include operations, such as bulk descrambling operations, which have previously been limited to post-unloading areas. Conventional techniques do not utilize space in such a versatile manner, and often are unable to place both robots and descramblers within unloading areas having limited access room (e.g., truck trailers, etc.). Thus, embodiment techniques are improvements over these conventional techniques that are not able to be deployed in similar conditions to remove items with the high speed and throughput. The various embodiment robotic carton unloaders may enable multiple items (e.g., cartons), such as two, three, four, five, or more items, to be unloaded at the same time, resulting in a throughput of at or above ten items (e.g., cartons) a minute, such as ten items a minute, ten to fifteen items a minute, fifteen items a minute, fifteen to seventeen items a minute, seventeen items a minute, seventeen to twenty two items a minute, seventeen to twenty four items a minute, twenty two items a minute, ten to twenty two items a minute, twenty four items a minute, ten to twenty four items a minute, ten to twenty four items or more a minute, or twenty four items or more a minute.

The various embodiment robotic carton unloaders described below comprise various descramblers that not only move items from unloading areas as conveyors, but also organize such items by singulation and descrambling (or unscrambling). In particular, central conveyors of the embodiment robotic carton unloaders (e.g., herringbone-type central descramblers) may include a plurality of zones of powered rollers that are configured to move items at different rates such that the items are moved into narrow lines. Further, embodiment conveyor systems may include front-end descramblers that also include a plurality of different belts or sets of rollers that move items at different rates, enabling descrambling of items to occur. In some embodiments, such front-end descramblers may also include optional outer rows (or wings) of rollers or belts that are capable of folding up (or down) in order to change the width of the front-end descrambler, thus allowing the robotic carton unloader to be positioned within unloading areas (e.g., trailers) of different widths. Having different descramblers on the actual robotic carton unloaders, the various embodiments described below improve over known techniques by not merely moving items, but also organizing those items before entering other phases of the unloading process, such as other phases within a warehouse such as a warehouse sorting facilities.

In some embodiments, front-end descramblers may include a center belt (or row) that is powered to move items at a first rate (or speed), two middle belts (or rows) that are powered to move items at a second rate (or speed), and two outer belts (or rows or wings) that are powered to move items at a third rate (or speed). In some embodiments, herringbone-type central descramblers may include at least two sections that both have various zones of powered rollers for descrambling items.

It should be appreciated that references to descramblers, unscramblers, descrambling, or undescrambling may regard the processing of a plurality of items (e.g., a wide group or row of items) to form a narrowed line for improved subsequent handling. Such processing may not include straightening of items.

In various embodiments, a robotic carton unloader may be capable of unloading a carton pile and may be movable across a floor (e.g., a truck trailer floor). Such a robotic carton unloader may include a mobile body, a movable robotic arm attached to the mobile body and including an end effector (or manipulator head) at an end thereof, wherein the end effector may be configured to unload a row of cartons in a side-by-side orientation from the carton pile, a descrambling conveyor (or conveyor system) mounted on the mobile body and configured to receive the row of cartons from the end effector in the side-by-side orientation (or configuration), wherein the descrambling conveyor may be further configured to simultaneously move the row of cartons towards a rear of the robotic carton unloader and to singulate the cartons while they move. In some embodiments, the descrambling conveyor may include a plurality of rows of conveyors oriented side by side. In some embodiments, at least one of the conveyors in the plurality of rows may be configured to move cartons carried thereon at a different speed than the other conveyors in the plurality of rows. In some embodiments, at least one of the conveyors in the plurality of rows may be configured to move cartons traveling thereon rearwards and towards a center line of the descrambling conveyor. In some embodiments, at least one of the conveyors in the plurality of rows may include skewed rollers. In some embodiments, the rollers of the rows of conveyors may be skewed in herringbone patterns. In some embodiments, the conveyors in the plurality of rows of conveyors may include belt conveyors. In some embodiments, the descrambling conveyor may include a front-end descrambler and a central descrambler (e.g., a herringbone-type central descrambler), wherein the front descrambler may feed cartons to the central descrambler. In some embodiments, the front-end descrambler may be pivotally mounted to the mobile body at the intersection of the front-end descrambler with the central descrambler, wherein the front-end descrambler may have a front end pivotally movable towards and away from the floor.

In some embodiments, wherein the descrambling conveyor (or conveyor system) includes a central descrambler may include a plurality of rows configured to move the items toward a rear of the conveyor system, wherein the plurality of rows are on both sides of a center line running a length of the central descrambler. In some embodiments, each of the plurality of rows may comprise a plurality of rollers. In some embodiments, each of the plurality of rollers of the plurality of rows may be angled toward the center line. In some embodiments, the plurality of rows may be associated with a plurality of zones, each zone being configured to move the items at a different speed. In some embodiments, each of the plurality of zones may be associated with a drive belt, a motor, and a variable frequency drive (VFD). In some embodiments, a first set of zones of the plurality of zones located on a first side of the center line of the central descrambler may be configured to move the items at a faster speed than a second set of zones of the plurality of zones located on a second side of the center line of the central descrambler. In some embodiments, the plurality of zones may include three zones located on a first side of the center line of the central descrambler and three zones located on a second side of the center line of the central descrambler. In some embodiments, the central descrambler may include a central conveyor and a rear conveyor. In some embodiments, the central descrambler may include two or more standard 28 inch (width)×15 foot (length) sections that are coupled end-to-end lengthwise.

In some embodiments, wherein the descrambling conveyor (or conveyor system) includes a central descrambler and a front-end descrambler, the front-end descrambler may include a plurality of parallel rows configured to move the items toward the central descrambler. In some embodiments, each in the plurality of parallel rows may include one of a light-weight plastic belt or a set of rollers. In some embodiments, each in the plurality of parallel rows may be configured to move the items toward the central descrambler at a different speed. In some embodiments, the plurality of parallel rows may include inner rows and outer-most rows. In some embodiments, the plurality of parallel rows may include three inner rows and two outer-most rows. In some embodiments, the inner rows of the plurality of parallel rows may be configured to move the items toward the central descrambler at faster speeds than the outer-most rows of the plurality of parallel rows. In some embodiments, a center row of the inner rows of the plurality of parallel rows may be configured to move the items toward the central descrambler at a fast speed, two middle rows of the inner rows of the plurality of parallel rows may be configured to move the items toward the central descrambler at a medium speed, and two outer rows of the outer-most rows of the plurality of parallel rows may be configured to move the items toward the central descrambler at a slow speed. In some embodiments, each of the outer-most rows of the plurality of parallel rows may include a section of rollers configured to move the items diagonally inward toward the inner rows of the plurality of parallel rows.

In some embodiments, the front-end descrambler may further include a plurality of guides configured to guide the items from the outer-most rows of the plurality of parallel rows inward toward the inner rows of the plurality of parallel rows. In some embodiments, each of the outer-most rows may be configured to individually rotate on an axis parallel to the inner rows. In some embodiments, the front-end descrambler may be configured to rotate on an axis parallel to a front edge of the central descrambler. In some embodiments, the front-end descrambler may be configured to rotate downwards on the axis such that a front edge of the front-end descrambler contacts a floor plane of the unloading area. In some embodiments, the front-end descrambler may be configured to rotate upwards on the axis up to a predefined angle. In some embodiments, the predefined angle is 18 degrees up from a floor plane of the unloading area. In some embodiments, the front-end descrambler may be configured to move laterally relative to the central descrambler. In some embodiments, the front-end descrambler and the herringbone descrambler may be configured to convey cartons from the carton pile through a robotic arm associated with the manipulator.

In some embodiments, a robotic carton unloader may include a mobile body movable across the floor, a conveyor (e.g., a descrambling conveyor or conveyor system) mounted on the mobile body to convey unloaded cartons thereon, and a robotic arm movably attached to the mobile body with the conveyor passing between movable portions of the robotic arm. In some embodiments, the movable robotic arm may include a distal end (or end effector or manipulator head) movable with the robotic arm and configured to unload cartons from the carton pile and onto the conveyor. In some embodiments, the movable portions of the robot arm may straddle each side of the conveyor. In some embodiments, the conveyor may extend side to side between the movable robotic arm to maximize the width thereof. In some embodiments, a first portion of the movable robotic arm may pivotally attach to the mobile body below the conveyor. In some embodiments, a portion of the robotic arm may be configured to move side to side relative to the mobile body to access the carton pile. In some embodiments, the robotic arm may further include a linear actuator to move the portion of the robotic arm side to side. In some embodiments, the robotic arm may be configured to pivot about at least one axis parallel to a front of the mobile body while moving towards and away from the carton pile. In some embodiments, when the robotic carton unloader is positioned in front of a carton pile in a truck trailer, the movable robotic arm may be configured to unload any carton from the carton wall with the end effector without moving the mobile body. In some embodiments, the robotic carton unloader may include a base secured to the mobile body and a movable arm extending from the base and movable relative thereto, wherein a counterbalance may connect between the base and the movable arm. In some embodiments, the counterbalance may be an over-the center design counterbalancing the robot arm when the arm is extending towards the carton pile and away from the carton pile. In some embodiments, the counterbalance may be a spring. In some embodiments, the counterbalance may be a gas spring. In some embodiments, the robotic arm may be configured to move between a first position, a second position aligned, and a third position such that the counterbalance is in a first resistance condition when the robotic arm is in the first position, the counterbalance is in a neutral resistance condition when the robotic arm is in the second position, and the counterbalance is in a second resistance condition when the robotic arm is in the third position.

FIG. 35A shows an embodiment robotic carton unloader 3500 for quickly and efficiently moving items (e.g., cartons, boxes, etc.) from unloading areas, such as a truck or a semitrailer, a store, a warehouse, a distribution center, an unloading bay, between product aisles, a rack, a pallet, and a freezer. In general, the robotic carton unloader 3500 may include a mobile body 3510 that rolls on wheels and that may be sized and configured to be positioned within semi-trailers (e.g., driven in and out of), a robotic arm 3530 movably coupled to the mobile body 3510 and configured for extending into and retracting out of the unloading area for pulling items (e.g., cartons, boxes, etc.), and a conveyor system 3550 that extends across the top of the mobile body 3510 from front to rear and through the robotic arm 3530, which is configured to "straddle" at least portions of the conveyor system 3550.

As described above, in various embodiments, the mobile body 3510 of the robotic carton unloader 3500 may comprise a generally rectangular chassis 3512 movably supported on a four wheel configuration with each wheel adjacent to a corner of the chassis 3512. The mobile body 3510 may be attached to the robotic arm 3530 and may include various components for controlling or otherwise moving the robotic carton unloader 3500. In particular, the mobile body 3510 may include various drive motors that may be generally located inboard from the sides of the robotic carton unloader 3500 (e.g., a left drive motor to drive a left front drive wheel 3515, a right drive motor to drive a right front drive wheel, etc.). In some embodiments, a left rear wheel 3514 and a right rear wheel may be configured to freewheel. The drive motors may drive and steer the robotic carton unloader 3500 within an unloading area (e.g., semi-trailer, etc.). Rotating the drive motors in the same direction may drive the robotic carton unloader 3500 forward or backward, rotating the drive motors in opposite directions may pivot the robotic carton unloader 3500 about a point centered between the front drive wheels, and rotating one of the drive motors without rotating the other may pivot the robotic carton unloader 3500 about the opposite, non-driven drive wheel.

The robotic carton unloader 3500 may also include a conveyor system 3550 (e.g., descrambling conveyor) capable of guiding items (e.g., cartons, boxes, etc.) onto and along conveyors (e.g., belts, sets of rollers, etc.) that extends from a front to a rear of the robotic carton unloader 3500. Similar to other embodiments described above, the conveyor system 3550 may be wide at the front to receive items (e.g., cartons), and narrow moving from front to rear. The narrowing of the conveyor system 3550 may position the unloaded items in a line for discharge. In various embodiments, the conveyor system 3550 may discharge items at a rear of the robotic carton unloader 3500 for collection by laborers or a distribution center conveyor. In some embodiments, the conveyor system 3550 may include a rear portion that may be fixed relative to the chassis 3512 that may align or otherwise be used to connect to other conveyors, belts, platforms, etc. In other embodiments, the rear portion may be at least partially movable, including being movable to compensate for or to enable any shifts in the structure of the conveying system. Various motors may be used to drive the various elements of the conveyor system 3550 (e.g., the central descrambler 3558, the front-end descrambler 3556, etc.).

The conveyor system 3550 may include a central section (or central descrambler 3558) and a front-end descrambler 3556. The central descrambler 3558 may be located on top of the mobile body 3510 and may run underneath and through the straddle-design robotic arm 3530. In other words, the straddle-design robotic arm 3530 may "straddle" the central descrambler 3558. As described in detail below, the central descrambler 3558 may have various belts or sets of rollers extending front-to-rear that may run at different speeds to singulate and unscramble items placed thereon. In particular, the central descrambler 3558 may include a plurality of rows, each comprised of a plurality of rollers and configured to move items toward a rear of the conveyor system 3550, wherein the plurality of rows are on both sides of a center line 3559 running a length of the central descrambler 3558. In some embodiments, the center line 3559 may run lengthwise from the front-end descrambler 3556 through the rest of the conveyor system 3550 (e.g., through the central descrambler 3558) to the rear of the robotic carton unloader 3500.

The front-end descrambler 3556 may be located at the front of the mobile body 3510 of the robotic carton unloader 3500. In other words, the rear of the front-end descrambler 3556 may be coupled to the front of the central descrambler 3558. The front-end descrambler 3556 may be positioned for catching items as they are dislodged from carton piles/walls by the straddle-design robotic arm 3530 and its end effector or distal end (i.e., a manipulator head 3532). The front-end descrambler 3556 may be comprised of a plurality of parallel rows of powered rollers or belts. In some embodiments, the front-end descrambler 3556 may have five parallel rows 3560a, 3560b, 3560c, 3560d, 3560e, as well as guides 3562a, 3562b for guiding items from outer rows 3560a, 3560e to inner rows 3560b-3560d. The rows 3560a-3560e may run at different speeds to singulate and unscramble items placed thereon. In other words, the front-end descrambler 3556 may act as a mini-unscrambler to organize and remove items (e.g., boxes, cartons, etc.). For example, the center row 3560c may run fastest to rapidly draw cartons out of the front-end descrambler 3556 first, the middle rows 3560b, 3560d may run slower than the center row 3560c, and the outer rows 3560a, 3560e may run slower than both the center row 3560c and the middle rows 3560b, 3560d. In some embodiments, a roller may be placed at the front of the front-end descrambler 3556 to aid in retrieval of items that are in contact with the floor.

In some embodiments, the front-end descrambler 3556 and/or the central descrambler 3558 may be capable of moving side-to-side. For example, front-end descrambler 3556 may be configured to move laterally relative to the central descrambler 3558.

In various embodiments, devices may be affixed to the chassis 3512 and connected to the front-end descrambler 3556 to lift the front-end descrambler 3556 off of a floor to various angular positions (or predefined angles). For example, via a hydraulic cylinder, the front-end descrambler 3556 may be raised a number of degrees so that its rows of belts or rollers are parallel with the central descrambler 3558. As another example, via an electric screw actuator or a pneumatic cylinder, the front-end descrambler 3556 may be raised so that it is at an 18 degree angle (e.g., 18 degrees up from a floor plane of the unloading area), angled towards the central descrambler 3558 so that any items on the front-end descrambler 3556 may roll toward the robotic carton unloader 3500 without tumbling. With respect to devices for lifting the front-end descrambler 3556, other embodiments of these devices (e.g., actuators) are not limited to electrical actuators, but can be fluidic actuators operable with compressible or incompressible fluids such as air and oil.

Further, in a similar fashion as described above with reference to the front portion 136b, during operation, the front-end descrambler 3556 may be angled to meet the changing height of item piles or walls such that when a carton pile is at a maximum, the angular position of the front-end descrambler 3556 may be at a maximum, and when the carton pile is at a minimum, the angular position of the front-end descrambler 3556 may be at a minimum. Such pivoting of the front-end descrambler 3556 may shorten the fall distance of items as they are pulled from item walls/piles by the straddle-design robotic arm 3530. In some embodiments, the front-end descrambler 3556 may be rotated (i.e., raised, lowered) via an electrical actuator such as a motor, but is not limited thereto. Embodiment conveyor systems are further described below.

The robotic carton unloader 3500 may also have a robotically-controlled carton remover system including a robotic arm 3530 and a manipulator head 3532 that extends frontwards from the mobile body 3510 to dislodge and unload items from a front and a top of a wall or items (e.g., a carton pile or wall). The robotic arm 3530 may include an arm body 3534 and is movably coupled, attached or fixed to the mobile body 3510. In some embodiments, the manipulator head 3532 may be a vacuum manipulator head pivotally attached to the ends of an upper arm of the arm body 3534 and may be angularly positioned by a motor (not shown). Various vacuum manipulators may be attached to the manipulator head 3532 to grasp, draw, and drop items (e.g., cartons) from a wall or pile. The robotic arm 3530 is further described in detail below.

In various embodiments, the robotic carton unloader 3500 may also include a control and visualization system as described above. Such a control and visualization system may include various visualization sensors (e.g., cameras, etc.), operator interfaces (e.g., joysticks, displays, keypads, etc.), and processors, and may be capable of controlling and automating the unloading process, and driving and steering the robotic carton unloader 3500 into and out of unloading areas (e.g., semi-trailers) before, during, and after the unloading process. For example, such a control and visualization system may provide timing, sequencing, homing routines, and motion control for drive motors attached to various components of the robotic carton unloader 3500, such as the front-end descrambler 3556. In some embodiments, the robotic carton unloader 3500 may be configured to communicate with an external monitor using a communications system (e.g., an operator interface or Human Machine Interface (HMI) attached to the conveyor system 3550, etc.).

In some embodiments, a control and visualization system may connect to remote locations or systems with a communication system, such as but not limited to a Wi-Fi system. For example, such a communications system may connect the robotic carton unloader 3500 to an external monitor (e.g., a remote warehouse or distribution center control room, a handheld controller, or a computer, etc.) and may provide passive remote viewing through the visualization system of the robotic carton unloader 3500. Alternately, the external monitor may override the programming inherent in the control and visualization system of the robotic carton unloader 3500 and assume active command and control of the robotic carton unloader 3500. Programming for the robotic carton unloader 3500 may also be communicated, operated and debugged through external systems such as the communications system and external monitor.

FIG. 35B illustrates an alternative embodiment front-end descrambler 3586 of a robotic carton unloader 3580. The front-end descrambler 3586 is similar to the front-end descrambler 3556 described above, except that the front-end descrambler 3586 includes belts 3588a-3588e, such as lightweight plastic belts. Similar to the rows described above, the front-end descrambler 3586 may have five parallel belts 3588a, 3588b, 3588c, 3588d, 3588e that may run at different speeds to singulate and unscramble items placed thereon. For example, the center belt 3588c may run fastest to rapidly draw items dumped thereon out of the front-end descrambler 3586 first, and the middle belts 3588b, 3588d may run slower than the center belt 3588c, and the outer belts 3588a, 3588e may run slower than both the center belt 3588c and the middle belts 3588b, 3588d. There may be a center line 3559 that runs lengthwise from the front-end descrambler 3586 through the rest of the conveyor system (e.g., through the herringbone-type central descrambler) to the rear of the robotic carton unloader 3580.

Figure 36:
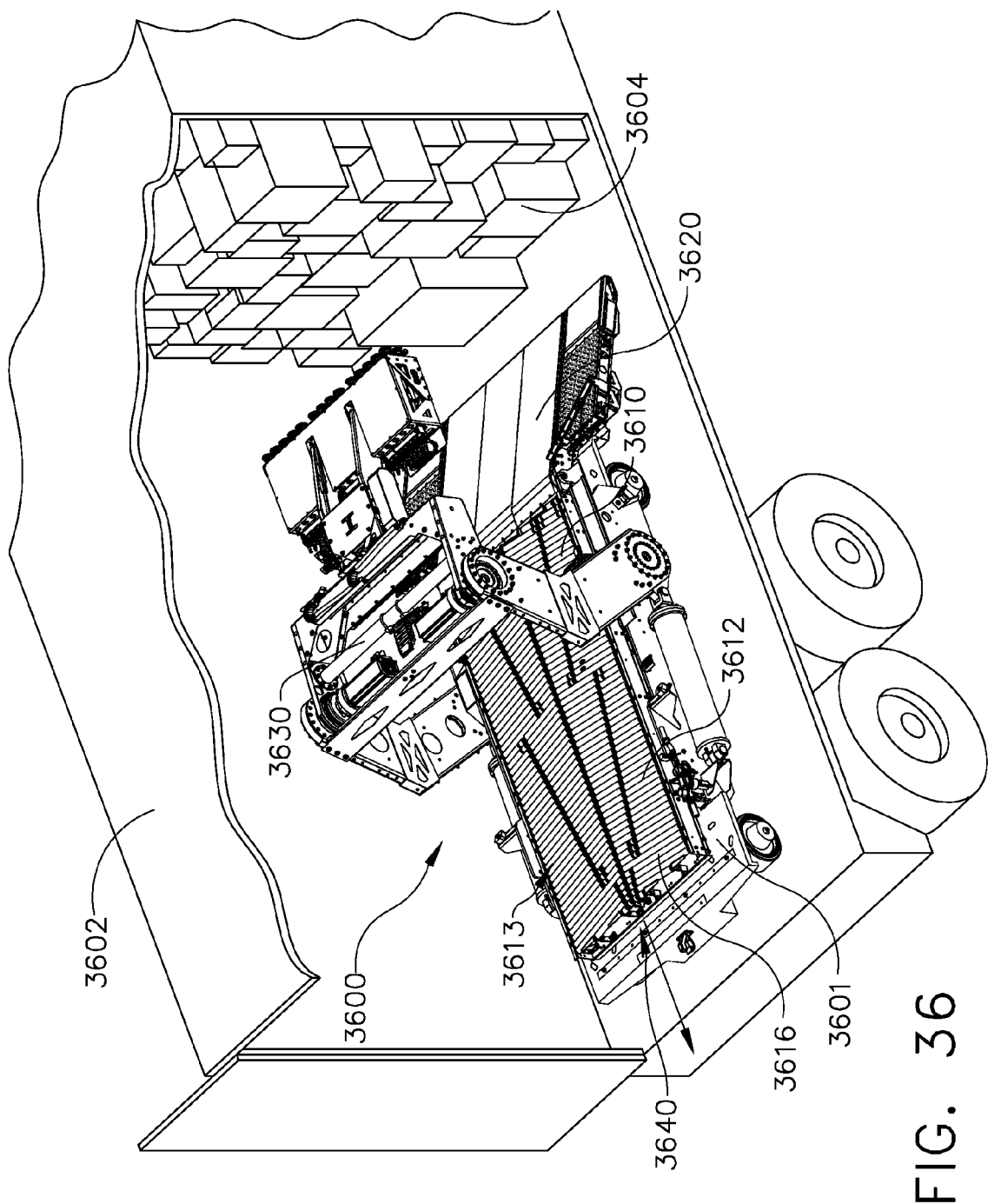
FIG. 36 is a diagram illustrating perspective view of a robotic carton unloader maneuvering within a truck to unload items, such as cartons depicted as a pile of cartons, stacked up within a front of the truck according to various embodiments.

FIG. 36 illustrates a robotic carton unloader 3600 with descramblers maneuvering within a truck 3602 to unload items (e.g., cartons) depicted as a pile of items 3604 stacked up within a front of the truck 3602. The conveyor system 3640 of the robotic carton unloader 3600 may include a front-end descrambler 3620 and a central descrambler 3613 that includes a center conveyor section 3610 and rear conveyor section 3612 that may be joined together and mounted on top of the mobile body 3601 of the robotic carton unloader 3600. The conveyor system 3640 may receive a plurality of items (e.g., cartons) placed side-by-side in a row on the front-end descrambler 3620, and may unscramble and singulate the items into a single file line of items that exit from the rear end. The single file line of items emerging from the rear end of the conveyor system 3640 may be in line with the front-to-rear direction of movement of the items along the conveyor system 3640. The direction of movement of the emerging items is shown by a directional arrow shown in FIG. 36.

The conveying surface of the conveyor system 3640 (i.e., the center conveyor section 3610 and rear conveyor section 3612) may comprise rows of conveyor rollers 3616 that define a conveying surface to move items along. The rows of conveyor rollers 3616 may be configured in a chevron pattern to singulate and unscramble items moving thereon. Whereas conveyor rollers 3616 may be used to unscramble and singulate items (e.g., cartons) placed on the conveyor system 3640 of the robotic carton unloader 3600, unscrambling and singulation on a robotic carton unloader 3600 is not limited thereto.

Figure 37A:
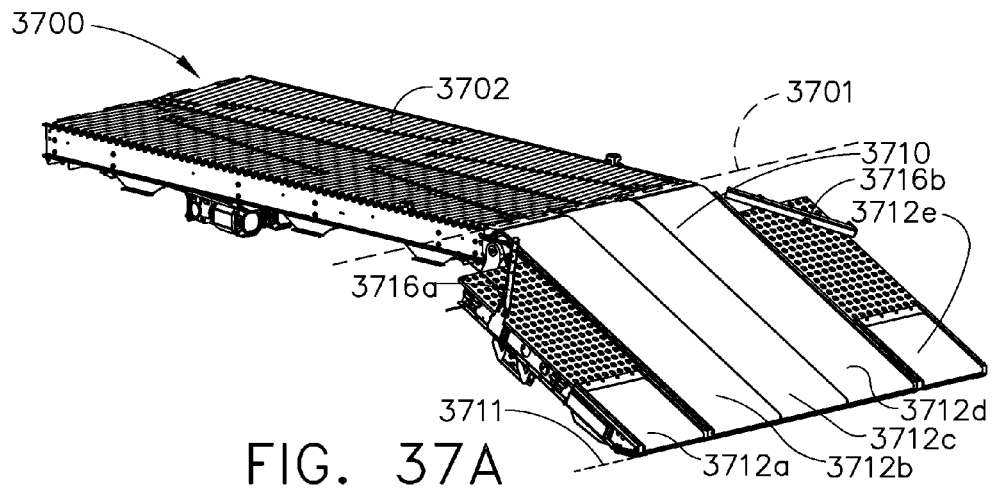
FIGS. 37A-37C are diagrams illustrating perspective views of a conveyor system including descramblers, a mobile body, and a robotic arm of a robotic carton unloader according to various embodiments.
Figure 37B:
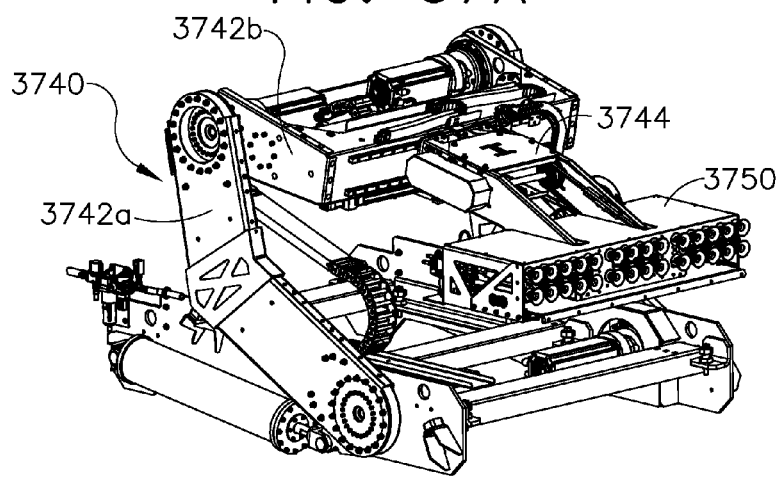
Figure 37C:
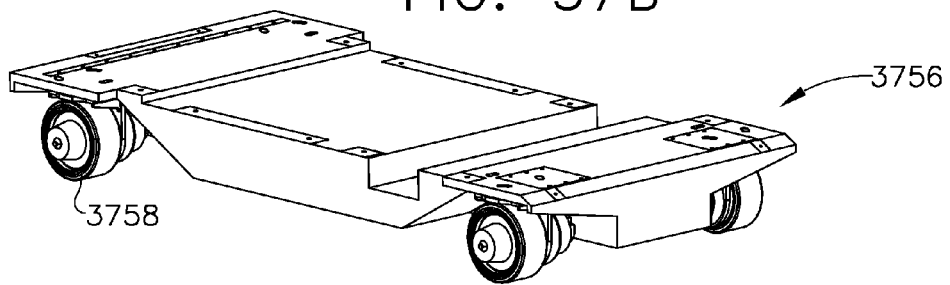

FIGS. 37A-37C illustrate individual embodiment components of a robotic carton unloader, including a mobile body 3756, a straddle-design robotic arm 3740 that mounts onto the top of the mobile body 3756, and a conveyor system 3700 with descramblers that mounts onto the mobile body 3756 and passes through the robotic arm 3740.

FIG. 37A illustrates the embodiment conveyor system 3700 comprised of at least a central descrambler 3702 and a front-end descrambler 3710. The conveyor system 3700 may extend from the front to the rear of a robotic carton unloader. The conveyor system 3700 may receive, singulate, and move items (e.g., boxes, cartons, etc.) into a line as the items move from the front to the rear along the conveyor system 3700. Various motors (not shown) may drive conveyors or belts of the conveyor system 3700.

As described above, the front-end descrambler 3710 may comprise a plurality of parallel rows or belts, such as five parallel belts 3712a-3712e that may run at the same speed or at different speeds to unscramble and singulate items placed thereon. Such rows or belts 3712a-3712e may move items to enter onto the central descrambler 3702. Further, the front-end descrambler 3710 may be configured to rotate (or pivot) about an axis that is parallel with a front edge 3701 of the central descrambler 3702. For example, the front-end descrambler 3710 may be configured to rotate downwards on the axis such that a front edge 3711 of the front-end descrambler 3710 contacts a floor plane of the unloading area (e.g., the floor of a truck trailer, etc.). As another example, the front-end descrambler 3710 may be configured to rotate upwards on the axis up to a predefined angle, such as 18 degrees up from a floor plane of the unloading area.

In some embodiments, the central descrambler 3702 and/or the front-end descrambler 3710 may be configured to singulate or to merge items being carried thereon away from their respective sides and into their respective centers. In some embodiments, the central descrambler 3702 may use an active or powered roller belt(s), or any equivalent thereof, such as that described in U.S. Pat. No. 7,344,018 which is incorporated herein by reference in its entirety. Such an active roller belt(s) may include belt rollers imbedded within that are angled to bias an item traveling thereon in a desired direction such as towards a side or center of the belt.

In some embodiments, the central descrambler 3702 may be comprised of two or more standard 28 inch (width)×15 foot (length) sections (or "mini-scramblers") that are placed and coupled end-to-end lengthwise.

In some embodiments, the bias can merge items traveling thereon away from the walls of the central descrambler 3702 and/or the front-end descrambler 3710 and towards their centers by having rollers adjacent to each wall and angled in different directions that bias an item towards a center line of the various belts or rows. One conveyor having these features is the ARB™ Merge 4000 manufactured and sold by Intralox, L.L.C. of Harahan, La., USA. In some embodiments, a plurality of guides 3716a, 3716b may extend along the sides of the front-end descrambler 3710. Guides 3716a, 3716b may be angled as shown to guide items along the conveyor system 3700.

FIG. 37B illustrates an embodiment robotic arm 3740 (also referred to as a robotic carton retrieval arm). The robotic arm 3740 may be movably mounted on top of a mobile body, such as the mobile body 3756 described below. To lower the center of gravity, portions of the robotic arm 3740 may straddle the sides of such a mobile body (i.e., the robotic arm 3740 may have a "straddle" design). This design may be beneficial for reducing the space required for the robotic carton unloader to use within an unloading area, as the conveyor system 3700 described above may be capable of running over and thus occupying the same space as a mobile body. In other words, with the straddle design which places the arms generally at or near the outermost extent of the robotic carton unloading system width dimension, the placement of the robotic arm 3740 permits conveyors (and thus items, such as cartons/boxes) to run generally below and through the robotic arm 3740, which may not consume useful unloading space.

The robotic arm 3740 may include a pair of pivoting arms 3742a, 3742b and a laterally moving arm 3744 to move and position the manipulator head 3750 (e.g., a vacuum manipulator head or end effector or distal end). The pivoting arms 3742a, 3742b may move the manipulator head 3750 towards and away from as well as up and down from items, such as items within a wall or pile of items (e.g., a carton pile within a truck trailer, etc.). The laterally moving arm 3744 may move the manipulator head 3750 from side to side relative to the width of the loading area, such as from a left side of a carton pile to the right side of the pile. In some embodiments, the manipulator head 3750 may also be independently pivotable up and down about a lateral axis. For example, the manipulator head 3750 may be pivoted from a position facing a carton pile to a position facing the floor of a truck trailer in which the carton pile and the robotic carton unloader is located. These movements may enable the manipulator head 3750 to engage all items within piles or walls of items, from floor to ceiling and from side to side, and within different sized unloading areas (e.g., trailers of different widths and/or heights). When the manipulator head 3750 is pivoted to face the floor, items within an unloading area may be picked up by their top by the robotic arm 3740. This feature is especially beneficial when retrieving items (e.g., cartons) that rest on the floor of a trailer and/or that are only accessible from their tops. Movement of the moving portions of the robotic arm 3740 may be through electric gear motors or electric linear motors, but is not limited thereto. While the arms are shown as being formed as "U" channels, tubing can also be used.

Figure 37D:
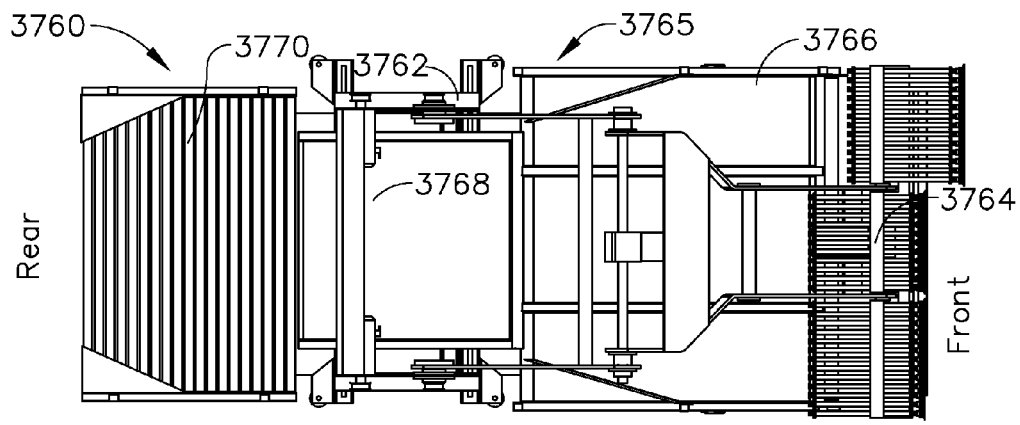
FIGS. 37D-37F are diagrams illustrating top views of an embodiment robotic carton unloader configured with a robotic arm and a conveyor system capable of translating laterally.
Figure 37E:
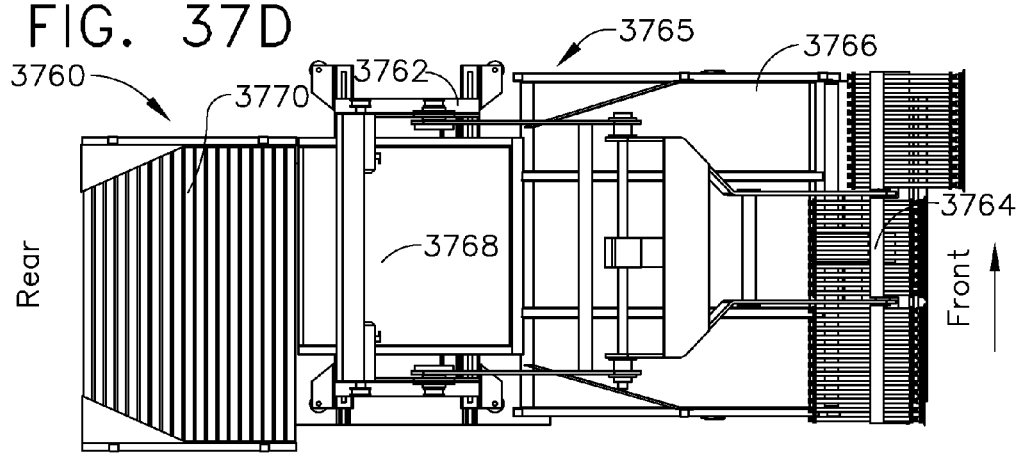
Figure 37F:
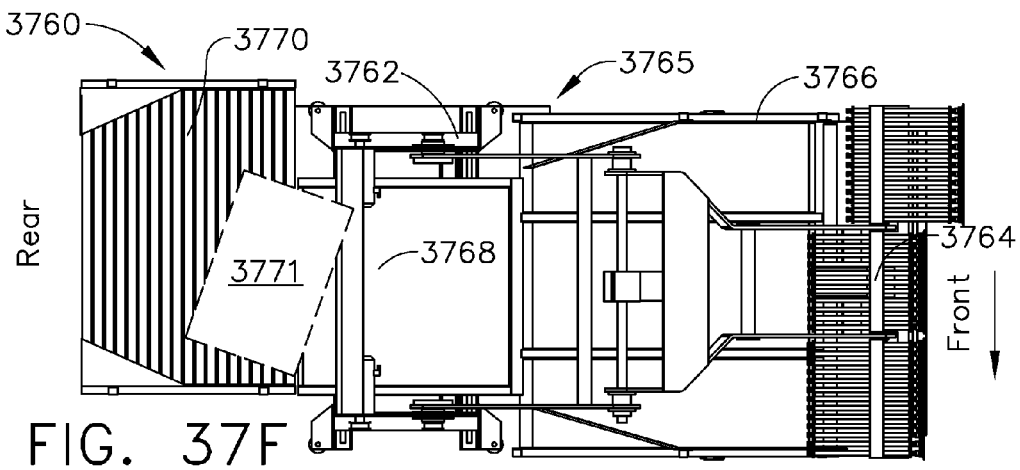
Figure 37G:
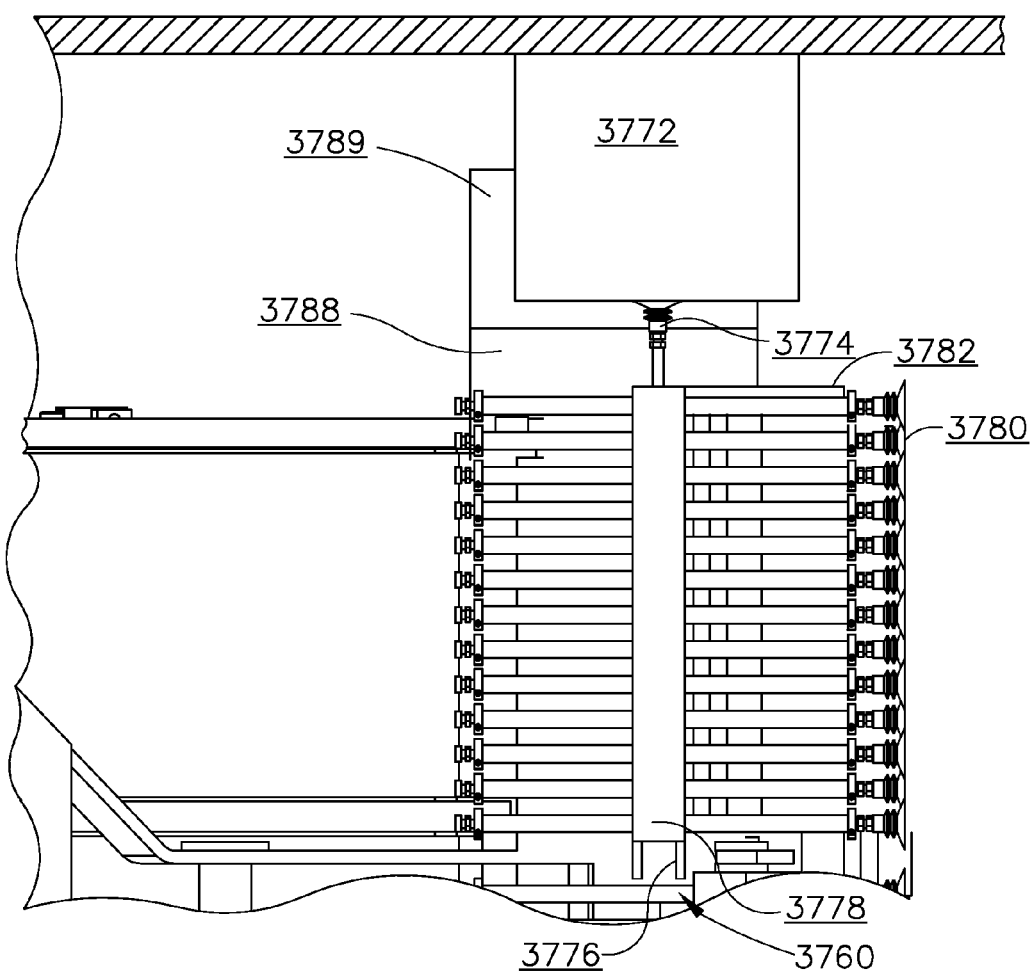
FIG. 37G is a diagram illustrating a partial view of the top view of the robotic carton unloader accessing a side item with a side manipulator (e.g., a cup) of a manipulator head (e.g., a vacuum manipulator head) of a robotic arm configured to move laterally.

FIG. 37C illustrates the embodiment mobile body 3756 that may be a separate stand-alone vehicle configured to receive and to integrate with other components of the robotic carton unloader, or in alternate embodiments, may be constructed as an integral part of a robotic carton unloader. As shown, the mobile body 3756 may be notched or include recesses to clear portions of the robotic arm 3740 as described above. Wheels 3758 may be located adjacent to each corner of the mobile body 3756 and each may be powered independently to provide movement and steering. Internally, the mobile body 3756 may include an internal structural frame, wheel drive motors, a vehicle controller, and an energy source, such as batteries or gas generator (e.g., liquid propane (LP) gas generator) to power the robotic carton unloader and optionally power pressurized fluid and vacuum sources. The robotic carton unloader and a mobile body 3756 may also be powered by connecting or tethering the robotic carton unloader to electrical sources found within a warehouse, store or distribution center. Additionally, the robotic carton unloader may connect to other external sources for pressurized fluid and vacuum. FIGS. 37D-37F illustrate an embodiment robotic carton unloader 3760 including of a mobile body, a robotic arm 3762 with a manipulator head 3764 and a conveyor system 3765 including a front-end section 3766 (e.g., a front-end descrambler, a "nose" conveyor, etc.) and a central section 3768 (e.g., a herringbone-type central descrambler), and a rear conveyor 3770. The robotic arm 3762 and conveyor system 3765 (e.g., the front-end descrambler and herringbone-type central descrambler) may be configured to move (i.e., translate or slide) laterally (i.e., side-to-side). Such an embodiment robotic carton unloader 3760 may be beneficial in enabling better retrieval, singulating, and descrambling of items from walls or piles due to the side-to-side movements of both the robotic arm 3762 and conveyor system 3765. In particular, the robotic carton unloader 3760 may be able to remove an item (e.g., carton) to the side of the robotic carton unloader 3760 once inside an unloading area. For example, such an item may be a box or carton located to the side of a trailer. To maneuver the manipulator head 3764 of the robotic arm 3762 (e.g., a vacuum manipulator head) sideways to gain clearance to pass around items, the front-end section 3766 and the central section 3768 of the conveyor system 3765 may be moved laterally. The robotic arm 3762 may also be moved laterally relative to the front-end section 3766 and central section 3768 to provide clearance for the manipulator head 3764. Manipulators of the manipulator head 3764 may be movable laterally on rails in order to move laterally to place side interactive elements (e.g., vacuum cups) of the manipulator head 3764 into contact with items to the side of the robotic carton unloader 3760. Once the item is picked up, the front-end section 3766 and central section 3768 may be moved laterally along with the manipulators of the manipulator head 3764 to position the picked-up item over the front-end section 3766 for release. In some embodiments, the item (shown in FIG. 37F as box 3771) may be at an angle as it goes from the central section 3768 to the rear conveyor 3770 when the conveyor system 3765 and robotic arm 3762 have been translated from their center position. In some embodiments, the robotic arm 3762 and conveyor system 3765 may be configured to move along a linear slide mounted to the front of the mobile body of the robotic carton unloader 3760. In some embodiment, a vertical hinge plate may mount onto the front of the linear slide, and the front-end section 3766 may hinge off of the vertical hinge plate. Further, an actuator may be attached to the vertical hinge plate and the front-end section 3766 to raise the front-end section 3766. In some embodiments, the robotic carton unloader 3760 may include a "nose conveyor lift cylinder" mounted in front of the front wheels of the mobile body capable of lifting the front-end section 3766. In various embodiments, cameras or other sensors (e.g., distance sensors) may be utilized to provide visualization and guide the robotic carton unloader into an unloading area (e.g., a semi-trailer). For example, such distance sensors may act like "curb feelers" that use contact to measure distance from the walls of the unloading area to the robotic carton unloader 3760. Alternately, distance sensors may use light, sound, or other methods to sense distance. FIG. 37D illustrates the embodiment robotic carton unloader 3760 with the robotic arm 3762 and conveyor system 3765 in a centered (or non-translated) position. FIG. 37E illustrates the embodiment robotic carton unloader 3760 with the robotic arm 3762 and conveyor system 3765 in a translated position such that the robotic arm 3762 and conveyor system 3765 are moved laterally to the right. FIG. 37F illustrates the embodiment robotic carton unloader 3760 with the robotic arm 3762 and conveyor system 3765 in a translated position such that the robotic arm 3762 and conveyor system 3765 are moved laterally to the left. FIG. 37G illustrates the robotic carton unloader 3760 accessing a side item 3772 (e.g., a carton) with a side manipulator cup 3774 (e.g., a vacuum cup) of a manipulator 3778 of the manipulator head 3764 (e.g., a vacuum manipulator head) of the robotic arm 3762 configured to move laterally as described above with reference to FIGS. 37D-F. The manipulator 3778 may be positioned perpendicular to other manipulator guide rods 3782 having other manipulator cups 3780. The item 3772 may be picked up by the side manipulator cup 3774 when the manipulator 3778 (e.g., outer vacuum manipulator) is moved laterally on rails 3776 and to place the side manipulator cup 3774 into contact with the item 3772. For example, when vacuum is applied to the side manipulator cup 3774, the item 3772 may be picked up. A tray 3788 may also slide sideways for support, such as with a placement shown by the line 3789.

Figure 38:
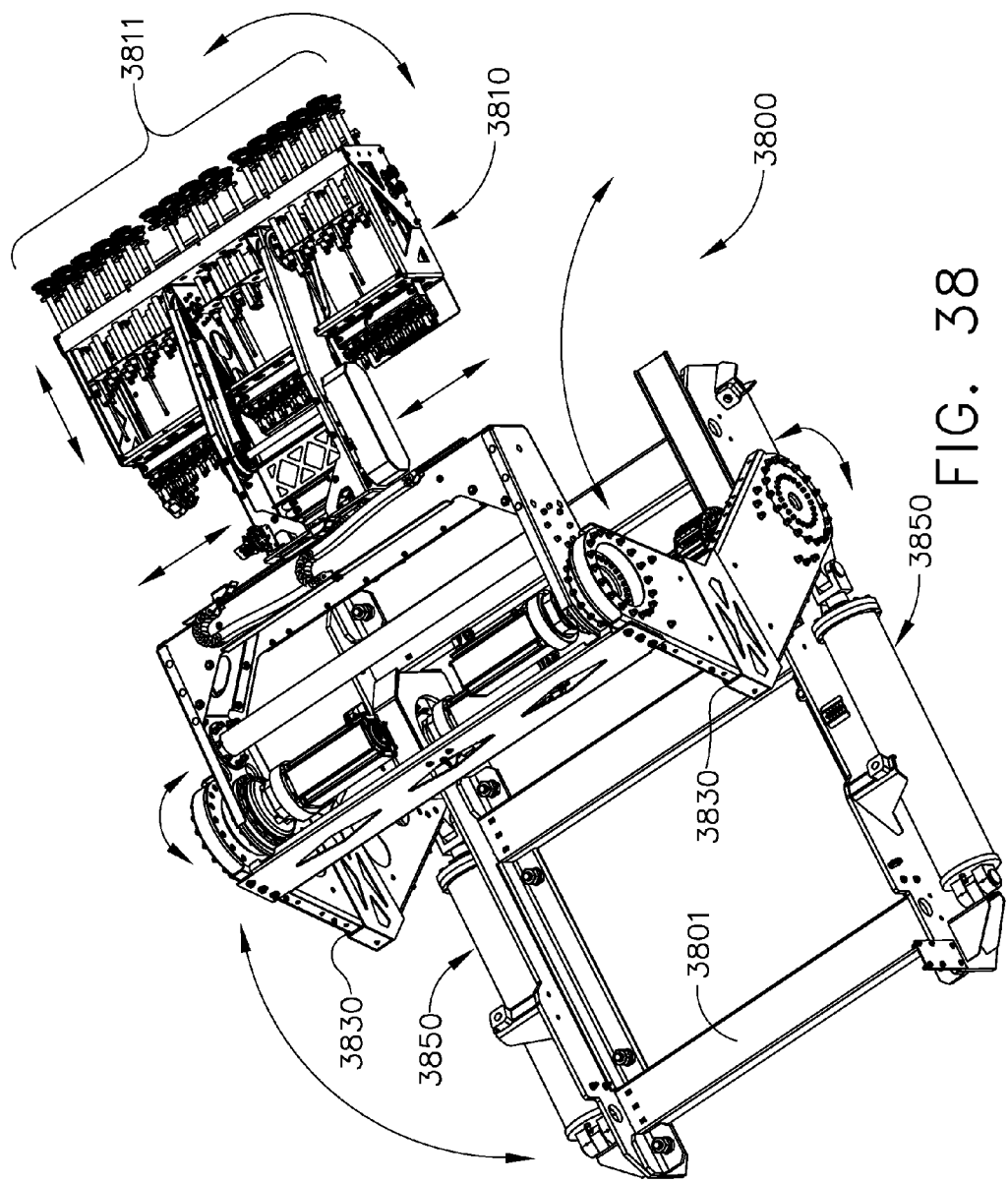
FIG. 38 is a perspective diagram illustrating a robotic arm, head unit and counterbalancing unit in the various embodiments.

FIG. 38 illustrates an embodiment robotic carton loading system 3800 and shows a perspective view of components of a robotic arm such as a carton retrieval arm 3830, including a supporting frame or base 3801, a carton-engaging end effector or distal end (e.g., manipulator head 3810), and counterbalancing units 3850. The carton retrieval arm 3830 may be referred to as a "straddle arm" configuration, whereby the arm straddles the conveying system on the sides thereof. The straddle arm configuration maximizes the area of the conveying system for facilitating maximum throughput by minimizing or eliminating obstructions which may arise from the carton retrieval arm 3830 located within the unloading area. The width of the carton retrieval arm 3830 provide additional advantages in that a wide carton engaging head unit may be used to provide a wider area for engaging cartons or articles. The carton retrieval arm 3830 may be configured such that cartons may pass through the sides of the arm structure, such as while the carton retrieval arm 3830 is operative to place cartons on a conveyor system. The carton retrieval arm 3830 may articulate about at least one horizontal axis to retract and extend to engage cartons, such as for placement on a conveyor system that may include descrambling, singulating, and other systems. Because the carton retrieval arm 3820 is configured with arms that articulate about a horizontal axis, the width between the side of the carton retrieval arm may be maximized and, in some cases, may extend to the fullwidth or nearly to the full width of the unloading space (e.g., the width of a trailer).

The counterbalancing units 3850 may be configured to couple to the carton retrieval arm 3830, such as at the lower axis to counterbalance forces from loads, particularly when the carton retrieval arm 3830 is in the fully extended or fully retracted positions. The loads may be from the arm components themselves and from cartons which are engaged by the manipulator head 3810.

In embodiments, the manipulator head 3810 may be configured with a frame that supports carton engaging mechanisms. For example, the manipulator head 3810 may be configured with a series of vacuum heads 3811 along the front portion and the side portions of the manipulator head 3810, such as along a frame thereof. In embodiments, the manipulator head 3810 may have a three axis ability to grasp a carton. For example, the manipulator head 3810 may move forward and backward, rotationally up and down, and from side to side. The manipulator head 3810 may be configured to provide side to side movement such that a face of a stack of cartons (i.e., a carton face) may be fully engaged, even at the side most extremes, as will be described in greater detail below.

Figure 39B:
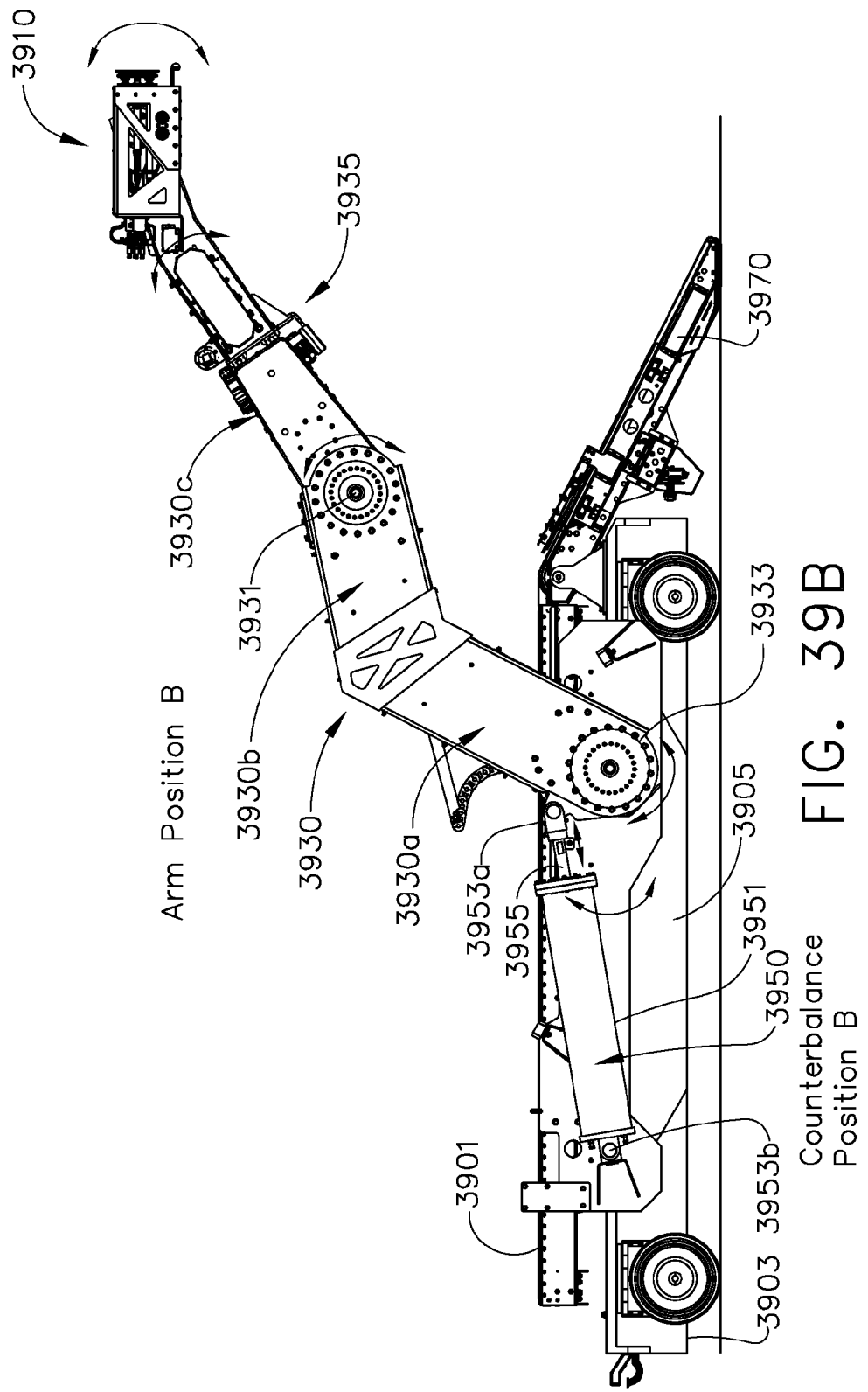
FIG. 39B is a diagram further illustrating a side view of a robotic arm, head unit, counterbalancing unit of FIG. 39A showing an upward extended position of the robotic arm and the counterbalancing unit in the various embodiments.
Figure 39C:
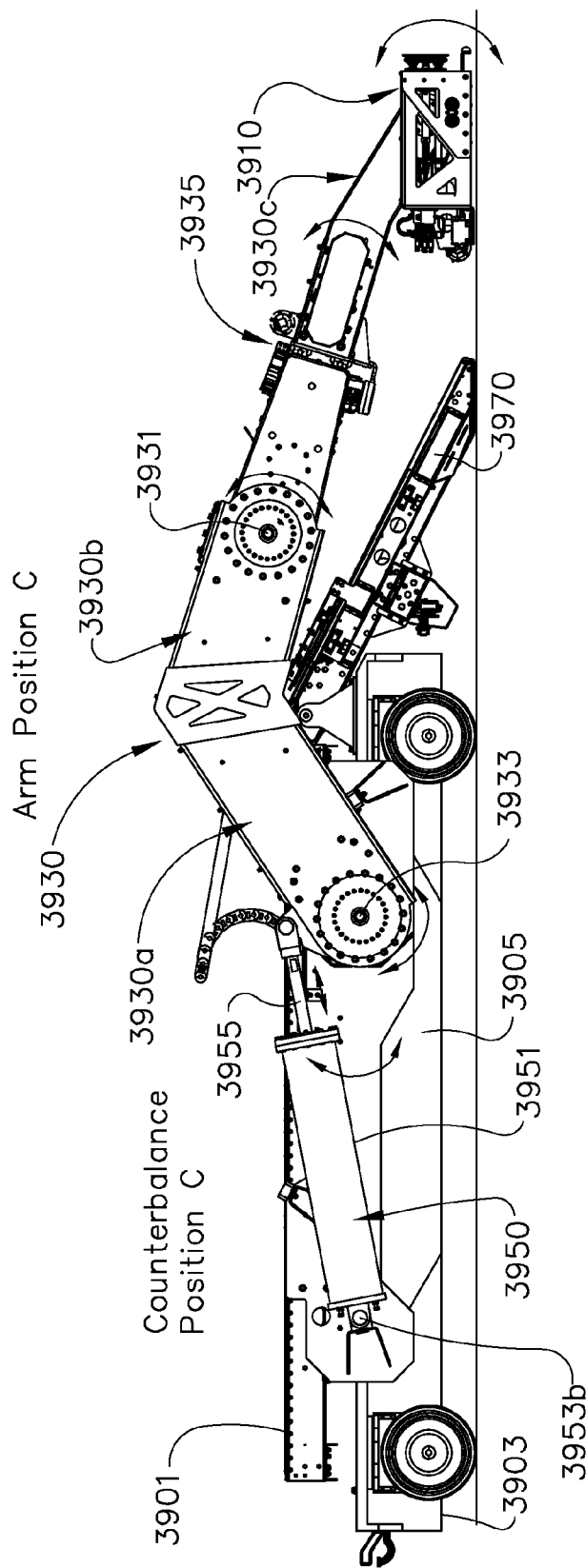
FIG. 39C is a diagram further illustrating a side view of a robotic arm, head unit, counterbalancing unit of FIG. 39A and FIG. 39B, showing a downward extended position of the robotic arm and the counterbalancing unit in the various embodiments.

As illustrated in FIG. 39A-39D, a carton retrieval arm 3930 coupled to counterbalancing units 3950 may be configured as an arm body that straddles a carton guide system and may be attached to mobile body 3903 by a frame or rails 3901. One end of the cylinder 3951 of the counterbalancing units 3950 may be attached to the arm body 3905 at a coupling 3953*b*, which may be fixed to the cylinder 3951. The cylinder 3951 may include a shaft 3955 having a movable coupling 3953*a* attached to the robotic arm 3930. A conveyor system 3970 may also be coupled to the mobile body 3903. The carton retrieval arm 3930 may have a lower arm portion 3930*a* and an upper arm portion 3930*b* on each side of the straddling arm configuration. In some embodiments, rails 3901 may enable the arm body to move forward or side-to-side relative to the mobile body 3903. The lower arm portion 3930*a* may pivotally attach to the arm body and may be angularly positioned about a lower arm axis 3933 by lower motors. The upper arm portion 3930*b* pivotally attaches to the ends of the lower arm portion 3930*a* about an upper axis 3931 and may be angularly positioned by an upper motor. A manipulator head 3910 (or end effector or distal end), such as a vacuum manipulator head, may be pivotally attached to the ends of the upper arm 3920*b* and may be angularly positioned by vacuum motor. In embodiments, the manipulator head 3910 may include vacuum manipulators 3911, which are attached to the manipulator head 3910 to grasp, draw, and drop a carton 3990 from a carton wall or carton pile (e.g., as illustrated in FIG. 39D).

The embodiment carton retrieval arm 3930 may mount on top of the mobile body 3903 so as to lower the center of gravity. For example, portions of the carton retrieval arm 3930 may straddle the sides of the mobile body 3903. The mobile body 3903 may include a recess to clear other portions of the carton retrieval arm 3930. The carton retrieval arm 3930 may include a pair of pivoting arms 3930*a*, 3930*b* on each side and a laterally moving arm 3930*c* to move and position the vacuum manipulator head 3910. The pivoting arms 3930*a*, 3930*b* of the carton retrieval arm 3930 may move the manipulator head 3910 towards and away from the carton pile, and up and down from the top to the bottom of the carton pile. The laterally moving arm 3930*c* may move the manipulator head 3910 from side to side relative to the carton pile. The manipulator head 3910 may also be pivotable from at least a position facing the carton pile (e.g., Arm Positions A-C, shown in FIG. 39A-FIG. 39C) to a position facing the floor of the trailer (e.g., Arm Position D in FIG. 39D). These movements may enable the manipulator head 3910 to engage cartons 3990 within the carton pile from floor to ceiling and from side to side, and within different sized trailers. When the manipulator head 3910 is pivoted to face the floor, the carton 3990 may be picked up by a top of the carton 3990 as illustrated in FIG. 39D. This feature may be especially beneficial when retrieving the carton 3990 when it is resting on the floor of the trailer, or when it is otherwise only accessible from the top of the carton 3990. Movement of the moving portions of the carton retrieval arm 3930 may be driven through electric motors or electric linear motors, including motors driven by gears, belts, chains, and so on, but is not limited thereto. Further, while the arms of the carton retrieval arm 3930 are shown as being formed as "U" channels, or similar structures, tubing may also be used to form the arms or other features.

As shown in FIG. 39A-FIG. 39D, the carton retrieval arm 3930 may have an arm body 3905 that mounts onto the mobile body 3903. The arm body 3905 may have at least one cross member extending between sides thereof that can be notched to receive the mobile body 3903 within. The arm body 3905 may further comprise body attachment points to secure the carton retrieval arm 3930 to the mobile body 3903. In embodiments, the lower arm 3930a may have a first end that pivotally attaches to the side of the arm body 3905 at the lower arm axis 3933 and a second end that pivotally attaches to a middle arm or upper arm 3930b at the upper arm axis 3931. The lower arm axis 3933 may be defined by the pivotal attachment of the first end of the lower arm 3930a to the arm body 3905 on each side thereof. The upper arm axis 3931 may be defined by the pivotal attachment of the second end of the lower arm 3930a to the upper arm 3930b on each side. A lower member, such as a tube or shaft, may extend along the lower arm axis 3933 to connect each lower arm 3930a together, and may form part of the pivotal attachment of the lower arms 3930a to the arm body 3905. A lower gear motor or actuator may attach to the arm body 3905 to engage with the lower arms 3930a via gearing to pivot the lower arms 3920a about the lower arm axis 3933.

The upper arm 3930b may pivotally extend from the second end of the lower arms 3930a and rotate around the upper pivot axis 3931. Each upper arm 3930b, and the second portion of the lower arm 3930a where joined at the upper arm axis 3931 may be joined on each side by an upper joining member, which may be a tube or shaft that connects the upper arms 3930b (and the second ends of the lower arms 3930a) together about the upper arm axis 3931, and may form a part of the pivotal attachment of the upper arms 3930b to the lower arms 3930a. Upper arms 3930b may extend away from the upper arm axis 3931 and may terminate in a slide that couples to an end arm 3930c. The end arm 3930c may couple to and facilitate movement of laterally movable head unit 3910. A upper arm gear motor or actuator may be attached, such as to the lower arm 3930a to engage with the upper arm 3930b via gearing, to pivot the upper arms 3930b about the upper arm axis 3931. In other embodiments, the upper arm axis 3931 and the lower arm axis 3933, and the lower arm 3930a and upper arm 3930b, may be driven independently on each side, or on at least one side, by drive motors positioned coaxially the axis at the axis location, and the joining members may be omitted.

In embodiments, the end arms 3930c may attach to an end plate 3935 that movably attaches the end arms 3930c to lateral slides or other structures that may serve to space the end arms 3930c apart. Lateral slides may be oriented to facilitate lateral movement of the end arms 3930c. A linear motor may be secured to the ends of the upper arms 3930b adjacent to the lateral slides and may drive lateral movement of the end arms 3930c. Actuation of the linear motor may move the end arms 3930c laterally.

Figure 40A:
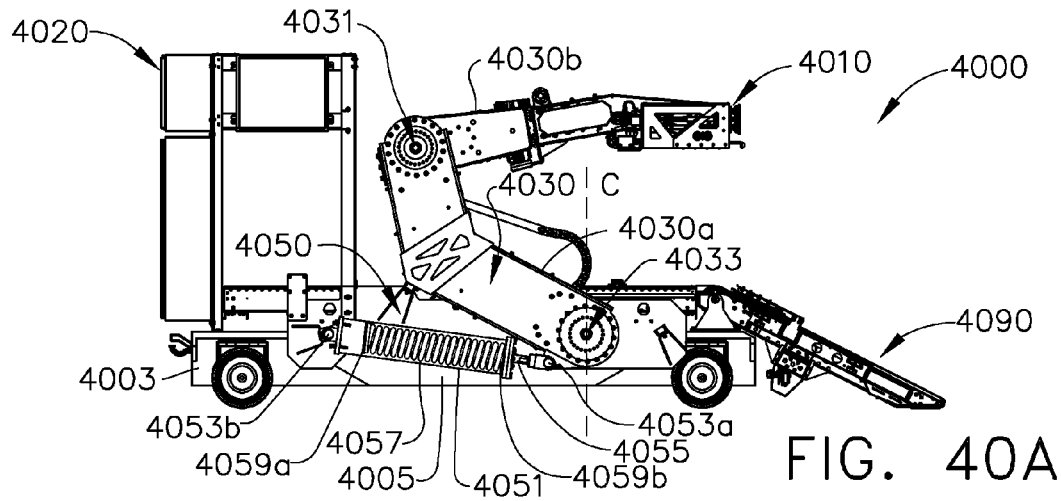
FIG. 40A is a diagram illustrating a side view of the counterbalancing unit in a partially extended state coupled to a robotic arm in a retracted state and further coupled to a base unit and control unit in the various embodiments.
Figure 40B:
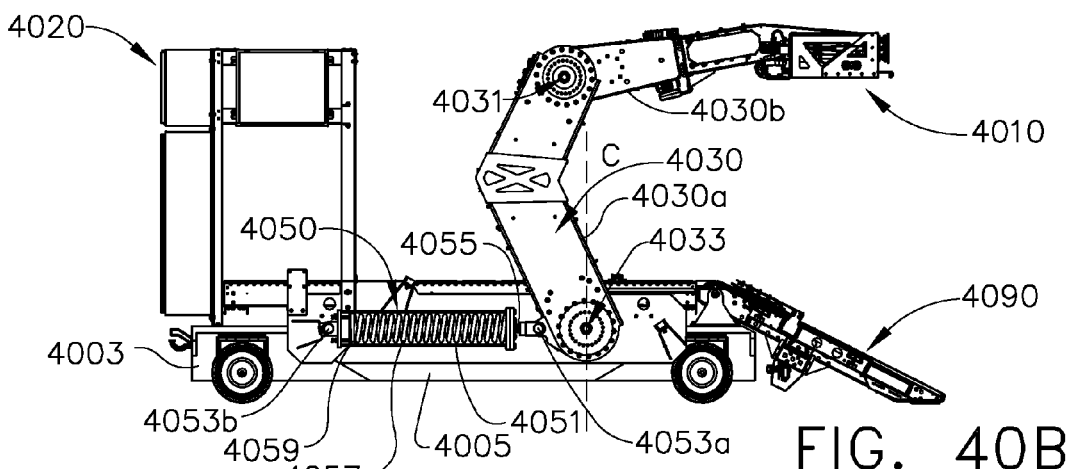
FIG. 40B is a diagram further illustrating a side view of the counterbalancing unit of FIG. 40A in a neutral state coupled to a robotic arm in a neutral state and further coupled to a base unit and control unit in the various embodiments.
Figure 40C:
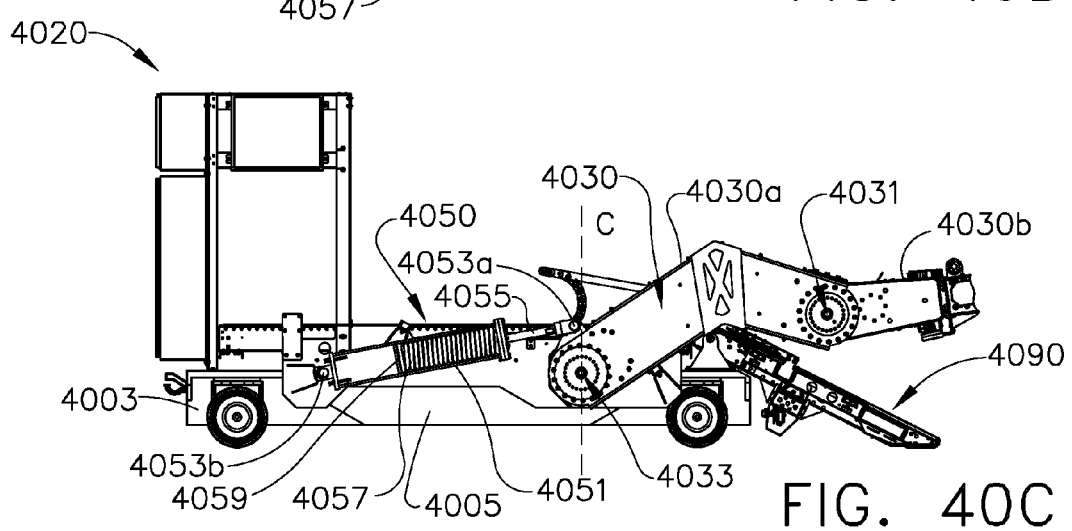
FIG. 40C is a diagram further illustrating a side view of the counterbalancing unit of FIG. 40A in an extended state coupled to a robotic arm in an extended state and further coupled to a base unit and control unit in the various embodiments.

Additional aspects in connection with an embodiment robotic carton loading system 4000 are illustrated in FIG. 40A-40C. The embodiment robotic carton loading system 4000 may include a manipulator head 4010, a control unit 4020, a robotic arm 4030, a counterbalance unit 4050 and a conveyor system 4090. Traditional counterbalance systems provide a counterbalance connection between points on a robot arm itself and do not connect to the base of the robot arm. In contrast to traditional robot arm counterbalances, the embodiment counterbalance unit 4050 may be connected between the robotic arm 4030 and base supporting the robotic arm 4030, such as the arm body 4005, the frame 4001, or the mobile body 4003. In this manner, the embodiment counterbalance unit 4050 may advantageously provide a counterbalancing force when the robotic arm 4030 is placed in various positions, such as those illustrated in FIG. 39A-39D, based on the connection between the robotic arm 4030 and the arm body 4005, the frame 4001, or the mobile body 4003. The counterbalance unit 4050 may counterbalance forces that are generated as the robotic arm 4030 moves through different positions, such as to engage and move cartons for placement on or near the conveyor system 4090 during operation. In a first position illustrated in FIG. 40A, the robotic arm 4030 may be in a retracted position that may be at least partially supported by the counterbalance unit 4050. The counterbalance unit 4050 may be configured with a damping element, such as spring 4057 that resists forces applied against it in a compression direction of the spring 4057. The counterbalance unit 4050 may attach at one end to lower arms 4030a, such as in a vicinity of a lower axis 4033 in a position outside of the arm body 4005 and to the arm body 4005 at the other end. The counterbalance 4050 may be configured to counterbalance the weight of the robotic arm 4030 and any cartons captured therewith. In some embodiments, the spring 4057 may be a gas spring.

The counterbalance unit 4050 may include a shaft 4055 that extends through the spring 4057 within a cylinder 4051 that encloses at least the spring 4057 and the shaft 4055. The shaft 4055 may attach at one end to a piston or an end plate 4059a within the cylinder 4051. The shaft 4055 may be coupled at the other end to a movable coupling 4053a that attaches to the lower arm 4030a in the vicinity of a first end of the cylinder 4051. The other end of the cylinder 4051 may be attached to the arm body 4005 at a coupling 4053b, which may be fixed to the cylinder 4051. The end of the shaft 4055 may be coupled to the end plate 4059a such that the end plate 4059a contacts and contains or retains one end of the spring 4057 as the shaft 4055 moves in and out of the cylinder 4051 with the movement of the lower arm 4030a. The other end of the spring 4057 may contact a cylinder end 4059b at an inner surface of a cylinder 4051. As the shaft 4055 moves out from the cylinder 4051, the spring 4057 may be compressed between the end plates 4059a and 4059b, which may provide a resisting force that opposes the outward movement of the shaft 4055. When the shaft 4055 moves into the cylinder 4051, the compression of the spring 4057 may be relieved. The tension of the spring 4057 may be configured such that it provides a resistive force to movements of the shaft 4055 both in and out of the cylinder 4051. Alternatively the spring 4057 may be configured to resist movement of the shaft 4055 in one direction only. While the counterbalance unit 4050 is described herein as a spring unit, it is not limited thereto. Other configurations for the counterbalance unit 4050 are possible, such as a gas cylinder and piston system, hydraulic fluid and piston system, or a combination of gas, fluid, mechanical or spring systems, and so on.

In the various embodiments, the robotic arm 4030 may be configured as a toggle arm, or "over the center" configuration that pivots within a range close to a vertical line "C" drawn through the pivot axis, such as the lower axis 4053 of the robotic arm 4030 and perpendicular to the mobile body 4003. In FIG. 40A and FIG. 40C the robotic arm 4030 may be in the retracted and the extended positions, respectively, where spring force may be relatively high. The counterbalance unit 4050 may compensate for forces generated from the robotic arm 4030 at these positions or at the fully retracted or fully extended extremes of movement of the robotic arm 4030 where the spring forces may be maximized. As illustrated in FIG. 40B, the robotic arm 4030 may be moved to a "neutral" position. In such a position, the spring 4057 may be fully extended and the spring forces may be minimized (e.g., lower than the relatively high force exerted in the retracted and extended positions of FIGS. 40A and 40C). Further movement of the arm 4030, in either an extending or a retracting direction, may cause the spring 4057 to be compressed as described herein above and provide a resisting force that counterbalances the forces of the robotic arm 4030. The counterbalancing unit 4050 thereby may have a stabilizing effect on the movement of the robotic arm 4030.

Figure 40D:
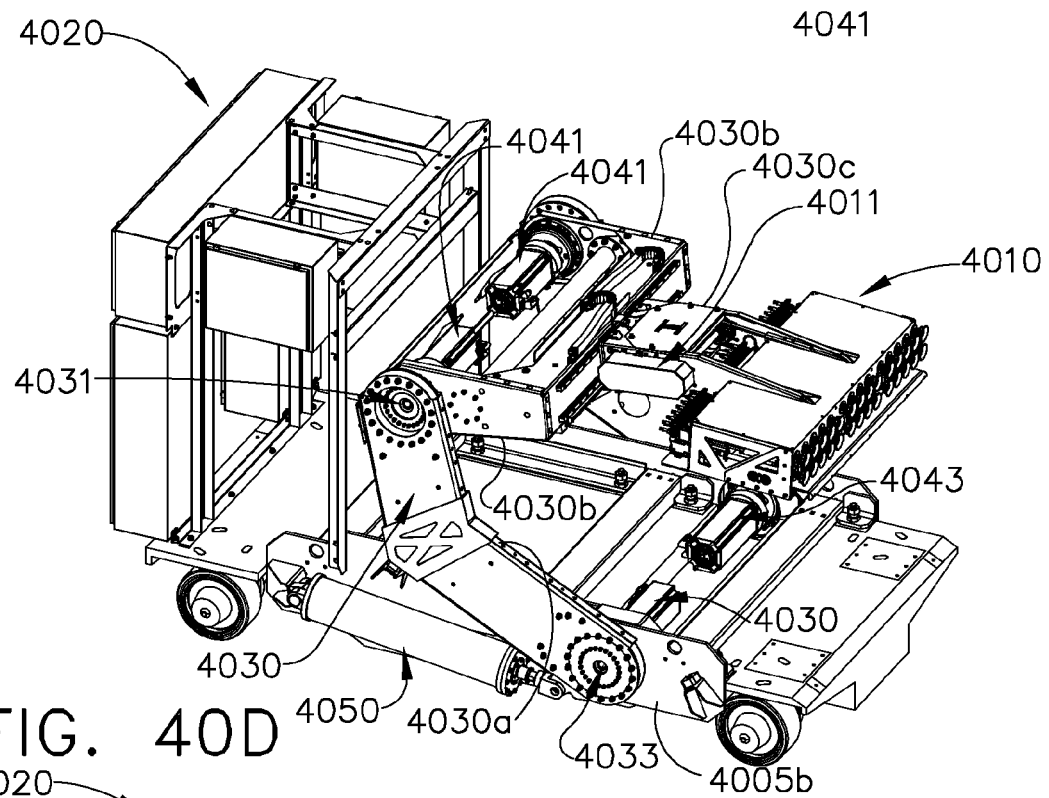
FIGS. 40D and 40E are diagrams illustrating additional details of an embodiment robotic carton loading system.
Figure 40E:
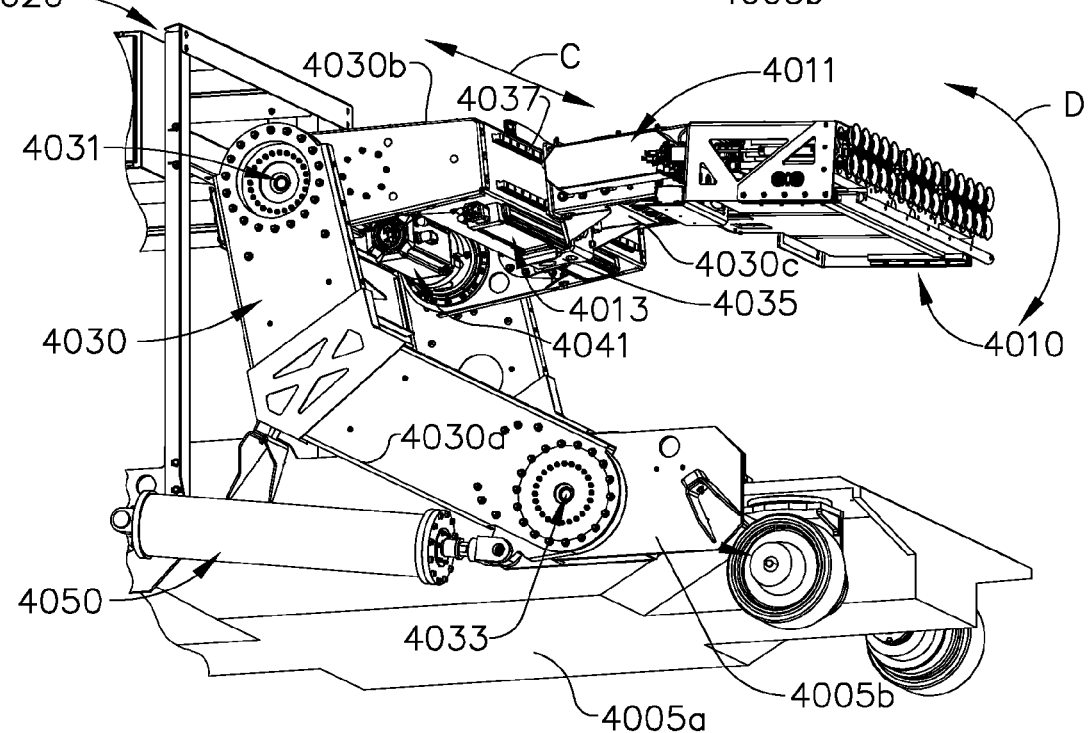

Additional details of an embodiment robotic carton loading system 4000 are illustrated in FIG. 40D and FIG. 40E, which are perspective views of an exemplary robotic carton loading system including an exemplary robotic arm. For example, the robotic arm 4030 may include drive motors 4041, which may be located on an inner portion of the joint between the lower arm 4030a and the upper arm 4030b. The drive motors 4041 may be located so as to be coaxial or approximately coaxial with the axis 4031. For example, a central drive gear or mechanism of the drive motors 4041 may be offset from the axis 4031 so as to engage a receiving gear or mechanism of the upper arm 4030b. In embodiments, the drive motors 4041 may include gear drive or other drive mechanisms to drive the upper arm 4030b. The drive motors 4041 may be coupled to an inner surface of the upper arm 4030b. Alternatively, the drive motors may be mounted to a gear drive assembly or other drive assembly, which, in turn, may be mounted directly to the inner surface of the upper arm 4030b or a receiving drive assembly of the upper arm 4030b. The robotic arm 4030 may further include drive motors 4043, which may be located on an inner portion of the joint between the lower arm 4030a and a frame portion 4005b of the main arm body 4005. The drive motors 4043 may be positioned so as to be below a pass-through conveying platform or mechanism that may extend through the robotic carton unloading system and the robotic arm 4030. The drive motors 4043 may be coupled to an inner surface of the lower arm 4030a. Alternatively, the drive motors 4043 may be mounted to a gear drive assembly or other drive assembly, which, in turn, may be mounted directly to the inner surface of the lower arm 4030a or a receiving drive assembly of the lower arm 4030a. In embodiments, the upper arm 4030b and the drive motors 4041 and the drive motors 4043 may be mounted inboard of the lower arms 4030a because the outer surface of the lower arms 4030a may define the outer dimension of the robotic carton loading system 4000 and may be very close to the sidewalls of a truck, container, or other carton storage and unloading space.

In embodiments, the upper arm 4030b may extend away from the axis 4031 and may terminate in a lateral slide 4037 that attaches at least one end arm 4030c to each upper arm 4030b. The end arm 4030c can attach to an end plate 4035 that movably attaches the end arm 4030d to the lateral slide 4037 and that defines a width of the end arm 4030c. The lateral slide 4037 is oriented to move the end arm 4030c laterally along an axis C. A linear motor 4013 may be secured to the ends of the upper arms 4030b adjacent to the lateral slide 4037 and may have a laterally movable connection 4039 that connects to the end plate 4035 or end arms 4030c. Actuation of the linear motor 4013 moves the connection 4039 which moves the end arm 4030c laterally. The end arm 4030c may further be coupled to a manipulator head 4010, which may also be moved laterally with the lateral movement of the end arm 4030c.

The manipulator head 4010 may be pivotally attached a free end or ends of the end arm 4030c and may be pivoted about a head pivot axis along a pivot arc D'. A head motor 4011 may be centrally mounted onto the end arm 4030c and may extend towards the end plate 4035 on one end and toward the manipulator head 4010 on the other end. The head motor 4011 may rotate the manipulator head 4010 about the head pivot axis along the pivot arc D' with a system that may comprise a combination of a gearbox and a belt drive system, such as the system described below with reference to FIG. 41A.

Figure 41A:
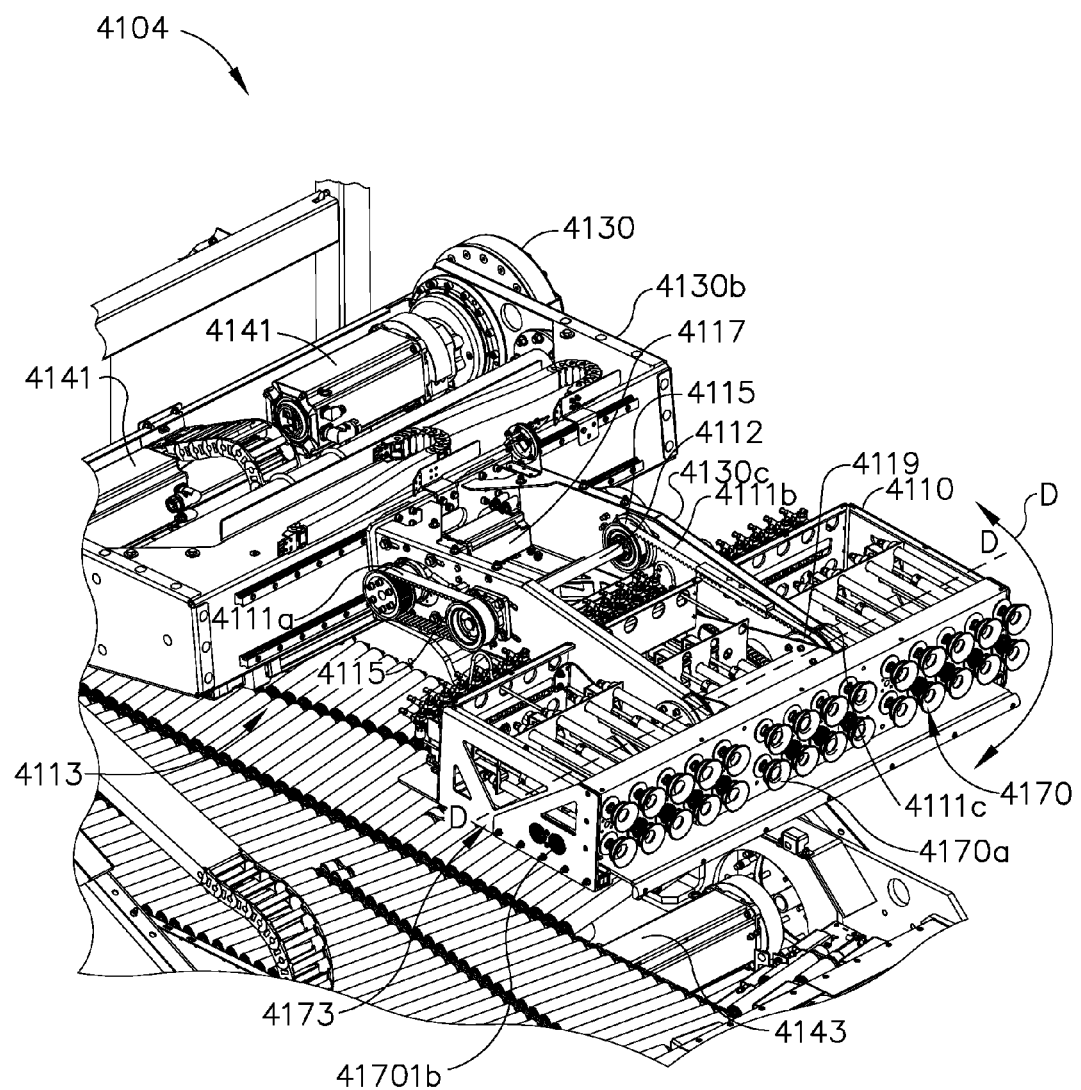
FIG. 41A is a diagram illustrating a perspective view of element details of a robotic carton unloading system including a manipulator head and pivot drive motor in embodiments.

Further details of components of a robotic carton unloading system 4104, including the manipulator head 4110 are illustrated in FIG. 41A. As described above, a manipulator head 4110 may be pivotally attached to the end of end arm 4130c. The end arm 4130c may be pivotally attached to the upper arm 4130b. The pivoting of the manipulator head 4110 may be driven by a head motor 4117. The head motor 4117 may drive a belt 4111a, which may be positioned on an outside of the sides of the end arm 4130c. The belt 4111a may drive a shaft 4112. The shaft 4112 may extend through both sides of the end arm 4130c and may be rotatably secured thereto. A pulley 4115 may be attached to each end of the shaft 4112 on an outside of each side of the end arm 4130c. As shown, the pulleys 4115 may also be attached to each side of manipulator head 4110 such as at pulleys 4119 allowing the manipulator head 4110 to move about the head pivot axis on the pivot arc D'. A bearing may be attached to the end arms 4130c behind each of the pulleys 4115 and 4119 with each bearing supporting a shaft connected to the pulleys 4115 and 4119. A head belt 4111b may extend between pulleys 4115 and 4119 along an inside of each side of the end arm 4130c and attached to a pulley 4111c. The head belt 4111b may transmit rotary motion from the shaft 4112 to the pivot the manipulator head 4110. In embodiments, the manipulator head 4110 may be configured with banks of vacuum rods 4170, which may be used to grip cartons though a series of vacuum cups 4170a. Additional side vacuum rods 4170b may be located on sides of the manipulator head 4110 to engage cartons that are along a side of a loading space. The side vacuum rods 4170b may allow cartons to be accessed from the side, such as without the need to retract the robotic carton unloading arm or mobile base, which provides greater flexibility and efficiency. The robotic arm 4130 may further include drive motors 4143.

In embodiments, the manipulator head 4110 comprises a manipulator frame 4173 that pivotally attaches to the end arm 4130c at the head pivot axis D-D. The manipulator frame 4173 may provide a structure to support all components of the manipulator head 4110, which may be a vacuum manipulator head. The drive belt 4111b may extend through the end arm 4130c and attach to the pulleys 4119 which may be secured to the manipulator frame 4173 inboard of sides of the end arm 4130c. The manipulator head 4110 may be any type manipulator head, such as the vacuum manipulators described above with reference to FIGS. 8-33C. While vacuum maniuplators may be described and illustrated with reference to FIGS. 35A-59D and elsewhere, it will be appreciated that other manipulators units may also be used with a laterally movable configuration. For example, claw heads, tray heads, or combinations of head technologies may all benefit from the features described herein in various embodiments of the robotic arm 4130.

Figure 41B:
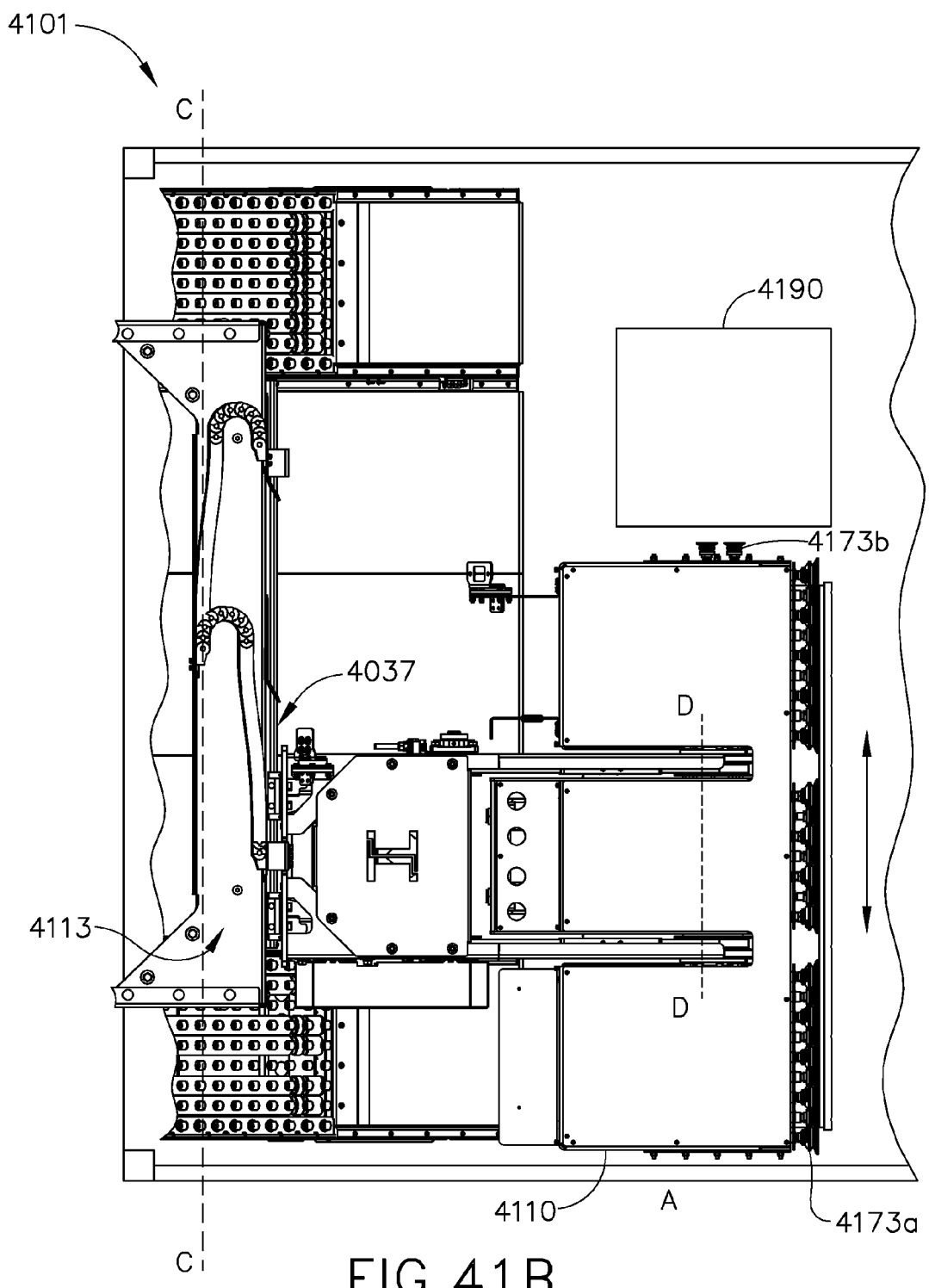
FIG. 41B is a diagram illustrating a top view of a laterally mobile head unit engaging a carton positioned on the side of the head unit in the various embodiments.
Figure 41C:
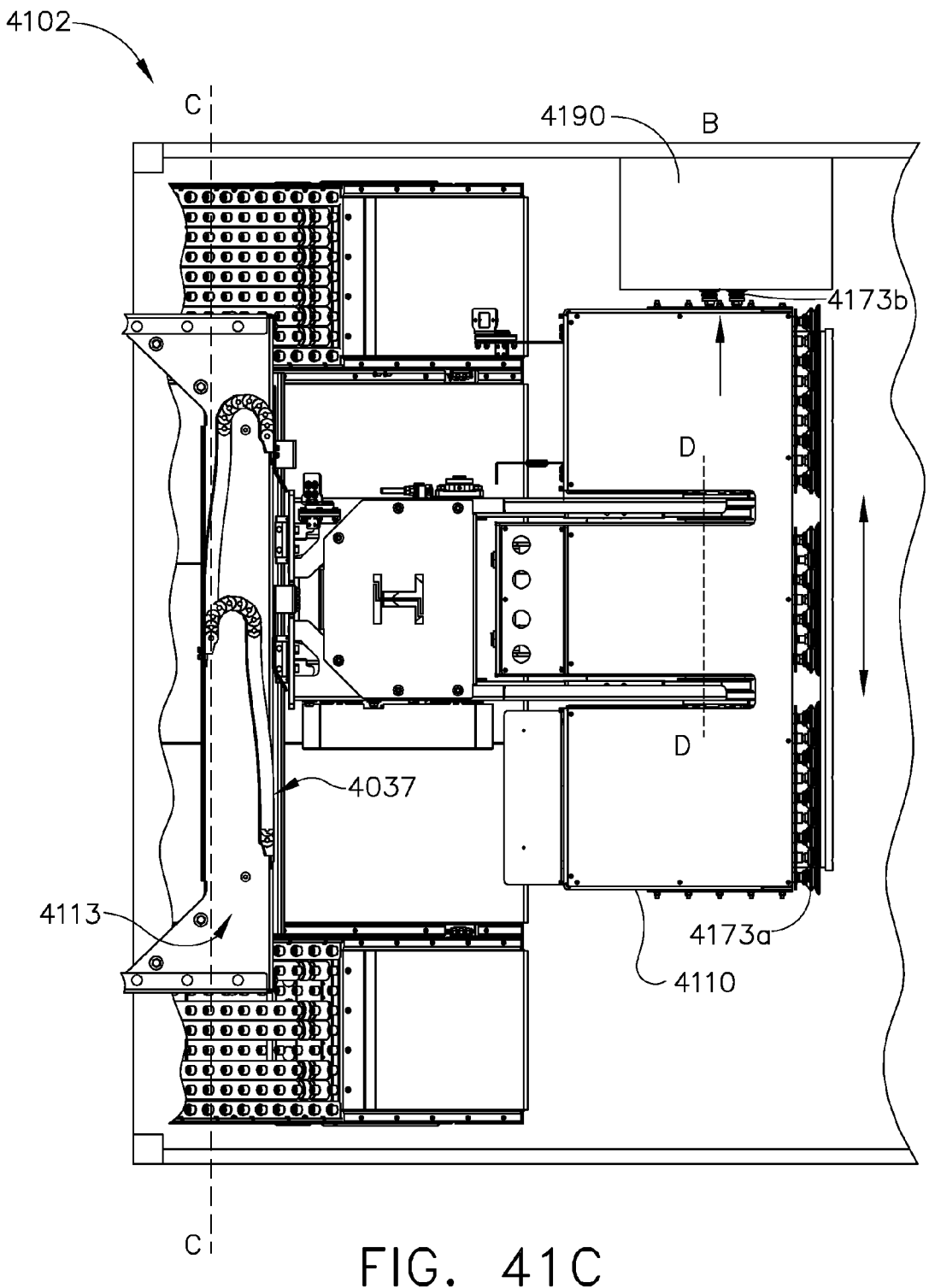
FIG. 41C is a diagram further illustrating a top view of a laterally mobile head unit disengaged from a carton positioned on the side of the head unit in the various embodiments.

It will be appreciated that the lower axis (e.g., 4033) of the lower robotic arm, the upper axis (e.g., 4031) of the upper robotic arm, the lateral movement axis of the slide (e.g., 4037), and the head pivot axis D-D may all be parallel. Thus, in embodiments, the manipulator head 4110 may have a three axis ability to grasp a carton 4190. FIGS. 41B and 41C show a top view of the manipulator head 4110 which may be additionally configured to grasp and remove a carton 4190 from an unloading space, such as a trailer or other space. In the view of FIG. 41B showing embodiment 4101, the linear motor 4113 has moved the manipulator head 4110 along the slide 4037 on the axis C-C to a side most position A. As shown, the vacuum rods 4173a may grasp and pull a single carton from a carton pile along a first axis. In embodiments, the manipulator head 4110 may further be configured to engage a carton 4190 which is positioned on a side of the manipulator head 4110 on a second perpendicular axis. As shown in the embodiment 4102 of FIG. 41C, the manipulator head 4110 may engage the carton 4190 even when against a side B of the unloading space by moving laterally along the slide 4037 toward the side B. The side vacuum rods 4170b may grasp the carton 4190, such as by extending and retracting along the second axis. Thus, the side vacuum rods 4173b may be configured to grasp and manipulate packages stuck against the walls of a loading space such as the interior of semi-trailer. As can be seen in FIG. 39D, the manipulator head 4110 may be configured to be rotated to face the vacuum rods 4170a towards the floor in order to grasped a carton by a top thereof and lift the carton vertically.

To power the vacuum rods 4170a and the side vacuum rods 4170b, a flexible or partially flexible fluid conducting line such as an air-line may be extended along the end arm 4130c to the manipulator head 4110. Air can be delivered to the air-line by an on-board air pump that is built into robotic carton unloader system 4000 or can be provided from an outside source such as compressed air conducted from the warehouse or distribution center.

Figure 42:
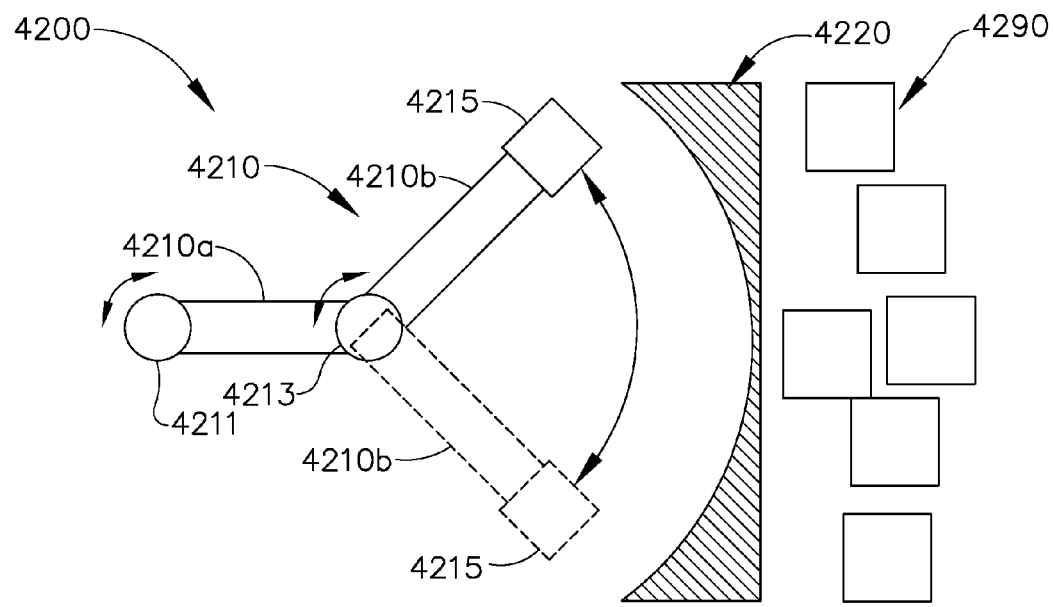
FIG. 42 is a diagram illustrating a top view of a conventional pivoting material handling arm on an axis with zones of inaccessibility.

The embodiment robotic carton loader system as described herein provides distinct advantages over a more conventional system 4200, by maximizing access to cartons within a loading area. As illustrated in FIG. 42, a robot arm 4210 that is articulated at lateral pivots 4211 and 4213 may limit access of a head unit 4215 to a carton pile 4290. For example as an arm portion 4210b, which laterally articulates about a pivot 4213, moves between end positions, a zone of inaccessibility 4220 may exist near the ends of travel of the arm portions 4210b. The zone of inaccessibility 4220 represents an area of limited access to the carton pile 4290 for a particular position of insertion of the arm 4210 into a loading area.

Figure 43:
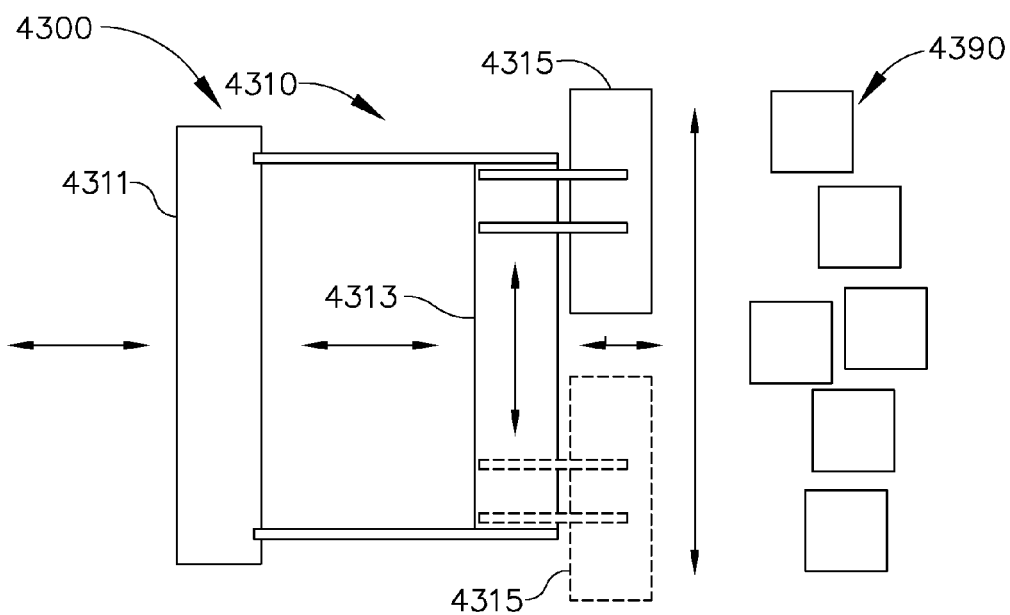
FIG. 43 is a diagram illustrating a top view of a robotic arm and laterally mobile head unit in the various embodiments.

In contrast, an embodiment robotic carton unloader system 4300, as illustrated in FIG. 43, may provide enhanced access to a carton pile 4390. An arm assembly 4311 may move into and out of the carton unloading area. A lateral drive assembly 4313 may move a manipulator head 4315 laterally between end positions (e.g., sidewall of a truck or unloading space). The lateral linear movement of the manipulator head 4315 may provide access to all areas of a face of the carton pile 4390, thus increasing unloading efficiency.

Figure 44A:
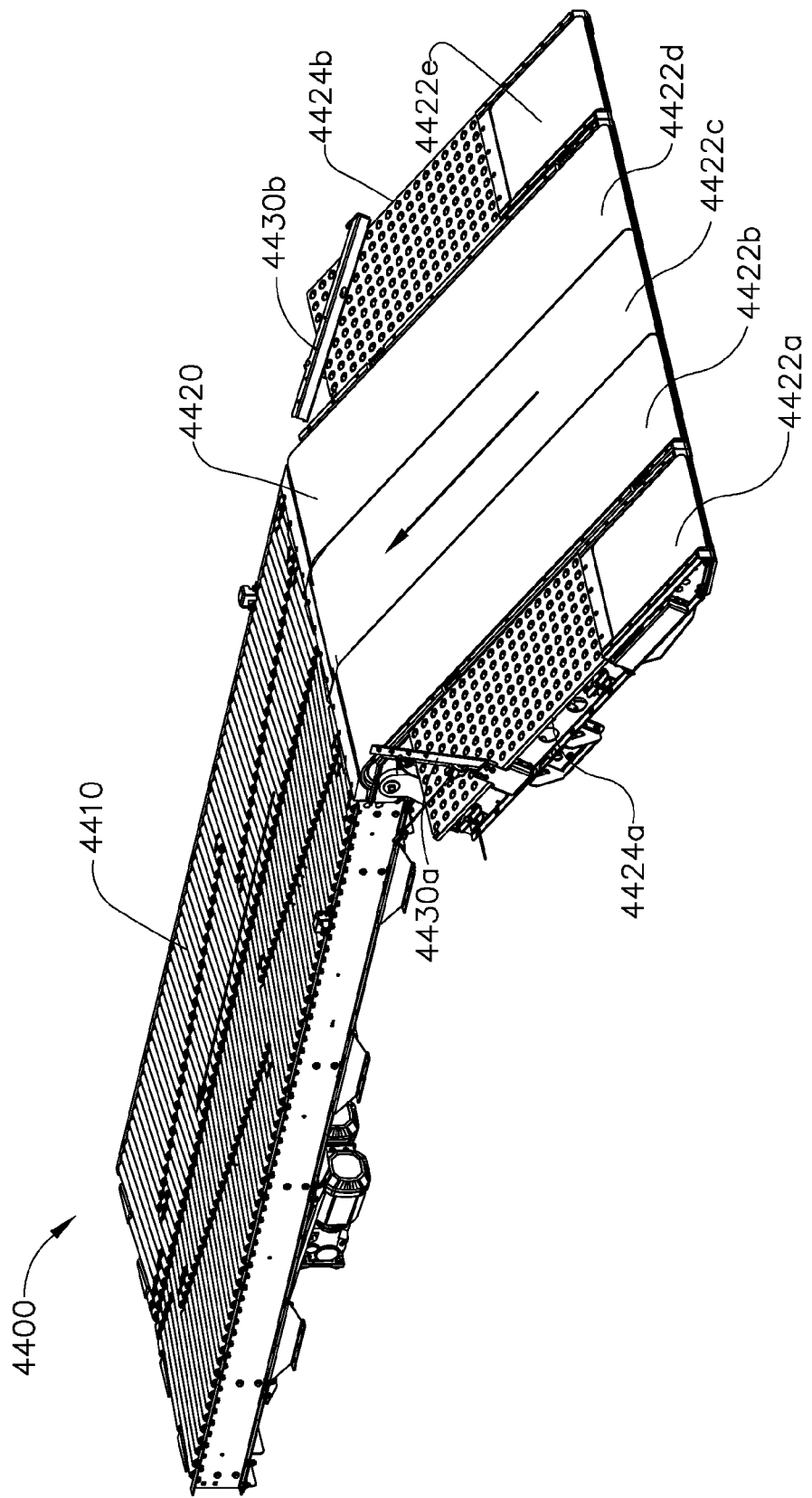
FIG. 44A is diagram illustrating a perspective view of a conveyor system including descramblers according to various embodiments.
Figure 44B:
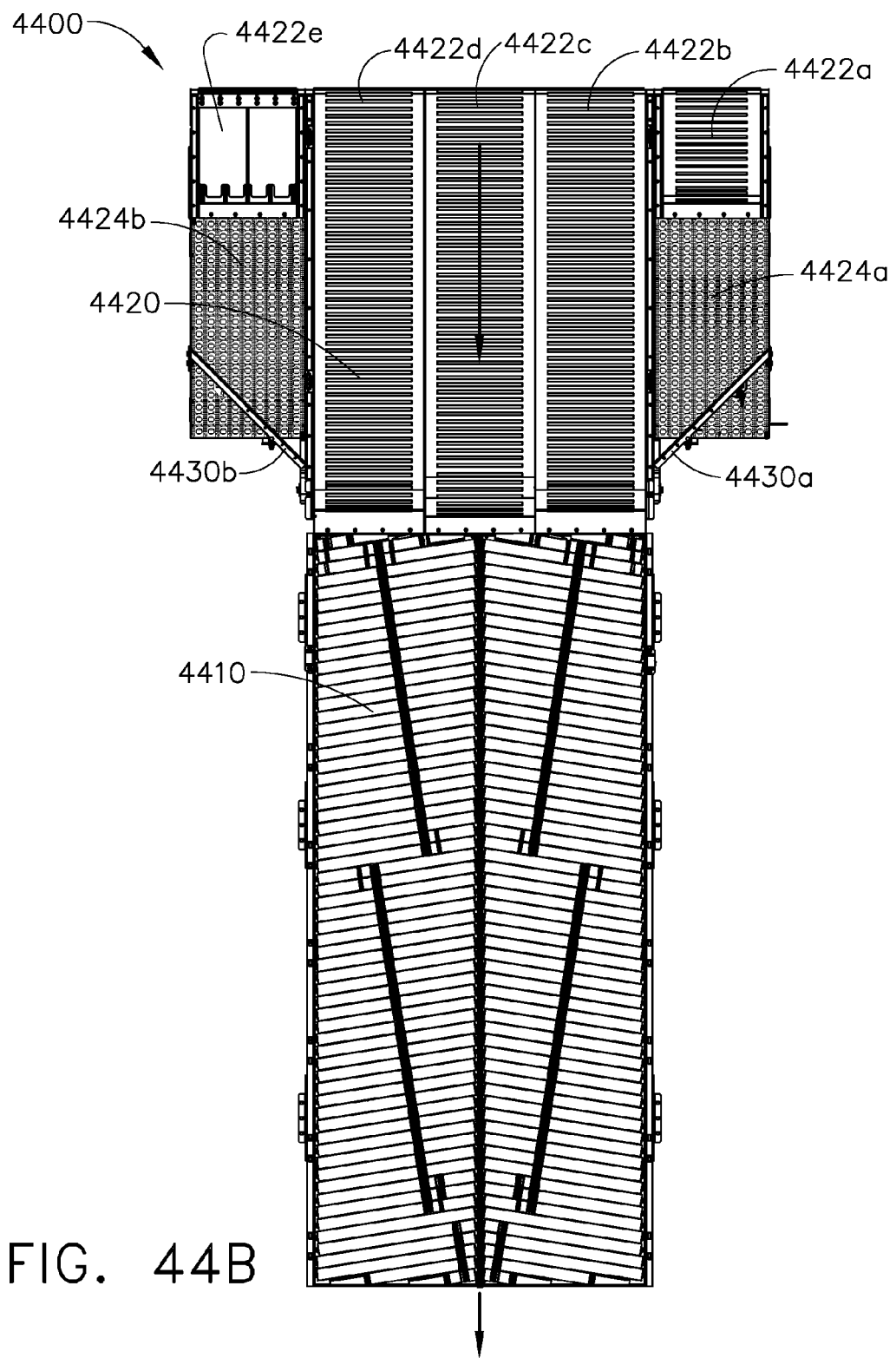
FIG. 44B is diagram illustrating a top view of a conveyor system including descramblers according to various embodiments.

FIG. 44A illustrates a perspective view of an embodiment conveyor system 4400 including a herringbone-type central descrambler 4410 and a front-end descrambler 4420. As described above, the front-end descrambler 4420 may include a plurality of rows of belts or rollers for moving items (e.g., boxes, cartons, etc.) from the front to the back end of the front-end descrambler 4420. For example and as shown in FIG. 44, the front-end descrambler 4420 may include five individual rows 4422a-4422e (i.e., three inner rows and two outer-most rows), each comprised of a set of rollers configured to move items at different speeds. In some embodiments and as described above, the outer-most rows 422a, 422e may include sections 4424a, 4424b configured to move items inward to the inner rows 422b-422d. For example, the sections 4424a, 4424b may include a plurality of rollers (or a section of rollers) configured and oriented to drive items diagonally inward at a certain angle. In some embodiments, each of the rows 4422a-4422e of the front-end descrambler 4420 may be comprised of a powered belt powered to move at various speeds. Further, and as described above, the herringbone-type central descrambler 4410 may be comprised of a plurality of powered or driven rollers that are configured to singulate and descramble items as they are moved from the front to the back of the herringbone-type central descrambler 4410. As described above, the front-end descrambler 4420 may also include guides 4430a, 4430b angled such that items (e.g., cartons, boxes, etc.) coming into contact with the guides 4430a4430b may be directed inward toward the inner rows 4422b-4422d. FIG. 44B shows a top view of the embodiment conveyor system 4400 that includes the front-end descrambler 4420 and the herringbone-type central descrambler 4410.

Figure 45A:
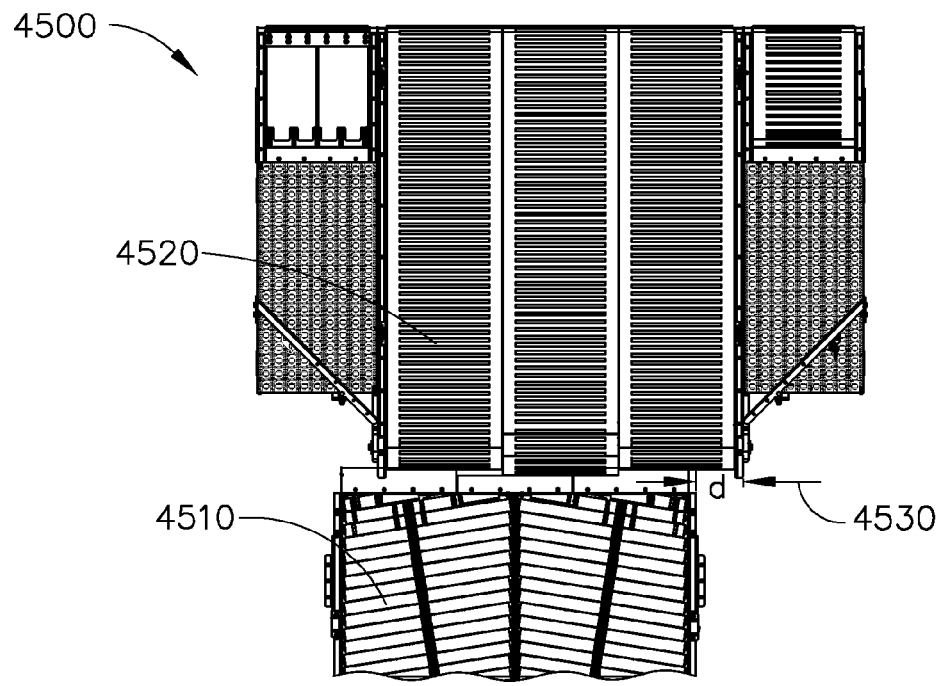
FIG. 45A is diagram illustrating a top view of a conveyor system including a front-end descrambler configured to move laterally according to an embodiment.

In some embodiments, a front-end descrambler may be configured to move or be re-positioned relative to a herringbone-type central descrambler. Accordingly, FIG. 45A illustrates a top view of a conveyor system 4500 including a front-end descrambler 4520 configured to move laterally relative to a herringbone-type central descrambler 4510. For example, the front-end descrambler 4520 may be configured to move side-to-side in two directions (e.g., left or right) along a track parallel to the floor of an unloading area (e.g., parallel to a truck trailer floor). A distance 4530 ('d' shown in FIG. 45A) illustrates an exemplary offset from the herringbone-type central descrambler 4510 that may occur due to such a side-to-side movement of the front-end descrambler 4520. In various embodiments, such lateral movements of the front-end descrambler 4520 may be driven by hydraulic or chain-driven mechanisms that may require various motor units.

Figure 45B:
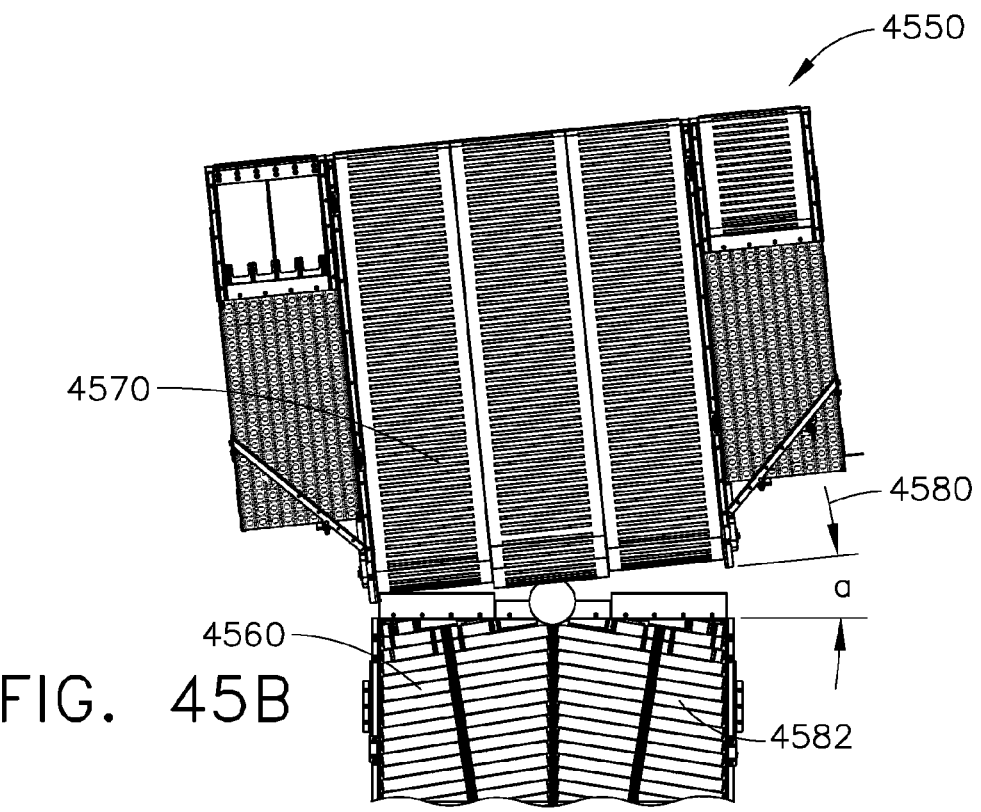
FIG. 45B is diagram illustrating a top view of a conveyor system including a front-end descrambler configured to pivot according to an embodiment.

FIG. 45B illustrates a top view of a conveyor system 4550 including a front-end descrambler 4570 configured to pivot relative to a herringbone-type central descrambler 4560. For example, the front-end descrambler 4570 may be configured to rotate on a pivot point 4582 in both directions on a particular axis (e.g., on a plane parallel to the floor of an unloading area). An angle 4580 ('a' shown in FIG. 45B) illustrates an exemplary rotation about the pivot point 4582 that may occur due to such a pivoting functionality. In various embodiments, such lateral movements of the front-end descrambler 4520 may be driven by hydraulic or chain-driven mechanisms that may require various motor units.

FIGS. 46-49 illustrate various embodiment herringbone-type central descramblers. As described above, in various embodiments, robotic carton unloaders may include conveyor systems that include center sections configured to not only move items (e.g., boxes, etc.) from front to rear, but also to singulate and descramble the items within the unloading area. In particular, herringbone-type central descramblers, coupled to the mobile body of the robotic carton unloader, may move items (e.g., cartons) arriving in a large or spread manner from a plurality of rows from a front-end descrambler to a center path and may separate the items into a follow-the-leader path. Some gapping may occur with such descrambling and singulation, with an end result being a line of separated items. In other words, side-to-side orientation of items arriving on the herringbone-type descrambler may be converted generally to an in-line line orientation.

Figure 46:
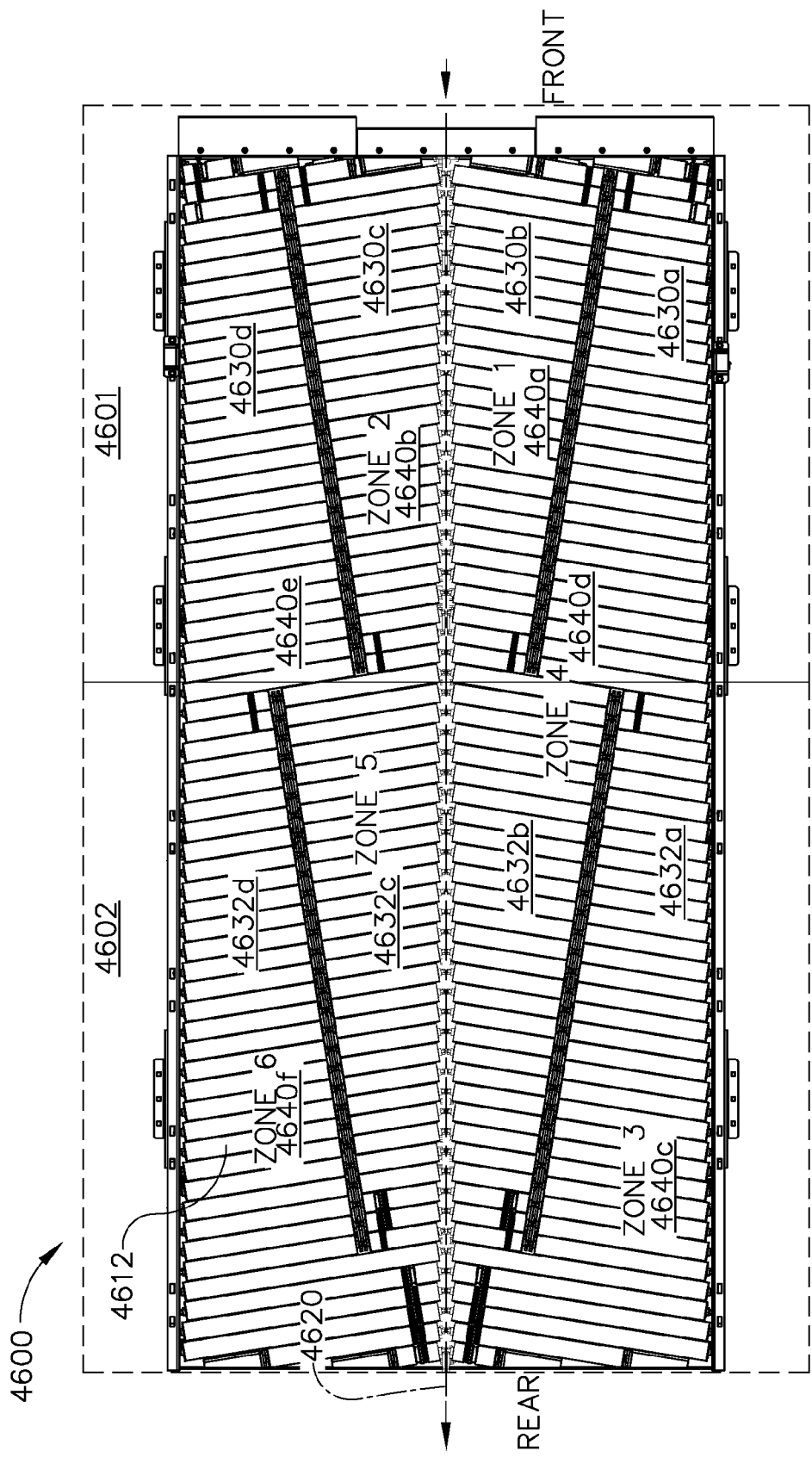
FIG. 46 is a top view diagram illustrating various zones of a herringbone-type central descrambler according to various embodiments.

FIG. 46 illustrates various zones of a herringbone-type central descrambler 4600 portion of a conveyor system configured to mount onto a mobile body of a robotic carton unloader as described above. In some embodiments, the herringbone-type central descrambler 4600 may include a center conveyor 4601 (or center conveyor section) and a rear conveyor 4602 (or rear conveyor section).

Conveyor rollers 4612 may be configured in rows and zones to bias items (e.g., cartons, boxes, etc.) being moved by the herringbone-type central descrambler 4600. In particular, the conveyor rollers 4612 may be aligned (or angled) to cause items to be carried inward towards a center line 4620 of the herringbone-type central descrambler 4600, and to separate or singulate the items. The center line 4620 may bisect the herringbone-type central descrambler 4600 lengthwise along the direction of movement of the items. For example, when the herringbone-type central descrambler 4600 comprises both the center conveyor 4601 and the rear conveyor 4602, both the center conveyor 4601 and rear conveyor 4602 may be bisected lengthwise by the center line 4620.

Conveyor rollers 4612 may be skewed at angles relative to the center line 4620 to create nested chevrons of conveyor rollers extending front to rear along the center line 4620. In some embodiments, each chevron may comprise four conveyor rollers with two coaxial conveyor rollers extending at a skew angle from each side of the center line 4620 as shown. Each skew angle may comprise about 81 degrees from center line 4620.

Further, each conveyor roller in a chevron may belong to a row of skewed conveyor rollers extending generally lengthwise and parallel to the center line 4620. In particular, the skewed conveyor rollers of the center conveyor 4601 may comprise rows 4630a, 4630b, 4630c, 4630d as shown. Inner rows 4630b, 4630c may comprise inside rows extending from both sides of the center line 4620, and outer rows 4630a, 4630d may comprise exterior rows located outside of the inner rows 4630b, 4630c. The skewed conveyor rollers of the rear conveyor 4602 may comprise chevrons that nest within the chevrons of the center conveyor 4601 and may comprise rows 4632a-4632d extending generally lengthwise and parallel to the center line 4620. Inner rows 4632b, 4632c may comprise inner rows adjacent to center line 4620 and outer rows 4632a, 4632d may comprise exterior rows on the outside thereof. Each of the rows 4632a, 4632b, 4632c, and 4632d may align lengthwise with the rows 4630a, 4630b, 4630c, 4630d. For example, a first row 4630a and second row 4632a may align lengthwise.

The nested chevron orientation of the skewed conveyor rollers may bias items (e.g., boxes, cartons, etc.) being propelled on the herringbone-type central descrambler 4600 inwards towards the center line 4620. When items pass across the center line 4620 and contact conveyor rollers 4612 on the other side, the items may be biased back towards the center line 4620. The path of an item being propelled on the herringbone-type central descrambler 4600 may weave back and forth across the center line 4620. To unscramble and singulate such items, the conveyor rollers 4612 may be driven as zones 4640a-4640f of conveyor rollers running at different speeds. Each zone 4640a-4640f of conveyor rollers may be driven by a different motor, and each motor may be a variable speed motor that may be set to run at a speed that may be different than other motors. In some embodiments, the herringbone-type central descrambler 4600 may comprise six different zones 4640a-4640f of conveyor rollers 4612, with three zones on either side of the center line 4620, with each zone driven by a different motor and having different velocities.

Figure 47:
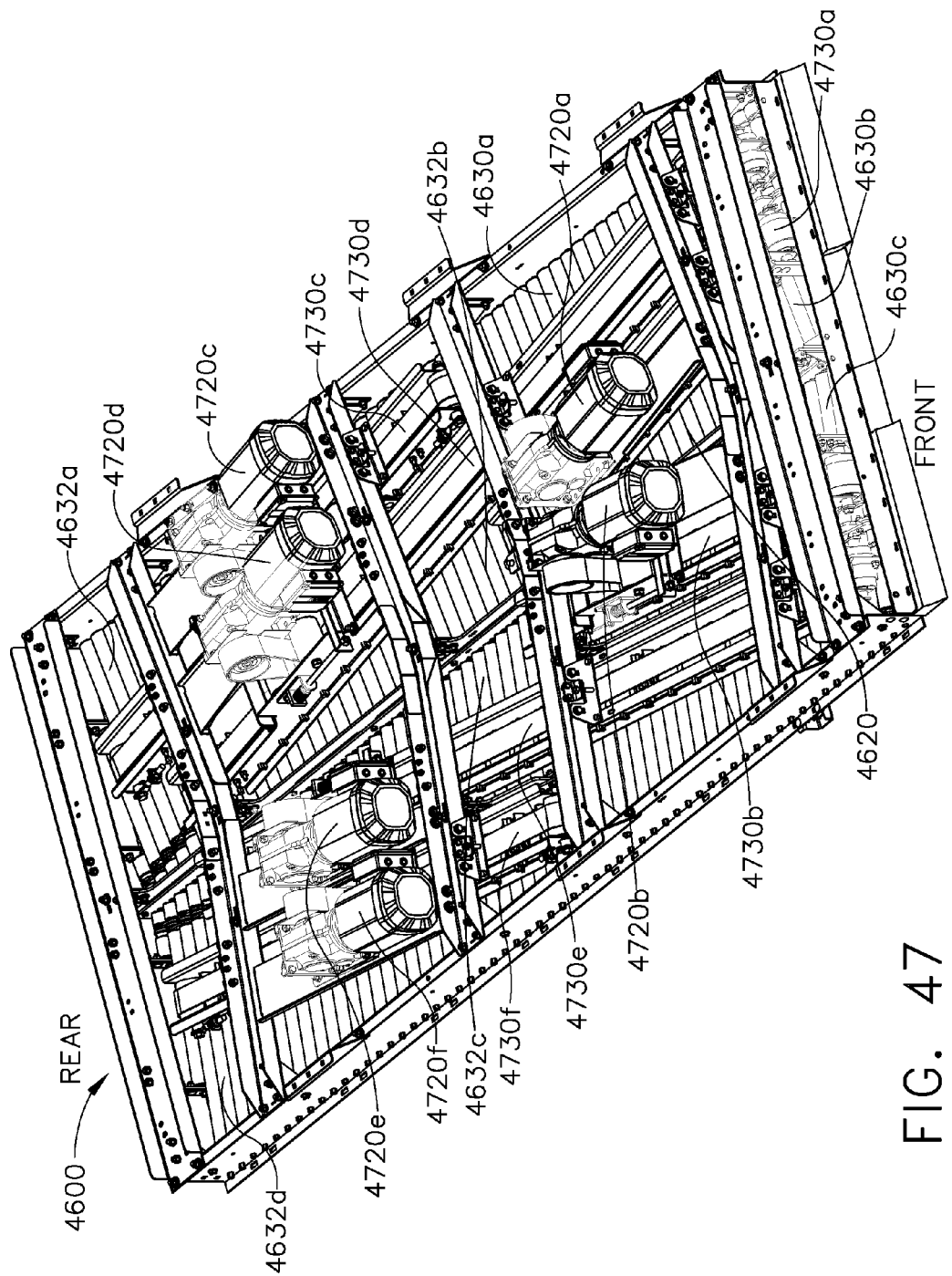
FIG. 47 is diagram illustrating a bottom view of a herringbone-type central descrambler according to various embodiments.

FIG. 47 illustrates a bottom view of an embodiment herringbone-type central descrambler 4600 portion of a conveyor system configured to mount onto a mobile body of a robotic carton unloader as described above. The herringbone-type central descrambler 4600 may comprise six different motors 4720a-4720f. Each motor 4720a-4720f may drive one of belts 4730a-4730f (or drive belts), and each belt 4730a-4730f may contact and drive one of the six zones of conveyor rollers, as described above with reference to FIG. 46. Each zone of conveyor rollers may comprise one or more rows, such as described above. Each motor 4720a-4720f may run at a selected speed that may be different than another motor, and thus each zone of conveyor rollers may run at a different speed.

The following is an illustration of exemplary movement speeds associated with various motors, rows of rollers, and zones described in FIGS. 46-47. The description below of rows of rollers, zones, and speeds are meant to be examples, and thus are not intended to limit the various embodiments. A first motor 4720a may drive a first belt 4730a that contacts and drives the second row 4630b of rollers that may comprise the first zone 4640a of conveyor rollers. In some embodiments, the first motor 4720a may cause items (e.g., boxes, cartons, etc.) to be moved at a first speed, such as at about 185 feet per minute. A second motor 4720b may drive a second belt 4730b that contacts and drives the third row 4630c of rollers that may comprise the second zone 4640b of conveyor rollers. In some embodiments, the second motor 4720b may cause items (e.g., boxes, cartons, etc.) to be moved at a second speed, such as at about 466 feet per minute. A third motor 4720c may drive a belt 4730c and the fifth row 4632a of rollers that may comprise a third zone 4640c of conveyor rollers. In some embodiments, the third motor 4720c may cause items (e.g., boxes, cartons, etc.) to be moved at a third speed, such as at about 276 feet per minute. A fourth motor 4720d may drive a belt 4730d that may contact and drive both the first row 4630a of rollers and the sixth row 4632b of rollers that may comprise a fourth zone 4640d of conveyor rollers. In some embodiments, the fourth motor 4720d may cause items to be moved at a fourth speed of about 556 feet per minute. The fifth motor 4720e may drive a belt 4730e which can contact and drive the fourth row 4630d of rollers and the seventh row 4632c of rollers that may comprise the fifth zone 4640e of conveyor rollers. In some embodiments, the fifth motor 4720e may cause items to be moved at a fifth speed of about 556 feet per minute. The sixth motor 4720f may drive a belt 4730f and the eighth row 4632d of rollers that define the sixth zone 4640f of conveyor rollers. In some embodiments, the sixth motor 4720f may cause items to be moved at a sixth speed of about 276 feet per minute.

The differences in velocities between the second row 4630b of rollers having a velocity of 185 feet per second and the third row 4630c having a velocity of 466 feet per second means that items (e.g., cartons) traveling on top of the third row 4630c of rollers (i.e., within the second zone 4640b) may pull ahead of items moving in the first zone 4640a on the second row 4630b of rollers moving at 185 feet per second. Additionally, the differences in speeds between the first zone 4640a and second zone 4640b may induce initial side-to-side turning in items that move across the center line 4620.

As the fifth zone 4640e and the fourth zone 4640d may be configured to move at the fastest velocity (e.g., about 566 feet per minute) and can speed up the slower moving items (e.g., cartons) incoming from the first and second zones 4640a, 4640b, these zones 4640d, 4640e may be capable of pulling gaps between incoming items, and may rotate rectangular items to lead with the narrow face.

The third zone 4640c and sixth zone 4640f may discharge items (e.g., boxes, cartons) from the conveyor system, and may be short sections operating at a slower speed to induce items to turn toward the center line 4620. Both the third zone 4640c and sixth zone 4640f may move at the same speed of about 278 feet per minute and receive items moving at about 566 feet per minute which promotes turning.

FIGS. 48A-48D illustrate exemplary roller speeds for various motors associated with zones of embodiment herringbone-type central descramblers 4800, 4850 utilizing variable speed electric motors to drive belts. In some embodiments, each zone of the embodiment herringbone-type central descramblers 4800, 4850 may have an independent side-mounted variable frequency drive (VFD)-driven hollow shaft mounted reducers sized for a base speed of 500 feet per minute (FPM). Such sizing may allow for a common design, easily replaceable parts, and significant future speed variations. In some embodiments, each motor of the herringbone-type central descramblers 4800, 4850 may be associated with an individual VFD capable of reversing direction and varying speed of belts associated with the motors. In some embodiments, the motors may be configured to run in forward or reverse directions. In some embodiments, the herringbone-type central descramblers 4800, 4850 may be set with (low) outside flanges back to back as verti-belt flanges are at roller height.

Figure 48A:
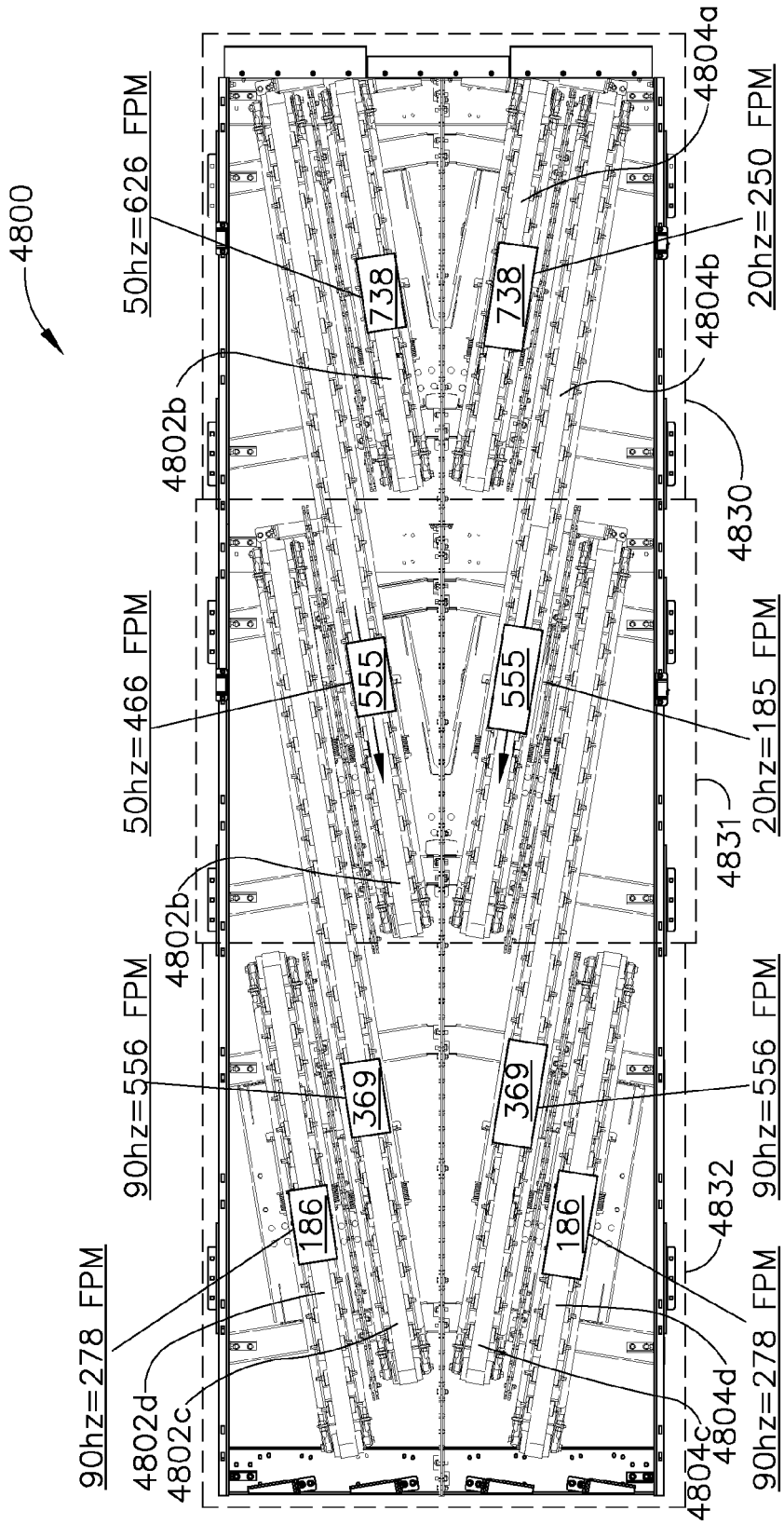
FIGS. 48A-48D are top views illustrating various roller speeds associated with sections of a herringbone-type central descrambler according to various embodiments.
Figure 48B:
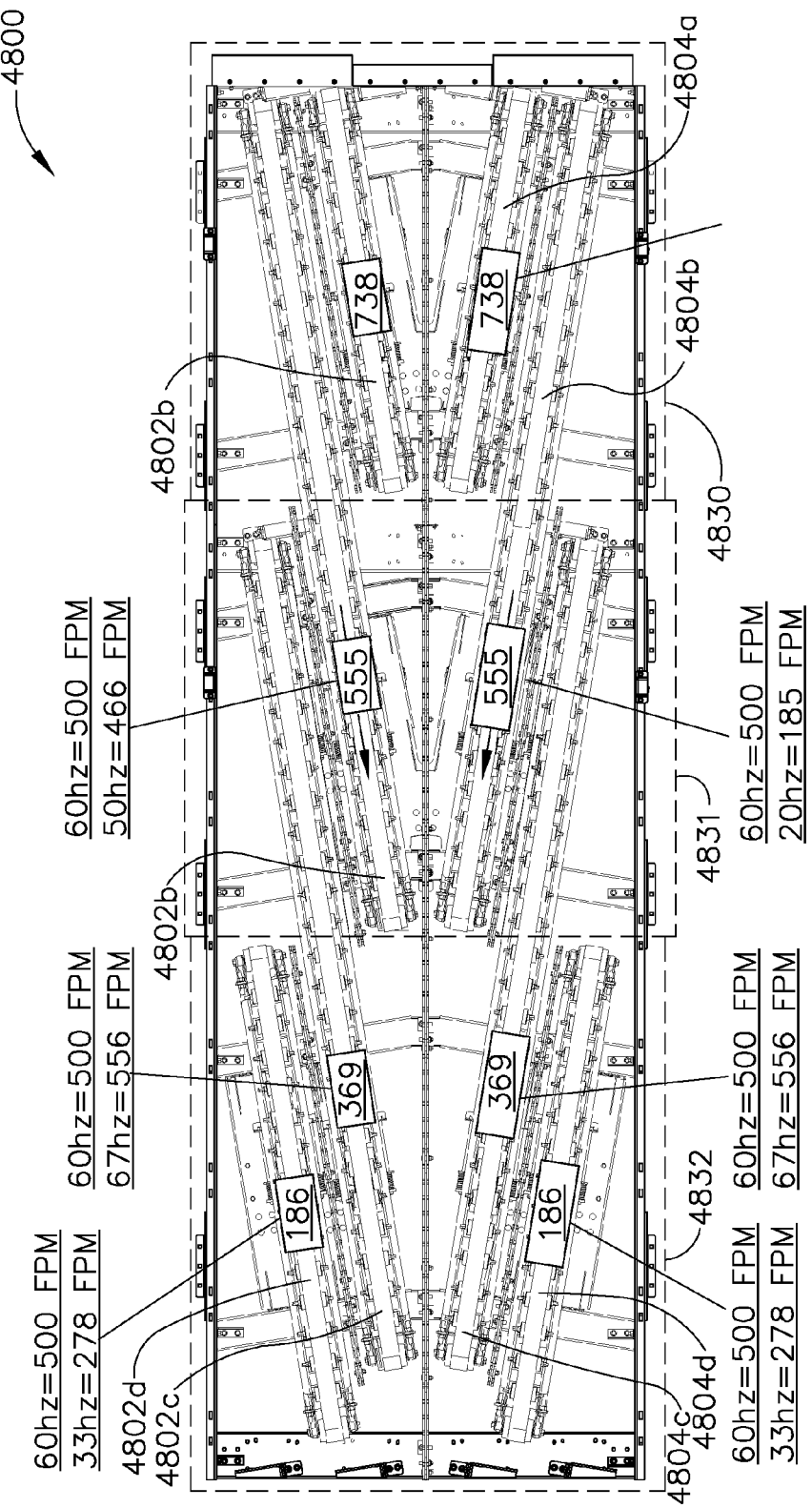

In some embodiments, electric motors of the herringbone-type central descramblers 4800, 4850 may be configured to run at different levels, such as indicated by 'hz' (hertz) in FIGS. 48A-48B. Different levels may cause the respective belts to run at different speeds, and thus the items on top of the rollers associated with the belts to move along the herringbone-type central descramblers 4800, 4850 at different speeds. Further, motors on one side (left-hand side (LHS) or right-hand side (RHS)) may be configured to run at higher levels than the other side in order to induce initial side-by-side turning of items being moved on the belts of the herringbone-type central descramblers 4800, 4850. Different LHS and RHS speeds of belts may induce initial side-by-side turning of items.

In some embodiments, and as shown in FIGS. 48A-48B, the embodiment herringbone-type central descrambler 4800 may be comprised of three or more zones (or sections), such as three sections within a 54 inch (width)×123 inch (length) unibody frame. In particular, the embodiment herringbone-type central descrambler 4800 may utilize a short "infeed" (or front) section 4830 that utilizes different speeds on the LHS and RHS. For example, a RHS motor may be configured to cause a 466 FPM out of 500 FPM (or approximately 93.2% of a base FPM) based on 57 hz, and a LHS motor may be configured to cause a 185 FPM out of 500 FPM (or approximately 37% of a base FPM) based on 22 hz. Further, the herringbone-type central descrambler 4800 may utilize a long belt second section 4831 that occurs after the short infeed section 4830 in order to cause significant speed-up in order to pull gaps needed for narrow face leading. For example, both RHS and LHS motors in the second section 4831 may be configured to cause a 556 FPM out of 500 FPM (or approximately 111% of a base FPM) based on 67 hz. Further, the herringbone-type central descrambler 4800 may include a final discharge section 4832 that operates at slower speeds and that occurs after the long belt second sections 4831 in order to induce turning of items toward the center of the herringbone-type central descrambler 4800. For example, both RHS and LHS motors in the discharge section 4832 may be configured to cause a 278 FPM out of 500 FPM (or approximately 55.6% of a base FPM) based on 33 hz.

The following is an illustration of exemplary different speeds for LHS and RHS belts of the embodiment herringbone-type central descrambler 4800 as shown in FIG. 48A. A first RHS motor may run at 50 hz in and move its associated belt 4802a at 626 FPM, a second RHS motor may run at 50 hz and move its associated belt 4802b at 466 FPM, a third RHS motor may run at 90 hz and move its associated belt 4802c at 556 FPM, and a fourth RHS motor may run at 90 hz and move its associated belt 4802d at 278 FPM. A first LHS motor may run at 20 hz and move its associated belt 4804a at 250 FPM, a second LHS motor may run at 20 hz and move its associated belt 4804b at 185 FPM, a third LHS motor may run at 90 hz and move its associated belt 4804c at 556 FPM, and a fourth LHS motor may run at 90 hz and move its associated belt 4804d at 278 FPM.

The following is another illustration of exemplary different speeds for LHS and RHS belts of the embodiment herringbone-type central descrambler 4800 as shown in FIG. 48B. A second RHS motor may run at 60 hz and move its associated belt 4802b at 500 FPM or the second RHS motor may run at 50 hz and move its associated belt 4802b at 466 FPM, a third RHS motor may run at 60 hz and move its associated belt 4802c at 500 FPM or the third RHS motor may run at 67 hz and move its associated belt 4802c at 556 FPM, and a fourth RHS motor may run at 60 hz and move its associated belt 4802d at 500 FPM or the fourth RHS motor may run at 33 hz and move its associated belt 4802d at 278 FPM. A second LHS motor may run at 60 hz and move its associated belt 4804b at 500 FPM or the second LHS motor may run at 20 hz and move its associated belt 4804b at 185 FPM, a third LHS motor may run at 60 hz and move its associated belt 4804c at 500 FPM or the third LHS motor may run at 67 hz and move its associated belt 4804c at 556 FPM, and a fourth LHS motor may run at 60 hz and move its associated belt 4804d at 500 FPM or the fourth LHS motor may run at 33 hz and move its associated belt 4804d at 278 FPM.

Figure 48C:
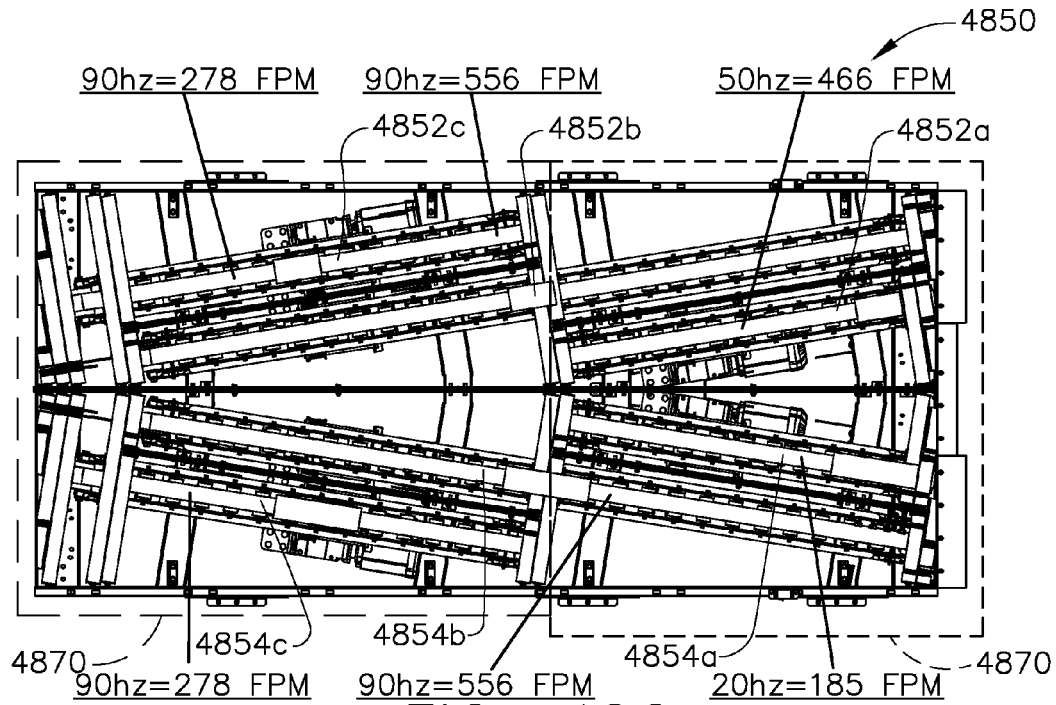
Figure 48D:
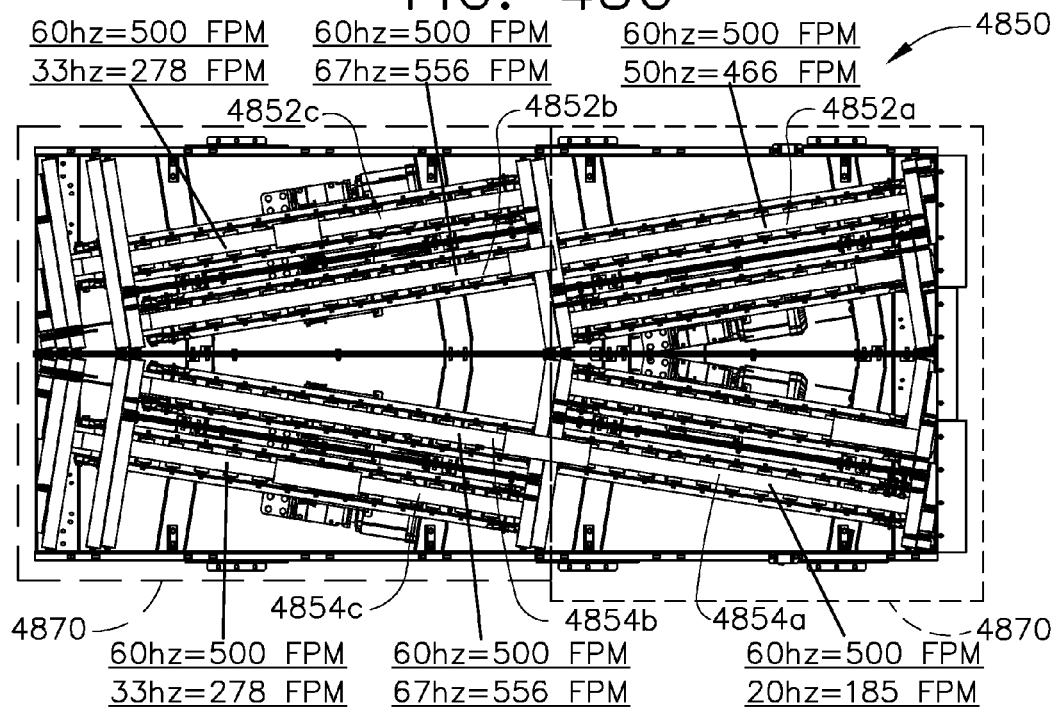

FIGS. 48C-48D illustrate simplified schematic drawings of the embodiment herringbone-type central descrambler 4850 (i.e., the drawings are simplified by not depicting roller and motor covers). The herringbone-type central descrambler 4850 shown in FIGS. 48C-48D may be comprised of two standard 28 inch (width)×15 foot (length) mini-unscramblers or sections. In particular, the embodiment herringbone-type central descrambler 4850 may utilize a first section 4870 and a second section 4872 that occurs after the first section 4870.

The following is an illustration of exemplary different speeds for LHS and RHS belts of the embodiment herringbone-type central descrambler 4850 as shown in FIG. 48C. A first RHS motor may run at 50 hz and move its associated belt 4852a at 466 FPM, a second RHS motor may run at 90 hz and move its associated belt 4852b at 556 FPM, and a third RHS motor may run at 90 hz and move its associated belt 4852c at 278 FPM. A first LHS motor may run at 20 hz and move its associated belt 4854a at 185 FPM, a second LHS motor may run at 90 hz and move its associated belt 4854b at 556 FPM, and a third LHS motor may run at 90 hz and move its associated belt 4854c at 278 FPM.

The following is another illustration of different speeds for LHS and RHS belts of the embodiment herringbone-type central descrambler 4850 as shown in FIG. 48D. A first RHS motor may run at 60 hz and move its associated belt 4852a at 500 FPM or the first RHS motor may run at 50 hz and move its associated belt 4852a at 466 FPM, a second RHS motor may run at 60 hz and move its associated belt 4852b at 500 FPM or the second RHS motor may run at 67 hz and move its associated belt 4852*b* at 556 FPM, and a third RHS motor may run at 60 hz and move its associated belt 4852*c* at 500 FPM or the third RHS motor may run at 33 hz and move its associated belt 4852*c* at 278 FPM. A first LHS motor may run at 60 hz and move its associated belt 4854*a* at 500 FPM or the first LHS motor may run at 20 hz and move its associated belt 4854*a* at 185 FPM, a second LHS motor may run at 60 hz and move its associated belt 4854*b* at 500 FPM or the second LHS motor may run at 67 hz and move its associated belt 4854*b* at 556 FPM, and a third LHS motor may run at 60 hz and move its associated belt 4854*c* at 500 FPM or the third LHS motor may run at 33 hz and move its associated belt 4854*c* at 278 FPM.

Figure 49:
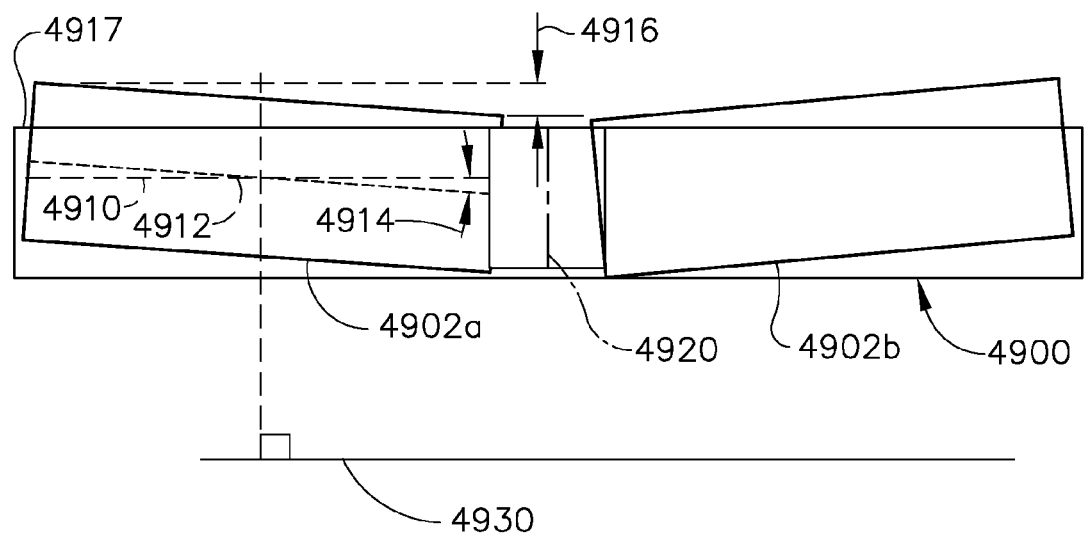
FIG. 49 is diagram illustrating a perspective view of a mid-section of a herringbone-type central descrambler according to various embodiments.

In some embodiments, the various rows of rollers of a herringbone-type central descrambler of a robotic carton unloader's conveyor system may include rollers that are angled (or sloped inward) so that their horizontal axes are not parallel with the floor of an unloading area (e.g., the floor of a truck trailer). Such angled rollers may promote the movement of items (e.g., cartons) toward the center of the conveyor system, thus improving descrambling efforts. FIG. 49 illustrates angled rollers 4902*a*, 4902*b* of an embodiment herringbone-type central descrambler 4900. As described above, the rollers 4902*a*, 4902*b* may be joined in the center at a center line 4920 that bisects the herringbone-type central descrambler 4900 lengthwise. The rollers 4902*a*, 4902*b* may be angled so that their axes are not parallel with a ground plane 4930. For example, the first roller 4902*a* may be angled on an axis 4912 that is rotated a number of degrees (shown as angle 'a' 4914) from another axis 4910 parallel with the ground plane 4930. Due to the angled configuration, the rollers 4902*a*, 4902*b* may have an outer height (i.e., a height near the outer edge 4917 of the herringbone-type central descrambler 4900) that is greater than their inner height (i.e., height at the center line 4920 of the herringbone-type central descrambler 4900). Such a height difference is illustrated with the distance 4916 ('h' in FIG. 49), indicating that the outer height of the first roller 4902*a* is greater than the inner height of the first roller 4902*a*. In some embodiments, such a height difference may be approximately ¾ of an inch. In some embodiments, items (e.g., cartons, boxes) may spin (or pinwheel) more when rollers of the herringbone-type central descrambler 4900 are not sloped (i.e., the rollers are flat).

FIGS. 50A-59D address embodiment front-end descramblers of robotic carton unloaders. As described above, in various embodiments, a robotic carton unloader may include front-end descrambler components that may be used to move items (e.g., cartons, boxes, etc.) towards the center of the conveyer system (e.g., to a herringbone-type central conveyer) of the robotic carton unloader for further processing, such as singulation and descrambling. Such front-end descramblers may also be configured to cause items to be moved, descrambled, and singulated. For example, when a series of boxes are placed on a front-end descrambler, the movement of the rollers and/or belts of the front-end descrambler may cause a wide spread of the boxes to be narrowed or moved toward the middle rows of the front-end descrambler (i.e., descrambling), as well as cause separations or gaps to be placed in between the boxes (i.e., singulation).

In various embodiments, the front-end descramblers may utilize different speeds (or singulator speeds) for each of its different rows. For example, center rows may be moved at high speeds to pull center items (e.g., boxes, cartons) to the front of the pack to make room for items moving up the outer rows (or wings) and onto the center rows. In this way, a line of items (e.g., boxes) may move from front to rear of the front-end descrambler in an alignment resembling a 'V' formation of flying birds.

In various embodiments, an embodiment front-end descrambler may include light-weight plastic belts positioned on the front-end descrambler on a plurality of parallel rows (e.g., five rows) that are configured to drive items placed on top of them to move toward the center of the conveyor system of a robotic carton unloader.

In some embodiments, the front-end descrambler may be configured with adjustable outer rows (or wings) that may be rotated (or folded) up or down at various angles about pivots. For example, the outer-most rows of the front-end descrambler may be folded up into a "U" shape. Such rotations of the outer rows (or wings) may enable better or more convenient placement of the front-end loader in installation sites of various widths and characteristics (e.g., different width truck trailers). Further, such rotations of the outer rows or wings may allow the outer rows to be rotated into a close positioning (e.g., touching) of side walls of truck trailers, enabling the outer rows to act as shields that may catch and then move falling items (e.g., boxes, cartons, etc.).

In some embodiments, the outer rows (or wings) of embodiment front-end descramblers may each include a section of belting that is followed by a portion of plastic sheeting with rollers mounted therein. Such rollers within the plastic sheeting may be held at an angle configured to guide items (e.g., cartons) towards the center rows or belts of the front-end descrambler (e.g., the center three of five rows). Further, such rollers may be powered by rollers mounted beneath the plastic sheeting that rotate on a front-to-rear axis parallel to the angled surface.

Figure 50A:
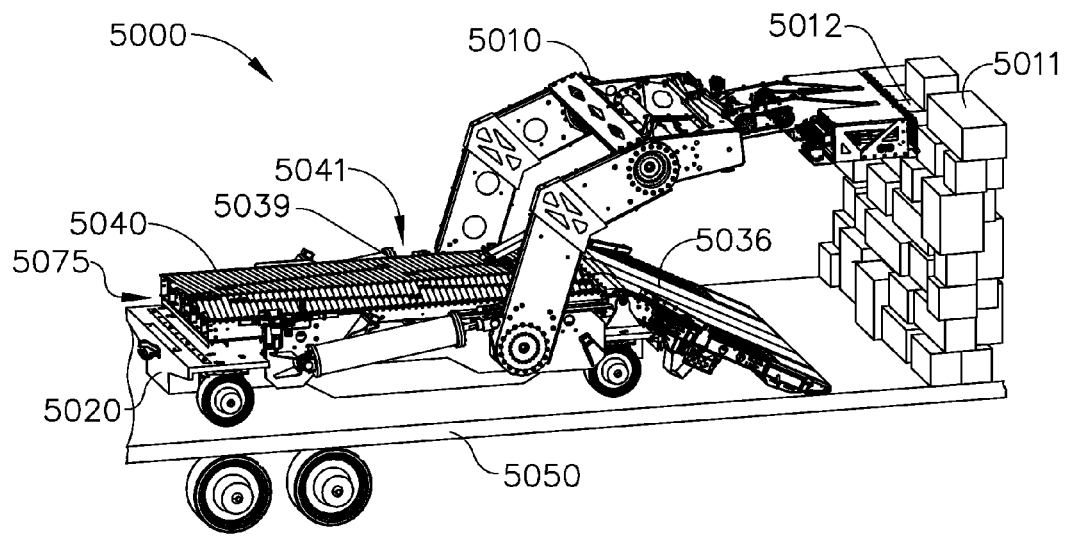
FIGS. 50A-50B are diagrams illustrating perspective views of a robotic carton unloader equipped with a front-end descrambler of a conveyor system according to various embodiments.
Figure 50B:
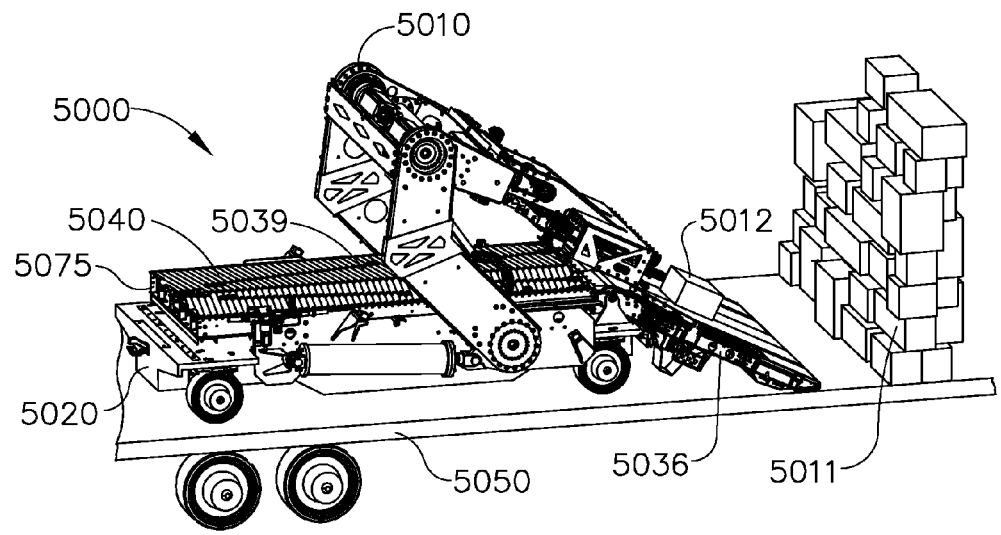

FIGS. 50A-50B illustrate a robotic carton unloader 5000 in various operations for retrieving items 5012 (e.g., boxes) from a loading area (e.g., from a wall of boxes 5011 within a truck trailer 5050, etc.). As described above, the robotic carton unloader 5000 may include a vehicle or mobile body 5020, a robotic arm 5010 (or robotic carton retrieval arm), and a conveyor system 5075. Further, the conveyor system 5075 may include a front-end descrambler 5036 connected to a central descrambler 5041 (or herringbone-type central descrambler) that includes a center conveyer 5039 and a rear conveyor 5040. In various embodiments, the front-end descrambler 5036 may include a plurality of parallel rows of belts or sets of rollers configured to cause items 5012 to be moved toward the center conveyer 5039. For example, the front-end descrambler 5036 may include five rows of driven light-weight plastic belts. In some embodiments, the outer-most rows of the front-end descrambler 5036 may be configured to rotate as described below, or alternatively may be fixed.

The front-end descrambler 5036 and/or the central descrambler 5041 may utilize or operate as mini-descramblers (or mini-unscramblers) to receive a bulk mass of items 5012 (e.g., boxes) thereon and separate and singulate the items 5012 as they move front-to-rear along the conveyor system 5075. As shown, the center conveyer 5039 and rear conveyor 5040 may comprise two or more sections of side-by-side roller conveyors that form mini-descramblers (or mini-unscramblers). FIG. 50B shows the robotic arm 5010 (or carton retrieval arm) of the robotic carton unloader 5000 releasing an item 5012 (e.g., a box or carton) onto the front-end descrambler 5036 of the conveyor system 5075.

Figure 51:
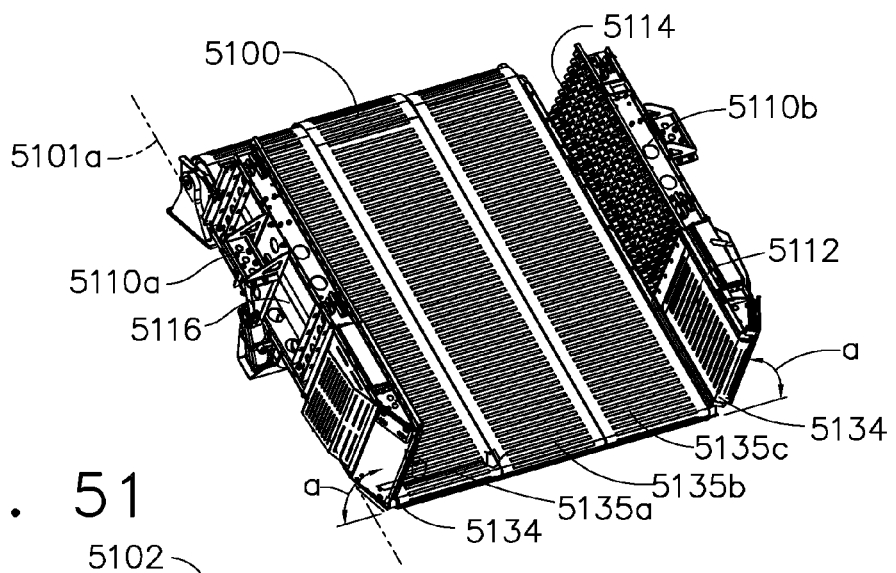
FIGS. 51-53 are diagrams illustrating perspective views of a front-end descrambler of a robotic carton unloader having wings (or outer rows) in various states of rotation (or folding) according to various embodiments.
Figure 52:
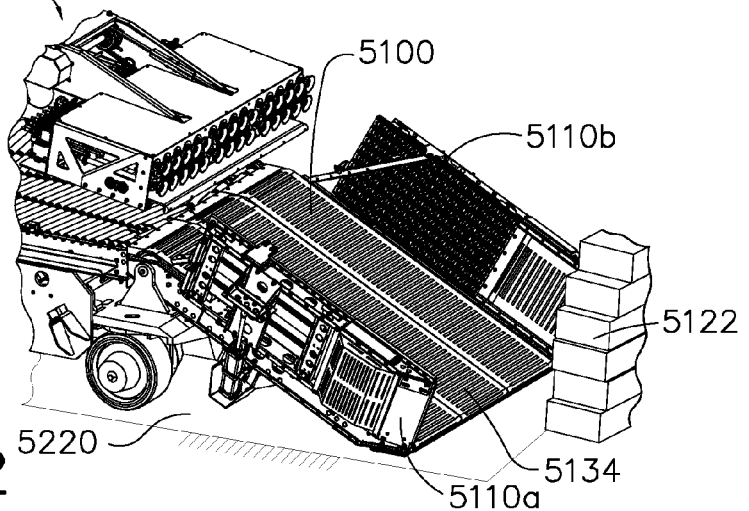
Figure 53:
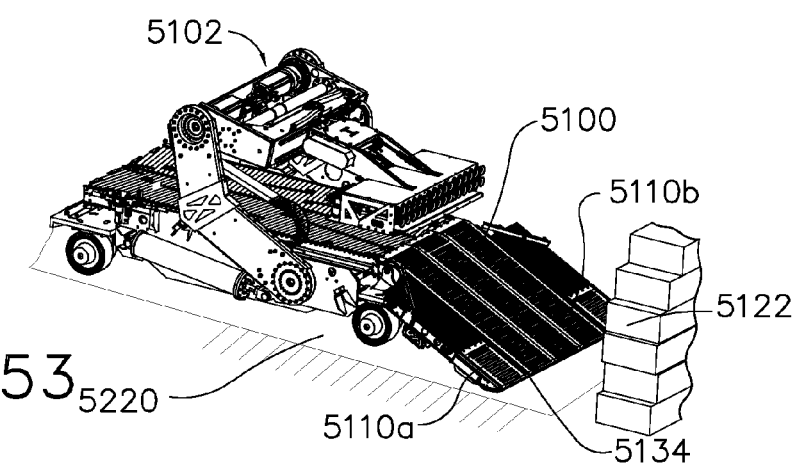

FIGS. 51-53 illustrate various views of an embodiment front-end descrambler 5100 of a conveyor system of a robotic carton unloader 5102, the front-end descrambler 5100 having outer rows (or wings) 5110*a*, 5110*b*) capable of being placed (or folded) in various angles. As shown in FIG. 51, the front-end descrambler 5100 may comprise a middle portion 5134, a left wing 5110a, and a right wing 5110b. The wings 5110a, 5110b may be pivotally attached to the middle portion 5134. In particular, the left wing 5110a may individually rotate on a first axis 5101a parallel to inner rows 5135a-5135c, and the right wing 5110b may individually rotate on a second axis 5101b parallel to the inner rows 5135a-5135c. Such pivot attachments may enable the wings 5110a, 5110b to be rotated in various angles, such as shown in FIG. 51 as an angle a (e.g., 10 degrees, 15 degrees, 45 degrees, etc.). In some embodiments, the individual wings 5110a, 5110b may be rotated in different angles from each other.

In FIG. 51 and FIG. 52, the left wing 5110a and right wing 5110b are shown pivoted up (or rotated up) relative to the middle portion 5134 so that the front-end descrambler 5100 of the robotic carton unloader 5102 has a "u" shape and a narrower cross width. In other words, when pivoted up, the front-end descrambler 5100 may be narrower, enabling the robotic carton unloader 5102 to pull into more narrow unloading areas (e.g., a truck trailer 5220, etc.) in order to unload items 5122 (e.g., boxes, cartons, etc.).

The middle portion 5134 may be comprised of a plurality of rows of rollers or conveyor belts configured to move items in a direction towards the central descrambler of the conveyor system of the robotic carton unloader 5102. For example, the middle portion 5134 may include three inner rows 5135a, 5135b, 5135c of parallel belts. Additionally, each wing 5110a, 5110b may include individual rows of rollers or conveyor belts. For example, as shown in FIG. 51, the right wing 5110b may include a belt 5112 and the left wing 5110a may include a belt, each capable of moving items toward the center of the conveyor system of the robotic carton unloader 5102. In some embodiments, the wings 5110a, 5110b may include sections of wheeled belting that may be attached to the wings 5110a, 5110b downstream from their associated belts. For example, a section of wheeled belting may be downstream from the belt of the left wing 5110a, and another section of wheeled belting 5114 may be downstream from the belt 5112 of the right wing 5110b. The wheels in the sections of wheeled belting, such as belting 5114, may be driven by rollers mounted beneath the left and right belts. For example, rollers 5116 to drive the belt of the left wing 5110a may be mounted underneath the left wing 5110a. Wheeled belting, such as 5114, may include wheels mounted therein that are oriented to drive items (e.g., cartons, boxes, etc.) placed thereon towards the middle portion 5134. In some embodiments, such wheeled belting, such as 5114, may be Intralox belting.

FIG. 53 illustrates the front-end descrambler 5100 with a plurality of rows oriented on a common plane. In other words, the wings 5110a, 5110b may be rotated down (or not rotated up from a default position) such that they are on the same plane as the middle portion 5134. Such a case may occur when the robotic carton unloader 5102 has driven into position in a truck trailer 5220 and the left wing 5110a and right wing 5110b are folded down to a wide position. The wide position may cause the left wing 5110a and/or the right wing 5110b to touch a side wall(s) of the truck trailer 5220. This may be beneficial as, when the left wing 5110a and right wing 5110b are folded down, they may create a large item (e.g., carton, box, etc.) catch area for an unloading process.

Figure 54A:
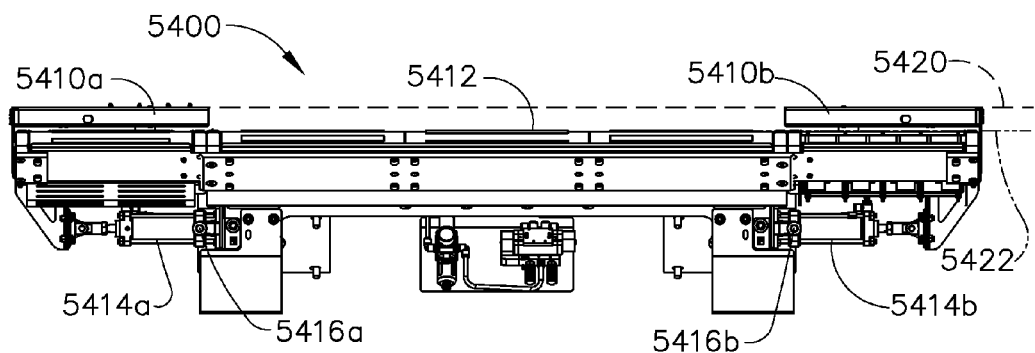
FIGS. 54A-54C are diagrams illustrating front views of a front-end descrambler of a robotic carton unloader having wings (or outer rows) in various states of rotation (or folding) according to various embodiments.
Figure 54B:
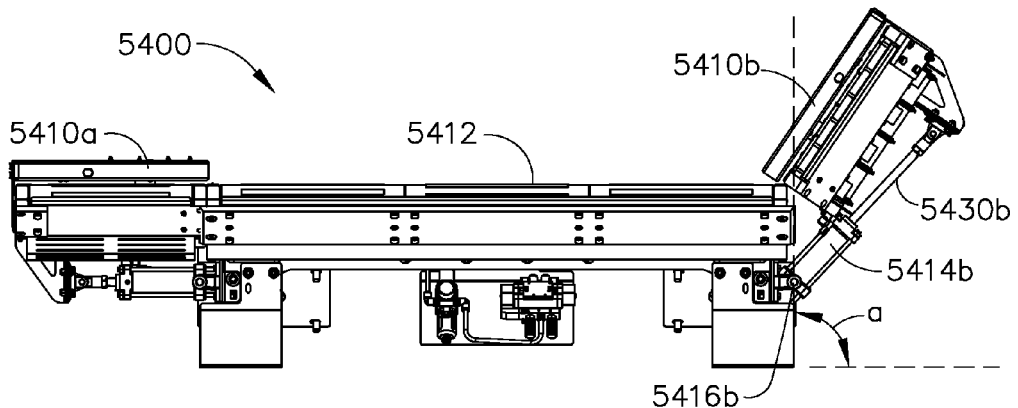
Figure 54C:
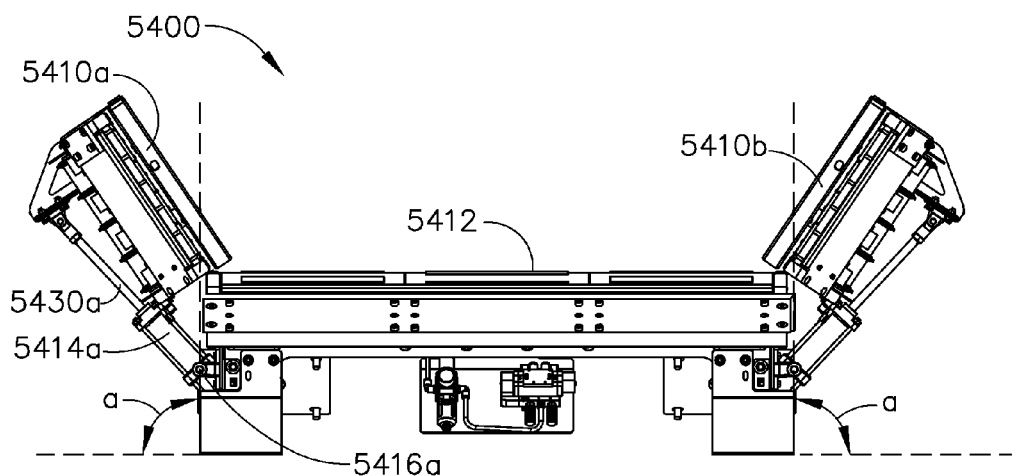

FIGS. 54A-54C show side views of a front-end descrambler 5400 of a robotic carton unloader having wings 5410a, 5410b in various states of rotation (or folding) around pivots. FIG. 54A shows the wings 5410a, 5410b in a non-rotated (or unfolded) state such that the wings 5410a, 5410b share a common plane 5420. Further, the common plane 5420 may be parallel with another plane 5422 associated with a middle portion 5412. In other words, the surfaces of the wings 5410a, 5410b and the rows of the middle portion 5412 may be parallel with one another.

In various embodiments, the wings 5410a, 5410b may be attached to various units 5414a, 5414b (e.g., hydraulic cylinders, etc.) configured to cause the wings 5410a, 5410b to rotate up or down on pivots 5416a, 5416b, respectively. FIG. 54B shows such a rotation of the right wing 5410b. For example, the unit 5414b may extend a piston, rod, or other included cylinder 5430b, causing both the unit 5414b and the right wing 5410b to rotate upward about the pivot 5416b. Such a rotation is shown in FIG. 54B as angle a. FIG. 54C shows such an additional rotation of the left wing 5410a. For example, the unit 5414a for the left wing 5410a may extend a piston or other included cylinder 5430a, causing both the unit 5414a and the left wing 5410a to rotate upward about the pivot 5416a. Such a rotation is shown in FIG. 54C as angle a' which may or may not be equal to angle a for the right wing 5410b as shown in FIG. B.

Figure 55A:
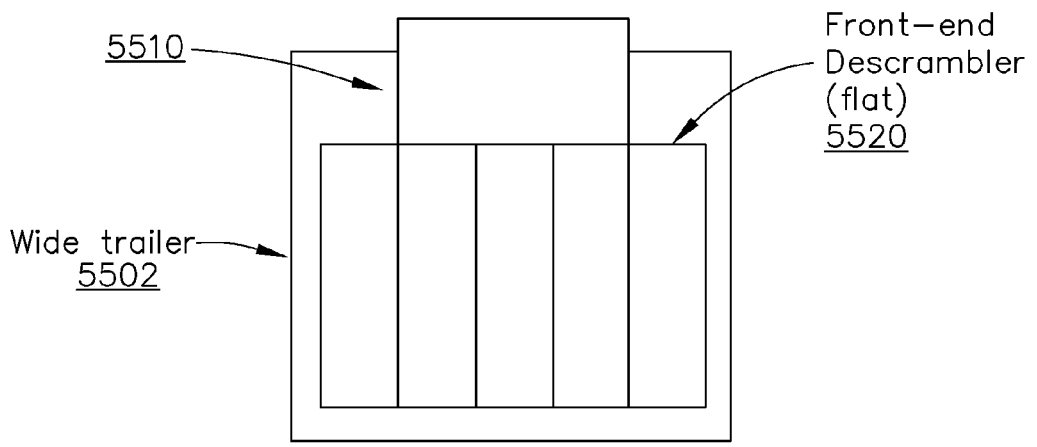
FIGS. 55A-55C are perspective diagrams illustrating a front-end descrambler of a robotic carton unloader used within different truck trailers of various widths according to various embodiments.
Figure 55B:
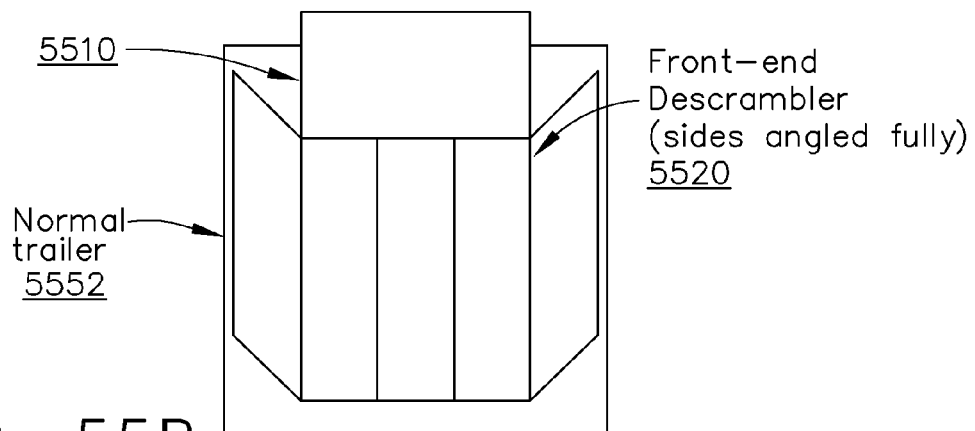
Figure 55C:
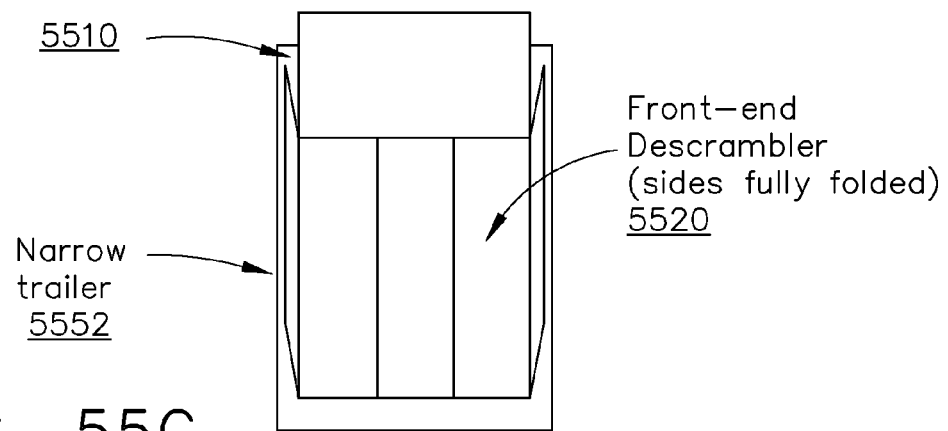

FIGS. 55A-55C illustrate an embodiment front-end descrambler 5520 of a conveyor system 5510 of a robotic carton unloader used within different truck trailers 5502, 5532, 5552 of various widths. As described above, the wings (or outer rows/sides) of the front-end descrambler 5520 may be rotated (or folded) up or down, such as in response to an extension (or retraction) of a hydraulic cylinder. Such folding may enable the front-end descrambler 5520 to enter spaces of various widths, allowing the robotic carton unloader to be useful in multiple unloading areas, such as by being capable of moving inside of differently-sized semi-trailers. FIG. 55A illustrates the front-end descrambler 5520 in a flattened (or unfolded) state within a wide truck trailer 5502 (e.g., a trailer having a cross width greater than an average truck trailer used for shipping cargo/items, etc.). FIG. 55B illustrates the front-end descrambler 5520 in a partially folded state within an average or normal-width truck trailer 5532 (e.g., a trailer having an average or standard cross width used for shipping cargo/items, etc.). FIG. 55C illustrates the front-end descrambler 5520 in a fully folded state within a narrow truck trailer 5552 (e.g., a trailer having a cross width smaller than an average truck trailer used for shipping cargo/items, etc.).

Figure 56:
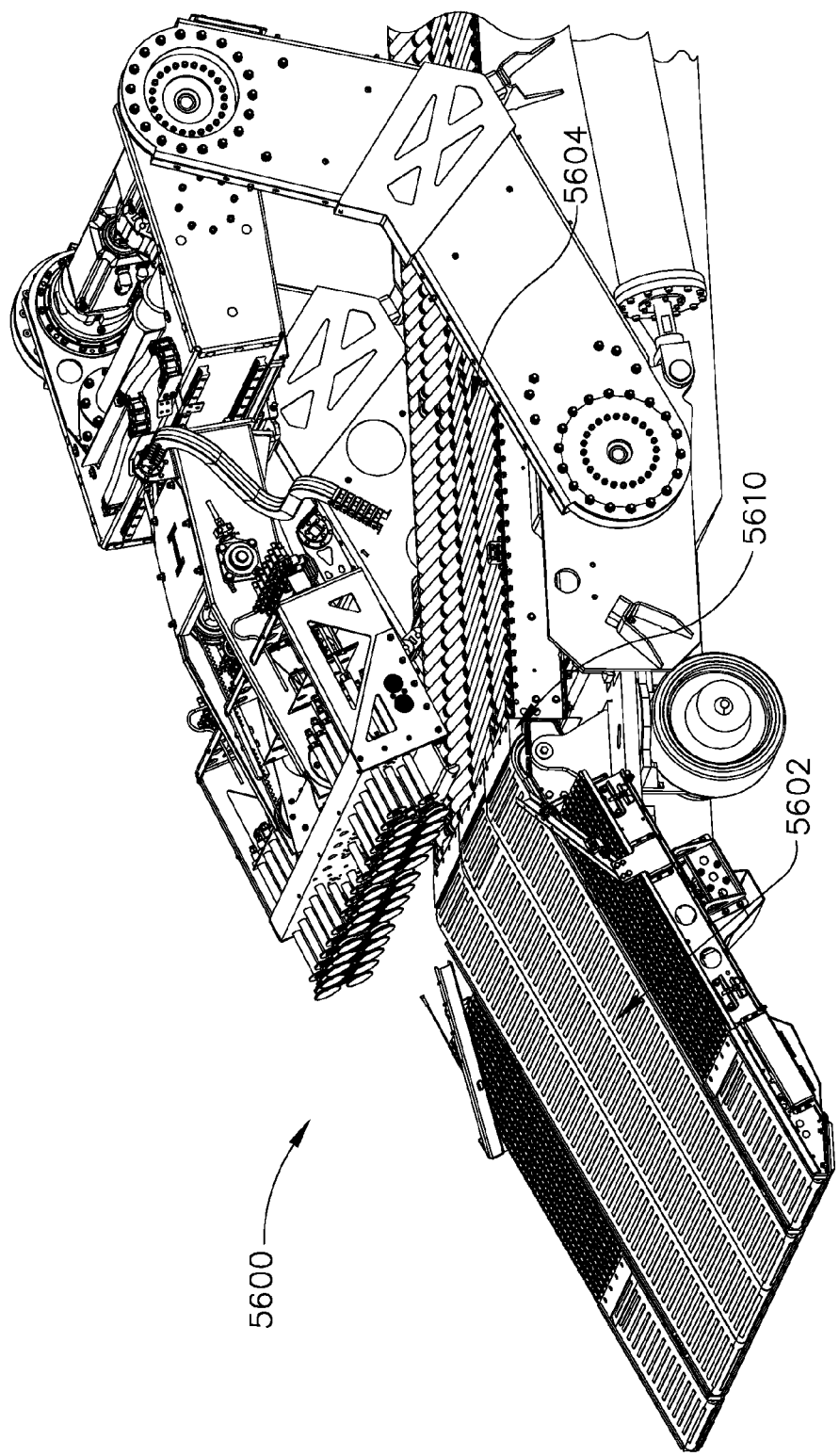
FIG. 56 is a diagram illustrating a perspective view of a front-end descrambler of a robotic carton unloader according to various embodiments.

In various embodiments, robotic carton unloaders may utilize a connection or connector element to join or otherwise connect front-end descramblers with central descramblers (e.g., herringbone-type central descramblers) of conveyor systems. Such connections may be physical sections that not only provide a surface in between rollers (or conveyor belts) of the front-end descramblers and the central descramblers, but may also include moving elements to move items (e.g., cartons, boxes, etc.). In particular, a connection may be a system that includes a flat plastic sheet with a series of holes punched into it, wherein each hole may have a roller positioned at 45 degree angle directed inwards, such as inwards towards the rollers of a central descrambler. The rollers within the holes may be driven, such as via a series of other rollers. In this way, the connection may be capable of propelling items (e.g., boxes) in a forward direction as well as in an inward direction. In some embodiments, the connection may be an Intralox system. FIG. 56 shows a front-end descrambler 5602 of a robotic carton unloader 5600 configured with such a connection 5610 between a five-row front-end descrambler 5602 and a herringbone-type central descrambler 5604.

Figure 57A:
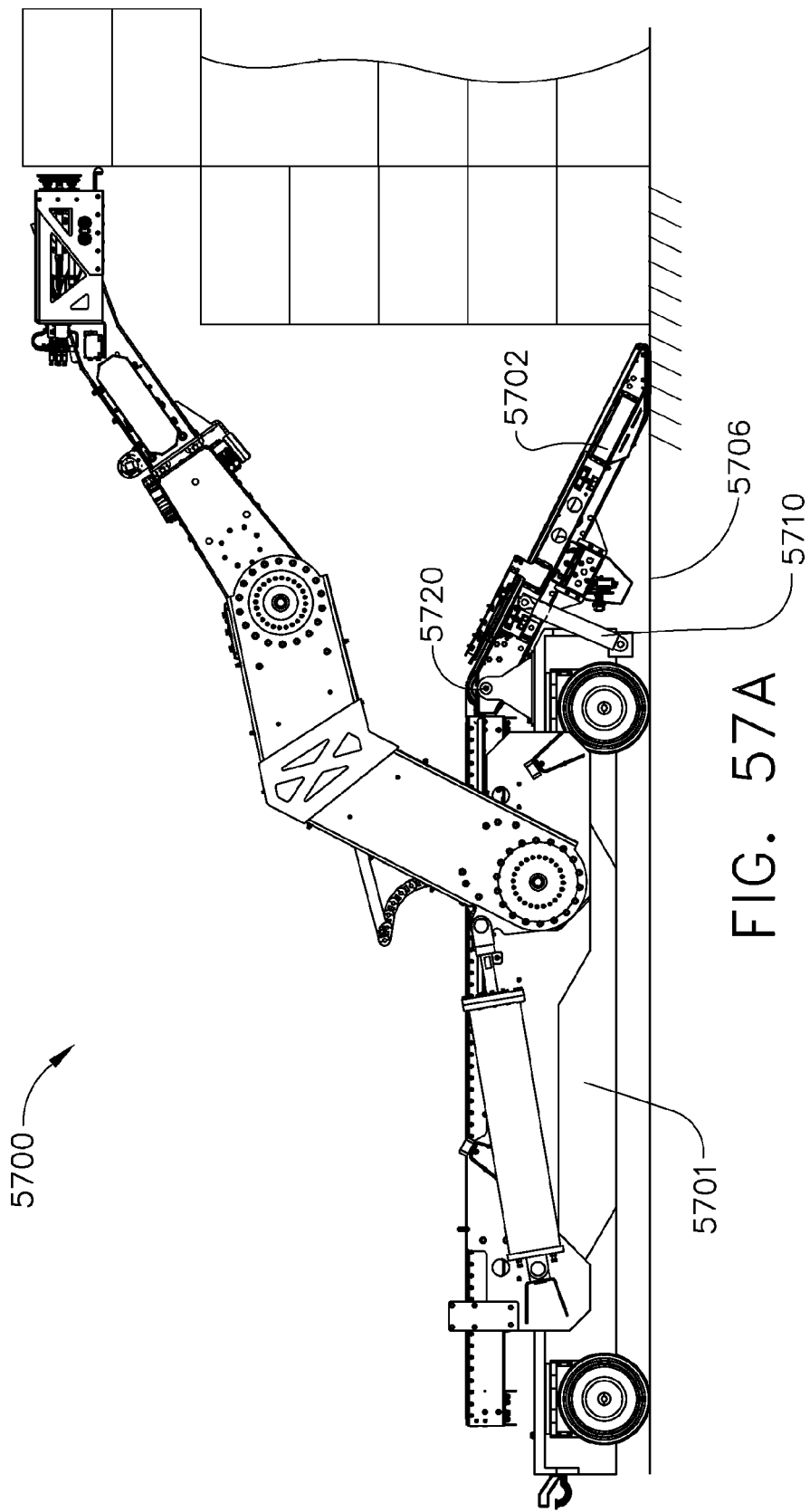
FIGS. 57A-57B are diagrams illustrating side views of a robotic carton unloader configured with components to lift (or lower) a front-end descrambler at different angles according to various embodiments.
Figure 57B:
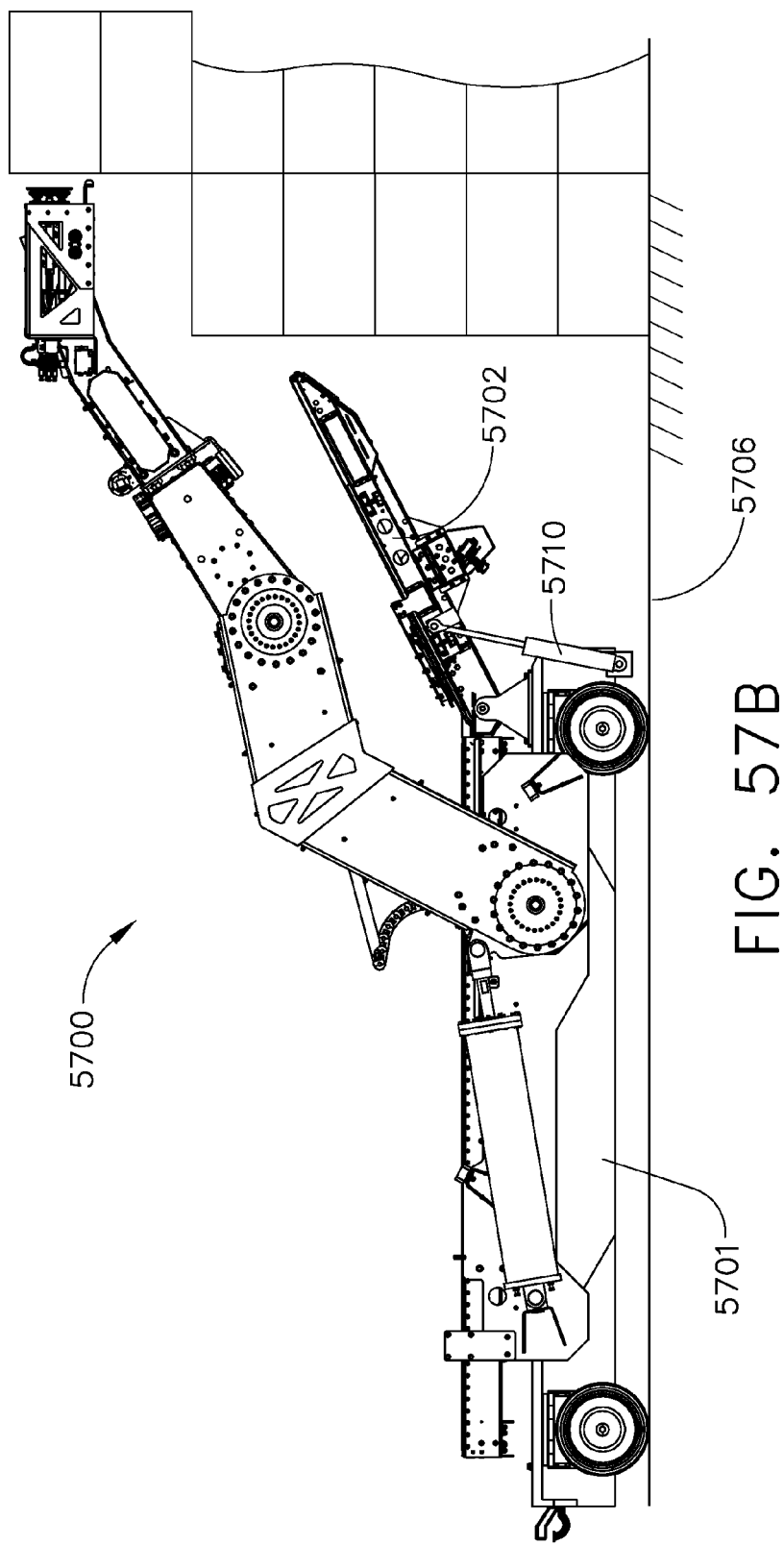

FIGS. 57A-57B illustrate an embodiment robotic carton unloader 5700 configured with components to lift (or lower) a front-end descrambler 5702 at different angles. In various embodiments, the robotic carton unloader 5700 may include a device 5710, such as a hydraulic cylinder device, a pneumatic device, fluidics, and/or an electric screw actuator, that may be capable of moving the front-end descrambler 5702 such that it rotates up or down on a pivot or hinge 5720. Such movements of the front-end descrambler 5702 may be used to assist in loading items from a truck trailer, such as by lifting up the front-end descrambler 5702 to receive boxes from the top of a wall of boxes or lowering down the front-end descrambler 5702 to assist in catch boxes that fall or are pulled from the wall of boxes.

In various embodiments, the device 5710 may be mounted to the mobile body 5701 at a low point at the front. The device 5710 may also be aimed in an upward direction such that when the device 5710 is extended or otherwise engaged (e.g., a piston or rod is pushed upward out of the body of the device 5710), the front-end descrambler 5702 may be rotated (or otherwise moved) upwards. Similarly, the top of the device 5710 (or cylinder) may pivot out to a horizontal position when not engaged (e.g., with the piston or rod compressed down).

FIG. 57A illustrates the robotic carton unloader 5700 having the front-end descrambler 5702 lower to a first position such that it makes physical contact with a surface 5706, such as a truck trailer floor. For example, the device 5710 may be in a default extension or arrangement such that the front-end descrambler 5702 is at a default position that rests on the surface 5706. FIG. 57B illustrates the robotic carton unloader 5700 having the front-end descrambler 5702 raised to a second position such that it no longer makes physical contact with the surface 5706. For example, the device 5710 may be in an extended state (e.g., a piston is extended from the body of the device 5710) or arrangement such that the front-end descrambler 5702 is at the raised second position. Such a raised second position may be useful when the robotic carton unloader 5700 is moved into a truck trailer, as the raised position may decrease the potential for the front-end descrambler to scrape or otherwise interact with the surface 5706. In various embodiments, the front-end descrambler 5702 may be limited in its allowed amount of rotation or other movement. For example, the device 5710 may be configured to only permit the front-end descrambler 5702 to be raised or lowered such that items on the front-end descrambler may not tumble (e.g., an 18 degree maximum rotation from a level setting).

Figure 58:
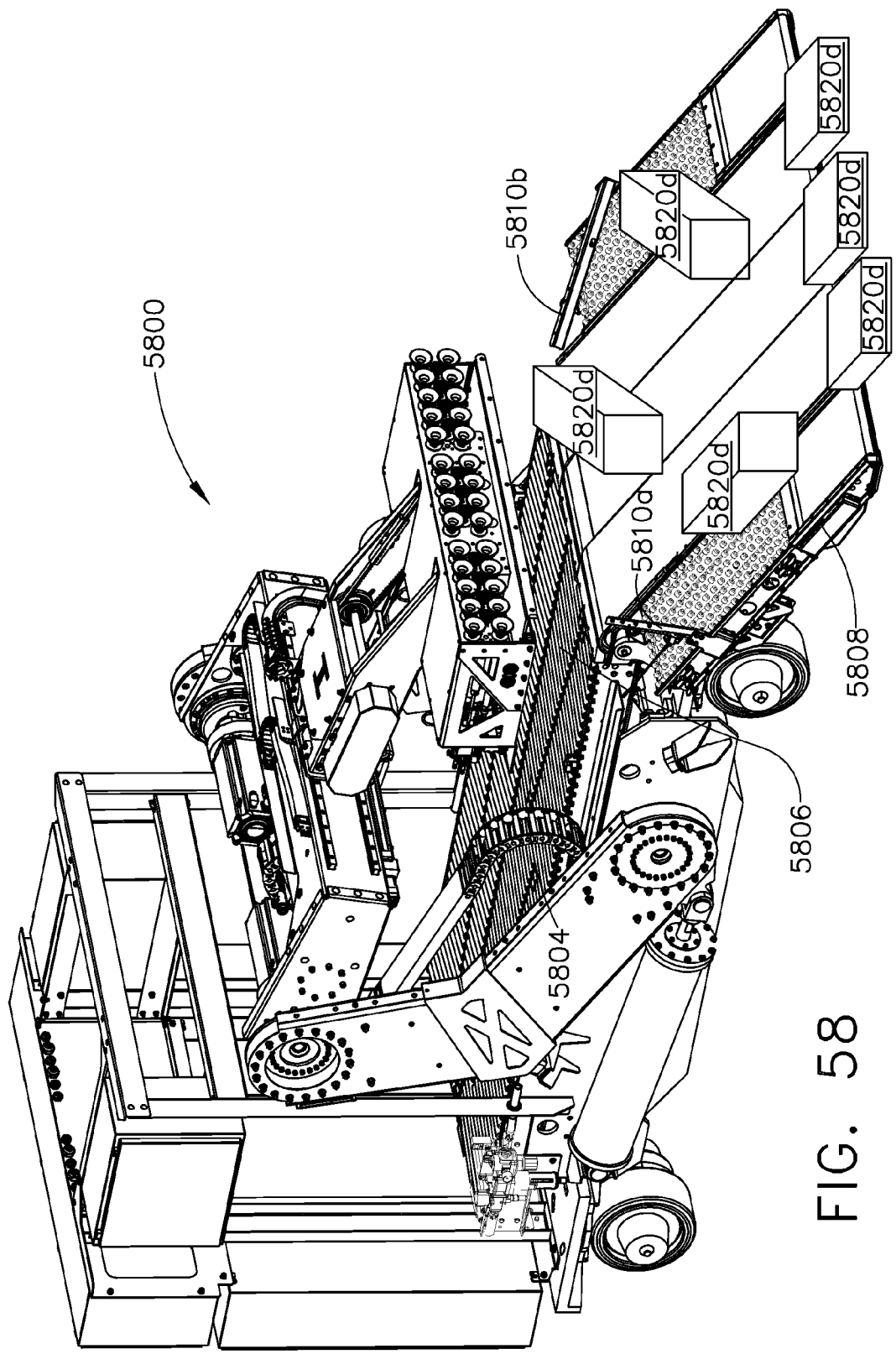
FIG. 58 is a diagram illustrating perspective view of items being moved via a front-end descrambler of a robotic carton unloader in accordance with various embodiments.

FIG. 58 illustrates items 5820a-5820f (e.g., boxes, cartons, etc.) being conveyed via a front-end descrambler 5808 of a robotic carton unloader 5800 in accordance with various embodiments. As described above, the front-end descrambler 5808 may be comprised of a plurality of rows configured to propel items towards the robotic carton unloader (i.e., towards a herringbone-type central descrambler 5804 at the center of the conveyor system of the robotic loader). For example, the front-end descrambler 5808 may include five rows that may each utilize an individual conveyor belt or a set of rollers to drive boxes toward a connection 5806 between the front-end descrambler 5808 and another descrambler element (e.g., a herringbone-type central descrambler 5804, etc.) of the robotic carton unloader 5800.

Further, the rate at which the different rows of the front-end descrambler 5808 drive items may vary. In particular, the outer-most rows may be configured to drive items towards the herringbone-type central descrambler 5804 at a first speed or rate, the middle rows may drive items towards the herringbone-type central descrambler 5804 at a second speed or rate, and the inner-most row(s) or center row(s) may drive items towards the herringbone-type central descrambler 5804 at a third speed or rate. For example, the outer-most rows may move items at a slow speed, the middle rows may move items at a medium speed, and the inner-most (or center) row(s) may move items at a fast speed. In this way, items placed on the front-end descrambler 5808 may arrive at the next section of the of the robotic carton unloader's conveyor system (e.g., the herringbone-type central descrambler 5804), at different times, avoiding jams or blockages of items placed on the front-end descrambler 5808 at the same or similar time.

Figure 59A:
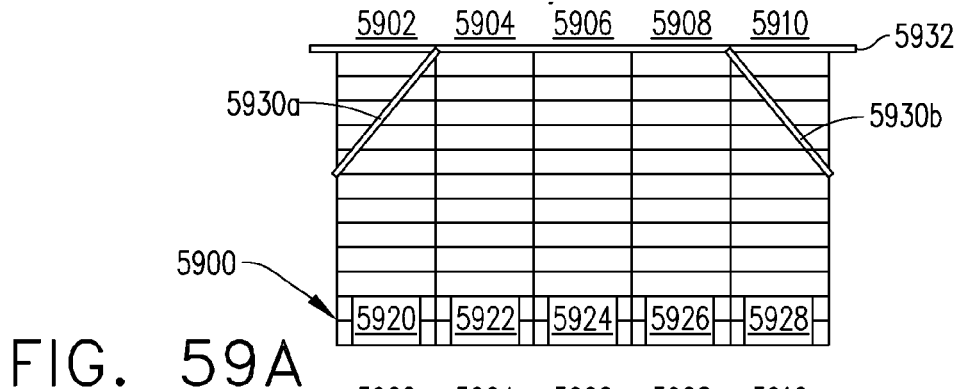
FIGS. 59A-59D are diagrams illustrating a progression of items traveling over a period on a front-end descrambler of a robotic carton unloader in accordance with various embodiments.
Figure 59B:
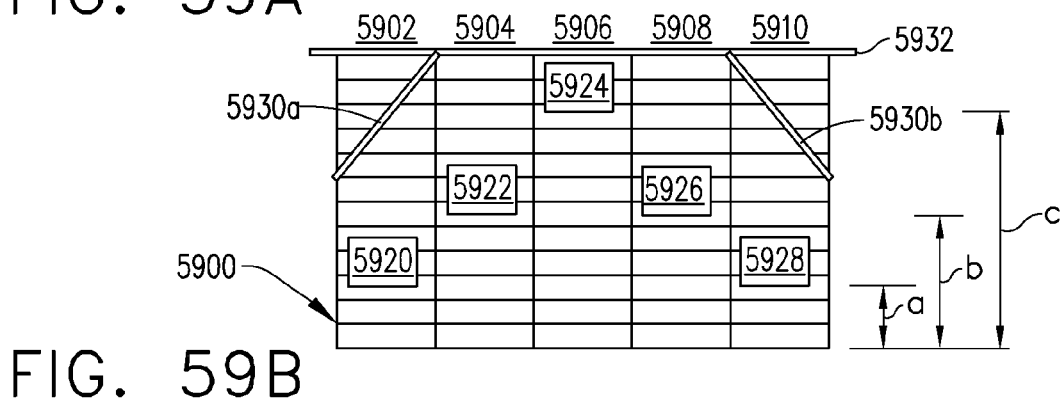

FIGS. 59A-59D illustrate how items 5920-5928 may be moved over time and at different rates based on their placement on the various rows 5902-5910 of the front-end descrambler 5900. The first row 5902 and fifth row 5910 (i.e., the outer-most rows) may be configured to move items at a first, slow rate or speed. The second row 5904 and fourth row 5908 (i.e., the middle rows) may be configured to move items at a second, medium rate or speed. The third row 5906 (i.e., the center row) may be configured to move items at a third, fast rate or speed. FIG. 59A shows the items 5920-5928 placed at the beginning of each of the rows 5902-5910. FIG. 59B shows the advancement of the items 5920-5928 on the rows 5902-5910 after a first period of time. In particular, the first item 5920 and fifth item 5928 have moved a first distance (represented as distance 'a' in FIG. 59B) based on the first speed of the first row 5902 and fifth row 5910, respectively. The second item 5922 and the fourth item 5926 have moved a second distance (represented as distance 'b' in FIG. 59B) based on the second speed of the second row 5904 and fourth row 5908, respectively. The third item 5924 has moved a third distance (represented as distance 'c' in FIG. 59B) based on the third speed of the third row 5906. The first distance (a) may be considered the shortest as the speed of the first row 5902 and fifth row 5910 may be a low (or slow) speed, and the third distance (c) may be considered the longest, as the speed of the third row 5906 is a high (or fast) speed. The second distance (b) may be between the first and third distances (a, c) as the speed of the second row 5904 and fourth row 5908 may only be a medium speed.

Figure 59C:
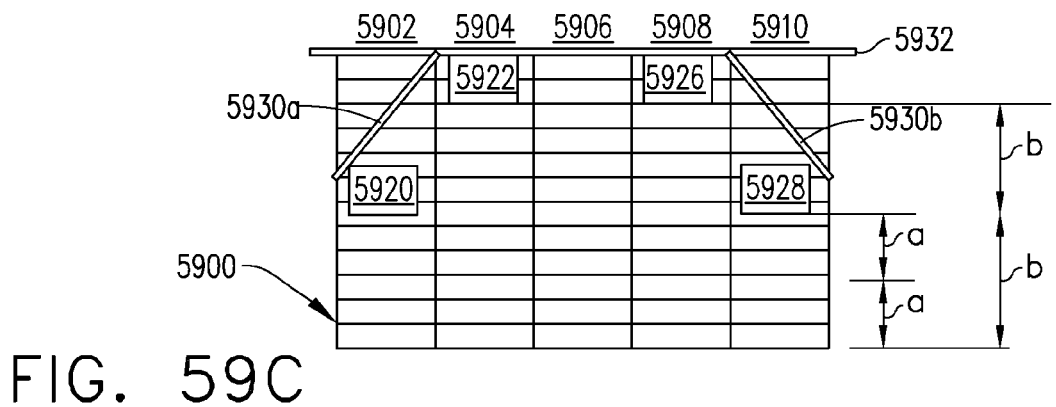

As shown in FIG. 59C, after a second period of time (e.g., similar to the first period of time), the first item 5920 and fifth item 5928 have again moved the first distance (represented as distance 'a' in FIG. 59C) based on the first speed of the first row 5902 and fifth row 5910, respectively, and the second item 5922 and the fourth item 5926 have again moved the second distance (represented as distance 'b' in FIG. 59C) based on the second speed of the second row 5904 and fourth row 5908, respectively. The third item 5924 is no longer shown, as it has moved past a connection 5932 and off the front-end descrambler 5900 due to the speed of the third row 5906.

The first item 5920 and fifth item 5928 may come into contact with guides 5930a, 5930b, respectively. As described above, the guides 5930a, 5930b may be pieces of material (e.g., wood, metal, plastic, etc.) that are placed at an angle to cause items moving along the various rows to be directed towards the center of the front-end descrambler 5900. In other words, the first guide 5930a may be angled and positioned on the front-end descrambler 5900 such that the first item 5920 may be guided from the first row 5902 towards the second row 5904, and likewise, the second guide 5930b may be angled and positioned such that the fifth item 5928 may be guided from the fifth row 5910 to the fourth row 5908. As items moving along in the inner rows 5904-5908 are being moved at faster speeds than the outer rows 5902, 5910, items directed to the inner rows 5904-5908 by the guides 5930a, 5930b may not be as likely to collide with items already moving in those rows 5904-5908.

Figure 59D:
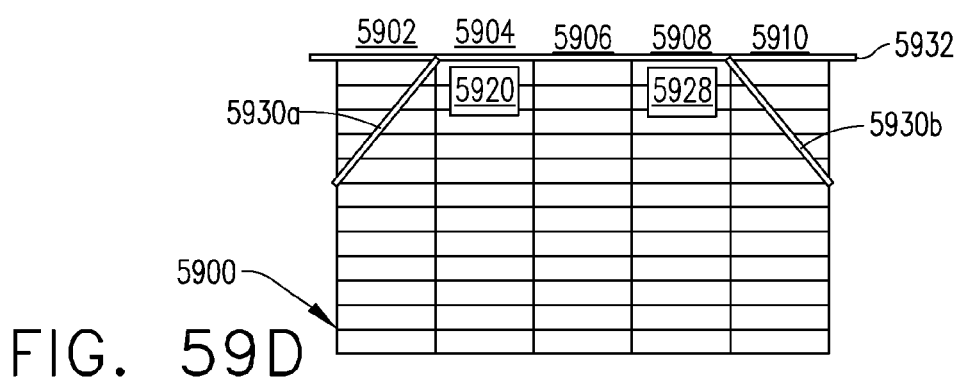

Accordingly and as shown in FIG. 59D, after a third period of time, the first item 5920 may be located on the second row 5904 due to contact with the first guide 5930a, and the fifth item 5928 may be located on the fourth row 5908 due to contact with the second guide 5930b. The first item 5920 and fifth item 5928 may now be moving at the second speed associated with the second and fourth rows 5904, 5908. The second item 5922 and fourth item 5926 are no longer shown, as they have already moved past the connection 5932 and off the front-end descrambler 5900 due to the speed of the second row 5904 and fourth row 5908.

As used herein, processors may be any programmable microprocessor, microcomputer or multiple processor chip or chips that can be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the embodiment, specific terminology was used for the sake of clarity. It is to be understood that each specific term includes all technical equivalents which operate in a similar manner to accomplish a similar purpose. It is intended that the scope of this provisional filing will be better defined by the claims submitted with a later non-provisional filing.

What is claimed is:

1. A robotic carton unloader for unloading cartons in a carton pile, the robotic carton unloader movable across a floor, the robotic carton unloader comprising:
a mobile body;
a movable robotic arm attached to the mobile body and comprising an end effector at an end thereof, the end effector configured to unload a row of cartons in a side-by-side orientation from the carton pile;
a descrambling conveyor mounted on the mobile body configured to receive the row of cartons from the end effector in the side-by-side orientation, the descrambling conveyor further configured to simultaneously move the row of cartons towards a rear of the robotic carton unloader and to singulate the cartons while the cartons move.

2. The robotic carton unloader of claim 1, wherein the descrambling conveyor comprises a plurality of rows of conveyors oriented side by side.

3. The robotic carton unloader of claim 2, wherein at least one of the conveyors in the plurality of rows of conveyors is configured to move a carton carried thereon at a different speed than other conveyors in the plurality of rows of conveyors.

4. The robotic carton unloader of claim 3, wherein at least one of the conveyors in the plurality of rows of conveyors is configured to move the carton traveling thereon rearwards and towards a center line of the descrambling conveyor.

5. The robotic carton unloader of claim 4, wherein at least one of the conveyors in the plurality of rows of conveyors comprises skewed rollers.

6. The robotic carton unloader of claim 5, wherein the skewed rollers of the at least one of the conveyors in the plurality of rows of conveyors are skewed in herringbone patterns.

7. The robotic carton unloader of claim 3, wherein the conveyors in the plurality of rows of conveyors comprise belt conveyors.

8. The robotic carton unloader of claim 1, wherein the descrambling conveyor comprises a front-end descrambler and a central descrambler, the front-end descrambler feeding the cartons to the central descrambler.

9. The robotic carton unloader of claim 8, wherein the front-end descrambler is pivotally mounted to the mobile body at an intersection of the front-end descrambler with the central descrambler, the front-end descrambler having a front end pivotally movable towards and away from the floor.

10. The robotic carton unloader of claim 8, wherein the central descrambler comprises a plurality of rows configured to move the cartons toward a rear of the robotic carton unloader, the plurality of rows are on both sides of a center line running a length of the central descrambler.

11. The robotic carton unloader of claim 10, wherein each of the plurality of rows is comprised of a plurality of rollers angled toward the center line.

12. The robotic carton unloader of claim 10, wherein the plurality of rows are associated with a plurality of zones, each zone being configured to move the cartons at a different speed.

13. The robotic carton unloader of claim 12, wherein a first set of zones of the plurality of zones located on a first side of the center line of the central descrambler are configured to move the cartons at a faster speed than a second set of zones of the plurality of zones located on a second side of the center line of the central descrambler.

14. The robotic carton unloader of claim 13, wherein the plurality of zones comprises three zones located on a first side of the center line of the central descrambler and three zones located on a second side of the center line of the central descrambler.

15. The robotic carton unloader of claim 8, wherein the front-end descrambler comprises a plurality of parallel rows configured to move the cartons toward the central descrambler.

16. The robotic carton unloader of claim 15, wherein each in the plurality of parallel rows is configured to move the cartons toward the central descrambler at a different speed.

17. The robotic carton unloader of claim 15, wherein the plurality of parallel rows comprises inner rows and outer-most rows, and wherein the inner rows of the plurality of parallel rows are configured to move the cartons toward the central descrambler at faster speeds than the outer-most rows of the plurality of parallel rows.

18. The robotic carton unloader of claim 17, wherein each of the outer-most rows of the plurality of parallel rows comprise a section of rollers configured to move the cartons diagonally inward toward the inner rows of the plurality of parallel rows.

19. The robotic carton unloader of claim 17, wherein a center row of the inner rows of the plurality of parallel rows is configured to move the cartons toward the central descrambler at a fast speed, two middle rows of the inner rows of the plurality of parallel rows are configured to move the cartons toward the central descrambler at a medium speed, and two outer rows of the outer-most rows of the plurality of parallel rows are configured to move the cartons toward the central descrambler at a slow speed.

20. The robotic carton unloader of claim 8, wherein the front-end descrambler is configured to move laterally relative to the central descrambler.

* * * * *